(12) United States Patent
Moran et al.

(10) Patent No.: US 10,027,789 B2
(45) Date of Patent: Jul. 17, 2018

(54) MODULAR WIRELESS COMMUNICATOR

(71) Applicant: Google Inc., Mountain View, CA (US)

(72) Inventors: Dov Moran, Kfar Saba (IL); Itay Sherman, Hod Hasharon (IL); Eyal Bychkov, Hod Hasharon (IL); Itay Cohen, Hod Hasharon (IL); Yaron Segalov, Tel Aviv (IL); Tamir Demri, Herzilya (IL); Eran Miller, Givataim (IL); Uri Ron, Tel Aviv (IL); Tal Engelstein, Ramat Gan (IL); Hagay Katz, Moshav Herut (IL); Hagit Perry, Herzilya (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/369,826

(22) Filed: Dec. 5, 2016

(65) Prior Publication Data

US 2017/0099377 A1 Apr. 6, 2017

Related U.S. Application Data

(63) Continuation of application No. 14/696,438, filed on Apr. 26, 2015, now Pat. No. 9,516,151, which is a
(Continued)

(51) Int. Cl.
*H04M 1/00* (2006.01)
*H04M 1/725* (2006.01)
(Continued)

(52) U.S. Cl.
CPC .... *H04M 1/72527* (2013.01); *H04L 63/0853* (2013.01); *H04M 1/0256* (2013.01); *H04W 4/14* (2013.01)

(58) Field of Classification Search
CPC ........... H04M 1/72527; H04M 1/0256; H04M 1/72522; H04M 1/7253; H04M 1/725; H04L 63/0853; H04W 4/14; H04W 88/02
(Continued)

(56) References Cited

U.S. PATENT DOCUMENTS

| 4,969,180 A | 11/1990 | Watterson et al. |
| 5,313,557 A | 5/1994 | Osterhout |

(Continued)

FOREIGN PATENT DOCUMENTS

| EP | 1871075 | 12/2007 |
| WO | WO-9421058 | 9/1994 |

(Continued)

OTHER PUBLICATIONS

"Advisory Action", U.S. Appl. No. 12/144,671, dated Nov. 28, 2012, 3 pages.
(Continued)

*Primary Examiner* — Nhan Le
(74) *Attorney, Agent, or Firm* — Colby Nipper

(57) ABSTRACT

A wireless communicator including a housing, wireless communication functionality located within the housing, native user interface functionality cooperating with the wireless communication functionality and including user interface surfaces located on at least one outer facing surface of the housing, and pouching responsive electrical interconnection functionality responsive to pouching orientation of the housing in a pouch of an enhanced function device for automatically causing the wireless communication functionality to adapt to interoperation with parenting user interface functionality forming part of the enhanced function device at least partially instead of with the native user interface functionality. A method is also described and claimed.

20 Claims, 80 Drawing Sheets

Related U.S. Application Data continuation of application No. 14/282,332, filed on May 20, 2014, now Pat. No. 9,026,080, which is a continuation of application No. 13/761,188, filed on Feb. 7, 2013, now Pat. No. 8,750,928, which is a continuation of application No. 13/471,751, filed on May 15, 2012, now Pat. No. 8,391,921, which is a continuation of application No. 12/525,820, filed as application No. PCT/IL2008/000164 on Feb. 6, 2008, now Pat. No. 8,180,395.

(60) Provisional application No. 60/901,353, filed on Feb. 13, 2007, provisional application No. 60/901,368, filed on Feb. 13, 2007, provisional application No. 60/918,943, filed on Mar. 20, 2007, provisional application No. 60/918,966, filed on Mar. 20, 2007, provisional application No. 60/918,967, filed on Mar. 20, 2007, provisional application No. 60/918,968, filed on Mar. 20, 2007, provisional application No. 60/919,112, filed on Mar. 20, 2007, provisional application No. 60/919,243, filed on Mar. 21, 2007, provisional application No. 60/920,037, filed on Mar. 26, 2007, provisional application No. 60/933,780, filed on Jun. 8, 2007, provisional application No. 60/933,792, filed on Jun. 8, 2007, provisional application No. 60/933,793, filed on Jun. 8, 2007, provisional application No. 60/964,233, filed on Aug. 9, 2007, provisional application No. 60/964,872, filed on Aug. 14, 2007, provisional application No. 60/995,575, filed on Sep. 26, 2007, provisional application No. 61/009,523, filed on Dec. 28, 2007, provisional application No. 61/063,668, filed on Feb. 5, 2008.

(51) Int. Cl.
*H04W 4/14* (2009.01)
*H04L 29/06* (2006.01)
*H04M 1/02* (2006.01)

(58) Field of Classification Search
USPC .................................. 455/556.1, 557, 550.1
See application file for complete search history.

(56) References Cited

U.S. PATENT DOCUMENTS

| | | | |
|---|---|---|---|
| 5,381,086 A | 1/1995 | Aslan | |
| 5,418,448 A | 5/1995 | Aslan | |
| 5,625,673 A | 4/1997 | Grewe et al. | |
| 5,628,055 A | 5/1997 | Stein | |
| 5,729,213 A | 3/1998 | Ferrari et al. | |
| 5,758,280 A | 5/1998 | Kimura | |
| 5,809,115 A | 9/1998 | Inkinen | |
| 5,890,016 A | 3/1999 | Tso | |
| 5,893,037 A | 4/1999 | Reele et al. | |
| 5,898,758 A | 4/1999 | Rosenberg | |
| 5,907,815 A | 5/1999 | Grimm et al. | |
| 5,913,227 A | 6/1999 | Raz et al. | |
| 5,928,367 A | 7/1999 | Nelson et al. | |
| 5,983,073 A | 11/1999 | Ditzik | |
| 6,029,074 A | 2/2000 | Irvin | |
| 6,158,884 A | 12/2000 | Lebby et al. | |
| 6,188,917 B1 | 2/2001 | Laureanti | |
| 6,195,562 B1 | 2/2001 | Pirhonen et al. | |
| 6,201,867 B1 | 3/2001 | Koike | |
| 6,209,011 B1 | 3/2001 | Vong et al. | |
| 6,212,414 B1 | 4/2001 | Alameh et al. | |
| 6,224,254 B1 | 5/2001 | Hayek et al. | |
| 6,236,969 B1 | 5/2001 | Ruppert et al. | |
| 6,243,578 B1 | 6/2001 | Koike | |
| 6,263,218 B1 | 7/2001 | Kita | |
| 6,272,359 B1 | 8/2001 | Kivela et al. | |
| 6,307,348 B1 | 10/2001 | Green | |
| 6,477,357 B1 | 11/2002 | Cook | |
| 6,516,202 B1 | 2/2003 | Hawkins et al. | |
| 6,553,567 B1 | 4/2003 | Wugofski et al. | |
| 6,565,608 B1 | 5/2003 | Fein et al. | |
| 6,594,370 B1 | 7/2003 | Anderson | |
| 6,600,929 B1 | 7/2003 | Toncich et al. | |
| 6,640,113 B1 | 10/2003 | Shim et al. | |
| 6,665,802 B1 | 12/2003 | Ober | |
| 6,690,947 B1 | 2/2004 | Tom | |
| 6,694,125 B2 | 2/2004 | White et al. | |
| 6,696,941 B2 | 2/2004 | Baker | |
| 6,751,474 B1 | 6/2004 | Lin et al. | |
| 6,757,551 B2 | 6/2004 | Newman et al. | |
| 6,760,600 B2 | 7/2004 | Nickum | |
| 6,775,206 B2 | 8/2004 | Karhu | |
| 6,778,436 B2 | 8/2004 | Piau et al. | |
| 6,882,870 B2 | 4/2005 | Kivela et al. | |
| 6,888,202 B2 | 5/2005 | Kang et al. | |
| 6,898,283 B2 | 5/2005 | Wycherley et al. | |
| 6,901,245 B1 | 5/2005 | Boyle | |
| 6,907,264 B1 | 6/2005 | Sterkel | |
| 6,912,287 B1 | 6/2005 | Fukumoto et al. | |
| 6,952,181 B2 | 10/2005 | Karr et al. | |
| 6,957,049 B1 | 10/2005 | Takeda | |
| 6,968,394 B1 | 11/2005 | El-Rafie | |
| 6,978,160 B2 | 12/2005 | Hutchison et al. | |
| 6,983,244 B2 | 1/2006 | Junqua et al. | |
| 6,999,792 B2 | 2/2006 | Warren | |
| 7,016,481 B2 | 3/2006 | McElvaney | |
| 7,016,707 B2 | 3/2006 | Fujisawa et al. | |
| 7,031,692 B1 | 4/2006 | Zanzi | |
| 7,076,272 B2 | 7/2006 | Ikeda et al. | |
| 7,085,542 B2 | 8/2006 | Dietrich et al. | |
| 7,089,035 B2 | 8/2006 | Ando et al. | |
| 7,103,380 B1 | 9/2006 | Ditzik | |
| 7,127,053 B1 | 10/2006 | Laljiani | |
| 7,130,664 B1 | 10/2006 | Williams | |
| 7,146,139 B2 | 12/2006 | Nevermann | |
| 7,155,745 B1 | 12/2006 | Shin et al. | |
| 7,194,285 B2 | 3/2007 | Tom | |
| 7,200,416 B2 | 4/2007 | Aisenberg | |
| 7,215,980 B2 | 5/2007 | Chai et al. | |
| 7,231,181 B2 | 6/2007 | Kohli et al. | |
| 7,233,809 B2 | 6/2007 | Kanevsky et al. | |
| 7,242,963 B1 | 7/2007 | Karstens et al. | |
| 7,266,391 B2 | 9/2007 | Warren | |
| 7,308,272 B1 | 12/2007 | Wortham | |
| 7,311,551 B1 | 12/2007 | Krula | |
| 7,313,423 B2 | 12/2007 | Griffin et al. | |
| 7,373,179 B2 | 5/2008 | Stine et al. | |
| 7,383,061 B1 | 6/2008 | Hawkins | |
| 7,383,362 B2 | 6/2008 | Yu et al. | |
| 7,395,313 B2 | 7/2008 | Ketola | |
| 7,428,429 B2 | 9/2008 | Gantz et al. | |
| 7,450,461 B2 | 11/2008 | Kotani et al. | |
| 7,477,919 B2 | 1/2009 | Warren | |
| 7,499,722 B2 | 3/2009 | McDowell et al. | |
| 7,499,729 B2 | 3/2009 | Lie et al. | |
| 7,509,094 B2 | 3/2009 | Moran et al. | |
| 7,512,402 B2 | 3/2009 | Narayanaswami et al. | |
| 7,515,937 B2 | 4/2009 | Lee | |
| 7,555,264 B2 | 6/2009 | Ishiwata et al. | |
| 7,596,666 B2 | 9/2009 | Ahn et al. | |
| 7,623,892 B2 | 11/2009 | Hawkins | |
| 7,706,850 B2 | 4/2010 | Parivash | |
| 7,739,738 B1 | 6/2010 | Sobel et al. | |
| 7,742,787 B2 | 6/2010 | Nghiem et al. | |
| 7,746,409 B2 | 6/2010 | Okamoto et al. | |
| 7,774,027 B2 | 8/2010 | Parikh et al. | |
| 7,783,318 B2 | 8/2010 | Wilson et al. | |
| 7,787,405 B2 | 8/2010 | Dettinger et al. | |
| 7,813,697 B2 | 10/2010 | McKillop | |
| 7,814,304 B2 | 10/2010 | Cornwell et al. | |
| 7,827,337 B2 | 11/2010 | Jeong | |
| 7,835,827 B2 | 11/2010 | Peed et al. | |
| 7,873,385 B2 | 1/2011 | Boireau et al. | |

(56) References Cited

U.S. PATENT DOCUMENTS

| | | | |
|---|---|---|---|
| 7,890,947 B2 | 2/2011 | Toyoshima | |
| 7,953,455 B2 | 5/2011 | Moran et al. | |
| 7,970,433 B2 | 6/2011 | Sherman et al. | |
| 7,971,046 B2 | 6/2011 | Mansson et al. | |
| 8,058,988 B1 | 11/2011 | Medina et al. | |
| 8,063,888 B2 | 11/2011 | McFarlane et al. | |
| 8,069,282 B2 | 11/2011 | Sherman et al. | |
| 8,180,395 B2 | 5/2012 | Moran et al. | |
| 8,185,156 B2 * | 5/2012 | Camilleri | H04W 8/183 455/428 |
| 8,238,961 B2 | 8/2012 | Bychkov et al. | |
| 8,260,348 B2 | 9/2012 | Sherman | |
| 8,327,124 B2 | 12/2012 | Sherman et al. | |
| 8,356,062 B2 | 1/2013 | Shinohara et al. | |
| 8,391,921 B2 | 3/2013 | Moran et al. | |
| 8,406,814 B2 | 3/2013 | Bychkov et al. | |
| 8,412,226 B2 | 4/2013 | Ron et al. | |
| 8,412,228 B2 | 4/2013 | Yoon | |
| 8,750,928 B2 * | 6/2014 | Moran | H04M 1/0256 455/556.1 |
| 8,750,936 B2 | 6/2014 | Bychkov et al. | |
| 8,755,846 B2 | 6/2014 | Moran et al. | |
| 8,811,363 B2 | 8/2014 | Velasco | |
| 8,850,086 B2 | 9/2014 | Sherman et al. | |
| 8,892,164 B2 | 11/2014 | Sherman | |
| 9,288,292 B2 | 3/2016 | Bychkov et al. | |
| 9,510,128 B2 | 11/2016 | Ron et al. | |
| 9,516,151 B2 | 12/2016 | Moran et al. | |
| 2006/0072287 A1 | 5/2001 | Hunter | |
| 2002/0075189 A1 | 6/2002 | Carillo et al. | |
| 2002/0090980 A1 | 7/2002 | Wilcox et al. | |
| 2002/0097700 A1 * | 7/2002 | Alastalo | H04W 40/246 370/338 |
| 2002/0151327 A1 | 10/2002 | Levitt | |
| 2002/0183004 A1 | 12/2002 | Fulton et al. | |
| 2003/0078036 A1 | 4/2003 | Chang et al. | |
| 2003/0084287 A1 | 5/2003 | Wang et al. | |
| 2003/0115930 A1 | 6/2003 | Kappi et al. | |
| 2003/0191818 A1 | 10/2003 | Rankin et al. | |
| 2003/0214780 A1 | 11/2003 | Oh-Yang et al. | |
| 2003/0228875 A1 | 12/2003 | Alapuranen | |
| 2004/0057578 A1 | 3/2004 | Brewer | |
| 2004/0063475 A1 | 4/2004 | Weng | |
| 2004/0068653 A1 | 4/2004 | Fascenda | |
| 2004/0171348 A1 | 9/2004 | Lin | |
| 2004/0233930 A1 | 11/2004 | Colby | |
| 2004/0236997 A1 | 11/2004 | Poo | |
| 2004/0248623 A1 | 12/2004 | Nelson et al. | |
| 2004/0266424 A1 | 12/2004 | Park et al. | |
| 2004/0268005 A1 | 12/2004 | Dickie | |
| 2005/0059429 A1 | 3/2005 | Liu et al. | |
| 2005/0070225 A1 | 3/2005 | Lee | |
| 2005/0124305 A1 | 6/2005 | Stichelbout | |
| 2005/0141700 A1 | 6/2005 | Takeda et al. | |
| 2005/0150122 A1 | 7/2005 | Cho et al. | |
| 2005/0150697 A1 | 7/2005 | Altman et al. | |
| 2005/0159153 A1 * | 7/2005 | Mousseau | H04W 36/0066 455/432.1 |
| 2005/0159184 A1 | 7/2005 | Kerner et al. | |
| 2005/0207599 A1 | 9/2005 | Fukumoto et al. | |
| 2005/0228980 A1 | 10/2005 | Brokish et al. | |
| 2005/0233749 A1 | 10/2005 | Karaoguz et al. | |
| 2005/0239404 A1 | 10/2005 | Karabinis | |
| 2007/0018957 A1 | 12/2005 | Seo | |
| 2006/0002404 A1 * | 1/2006 | Igarashi | H04L 63/0236 370/401 |
| 2006/0003804 A1 | 1/2006 | Liu | |
| 2006/0025158 A1 | 2/2006 | Leblanc et al. | |
| 2006/0035663 A1 | 2/2006 | Cheng | |
| 2006/0056446 A1 | 3/2006 | Lee et al. | |
| 2006/0068760 A1 | 3/2006 | Hameed | |
| 2006/0078122 A1 | 4/2006 | Dacosta | |
| 2006/0094481 A1 | 5/2006 | Gullickson | |
| 2006/0105718 A1 * | 5/2006 | Ozluturk | H04W 8/005 455/67.11 |
| 2006/0105722 A1 | 5/2006 | Kumar | |
| 2006/0116113 A1 | 6/2006 | Gass | |
| 2006/0128376 A1 | 6/2006 | Alexis | |
| 2006/0154688 A1 | 7/2006 | Chai et al. | |
| 2006/0163493 A1 | 7/2006 | Antanouski | |
| 2006/0190321 A1 | 8/2006 | Martins Nicho et al. | |
| 2006/0200843 A1 | 9/2006 | Morgan et al. | |
| 2006/0209809 A1 | 9/2006 | Ellingham et al. | |
| 2006/0241353 A1 | 10/2006 | Makino et al. | |
| 2006/0245585 A1 | 11/2006 | Yin et al. | |
| 2006/0271678 A1 | 11/2006 | Jessup et al. | |
| 2006/0273914 A1 | 12/2006 | Carreras et al. | |
| 2007/0004446 A1 | 1/2007 | Moran et al. | |
| 2007/0004450 A1 | 1/2007 | Parikh | |
| 2007/0004550 A1 | 1/2007 | Parikh | |
| 2007/0008582 A1 | 1/2007 | Cheng | |
| 2007/0072620 A1 | 3/2007 | Levitan | |
| 2007/0073868 A1 | 3/2007 | Nelson et al. | |
| 2007/0077275 A1 | 4/2007 | Bhogal et al. | |
| 2007/0079030 A1 | 4/2007 | Okuley et al. | |
| 2007/0085743 A1 | 4/2007 | Eberhardt et al. | |
| 2007/0105572 A1 | 5/2007 | Kim | |
| 2007/0115180 A1 | 5/2007 | Kish et al. | |
| 2007/0124536 A1 | 5/2007 | Carper | |
| 2007/0145152 A1 | 6/2007 | Jogand-Coulomb et al. | |
| 2007/0149240 A1 | 6/2007 | Nrol | |
| 2007/0161404 A1 | 7/2007 | Yasujima et al. | |
| 2007/0167167 A1 | 7/2007 | Jiang | |
| 2007/0168652 A1 | 7/2007 | Mylly et al. | |
| 2007/0175994 A1 | 8/2007 | Fruhauf | |
| 2007/0197266 A1 | 8/2007 | Chang | |
| 2007/0232233 A1 | 10/2007 | Liu et al. | |
| 2007/0232273 A1 * | 10/2007 | Huang | H04M 1/6505 455/412.1 |
| 2007/0233955 A1 | 10/2007 | Luo et al. | |
| 2007/0241261 A1 | 10/2007 | Wendt | |
| 2007/0263811 A1 | 11/2007 | Lin et al. | |
| 2007/0282471 A1 | 12/2007 | Lee | |
| 2007/0285326 A1 | 12/2007 | McKinzie | |
| 2007/0288583 A1 | 12/2007 | Rensin et al. | |
| 2008/0008142 A1 | 1/2008 | Aldaz et al. | |
| 2008/0009325 A1 | 1/2008 | Zinn et al. | |
| 2008/0020765 A1 * | 1/2008 | Black | H04M 1/72522 455/435.2 |
| 2008/0026794 A1 | 1/2008 | Warren | |
| 2008/0031201 A1 | 2/2008 | Lee | |
| 2008/0040354 A1 | 2/2008 | Ray et al. | |
| 2008/0057917 A1 * | 3/2008 | Oria | H04M 15/00 455/414.1 |
| 2008/0063193 A1 | 3/2008 | Nishioka | |
| 2008/0070501 A1 | 3/2008 | Wyld | |
| 2008/0076437 A1 | 3/2008 | Wilson et al. | |
| 2008/0125189 A1 | 5/2008 | Tomoda | |
| 2008/0130604 A1 | 6/2008 | Boyd | |
| 2008/0140886 A1 | 6/2008 | Izutsu | |
| 2008/0186162 A1 | 8/2008 | Rajan et al. | |
| 2008/0198138 A1 | 8/2008 | McFarlane et al. | |
| 2008/0205379 A1 | 8/2008 | Naqvi | |
| 2008/0279359 A1 | 11/2008 | Tiliks et al. | |
| 2008/0305833 A1 | 12/2008 | Sherman et al. | |
| 2008/0312780 A1 | 12/2008 | Peed et al. | |
| 2009/0009478 A1 | 1/2009 | Badali et al. | |
| 2009/0011794 A1 | 1/2009 | Seo | |
| 2009/0033487 A1 | 2/2009 | McFadden et al. | |
| 2009/0043963 A1 | 2/2009 | Lahcanski et al. | |
| 2009/0088151 A1 | 4/2009 | Karabinis | |
| 2009/0109897 A1 | 4/2009 | Woo | |
| 2009/0147758 A1 | 6/2009 | Kumar | |
| 2009/0167678 A1 | 7/2009 | Orr et al. | |
| 2009/0176528 A1 | 7/2009 | Moran et al. | |
| 2009/0177884 A1 | 7/2009 | Bieh et al. | |
| 2009/0239470 A1 | 9/2009 | Sherman | |
| 2009/0243397 A1 | 10/2009 | Cook | |
| 2009/0318197 A1 | 12/2009 | Ron et al. | |
| 2010/0006764 A1 | 1/2010 | Bushberg | |
| 2010/0013714 A1 | 1/2010 | Azhari | |
| 2010/0013730 A1 | 1/2010 | Azhari | |

(56) References Cited

U.S. PATENT DOCUMENTS

| | | |
|---|---|---|
| 2010/0033397 A1 | 2/2010 | Narasimhan et al. |
| 2010/0056210 A1 | 3/2010 | Bychkov et al. |
| 2010/0061431 A1 | 3/2010 | Jyrkka et al. |
| 2010/0075704 A1 | 3/2010 | McHenry et al. |
| 2010/0081402 A1 | 4/2010 | Itkin et al. |
| 2010/0093401 A1 | 4/2010 | Moran et al. |
| 2010/0146256 A1 | 6/2010 | Luo et al. |
| 2011/0014951 A1 | 1/2011 | Sherman et al. |
| 2011/0298589 A1 | 12/2011 | McFarlane et al. |
| 2011/0314268 A1 | 12/2011 | Sherman et al. |
| 2012/0231778 A1 | 9/2012 | Chen et al. |
| 2012/0282912 A1 | 11/2012 | Bychkov et al. |
| 2012/0289291 A1 | 11/2012 | Moran et al. |
| 2012/0295614 A1 | 11/2012 | Sherman |
| 2013/0005399 A1 | 1/2013 | Moran et al. |
| 2013/0023246 A9 | 1/2013 | Ellingham et al. |
| 2013/0040702 A1 | 2/2013 | Sherman et al. |
| 2013/0165100 A1 | 6/2013 | Moran et al. |
| 2013/0183929 A1 | 7/2013 | Bychkov et al. |
| 2013/0183955 A1 | 7/2013 | Ron et al. |
| 2014/0071967 A1 | 3/2014 | Velasco |
| 2014/0274206 A1 | 9/2014 | Moran et al. |
| 2014/0295911 A1 | 10/2014 | Bychkov et al. |
| 2015/0050959 A1 | 2/2015 | Sherman et al. |
| 2015/0078363 A1 | 3/2015 | Sherman |
| 2015/0237191 A1 | 8/2015 | Moran et al. |
| 2016/0028864 A1 | 1/2016 | Moran et al. |

FOREIGN PATENT DOCUMENTS

| | | |
|---|---|---|
| WO | 9843463 | 1/1998 |
| WO | WO-0059247 | 10/2000 |
| WO | WO-0131930 | 5/2001 |
| WO | WO-0186922 | 10/2001 |
| WO | WO-03103174 | 12/2003 |
| WO | 2006126777 | 11/2006 |
| WO | 09040796 | 4/2009 |
| WO | 09101618 | 8/2009 |

OTHER PUBLICATIONS

"Advisory Action", U.S. Appl. No. 13/612,900, dated Jan. 14, 2014, 3 pages.

"Advisory Action", U.S. Appl. No. 13/778,155, dated Mar. 12, 2015, 3 pages.

"Corrected Notice of Allowance", U.S. Appl. No. 14/696,438, dated Oct. 14, 2016, 2 pages.

"Extended European Search Report", EP Application No. 09722951.2, dated Nov. 7, 2016, 8 pages.

"Final Office Action", U.S. Appl. No. 12/144,671, dated Oct. 12, 2011, 10 pages.

"Final Office Action", U.S. Appl. No. 12/144,671, dated Nov. 7, 2012, 8 pages.

"Final Office Action", U.S. Appl. No. 12/151,079, dated Nov. 10, 2010, 21 pages.

"Final Office Action", U.S. Appl. No. 13/564,728, dated Jan. 28, 2013, 25 pages.

"Final Office Action", U.S. Appl. No. 13/564,728, dated Feb. 6, 2014, 29 pages.

"Final Office Action", U.S. Appl. No. 13/612,900, dated Oct. 1, 2013, 6 pages.

"Final Office Action", U.S. Appl. No. 13/778,155, dated Jan. 16, 2015, 18 pages.

"Final Office Action", U.S. Appl. No. 14/280,879, dated Jan. 22, 2015, 10 pages.

"Final Office Action", U.S. Appl. No. 14/499,273, dated Jul. 8, 2016, 9 pages.

"Final Office Action", U.S. Appl. No. 14/540,568, dated Aug. 26, 2016, 21 pages.

"Final Office Action", U.S. Appl. No. 14/540,568, dated Dec. 3, 2015, 9 pages.

"Mobile Phones", Federal Office of Public Health http://www.bag.admin.ch/themen/strahlung/00053/00673/04265/index.html?lang=en, Feb. 5, 2009, 11 pages.

"Non-Final Office Action", U.S. Appl. No. 11/380,944, dated Oct. 16, 2008, 6 pages.

"Non-Final Office Action", U.S. Appl. No. 11/827,525, dated Dec. 3, 2010, 8 pages.

"Non-Final Office Action", U.S. Appl. No. 12/144,671, dated Apr. 14, 2011, 7 pages.

"Non-Final Office Action", U.S. Appl. No. 12/144,671, dated Jun. 19, 2012, 11 pages.

"Non-Final Office Action", U.S. Appl. No. 12/151,079, dated Aug. 25, 2010, 17 pages.

"Non-Final Office Action", U.S. Appl. No. 12/151,079, dated Nov. 22, 2011, 25 pages.

"Non-Final Office Action", U.S. Appl. No. 12/406,327, dated Dec. 13, 2010, 5 pages.

"Non-Final Office Action", U.S. Appl. No. 12/525,820, dated Dec. 16, 2011, 11 pages.

"Non-Final Office Action", U.S. Appl. No. 12/876,129, dated Jul. 15, 2011, 10 pages.

"Non-Final Office Action", U.S. Appl. No. 13/106,863, dated Oct. 20, 2011, 4 pages.

"Non-Final Office Action", U.S. Appl. No. 13/170,169, dated Apr. 27, 2012, 6 pages.

"Non-Final Office Action", U.S. Appl. No. 13/471,751, dated Oct. 22, 2012, 10 pages.

"Non-Final Office Action", U.S. Appl. No. 13/564,728, dated Jul. 11, 2013, 30 pages.

"Non-Final Office Action", U.S. Appl. No. 13/564,728, dated Oct. 11, 2012, 19 pages.

"Non-Final Office Action", U.S. Appl. No. 13/607,819, dated Nov. 8, 2013, 9 pages.

"Non-Final Office Action", U.S. Appl. No. 13/612,900, dated Feb. 3, 2014, 10 pages.

"Non-Final Office Action", U.S. Appl. No. 13/612,900, dated Aug. 16, 2013, 13 pages.

"Non-Final Office Action", U.S. Appl. No. 13/761,188, dated Sep. 10, 2013, 9 pages.

"Non-Final Office Action", U.S. Appl. No. 13/778,145, dated Jul. 5, 2013, 12 pages.

"Non-Final Office Action", U.S. Appl. No. 13/778,155, dated Feb. 2, 2016, 12 pages.

"Non-Final Office Action", U.S. Appl. No. 13/778,155, dated Nov. 17, 2015, 12 pages.

"Non-Final Office Action", U.S. Appl. No. 14/282,332, dated Sep. 18, 2014, 6 pages.

"Non-Final Office Action", U.S. Appl. No. 14/283,231, dated Mar. 23, 2015, 14 pages.

"Non-Final Office Action", U.S. Appl. No. 14/499,273, dated Jan. 25, 2016, 8 pages.

"Non-Final Office Action", U.S. Appl. No. 14/540,568, dated Apr. 27, 201, 23 pages.

"Non-Final Office Action", U.S. Appl. No. 14/540,568, dated Aug. 14, 2015, 10 pages.

"Non-Final Office Action", U.S. Appl. No. 14/696,438, dated Feb. 12, 2016, 8 pages.

"Non-Final Office Action", U.S. Appl. No. 14/803,129, dated Feb. 2, 2016, 11 pages.

"Notice of Allowance", U.S. Appl. No. 11/380,944, dated Feb. 9, 2009, 7 pages.

"Notice of Allowance", U.S. Appl. No. 11/827,525, dated Mar. 3, 2011, 9 pages.

"Notice of Allowance", U.S. Appl. No. 12/144,671, dated Jan. 3, 2013, 6 pages.

"Notice of Allowance", U.S. Appl. No. 12/151,079, dated May 8, 2012, 10 pages.

"Notice of Allowance", U.S. Appl. No. 12/406,327, dated Feb. 4, 2011, 4 pages.

"Notice of Allowance", U.S. Appl. No. 12/525,820, dated Mar. 6, 2012, 7 pages.

"Notice of Allowance", U.S. Appl. No. 12/552,440, dated Apr. 3, 2012, 10 pages.

(56) References Cited

OTHER PUBLICATIONS

"Notice of Allowance", U.S. Appl. No. 12/876,129, dated Oct. 17, 2011, 5 pages.
"Notice of Allowance", U.S. Appl. No. 13/106,863, dated Jun. 13, 2012, 5 pages.
"Notice of Allowance", U.S. Appl. No. 13/170,169, dated Aug. 8, 2012, 5 pages.
"Notice of Allowance", U.S. Appl. No. 13/471,751, dated Nov. 2, 2012, 8 pages.
"Notice of Allowance", U.S. Appl. No. 13/553,837, dated Dec. 10, 2012, 11 pages.
"Notice of Allowance", U.S. Appl. No. 13/564,728, dated Aug. 4, 2014, 12 pages.
"Notice of Allowance", U.S. Appl. No. 13/607,819, dated Feb. 10, 2014, 5 pages.
"Notice of Allowance", U.S. Appl. No. 13/612,900, dated Jun. 2, 2014, 7 pages.
"Notice of Allowance", U.S. Appl. No. 13/761,188, dated Feb. 4, 2014, 7 pages.
"Notice of Allowance", U.S. Appl. No. 13/778,145, dated Feb. 14, 2014, 8 pages.
"Notice of Allowance", U.S. Appl. No. 13/778,155, dated Jul. 29, 2016, 6 pages.
"Notice of Allowance", U.S. Appl. No. 13/778,155, dated Sep. 26, 2014, 13 pages.
"Notice of Allowance", U.S. Appl. No. 14/282,332, dated Jan. 14, 2015, 7 pages.
"Notice of Allowance", U.S. Appl. No. 14/283,231, dated Jun. 26, 2015, 5 pages.
"Notice of Allowance", U.S. Appl. No. 14/283,231, dated Oct. 27, 2015, 4 pages.
"Notice of Allowance", U.S. Appl. No. 14/696,438, dated Jul. 26, 2016, 7 pages.
"Restriction Requirement", U.S. Appl. No. 11/380,944, dated Oct. 2, 2008, 6 pages.
"Restriction Requirement", U.S. Appl. No. 11/827,525, dated Aug. 17, 2010, 6 pages.
"Restriction Requirement", U.S. Appl. No. 12/144,671, dated Jan. 27, 2011, 9 pages.
"Restriction Requirement", U.S. Appl. No. 12/151,079, dated Aug. 4, 2010, 8 pages.
"Restriction Requirement", U.S. Appl. No. 12/552,440, dated Jan. 5, 2012, 7 pages.
"Restriction Requirement", U.S. Appl. No. 13/553,837, dated Nov. 5, 2012, 6 pages.
Friedman,"R., Mechanism of short-term ERK activation by electromagnetic fields at mobile phone frequencies", Manuscript BJ20061653, BJ Immediate Publication http://www.biochemj.org/bj/405/0559/4050559.pdf, Apr. 25, 2007, 33 pages.
Helleseth,"How to Break and Exploit", Thesis for the degree Master of Science Department of Informatics, University of Bergen, Jun. 2006, 90 pages.
Hondou,,"Passive exposure to mobile phones: enhancement of intensity by reflection", Journal of the Physical Society of Japan, vol. 75, No. 8 Retrieved at: http://www.empt.phys.tohoku.ac.jp/-hondou/JPSJ-75-084801.pdf, Aug. 2006, 5 pages.
Kuhn,"Assessment of the radio-frequency electromagnetic fields induced in the human body from mobile phones user with hands-free kits", Phys. Med. Biol., vol. 54 pp. 5493-5508, Aug. 26, 2009, 16 pages.
"Final Office Action", U.S. Appl. No. 14/540,568, dated Apr. 11, 2017, 22 pages.
"Notice of Allowance", U.S. Appl. No. 14/499,273, dated Jan. 30, 2017, 7 pages.
"Non-Final Office Action", U.S. Appl. No. 14/540,568, dated Aug. 28, 2017, 27 pages.
"Examination Report", EP Application No. 09722951.2, dated Feb. 15, 2018, 6 pages.
"Examiner's Answer to the Appeal Brief", U.S. Appl. No. 14/540,568, dated Mar. 14, 2018, 47 pages.

\* cited by examiner

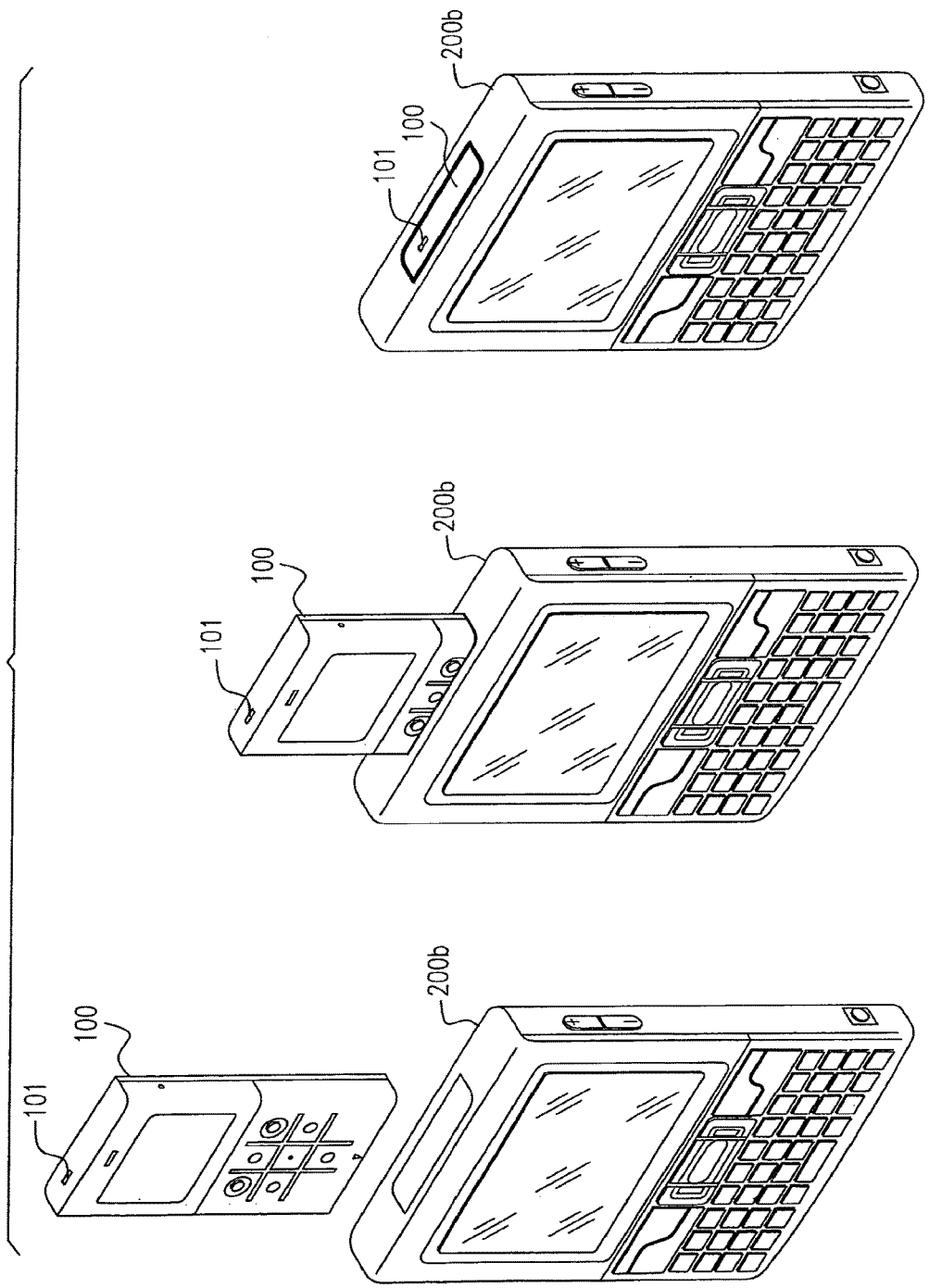

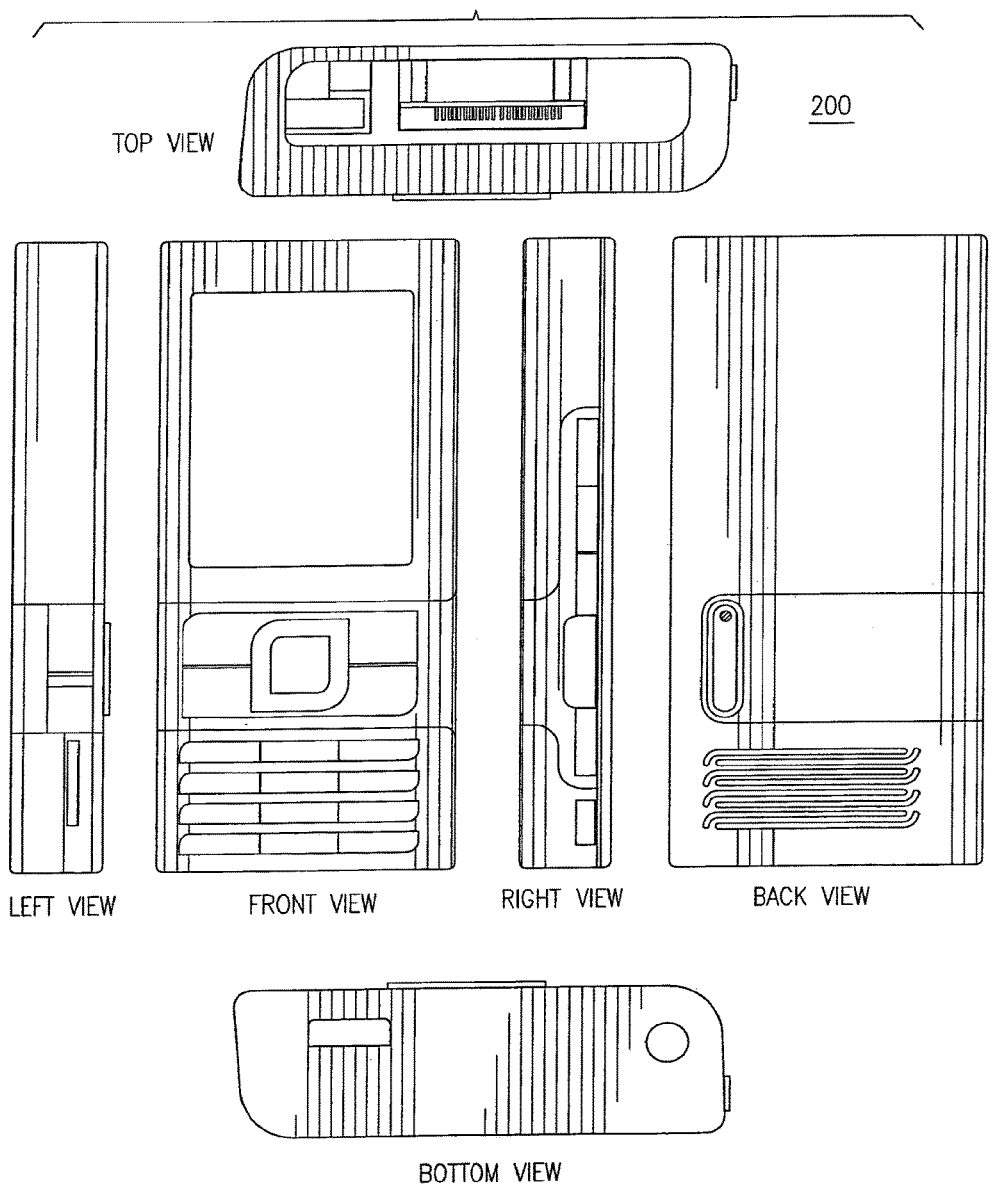

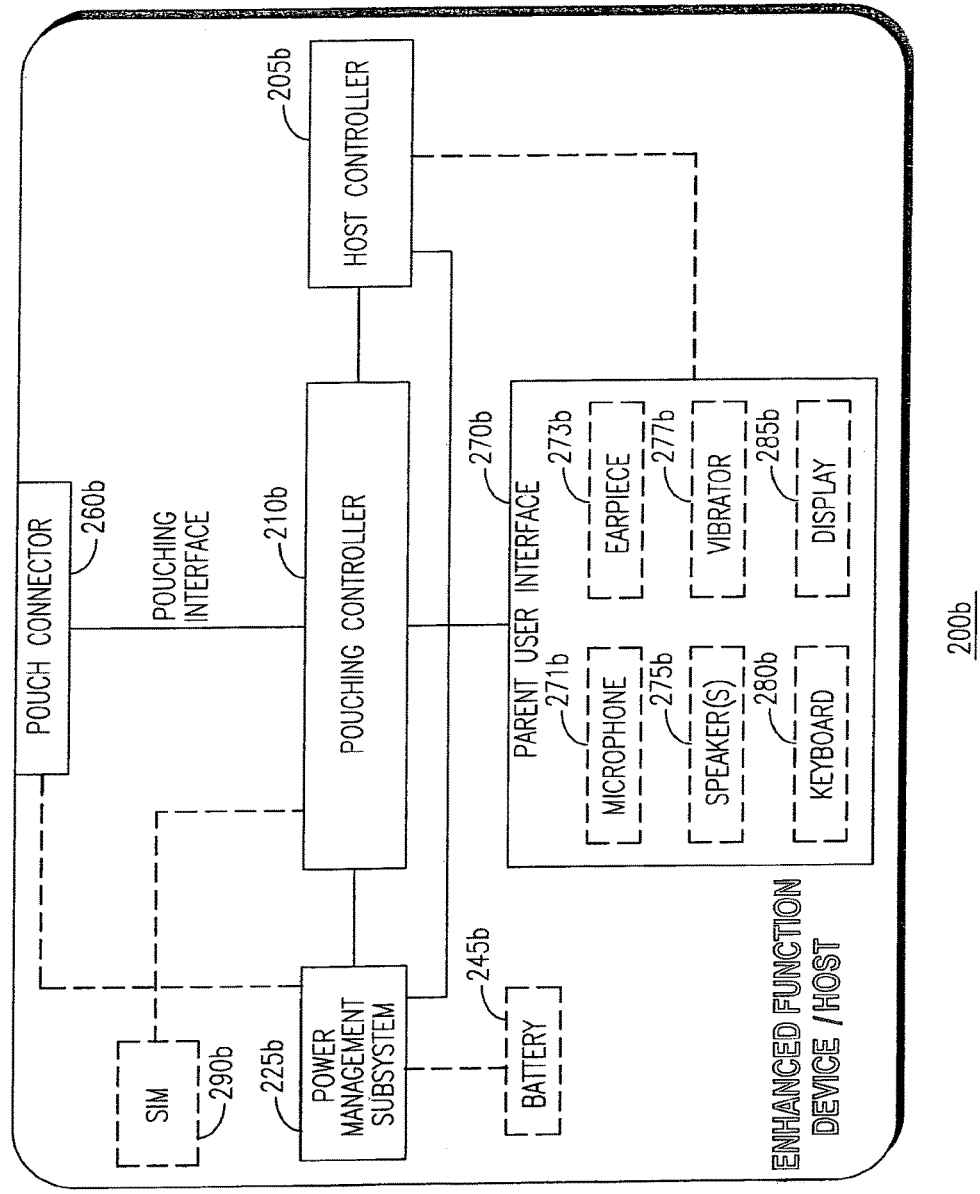

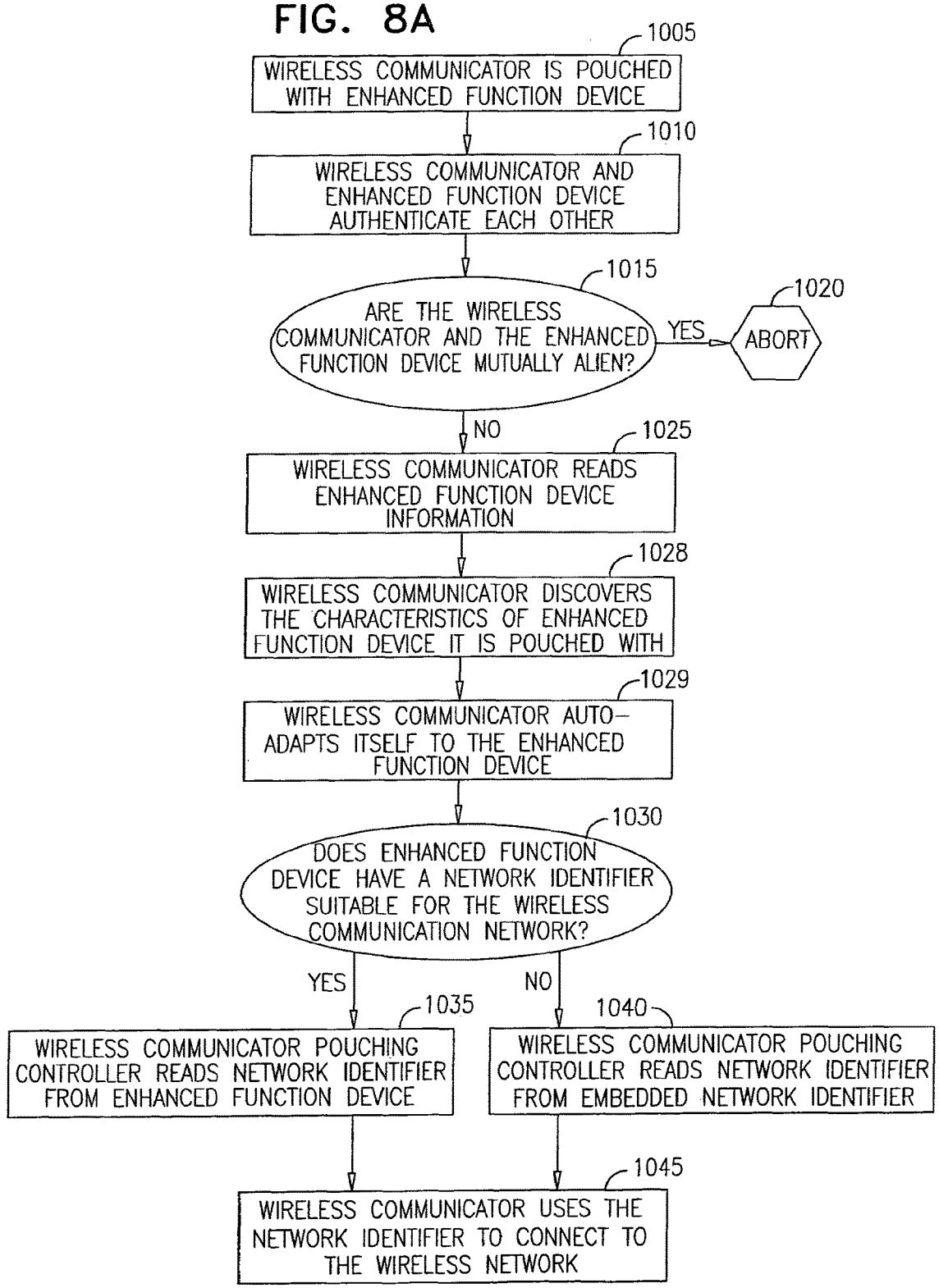

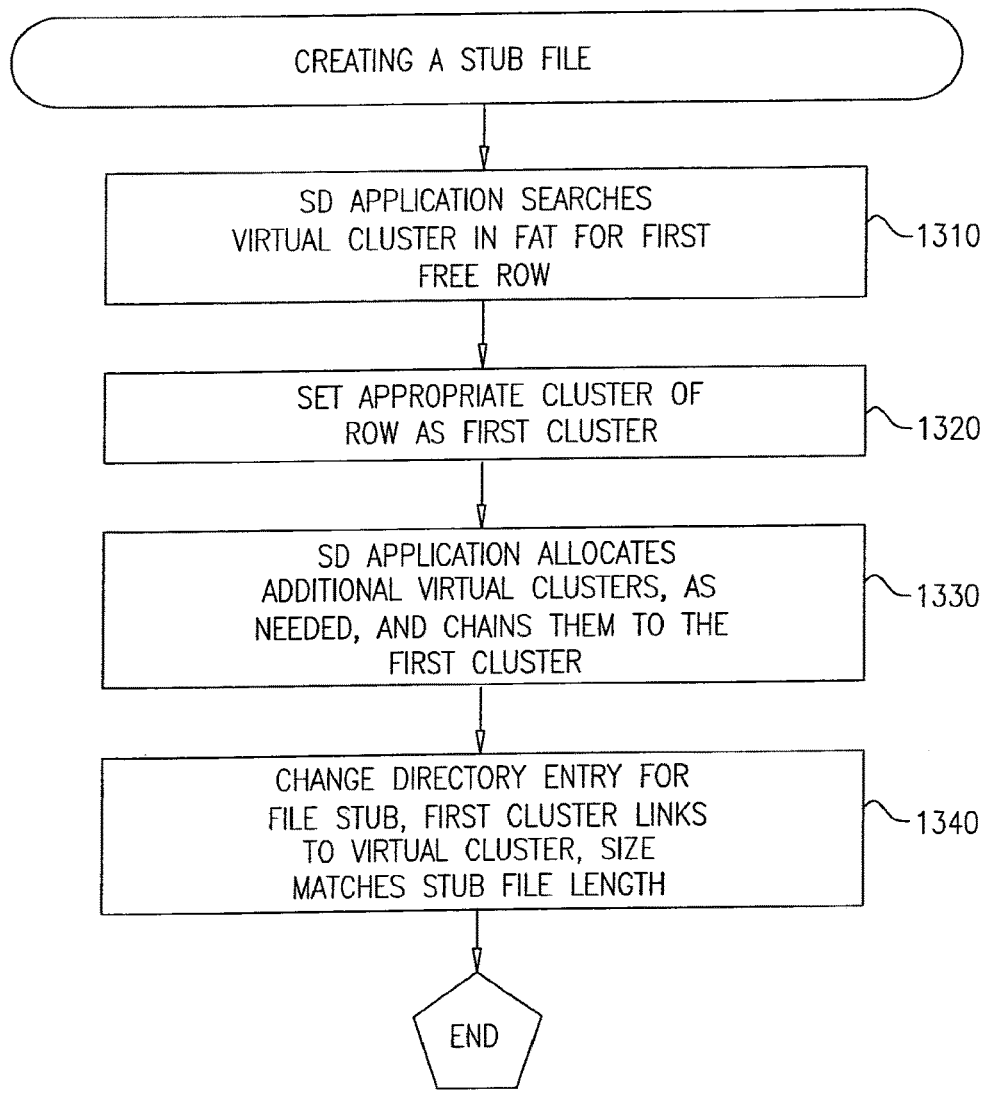

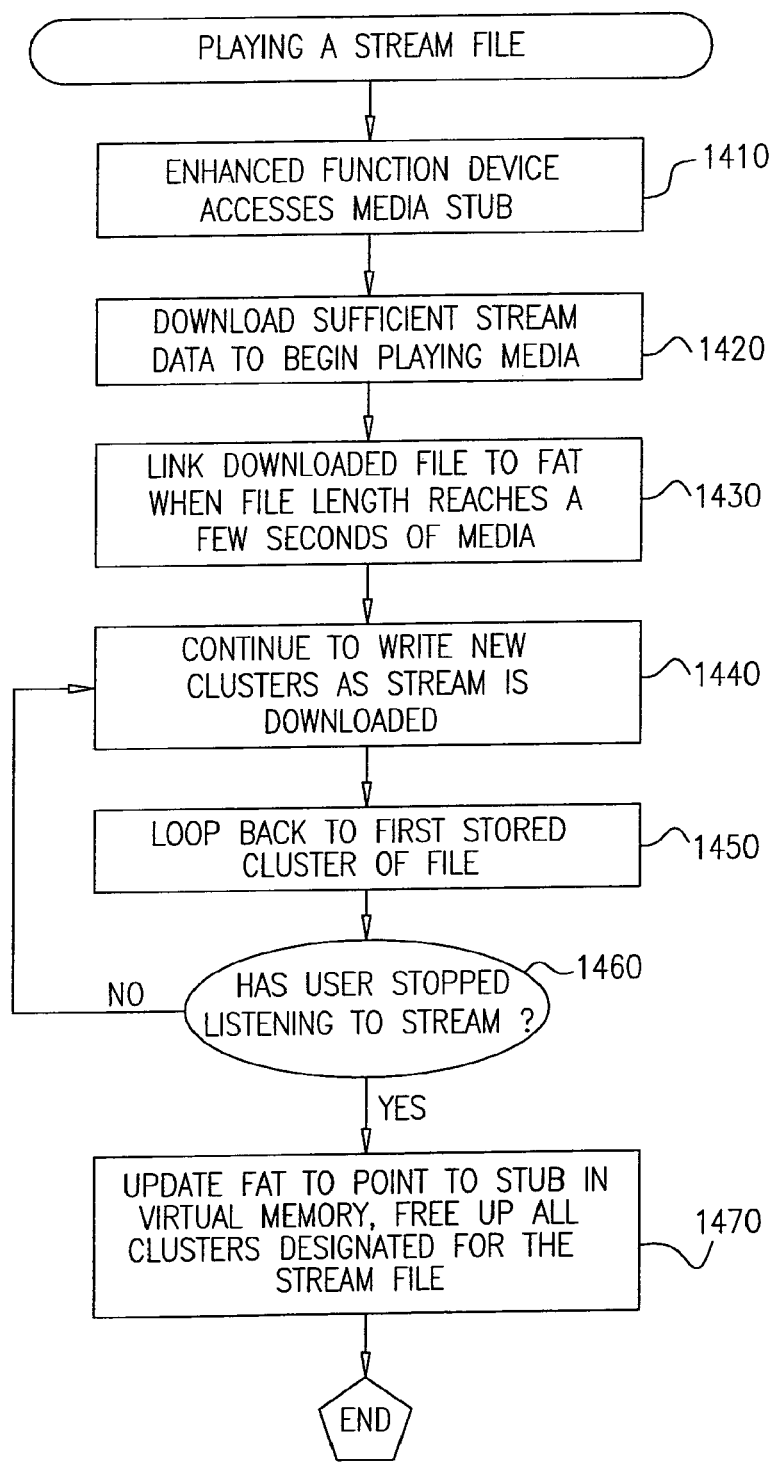

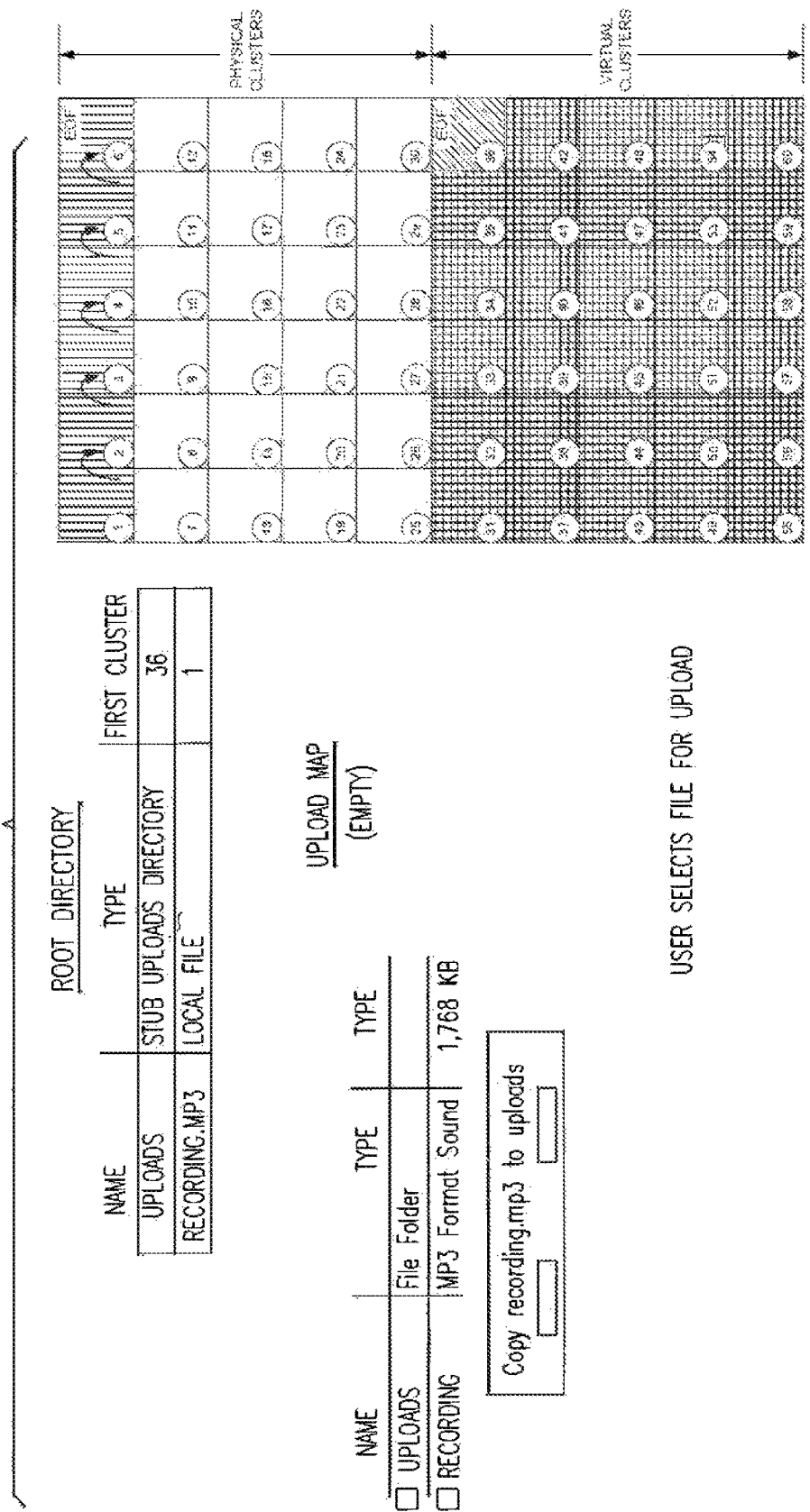

AFTER POUCHING
WIRELESS COMMUNICATOR

BEFORE POUCHING
WIRELESS COMMUNICATOR

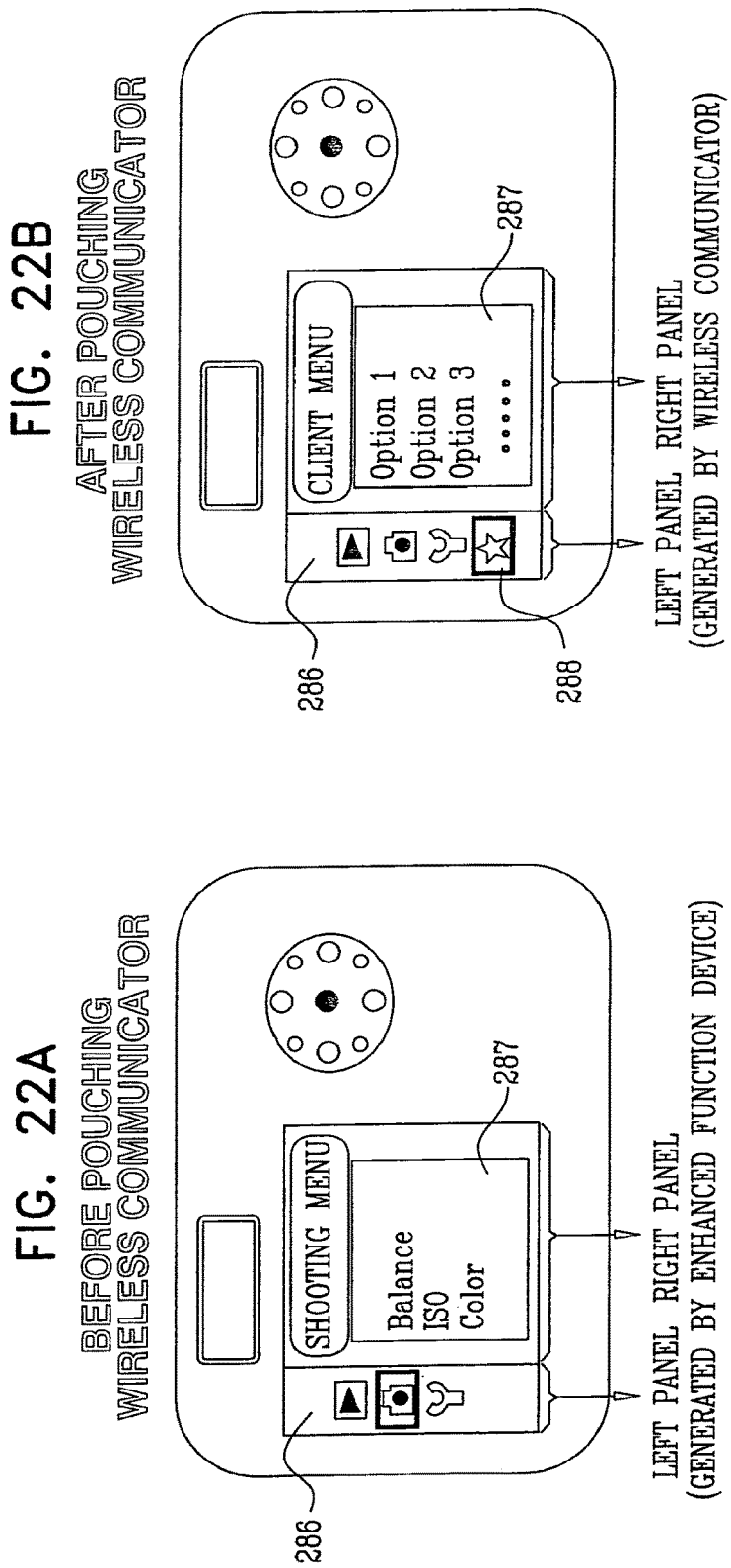

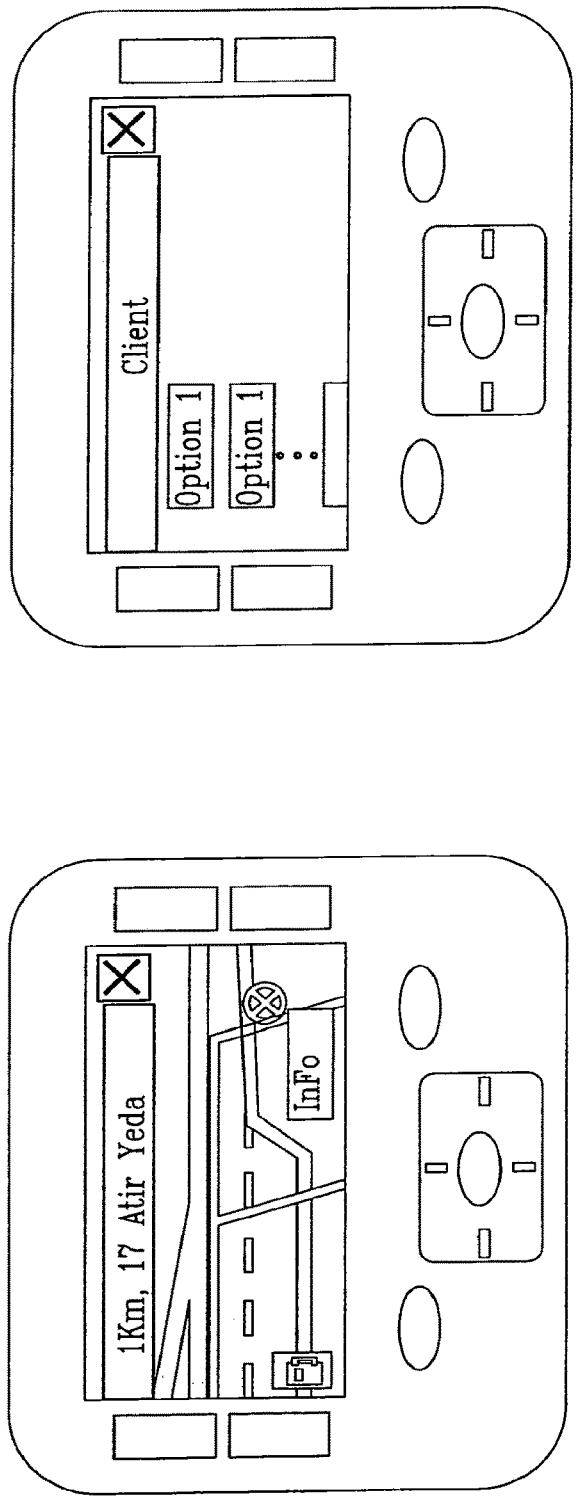

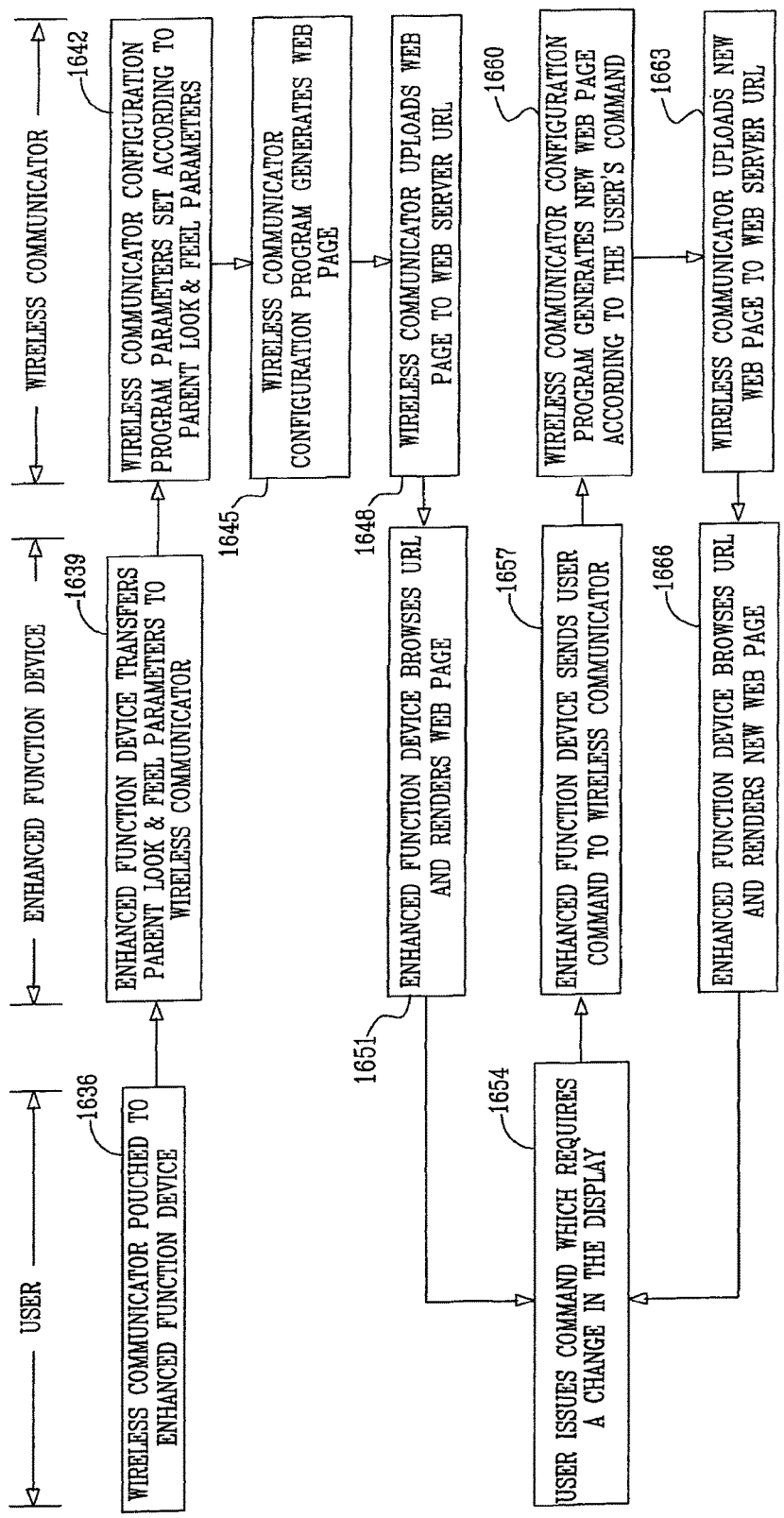

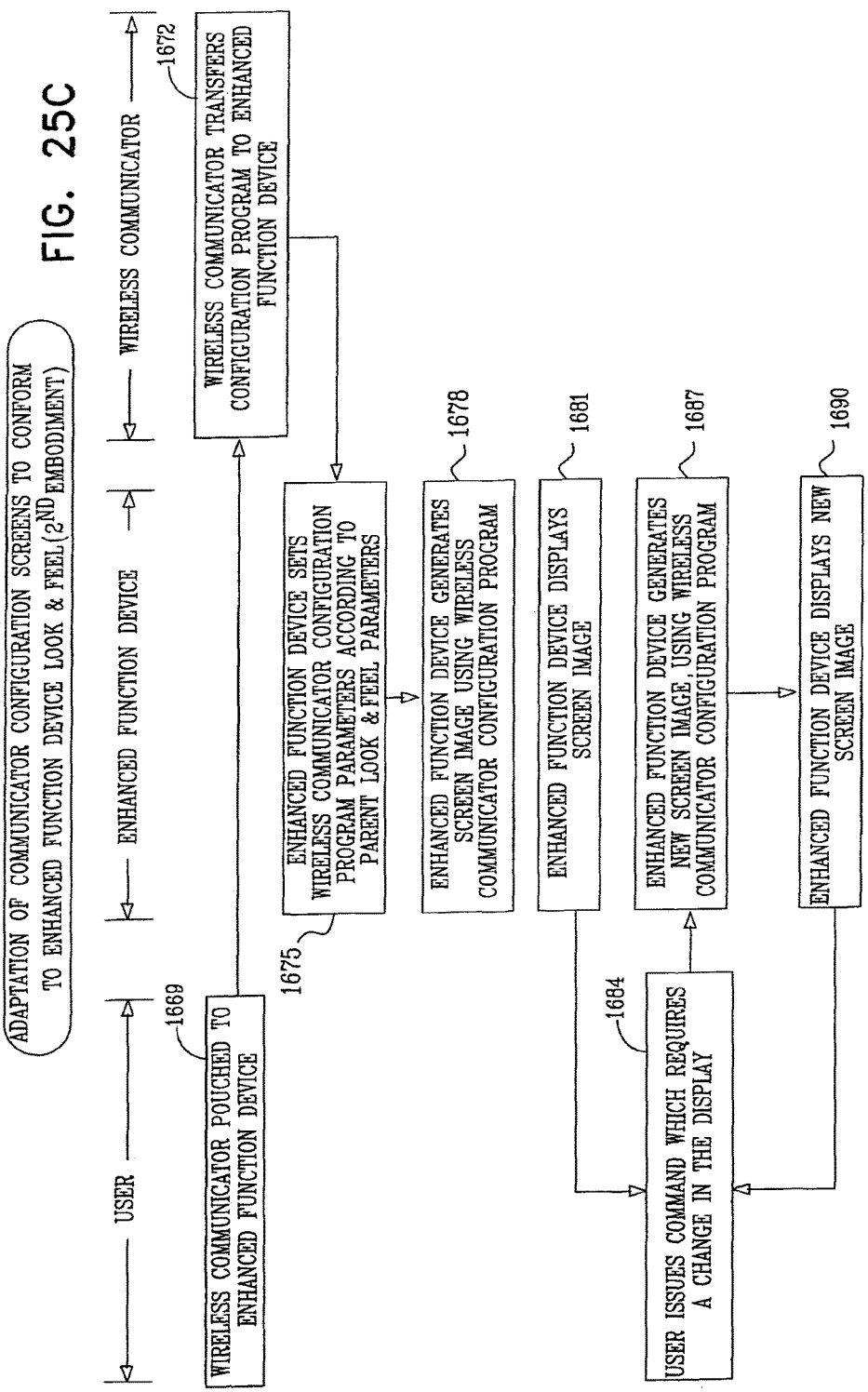

| BUTTON ASSIGNMENT | | | |
|---|---|---|---|
| FUNCTION | ASSIGNED KEY | FUNCTION | ASSIGNED KEY |
| 0 | B11 | # | B12 |
| 1 | B1 | * | B10 |
| 2 | B2 | UP | B14 |
| 3 | B3 | DOWN | B15 |
| 4 | B4 | CALL | B13 |
| 5 | B5 | END | B16 |
| 6 | B6 | | |
| 7 | B7 | | |
| 8 | B8 | | |
| 9 | B9 | | |

FIG. 30

| SA Battery State | JKT Battery State | SA Mode | SA Charging Mode | SA Boost | SA Charger |
|---|---|---|---|---|---|
| SA>Vh | JKT>SA | Standby | Supply from JKT Battery | Disabled | Fixed voltage=SA |
|  |  | High | Supply from SA and JKT Battery | Disabled | Fixed current=STBC |
|  | JKT<SA | All | No Charge | Disabled | No charge |
| V1<SA<Vh | JKT>SA+Vc | All | Charge from JKT Battery | Disabled | Fixed current=CC |
|  | SA<JKT<SA+Vc | Standby | Supply from JKT Battery | Disabled | Fixed voltage=SA |
|  |  | High | Supply from SA and JKT Battery | Disabled | Fixed current=STBC |
|  | JKT<SA | Standby | Supply from JKT Battery | Enabled | Fixed voltage=SA |
|  |  | High | Supply from SA and JKT Battery | Enabled | Fixed current=STBC |
| SA<V1 | JKT>SA+Vc | All | Charge from JKT Battery | Disabled | Fixed current=CC |
|  | JKT<SA+Vc | All | Charge from JKT Battery | Enabled | Fixed current=CC |

FIG. 32

| SA Battery State | HST Battery State | SA Mode | Charging Mode | SA Boost | SA Charger | HST Charger & Boost |
|---|---|---|---|---|---|---|
| SA>Vh | HST>SA | Standby | Supply from HST Battery | Disabled | Fixed voltage=SA | Disabled |
| | Vm<HST<SA | High | Supply from SA and HST Battery | Disabled | Fixed current=STBC | Disabled |
| | HST<Vm | All | No Charge | Disabled | No charge | Disabled |
| | HST<Vm | All | Charge from SA Battery | Disabled | No charge | Enabled |
| Vl<SA<Vh | HST>SA+Vc | All | Supply from HST Battery | Disabled | Fixed current=CC | Disabled |
| | SA<HST<SA+Vc | Standby | Supply from SA and HST Battery | Disabled | Fixed voltage=SA | Disabled |
| | SA<HST<SA+Vc | High | Supply from SA and HST Battery | Disabled | Fixed current=STBC | Disabled |
| | Vm<HST<SA | All | Charge from SA Battery | Disabled | No charge | Disabled |
| | HST<Vm | All | No Charge | Disabled | No charge | Enabled |
| SA<Vl | HST>SA+Vc | All | Charge from HST Battery | Disabled | Fixed current=CC | Disabled |
| | Vm<HST<SA+Vc | All | Charge from HST Battery | Enabled | Fixed current=CC | Disabled |
| | HST<Vm | All | No Charge | Disabled | No charge | Disabled |

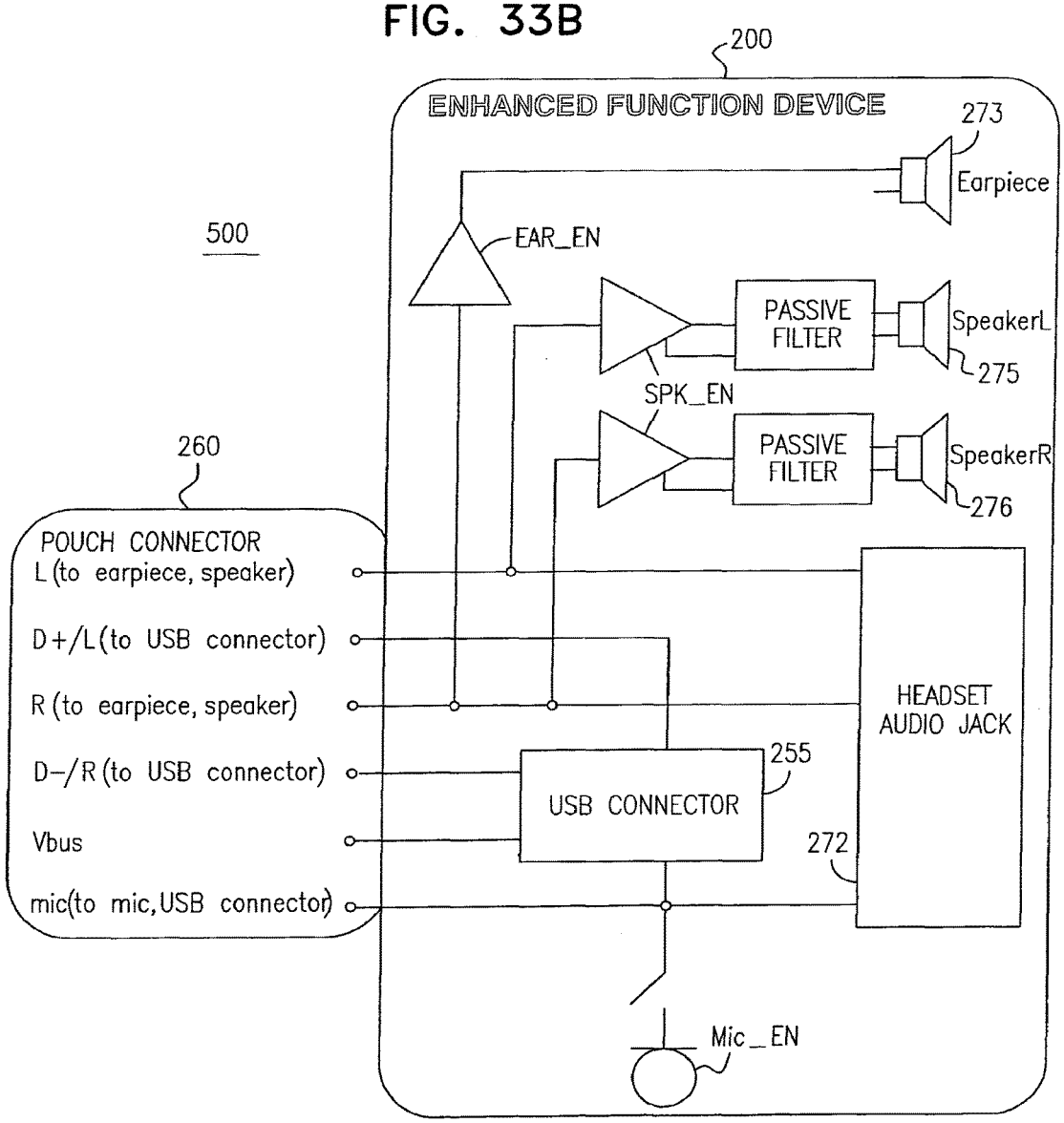

FIG. 36

SAMPLE A AND B SIGNALS FOR SSD/MMC BRIDGE LOGIC

| A | 1 | 1 | 0 | 0 | 1 | 0 | 1 | 1 | 0 | 1 | 1 | 1 | 0 | x | x | x | x | x |
|---|---|---|---|---|---|---|---|---|---|---|---|---|---|---|---|---|---|---|
| Logic A (DFF_EnAB.in) | 0 | 0 | 1 | 1 | 1 | 1 | 1 | 1 | 1 | 1 | 0 | 0 | 0 | 0 | 0 | 0 | 1 | 0 |
| DFF_EnAB.out |   | 0 | 0 | 1 | 1 | 1 | 1 | 1 | 1 | 1 | 1 | 0 | 0 | 0 | 0 | 0 | 0 | 1 |
| Out A (BufferAtoB.out) |   | x | x | 0 | 1 | 1 | 0 | 1 | 0 | 1 | 0 | 0 | x | 0 | 0 | 0 | x | x |
| B | x | x | x | 0 | 0 | 1 | 0 | 0 | 1 | 0 | x | 1 | 0 | 1 | 1 | 1 | 1 | 1 |
| Logic B (DFF_EnBA.in) | 0 | 0 | 0 | 0 | 0 | 0 | 0 | 0 | x | 0 | x | 0 | 1 | 1 | 1 | 0 | 1 | 0 |
| DFF_EnBA.out | 0 | 0 | 0 | 0 | 0 | 0 | 0 | 0 | 0 | x | 0 | x | 0 | 1 | 1 | 1 | 0 | 1 |
| Out B (BufferBtoB.out) | x | x | x | x | x | x | x | x | x | x | 0 | x | 0 | 0 | 1 | 0 | 1 | 1 |

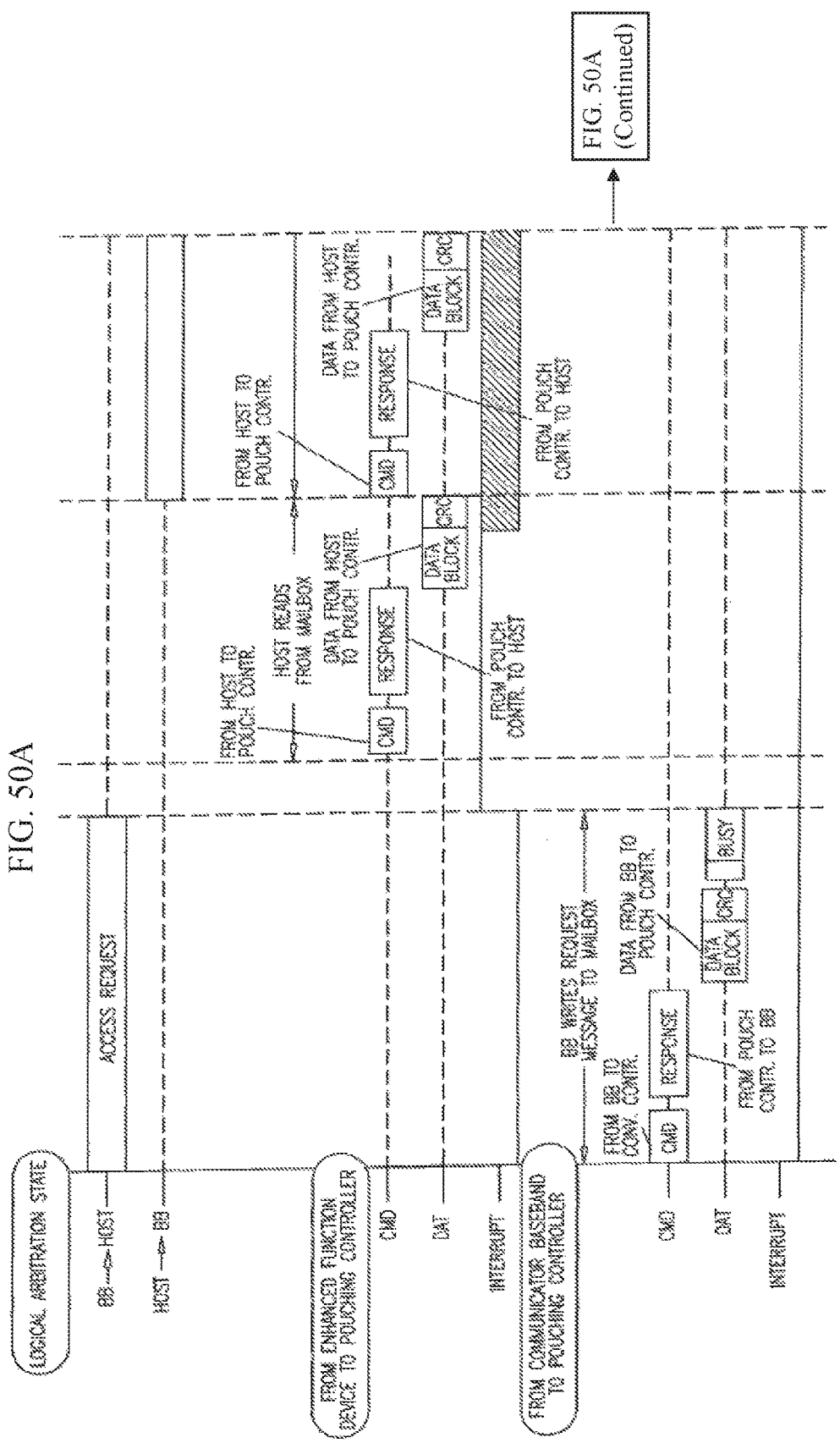

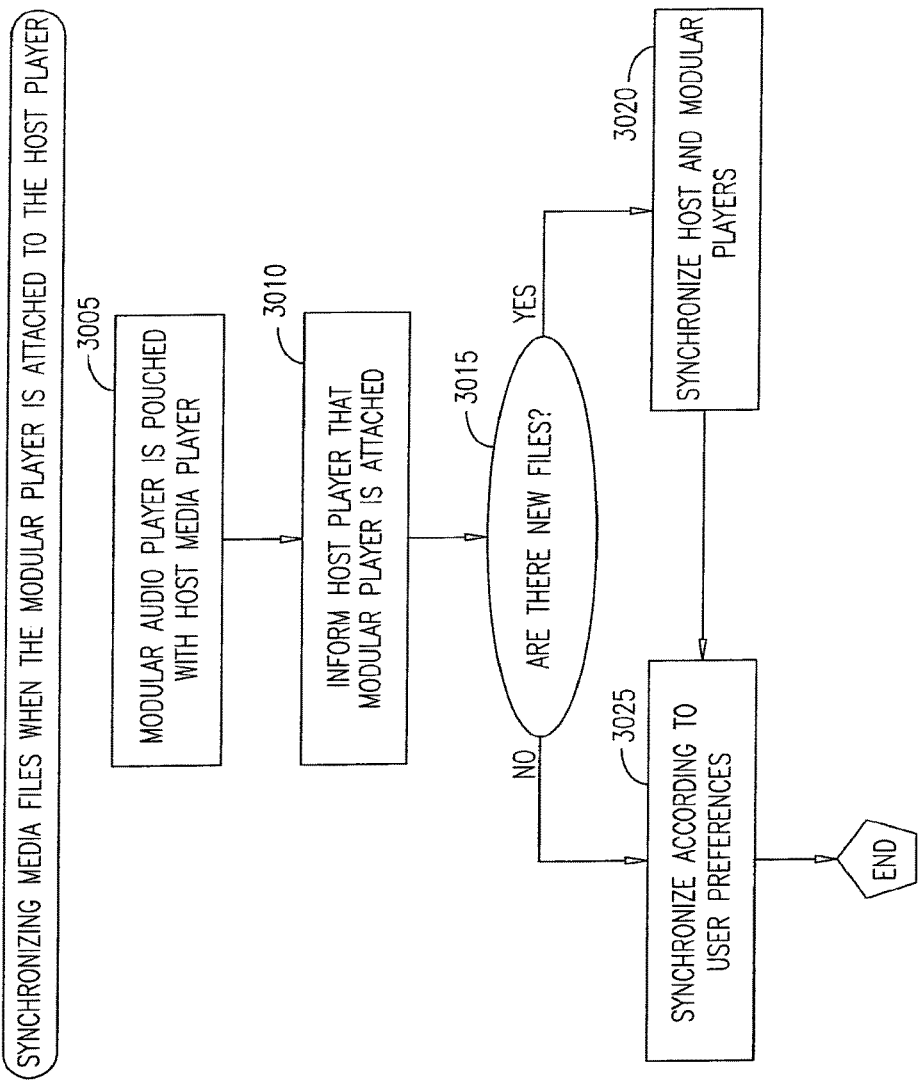

MODULAR WIRELESS COMMUNICATOR

PRIORITY REFERENCE TO RELATED APPLICATIONS

This application claims benefit of the following U.S. patent applications, commonly owned by assignee:

U.S. Provisional Application No. 60/901,353, entitled CELLULAR MODEM ON SD CARD, filed on Feb. 13, 2007 by inventors Itay Sherman, Adar Azancot and Lior Storfer;

U.S. Provisional Application No. 60/901,368, entitled INTERFACE FOR EXTENDING FUNCTIONALITY OF MEMORY CARDS, filed on Feb. 13, 2007 by inventor Itay Sherman;

U.S. Provisional Application No. 60/918,943, entitled COMPACT KEY PAD, filed on Mar. 20, 2007 by inventors Adar Azancot, Yaron Segalov, Eran Miller and Itay Sherman;

U.S. Provisional Application No. 60/918,966, entitled REDUCING POWER DISSIPATION FOR SOLID STATE DISKS, filed on Mar. 20, 2007 by inventor Itay Sherman;

U.S. Provisional Application No. 60/918,967, entitled DEVICE REGISTRATION OVER A COMPUTER NETWORK, filed on Mar. 20, 2007 by inventor Itay Sherman;

U.S. Provisional Application No. 60/918,968, entitled INTEGRATED COMMUNICATION AND STORAGE SUB-SYSTEM FOR EMBEDDED SYSTEMS, filed on Mar. 20, 2007 by inventor Itay Sherman;

U.S. Provisional Application No. 60/919,112 entitled PEER-TO-PEER FILE SHARING USING SHORT RANGE RF, filed on Mar. 20, 2007 by inventors Yaron Segalov and Eyal Bychkov;

U.S. Provisional Application No. 60/919,243, entitled INTEGRATED CELLULAR PHONE AND CORDLESS PHONE, filed on Mar. 21, 2007 by inventors Eyal Bychkov, Itay Sherman, Adar Azancot and Hagay Katz;

U.S. Provisional Application No. 60/920,037, entitled SYNCHRONIZED MEDIA PLAYERS WITHIN A SINGLE HOUSING, filed on Mar. 26, 2007 by inventor Itay Sherman;

U.S. Provisional Application No. 60/933,780, entitled ADAPTIVE USER INTERFACE FOR A MULTI-SOURCE SYSTEM, filed on Jun. 8, 2007 by inventors Itay Sherman, Eyal Bychkov and Yaron Segalov;

U.S. Provisional Application No. 60/933,792, entitled SD SWITCH BOX IN A CELLULAR HANDSET, filed on Jun. 8, 2007 by inventors Itay Sherman, Eyal Bychkov and Yaron Segalov;

U.S. Provisional Application No. 60/933,793, entitled COMMUNICATION CARD WITH THREE OPERATIONAL STATES, filed on Jun. 8, 2007 by inventors Itay Sherman, Itay Cohen and Yaron Segalov;

U.S. Provisional Application No. 60/964,233, entitled CALL SHUFFLING, filed on Aug. 9, 2007 by inventors Itay Sherman, Eyal Bychkov, Hagit Perry and Uri Ron;

U.S. Provisional Application No. 60/964,872, entitled COUNTER-TACTILE KEYPAD, filed on Aug. 14, 2007 by inventors Eyal Bychkov and Hagay Katz;

U.S. Provisional Application No. 60/995,575, entitled AUTOMATED CONSUMER ELECTRONICS DEVICE REPORTNG, filed on Sep. 26, 2007, by inventors Itay Sherman, Eyal Bychkov, Uri Ron, Hagay Katz and Hagit Perry;

U.S. Provisional Application No. 61/009,523, entitled MULTI-TAPPING NUMPAD, filed on Dec. 28, 2007 by inventor Uri Ron;

U.S. Provisional Application No. 61/062,171, entitled MODULAR WIRELESS COMMUNICATOR, filed on Jan. 23, 2008 by inventors Itay Sherman, Eyal Bychkov, Itay Cohen, Tamir Demri, Hagay Katz, Eran Miller, Hagit Perry, Uri Ron and Yaron Segalov;

U.S. Provisional Application No. 61/063,668, entitled MODULAR WIRELESS COMMUNICATOR, filed on Feb. 5, 2008 by inventors Dov Moran, Itay Sherman, Eyal Bychkov, Itay Cohen, Yaron Segalov, Tamir Demri, Eran Miller, Uri Ron, Hagay Katz and Hagit Perry;

U.S. application Ser. No. 11/725,691, entitled INTERFACE FOR EXTENDING FUNCTIONALITY OF MEMORY CARDS, filed on Mar. 20, 2007 by inventors Itay Sherman and Yaron Segalov;

U.S. application Ser. No. 11/827,525, entitled SD SWITCH BOX IN A CELLULAR HANDSET, filed on Jul. 11, 2007 by inventors Itay Sherman, Eyal Bychkov and Yaron Segalov;

U.S. application Ser. No. 11/827,604, entitled COMMUNICATION CARD WITH THREE OPERATIONAL STATES, filed on Jul. 11, 2007 by inventors Itay Sherman, Itay Cohen and Yaron Segalov;

U.S. application Ser. No. 11/827,701, entitled SMALL REMOVABLE AUDIO PLAYER THAT ATTACHES TO A HOST MEDIA PLAYER, filed on Jul. 13, 2007 by inventor Itay Sherman;

U.S. application Ser. No. 11/891,777, entitled ADJUSTABLE CUT-OFF VOLTAGE FOR MOBILE DEVICE BATTERY, filed on Aug. 13, 2007 by inventors Itay Sherman, Eyal Bychkov, Eran Miller and Uri Ron;

U.S. application Ser. No. 11/893,837, entitled METHOD AND SYSTEM FOR REMOTE DIAGNOSTICS, filed on Aug. 16, 2007 by inventors Hagay Katz, Eyal Bychkov and Itay Sherman;

U.S. application Ser. No. 11/893,958, entitled COMMUNICATION LAYER SWITCHING DEVICE, filed on Aug. 16, 2007 by inventors Itay Sherman, Eyal Bychkov and Uri Ron;

U.S. application Ser. No. 11/975,489, entitled SYSTEM AND METHOD FOR PREDICTING TEXT, filed on Oct. 19, 2007 by inventors Hagit Perry and Uri Ron;

U.S. application Ser. No. 11/983,444, entitled UNSUCCESSFUL CALL ALERT, filed on Nov. 9, 2007 by inventors Eyal Bychkov and Uri Ron;

U.S. application Ser. No. 11/986,600, entitled SYSTEM AND METHOD FOR PREDICTING TEXT, filed on Nov. 21, 2007 by inventors Hagit Perry and Uri Ron;

U.S. application Ser. No. 11/986,242, entitled MULTIMEDIA ENHANCEMENT CHANNEL, filed on Nov. 19, 2007 by inventors Itay Sherman and Eyal Bychkov;

U.S. application Ser. No. 11/975,854, entitled REDUCING POWER DISSIPATION FOR SOLID STATE DISKS, filed on Oct. 22, 2007 by inventor Itay Sherman;

U.S. application Ser. No. 11/986,637, entitled UNIQUELY IDENTIFIABLE KEYS FOR ELECTRONIC KEYBOARDS, filed on Nov. 23, 2007 by inventors Uri Ron, Eyal Bychkov and Itay Sherman;

U.S. application Ser. No. 12/008,499, entitled BI-DIRECTIONAL BATTERY CHARGING FOR COUPLED ELECTRONIC DEVICES, filed on Jan. 11, 2008 by inventors Itay Sherman and Tamir Demri;

U.S. application Ser. No. 12/008,501, entitled BRIDGE DESIGN FOR SD AND MMC DATA BUSES, filed on Jan. 11, 2008 by inventor Itay Sherman;

U.S. application Ser. No. 12/008,582, entitled AUDIO AND USB MULTIPLEXING, filed on Jan. 11, 2008 by inventors Itay Sherman and Eran Miller;

U.S. application Ser. No. 12/009,228, entitled CONTENT DELIVERY DURING CALL IDLE TIME, filed on Jan. 17, 2008 by inventors Eyal Bychkov and Uri Ron; PCT Application No. PCT/IL2008/000164 entitled MODULAR WIRELESS COMMUNICATOR, filed on Feb. 6, 2008 by inventors Dov Moran, Itay Sherman, Eyal Bychkov, Itay Cohen, Yaron Segalov, Tamir Demri, Eran Miller, Uri Ron, Tal Engelstein, Hagay Katz, and Hagit Perry;

U.S. application Ser. No. 12/525,820 entitled MODULAR WIRELESS COMMUNICATOR, filed on Aug. 5, 2009 by inventors Dov Moran, Itay Sherman, Eyal Bychkov, Itay Cohen, Yaron Segalov, Tamir Demri, Eran Miller, Uri Ron, Tal Engelstein, Hagay Katz, and Hagit Perry;

U.S. application Ser. No. 13/471,751 entitled MODULAR WIRELESS COMMUNICATOR, filed on May 15, 2012 by inventors Dov Moran, Itay Sherman, Eyal Bychkov, Itay Cohen, Yaron Segalov, Tamir Demri, Eran Miller, Uri Ron, Tal Engelstein, Hagay Katz, and Hagit Perry;

U.S. application Ser. No. 13/761,188 entitled MODULAR WIRELESS COMMUNICATOR, filed on Feb. 7, 2013 by inventors Dov Moran, Itay Sherman, Eyal Bychkov, Itay Cohen, Yaron Segalov, Tamir Demri, Eran Miller, Uri Ron, Tal Engelstein, Hagay Katz, and Hagit Perry;

U.S. application Ser. No. 14/282,332 entitled MODULAR WIRELESS COMMUNICATOR, filed on May 20, 2014 by inventors Dov Moran, Itay Sherman, Eyal Bychkov, Itay Cohen, Yaron Segalov, Tamir Demri, Eran Miller, Uri Ron, Tal Engelstein, Hagay Katz, and Hagit Perry;

FIELD OF THE INVENTION

The field of the present invention is wireless communication.

SUMMARY OF THE DESCRIPTION

Aspects of the present invention relate to a modular wireless communicator that may be coupled with an enhanced function device in a manner referred to herein as pouching. Pouching is defined herein to mean inserting the wireless communicator device inside of the enhanced function device so that the wireless communicator is at least partially obscured by the enhanced function device, and such that the enhanced function device mechanically supports the wireless communicator.

There is thus provided in accordance with an embodiment of the present invention a wireless communicator including a housing, wireless communication functionality located within the housing, native user interface functionality cooperating with the wireless communication functionality and including user interface surfaces located on at least one outer facing surface of the housing, and pouching responsive electrical interconnection functionality responsive to pouching orientation of the housing in a pouch of an enhanced function device for causing the wireless communication functionality to adapt to cooperating with parenting user interface functionality forming part of the enhanced function device at least partially instead of with the native user interface functionality.

Additionally in accordance with an embodiment of the present invention the wireless communication functionality includes a phone call dialing functionality.

Further in accordance with an embodiment of the present invention the wireless communication functionality includes a network access functionality.

Yet further in accordance with an embodiment of the present invention the pouching responsive electrical interconnection functionality automatically causes the wireless communication functionality to adapt to cooperating with the parenting user interface functionality when the housing is oriented in the pouch of the enhanced function device.

Moreover in accordance with an embodiment of the present invention the pouching responsive electrical interconnection functionality causes the wireless communication functionality to adapt to cooperating with the parenting user interface functionality, when manually prompted to do so and when the housing is oriented in the pouch of the enhanced function device.

Additionally in accordance with an embodiment of the present invention the pouching responsive electrical interconnection functionality includes alien rejection functionality operative to prevent cooperation of the wireless communication functionality with user interface functionality of an alien enhanced function device notwithstanding existence of pouching orientation of the housing in a pouch of the alien enhanced function device.

Further in accordance with an embodiment of the present invention the adaptation to interoperation includes transmission from the enhanced function device to the wireless communicator of information relating to parenting user interface functionality forming part of the enhanced function device, and configuration of the wireless communication functionality to be controlled by the parenting user interface functionality forming part of the enhanced function device at least partially instead of by the native user interface functionality.

Yet further in accordance with an embodiment of the present invention the pouching responsive electrical interconnection functionality causes the wireless communicator to transmit user interface data from the wireless communicator to the enhanced function device in conformance with the information relating to parenting user interface functionality.

Moreover in accordance with an embodiment of the present invention the pouching responsive electrical interconnection functionality expands the functionality of the wireless communicator, in addition to causing the wireless communication functionality to adapt to cooperating with the parenting user interface functionality.

Additionally in accordance with an embodiment of the present invention the enhanced function device expands the functionality of the wireless communicator by enabling access to functionality of the wireless communicator that is inaccessible when the wireless communicator is not pouched with the enhanced function device.

Further in accordance with an embodiment of the present invention the enhanced function device provisions software to the wireless communicator when the wireless communicator is pouched with the enhanced function device.

Yet further in accordance with an embodiment of the present invention the enhanced function device includes a subscriber identifier, which enables wireless network connectivity that is inaccessible to the wireless communicator when the wireless communicator is not pouched with the enhanced function device.

Moreover in accordance with an embodiment of the present invention the subscriber identifier is a SIM card.

Additionally in accordance with an embodiment of the present invention the housing includes an at least partially transparent portion in an outer facing surface, the wireless communicator further includes at least one light source fastened inside of the housing, the at least one light source indicates when the wireless communicator is sufficiently pouched with the enhanced function device so as to activate the pouching responsive electrical interconnection functionality, and the light of the at least one light source shines through the at least partially transparent portion of the housing.

Further in accordance with an embodiment of the present invention the at least partially transparent portion is a hole in an outer facing surface of the housing.

Yet further in accordance with an embodiment of the present invention the at least one light source includes an LED light.

Moreover in accordance with an embodiment of the present invention the at least one light source indicates a state of the wireless communicator.

Additionally in accordance with an embodiment of the present invention the at least one light source indicates a battery status of the wireless communicator.

Further in accordance with an embodiment of the present invention the at least one light source indicates a reception strength of the wireless communicator.

Yet further in accordance with an embodiment of the present invention the at least one light source indicates an operational mode of the wireless communication functionality.

Moreover in accordance with an embodiment of the present invention the at least one light source indicates when the wireless communication functionality is in audio conversation operational mode.

Additionally in accordance with an embodiment of the present invention the at least one light source indicates when the wireless communication functionality is in video conversation operational mode.

Further in accordance with an embodiment of the present invention the at least one light source indicates when a message has been received.

Yet further in accordance with an embodiment of the present invention the message is a text message.

Moreover in accordance with an embodiment of the present invention the message is a multimedia message.

Additionally in accordance with an embodiment of the present invention the message is an e-mail message.

Further in accordance with an embodiment of the present invention the at least one light source indicates when a message has been sent.

Yet further in accordance with an embodiment of the present invention the message is a text message.

Moreover in accordance with an embodiment of the present invention the message is a multimedia message.

Additionally in accordance with an embodiment of the present invention the message is an e-mail message.

Further in accordance with an embodiment of the present invention the at least one light source indicates when the wireless communicator has an incoming phone call.

Yet further in accordance with an embodiment of the present invention the at least one light source indicates a status of the enhanced function device when the wireless communicator is pouched therewith.

Moreover in accordance with an embodiment of the present invention the at least one light source indicates an operational mode of the enhanced function device when the wireless communicator is pouched therewith.

Additionally in accordance with an embodiment of the present invention the housing includes an at least partially transparent portion in an outer facing surface, the wireless communication functionality includes an antenna fastened inside of the housing, for receiving and transmitting radio signals, the antenna includes an antenna hole in an outer facing surface, the antenna hole is aligned with the at least partially transparent portion of the housing, the wireless communicator further includes a light source fastened inside of the housing, the light source indicates when the wireless communicator is sufficiently pouched with the enhanced function device so as to activate the pouching responsive electrical interconnection functionality, and the light of the light source shines through the antenna hole and through the at least partially transparent portion in the housing.

Further in accordance with an embodiment of the present invention the native user interface functionality includes at least one of a keyboard, a display, a microphone, an earpiece, a headset port, a speaker and a vibrator.

Yet further in accordance with an embodiment of the present invention the pouching responsive electrical interconnection functionality responsive to pouching orientation of the housing in the pouch of the enhanced function device restricts the wireless communication functionality from using at least a portion of the native user interface functionality.

Moreover in accordance with an embodiment of the present invention the wireless communication functionality includes a phone call dialing functionality, and the pouching responsive electrical interconnection functionality responsive to pouching orientation of the housing in the pouch of the enhanced function device restricts the dialing functionality.

Additionally in accordance with an embodiment of the present invention the wireless communication functionality includes a network access functionality, and the pouching responsive electrical interconnection functionality responsive to pouching orientation of the housing in said pouch of the enhanced function device restricts the network access functionality.

There is further provided in accordance with an embodiment of the present invention an enhanced function device for use with a wireless communicator including a housing, wireless communication functionality located within the housing and native user interface functionality cooperating with the wireless communication functionality, the enhanced function device including a pouch, parenting user interface functionality, and pouching responsive electrical interconnection functionality responsive to pouching orientation of the housing of the wireless communicator in the pouch for causing the wireless communication functionality to adapt to cooperating with the parenting user interface functionality at least partially instead of with the native user interface functionality.

Yet further in accordance with an embodiment of the present invention the pouching responsive electrical interconnection functionality automatically causes the wireless communication functionality to adapt to cooperating with the parenting user interface functionality when the housing is oriented in the pouch of the enhanced function device.

Moreover in accordance with an embodiment of the present invention the pouching responsive electrical interconnection functionality causes the wireless communication functionality to adapt to cooperating with the parenting user interface functionality, when manually prompted to do so and when the housing is oriented in the pouch of the enhanced function device.

Additionally in accordance with an embodiment of the present invention the pouching responsive electrical interconnection functionality includes alien rejection functionality operative to prevent cooperation of an alien wireless communicator with the parenting user interface functionality of the enhanced function device notwithstanding existence of pouching orientation of the alien wireless communicator in the pouch of the enhanced function device.

Further in accordance with an embodiment of the present invention the enhanced function device is able to operate when the wireless communicator is not pouched therewith.

Yet further in accordance with an embodiment of the present invention the enhanced function device is not able to operate unless the wireless communicator is pouched therewith.

Moreover in accordance with an embodiment of the present invention the enhanced function device includes a non-volatile storage positioned within the housing, for storing information relating to parenting user interface functionality, and a controller positioned within the housing for transmitting from the enhanced function device to the wireless communicator the information relating to parenting user interface functionality, when the wireless communicator is pouched with the enhanced function device.

Additionally in accordance with an embodiment of the present invention the parenting user interface functionality includes at least one of a keyboard, a display, a microphone, a speaker, a headset port and an earpiece.

There is further provided in accordance with an embodiment of the present invention a wireless communication system including a wireless communicator, including a housing, wireless communication functionality located within the housing, native user interface functionality cooperating with the wireless communication functionality and including user interface surfaces located on at least one outer facing surface of the housing, and pouching responsive electrical interconnection functionality responsive to pouching orientation of the housing in a pouch of an enhanced function device for automatically causing the wireless communication functionality to adapt to cooperating with parenting user interface functionality forming part of the enhanced function device at least partially instead of with the native user interface functionality, and an enhanced function device, including a pouch, parenting user interface functionality, and pouching responsive electrical interconnection functionality responsive to pouching orientation of the housing of the wireless communicator in the pouch for automatically causing the wireless communication functionality to adapt to cooperating with the parenting user interface functionality at least partially instead of with the native user interface functionality.

Yet further in accordance with an embodiment of the present invention the wireless communication functionality includes a phone call dialing functionality.

Moreover in accordance with an embodiment of the present invention the wireless communication functionality includes a network access functionality.

Additionally in accordance with an embodiment of the present invention the system includes alien rejection functionality operative to prevent cooperation between mutually alien wireless communication functionality and enhanced user interface functionality of a wireless communicator and an enhanced function device which are mutually alien notwithstanding existence of pouching orientation of said housing in a pouch of said enhanced function device.

Further in accordance with an embodiment of the present invention the wireless communication system includes connector circuitry connecting the wireless communicator with the enhanced function device when the wireless communicator is pouched with the enhanced function device, wherein the connector circuitry enables the wireless communicator to detect whether or not the wireless communicator is pouched with the enhanced function device.

Alternatively in accordance with an embodiment of the present invention the wireless communication system includes connector circuitry connecting the wireless communicator with the enhanced function device when the wireless communicator is pouched with the enhanced function device, wherein the connector circuitry enables the wireless communicator to determine whether the enhanced function device is able to operate when the wireless communicator is not pouched therewith, or else is unable to operate unless the wireless communicator is pouched therewith.

Moreover in accordance with an embodiment of the present invention the wireless communicator functions as a master when pouched with the enhanced function device if the wireless communicator determines that the enhanced function device is unable to operate unless the wireless communicator is pouched therewith.

Additionally in accordance with an embodiment of the present invention the wireless communicator functions as a slave when pouched with the enhanced function device if the wireless communicator determines that the enhanced function device is able to operate when the wireless communicator is not pouched therewith.

Further in accordance with an embodiment of the present invention the wireless communication system includes connector circuitry connecting the wireless communicator with the enhanced function device when the wireless communicator is pouched with the enhanced function device, where the connector circuitry enables the enhanced function device to power the wireless communicator on and off when the enhanced function device is respectively powered on and off.

Yet further in accordance with an embodiment of the present invention the wireless communicator and the enhanced function device each includes a rechargeable battery, the wireless communicator system including connector circuitry connecting the wireless communicator with the enhanced function device when the wireless communicator is pouched with the enhanced function device, wherein the connector circuitry enables each of the rechargeable batteries to supply power to both the wireless communicator and the enhanced function device.

Moreover in accordance with an embodiment of the present invention the wireless communicator and the enhanced function device each includes a rechargeable battery, the wireless communicator system including connector circuitry connecting the wireless communicator with the enhanced function device when the wireless communicator is pouched with the enhanced function device, wherein the connector circuitry enables each of the rechargeable batteries to charge the other rechargeable battery.

Additionally in accordance with an embodiment of the present invention the wireless communicator includes a mailbox for receiving data from the enhanced function device and for transmitting data to the enhanced function device, when the wireless communicator is pouched with the enhanced function device.

Further in accordance with an embodiment of the present invention the wireless communicator pouching responsive electrical interconnection functionality is operative to wirelessly transmit a report about the enhanced function device to a remote recipient.

Yet further in accordance with an embodiment of the present invention the enhanced function device is an electronic appliance.

Moreover in accordance with an embodiment of the present invention the report is an appliance registration report.

Additionally in accordance with an embodiment of the present invention the report is an appliance diagnostic report.

Further in accordance with an embodiment of the present invention the enhanced function device includes a media playing module for playing digital media files, and a storage unit for storing digital media files, and wherein the parenting user interface functionality includes functionality for navigating and playing digital media files stored in the storage unit, and wherein the wireless communicator further includes a storage unit for storing digital media files, and a controller for storing incoming media files in the storage unit and for selectively copying media files from the storage unit to the enhanced function device storage unit when the wireless communicator is pouched in the enhanced function device.

Yet further in accordance with an embodiment of the present invention the wireless communicator includes an audio playing module for playing digital audio files, and the enhanced function device includes a controller for selectively copying media files from the enhanced function device storage unit to the wireless communicator storage unit when the wireless communicator is pouched in the enhanced function device.

Moreover in accordance with an embodiment of the present invention the parenting user interface functionality includes functionality for navigating and playing digital media files stored in the wireless communicator storage unit.

There is additionally provided in accordance with an embodiment of the present invention a method for a pouchable wireless communicator, the wireless communicator having a native user interface, including in response to orienting the wireless communicator in a pouch of an enhanced function device, adapting the wireless communicator to conform with a parent user interface forming part of the enhanced function device at least partially instead of with the native user interface.

Further in accordance with an embodiment of the present invention the method includes preventing the wireless communicator from adapting to conform with an alien enhanced function device, notwithstanding the wireless communicator being oriented in a pouched of the alien enhanced function device.

Yet further in accordance with an embodiment of the present invention the method includes mutually transmitting from the enhanced function device to the wireless communicator information relating to the parent user interface of the enhanced function device, and configuring the wireless communicator to conform with the parent user interface forming part of the enhanced function device at least partially instead of with the native user interface.

Moreover in accordance with an embodiment of the present invention the method includes transmitting user interface data from the wireless communicator to the enhanced function device in conformance with the information relating to the parent user interface.

Additionally in accordance with an embodiment of the present invention the native user interface functionality includes at least one of a keyboard, a display, a microphone, an earpiece, a headset port, a speaker and a vibrator.

Further in accordance with an embodiment of the present invention adapting the wireless communicator to conform with a parent user interface includes restricting the wireless communicator from using at least a portion of its native user interface.

There is yet further provided in accordance with an embodiment of the present invention a method for using a wireless communicator, the wireless communicator having a native user interface, including in response to orienting the wireless communicator in a pouch of an enhanced function device, causing the wireless communicator to adapt to conform with a parent user interface of the enhanced function device at least partially instead of with the native user interface.

Moreover in accordance with an embodiment of the present invention the enhanced function device is able to operate when the wireless communicator is not pouched therewith.

Additionally in accordance with an embodiment of the present invention the enhanced function device is not able to operate unless the wireless communicator is pouched therewith.

Further in accordance with an embodiment of the present invention the parenting user interface functionality includes at least one of a keyboard, a display, a microphone, a speaker, a headset port and an earpiece.

There is yet further provided in accordance with an embodiment of the present invention a method for wireless communication including in response to orienting a wireless communicator having a native user interface in a pouch of an enhanced function device, adapting the wireless communicator to conform with a parent user interface forming part of the enhanced function device at least partially instead of with the native user interface, and in response to orienting the wireless communicator in the pouch of the enhanced function device, causing the wireless communicator to adapt to conform with the parent user interface of the enhanced function device at least partially instead of with the native user interface.

Moreover in accordance with an embodiment of the present invention the method includes detecting whether or not the wireless communicator is pouched with the enhanced function device.

Alternatively in accordance with an embodiment of the present invention the method includes determining whether the enhanced function device is able to operate when the wireless communicator is not pouched therewith, or else is unable to operate unless the wireless communicator is pouched therewith.

Further in accordance with an embodiment of the present invention the method includes controlling the wireless communicator to function as a master when pouched with the enhanced function device if the determining determines that the enhanced function device is unable to operate unless the wireless communicator is pouched therewith.

Yet further in accordance with an embodiment of the present invention the method includes controlling the wireless communicator to function as a slave when pouched with the enhanced function device if the determining determines that the enhanced function device is able to operate when the wireless communicator is not pouched therewith.

Moreover in accordance with an embodiment of the present invention the method includes powering the wireless communicator on and off, by the enhanced function device, when the enhanced function device is respectively powered on and off.

Additionally in accordance with an embodiment of the present invention the method includes supplying power to both the wireless communicator and the enhanced function device by a rechargeable battery in the wireless communicator.

Further in accordance with an embodiment of the present invention the method includes supplying power to both the wireless communicator and the enhanced function device by a rechargeable battery in the enhanced function device.

Yet further in accordance with an embodiment of the present invention the method includes charging a rechargeable battery in the wireless communicator by a rechargeable battery in the enhanced function device.

Moreover in accordance with an embodiment of the present invention the method includes charging a rechargeable battery in the enhanced function device by a rechargeable battery in the wireless communicator.

Additionally in accordance with an embodiment of the present invention the method includes wirelessly transmitting, by the wireless communicator, a report about the enhanced function device to a remote recipient.

Further in accordance with an embodiment of the present invention the enhanced function device is an electronic appliance.

Yet further in accordance with an embodiment of the present invention the report is an appliance registration report.

Moreover in accordance with an embodiment of the present invention the report is an appliance diagnostic report.

Additionally in accordance with an embodiment of the present invention the wireless communicator and the enhanced function device each have storage units, and the parent user interface includes an interface for navigating and playing digital media files stored in the enhanced function device storage unit, the method including storing, by the wireless communicator, incoming media files in the wireless communicator storage unit, and selectively copying media files from the wireless communicator storage unit to the enhanced function device storage unit when the wireless communicator is pouched in the enhanced function device.

Further in accordance with an embodiment of the present invention the native user interface includes an interface for playing digital audio files stored in the wireless communicator storage unit, the method including selectively copying, by the enhanced function device, media files from the enhanced function device storage unit to the wireless communicator storage unit when the wireless communicator is pouched in the enhanced function device.

There is yet further provided in accordance with an embodiment of the present invention a wireless communication system including a plurality of wireless communicators, each wireless communicator including a housing, wireless communication functionality located within the housing, native user interface functionality cooperating with the wireless communication functionality and including user interface surfaces located on at least one outer facing surface of the housing, and pouching responsive electrical interconnection functionality responsive to pouching orientation of the housing in a pouch of an enhanced function device for automatically causing the wireless communication functionality to adapt to interoperation with parenting user interface functionality forming part of the enhanced function device at least partially instead of with the native user interface functionality, and a plurality of distinguishable enhanced function devices, each enhanced function device including a pouch, parenting user interface functionality, and pouching responsive electrical interconnection functionality responsive to pouching orientation of the housing of the wireless communicator in the pouch for automatically causing the wireless communication functionality to adapt to interoperation with the parenting user interface functionality at least partially instead of with the native user interface functionality, wherein the plurality of wireless communicator pouching responsive electrical interconnection functionalities and the plurality of enhanced function device pouching responsive electrical interconnection functionalities enable each wireless communicator to identify which of the plurality of distinguishable enhanced function devices it is pouched in.

Moreover in accordance with an embodiment of the present invention the wireless communication functionality wirelessly transmits to a remote recipient a report about an enhanced function device, when the wireless communicator identifies the enhanced function device as being pouched therewith.

Additionally in accordance with an embodiment of the present invention the plurality of wireless communicators includes GSM wireless communicators and CDMA wireless communicators.

There is further provided in accordance with an embodiment of the present invention a method for wireless communication including in response to orienting each of a plurality of wireless communicators having native user interfaces in a pouch of one of a plurality of distinguishable enhanced function devices adapting the wireless communicator to conform with a parent user interface forming part of the one enhanced function device at least partially instead of with the native user interface, and identifying which one of the plurality of distinguishable enhanced function devices the wireless communicator is pouched in, and in response to orienting each of the plurality of wireless communicators in the pouch of one of the plurality of enhanced function devices, causing the wireless communicator to adapt to conform with the parent user interface of the one enhanced function device at least partially instead of with the native user interface.

Yet further in accordance with an embodiment of the present invention the method includes wirelessly transmitting to a remote recipient, by the wireless communicator, a report about an enhanced function device, when the wireless communicator identifies the enhanced function device as being pouched therewith.

Moreover in accordance with an embodiment of the present invention the plurality of wireless communicators includes GSM wireless communicators and CDMA wireless communicators.

There is additionally provided in accordance with an embodiment of the present invention an enhanced function device for use with a plurality of wireless communicators, each wireless communicator including a housing, wireless communication functionality located within the housing, and native user interface functionality cooperating with the wireless communication functionality, the enhanced function device including parenting user interface functionality, a plurality of pouches, and pouching responsive electrical interconnection functionality responsive to pouching orientation of the housing of any specific one of the plurality of wireless communicator in a corresponding one of the plurality of pouches, for causing the wireless communication functionality of the specific wireless communicator to adapt to cooperating with the parenting user interface functionality at least partially instead of with the specific wireless communicator native user interface functionality.

Further in accordance with an embodiment of the present invention the pouching responsive electrical interconnection functionality causes the wireless communication functionality of at least two wireless communicators to simultaneously adapt to cooperating with the parenting user interface functionality at least partially instead of with the respective native user interface functionalities of the at least two wireless communicators, in response to pouching orientation of the housings of the at least two wireless communicators in corresponding at least two pouches.

BRIEF DESCRIPTION OF THE DRAWINGS

The present invention will be more fully understood and appreciated from the following detailed description, taken in conjunction with the drawings in which:

FIG. 2B is a simplified illustrations of various stages of pouching of a wireless communicator with a second enhanced function device in accordance with an embodiment of the present invention;

FIGS. 4A and 4B are pictorial illustrations of an embodiment of an enhanced function device in accordance with an embodiment of the present invention;

FIG. 7B is a simplified block diagram illustration of a second enhanced function device in accordance with an embodiment of the present invention;

FIG. 8A is a simplified flow chart illustration of operation of the wireless communicator when pouched within the enhanced function device in accordance with an embodiment of the present invention;

FIG. 16 is a simplified flowchart of a method for playing a streamed file from an SD card in accordance with an embodiment of the present invention;

FIG. 17 is a simplified flowchart of a method for playing a streamed file from the wireless communicator in accordance with an embodiment of the present invention;

FIGS. 20A and 20B, which are snapshots of a user interface and a file system for a simple example use case, during various stages of file upload during operation of the method of FIG. 19 in accordance with an embodiment of the present invention;

FIGS. 22A and 22B, are displays of different configuration screens for the enhanced function device and the wireless communicator, pouched together, controlled so as to have the same look & feel, in accordance with an embodiment of the present invention;

FIGS. 23A and 23B, are displays of yet different configuration screens for the enhanced function device and the wireless communicator, pouched together, controlled so as to have the same look & feel, in accordance with an embodiment of the present invention;

FIG. 25B, which is a simplified flowchart of a second embodiment of a method for controlling a configuration interface for the wireless communicator so as to conform to the look & feel of the parent user interface in accordance with an embodiment of the present invention;

FIG. 25C is a simplified flowchart of a third embodiment of a method for controlling a configuration interface for the wireless communicator so as to conform to the look & feel of the parent user interface in accordance with an embodiment of the present invention;

FIG. 30 is a summary of bi-directional battery charging logic for the hardware of FIG. 29 in accordance with an embodiment of the present invention;

FIG. 32 is a summary of bi-directional battery charging logic for the hardware of FIG. 31 in accordance with an embodiment of the present invention;

FIGS. 33A and 33B are simplified diagrams of a switching circuit that distinguishes between twelve audio/USB configurations of in accordance with an embodiment of the present invention;

FIG. 36 is a sample simulation for A and B signals 110010101110111 and 0010111, respectively in accordance with an embodiment of the present invention;

FIG. 63 is a simplified flowchart of operations carried out when the modular audio player is pouched with the host media player in accordance with an embodiment of the present invention.

Figure 1:
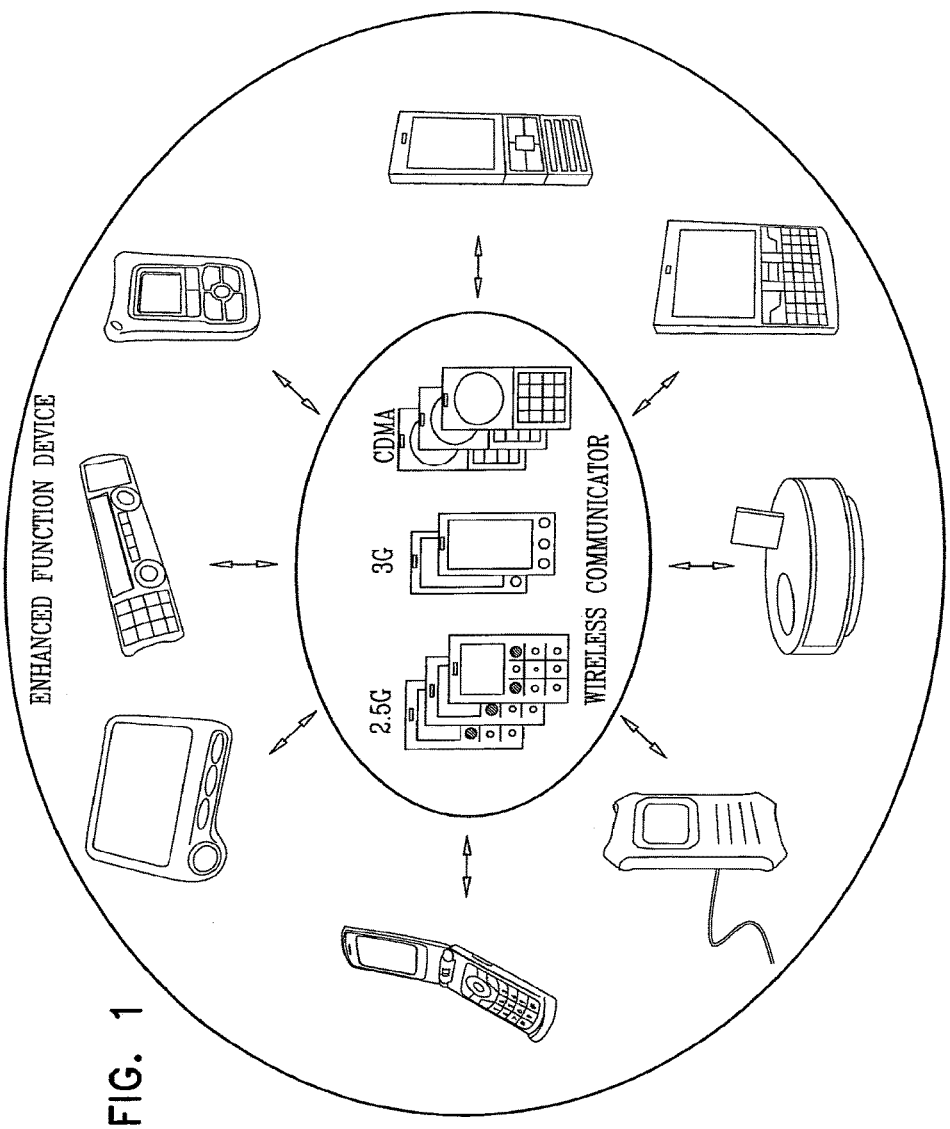
FIG. 1 is a simplified illustration of a multifunctional multi-parent, pouchable communication system constructed and operative in accordance with an embodiment of the present invention.

For reference to the figures, the following index of elements and their numerals is provided. Elements numbered in the 100's generally relate to the wireless communicator, elements numbered in the 200's generally relate to the enhanced function device, elements numbered in the 400's-600's generally relate to pouch connection circuitry, elements numbered in the 300's and 700's-900's generally relate to wireless networks. Elements numbered in the 1000's-3000's are steps of flow charts.

| Elements generally related to the wireless communicator | |
|---|---|
| Element | Description |
| 100 | Wireless communicator |
| 101 | Transparent portion of housing |
| 102 | SD NAND controller |
| 106 | UART port of pouching controller |
| 107 | SD host port of pouching controller |
| 108 | SD port of pouching controller |
| 109 | SD host of modem |
| 110 | Pouching controller |
| 111 | SD host of pouching controller |
| 112 | SD slave of pouching controller |
| 113 | Management data channel |
| 114 | Data channel bridge |
| 115 | Storage |
| 117 | Outgoing mailbox |
| 118 | Incoming mailbox |
| 120 | Modem |
| 123 | Voltage boost |
| 124 | Battery charger |
| 125 | Power management subsystem |
| 126 | Voltage level shifter |
| 127 | On/off button |
| 128 | On/off switch |
| 130 | Audio/video subsystem |
| 135 | Power amplifier |
| 136 | RF interface |
| 140 | Internal antenna |
| 145 | Battery |
| 146 | External power source |
| 150 | Connector |
| 155 | USB connector |
| 156 | USB charger |
| 160 | Pouch connector |
| 161 | UART interface modem |
| 162 | SD interface of modem |
| 163 | Internal SRAM memory |
| 164 | External memory interface |
| 166 | External SDRAM memory |
| 170 | Native user interface |
| 171 | Microphone |
| 173 | Earpiece |
| 175 | Speaker |
| 177 | Vibrator |
| 180 | Keyboard |

| Elements generally related to the wireless communicator | |
|---|---|
| Element | Description |
| 185 | Display |
| 190 | SIM card |

| Elements generally related to the enhanced function device | |
|---|---|
| Element | Description |
| 200 | Enhanced function device |
| 200a | Jacket |
| 200b | Host |
| 200c | Media player |
| 205 | Host controller |
| 205a | Auxiliary processor for jacket |
| 205b | Host controller for host |
| 207 | SD driver |
| 208 | SD application |
| 209 | SD host of host controller |
| 210 | Pouching controller |
| 210a | Pouching controller for jacket |
| 210b | Pouching controller for host |
| 210c | Pouching controller for media player |
| 211 | SD host of pouching controller |
| 212 | SD slave of pouching controller |
| 213 | Management data channel |
| 214 | Data channel bridge |
| 215 | Storage |
| 215a | Storage for jacket |
| 215c | Storage for media player |
| 220c | Modem |
| 223 | Voltage boost |
| 224 | Battery charger |
| 225 | Power manager |
| 225a | Power manager for jacket |
| 225b | Power manager for host |
| 225c | Power manager for media player |
| 227 | On/off button |
| 228 | On/off switch |
| 230c | Media player |
| 245 | Battery |
| 245a | Battery for jacket |
| 255 | USB connector |
| 255c | External connector for media player |
| 256 | USB charger |
| 257 | USB hub |
| 260 | Pouch connector |
| 260a | Pouch connector of jacket |
| 260b | Pouch connector of host |
| 260c | Pouch connector of media player |
| 261c | Tracks for sliding wireless communicator |
| 270a | Parent user interface of jacket |
| 270b | Parent user interface of host |
| 270c | Parent user interface of media player |
| 271a | Microphone of jacket |
| 271b | Microphone of host |
| 272 | Headset audio jack |
| 273 | Earpiece |
| 273a | Earpiece of jacket |
| 273b | Earpiece of host |
| 275 | Left speaker |
| 275a | Speaker(s) of jacket |
| 275b | Speaker(s) of host |
| 276 | Right speaker |
| 277a | Vibrator of jacket |
| 277b | Vibrator of host |
| 280 | Keyboard |
| 280a | Keyboard of jacket |
| 280b | Keyboard of host |
| 281 | Soft key |
| 282 | Soft key |
| 283 | Display bar |
| 285 | Peripheral display/camera |
| 285a | Display of jacket |

19
-continued

Elements generally related to the enhanced function device

| Element | Description |
| --- | --- |
| 285b | Display of host |
| 285c | Display of media player |
| 286 | Left display panel |
| 287 | Right display panel |
| 288 | Display control element |
| 289 | Strap for USB jacket |
| 290a | SIM card for jacket |
| 290b | SIM card for host |
| 292 | SPDT switch of USB jacket |
| 293 | USB2SD bridge of USB jacket |
| 295 | Web browser |
| 296 | Micro-SD card of USB jacket |
| 297 | Controller of micro-SD card |
| 298 | Storage of micro-SD card |

Elements generally related to the pouching connection/Network elements

| Element | Description |
| --- | --- |
| 300 | Manufacturer/seller/service provider |
| 310 | Appliance registration report |
| 320 | Appliance diagnostic report |
| 395 | Web server |
| 400 | Bi-directional power control circuit |
| 500 | Audio and USB multiplexing circuit |
| 505 | D+ signal line |
| 510 | D− signal line |
| 515 | Analog/digital switch |
| 520 | Analog/digital switch |
| 525 | Control signal line |
| 530 | Headset left signal line |
| 535 | Headset right signal line |
| 540 | USB signal line |
| 545 | USB signal line |
| 550 | Headset microphone signal line |
| 555 | USB signal line |
| 560 | Headset detection line |
| 565 | USB detection line |
| 600 | SD/MMC bi-directional bridge |
| 610 | Level shifter buffer |
| 610b | Level shifter buffer |
| 610c | Level shifter buffer |
| 615 | Level shifter buffer |
| 615b | Level shifter buffer |
| 615c | Level shifter buffer |
| 620 | Data flip-flop module |
| 620b | Data flip-flop module |
| 620c | Data flip-flop module |
| 625 | Data flip-flop module |
| 625b | Data flip-flop module |
| 625c | Data flip-flop module |
| 630 | Data flip-flop module |
| 630b | Data flip-flop module |
| 630c | Data flip-flop module |
| 635 | Data flip-flop module |
| 635b | Data flip-flop module |
| 635c | Data flip-flop module |
| 640 | Data by-pass line |
| 640b | Data by-pass line |
| 640c | Data by-pass line |
| 645 | Data by-pass line |
| 645b | Data by-pass line |
| 645c | Data by-pass line |
| 650 | Logical processing unit |
| 650b | Logical processing unit |
| 650c | Logical processing unit |
| 655 | Logical processing unit |
| 655b | Logical processing unit |
| 655c | Logical processing unit |
| 660 | Logical processing unit |
| 660b | Logical processing unit |

20
-continued

Elements generally related to the pouching connection/Network elements

| Element | Description |
| --- | --- |
| 660c | Logical processing unit |
| 665 | Logical processing unit |
| 665b | Logical processing unit |
| 665c | Logical processing unit |
| 670 | Pull-up resistor |
| 670c | Pull-up resistor |
| 675 | Pull-up resistor |
| 675b | Pull-up resistor |
| 675c | Pull-up resistor |
| 680 | Control signal line |
| 690 | SD/MMC bi-directional bridge |
| 700 | GSM communication network |
| 715 | Base transceiver station |
| 720 | Base station controller |
| 725 | Mobile switching center |
| 730 | Serving GPRS support node |
| 735 | GPRS HLR/AUC/EIR |
| 740 | GPRS visitor location registry |
| 745 | Gateway mobile switching center |
| 750 | Public-switched telephone network |
| 755 | Gateway GPRS support node |
| 760 | Internet |
| 765 | Remote server |
| 800 | CDMA communication network |
| 805 | Packet control function |
| 810 | Packet data serving node |
| 815 | Packet core network |
| 820 | CDMA home agent |
| 825 | CDMA AAA server |
| 830 | CDMA interworking function |
| 900 | WiFi communication network |
| 905 | Wireless router |
| 910 | Modem |

DETAILED DESCRIPTION

Aspects of the present invention relate to a wireless communicator that attaches to an enhanced function device in a manner referred to herein as pouching. Pouching is defined herein to mean inserting the wireless communicator device inside of the enhanced function device so that the wireless communicator is at least partially obscured by the enhanced function device, and such that the enhanced function device mechanically supports the wireless communicator.

There are two general types of enhanced function devices into which the wireless communicator may be pouched; namely, jackets and hosts. A jacket is a device that provides a user interface for the wireless communicator, enriches the capabilities of the wireless communicator, and is not able to operate independently when the wireless communicator is not pouched therewith. Conversely, a host is a device that is able to operate independently when the wireless communicator is not pouched therewith, and whose capabilities are enriched by the wireless communicator when the wireless communicator is pouched therewith. Generally a host does not have communication functionality independent of the wireless communicator.

Reference is now made to FIG. 1, which is a simplified illustration of a multifunctional multi-parent, pouchable communication system constructed and operative in accordance with an embodiment of the present invention. Shown in FIG. 1 are a variety of wireless communicators, including 2.5G communicators for a GSM network, 3G communicators for GSM network, and CDMA communicators for a CDMA network. Such wireless communicators are described hereinbelow with reference to FIGS. 38 and 39. It will be appreciated by those skilled in the art that the networks illustrated in FIG. 1 are exemplary of a wide variety of networks and communication protocols that are supported by the wireless communicators of the present invention, such networks and communication protocols including inter alia WiFi, Bluetooth and WiMax.

Also shown in FIG. 1 are a variety of enhanced function devices. In accordance with an embodiment of the present invention, each wireless communicator may be pouched with each enhanced function device, and is compatible therewith. The wireless communicators are substantially of the same form factor and, as such, are able to be pouched with the various enhanced function devices.

Figure 2A:
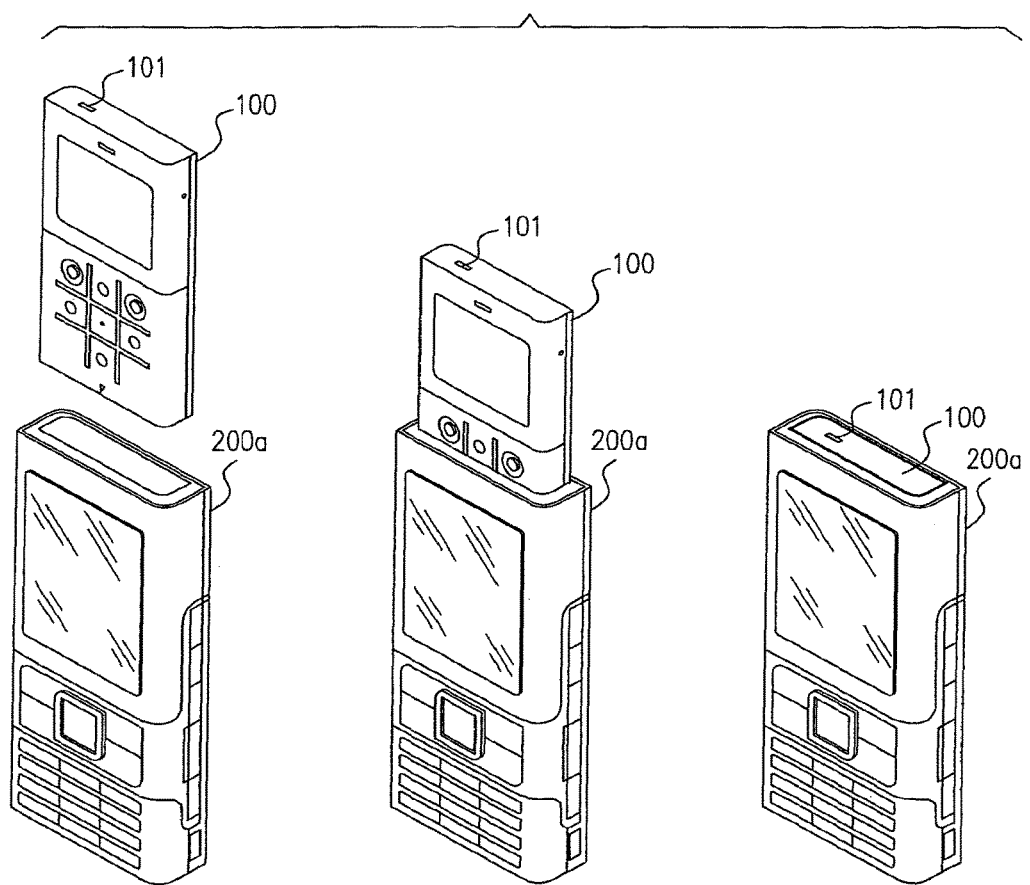
FIG. 2A is a simplified illustrations of various stages of pouching of a wireless communicator with a first enhanced function device in accordance with an embodiment of the present invention.

Reference is now made to FIG. 2A, which is a simplified illustration of various stages of pouching of a wireless communicator 100 with a first enhanced function device 200a in accordance with an embodiment of the present invention. First enhanced device 200a is a jacket for wireless communicator 100. The housing of wireless communicator 100 has an at least partially transparent portion 101 for a light source, such as an LED display, to show through. When wireless communicator 100 is fully inserted into jacket 200a so that electrical connection is made via a pouch connector, the light source is lit underneath portion 101, indicating that the connection has been made.

It will be appreciated by those skilled in the art that the light source may be used to indicate a status of wireless communicator 100. Thus the light source may indicate inter alia a battery status of wireless communicator, or a reception strength thereof. The light source may indicate an operational mode of wireless communicator 100. Thus the light source may indicate inter alia an audio conversation mode or a video conversation mode. The light source may indicate when a message has been received by wireless communicator 100, or when a message has been sent by wireless communicator 100. The light source may indicate that wireless communicator 100 has an incoming call. Similarly, the light source may indicate a status or operational mode of enhanced function device 200 when wireless communicator 100 is pouched therewith.

Reference is now made to FIG. 2B, which is a simplified illustration of various stages of pouching of wireless communicator 100 with a second enhanced function device 200b in accordance with an embodiment of the present invention. Second enhanced function device 200b is a host for wireless communicator 100. When wireless communicator 100 is fully inserted into jacket 200b so that electrical connection is made via a pouch connector, an light source is lit underneath portion 101, confirming that the connection has been made.

Figure 3A:
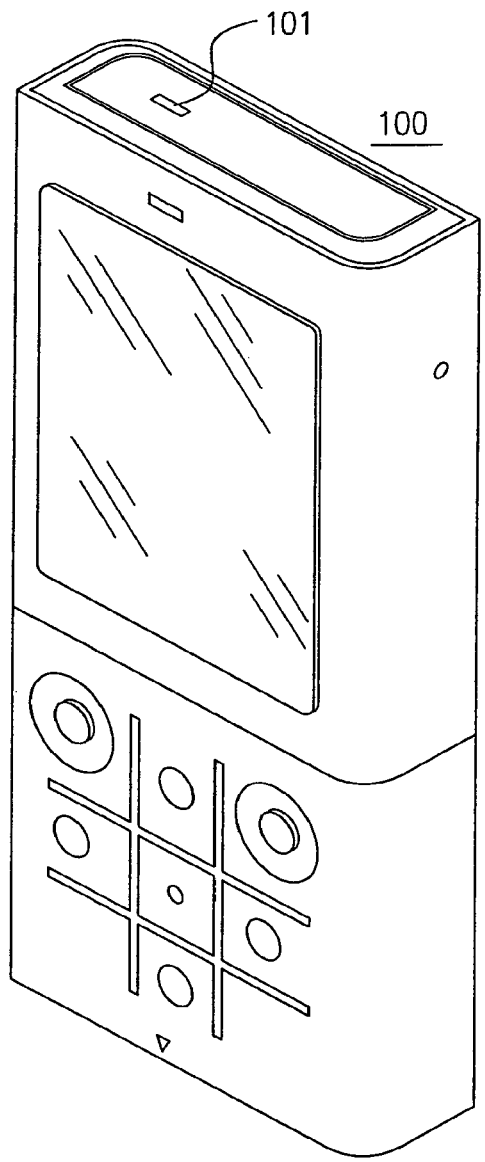
FIGS. 3A and 3B are pictorial illustrations of an embodiment of a wireless communicator in accordance with an embodiment of the present invention.
Figure 3B:
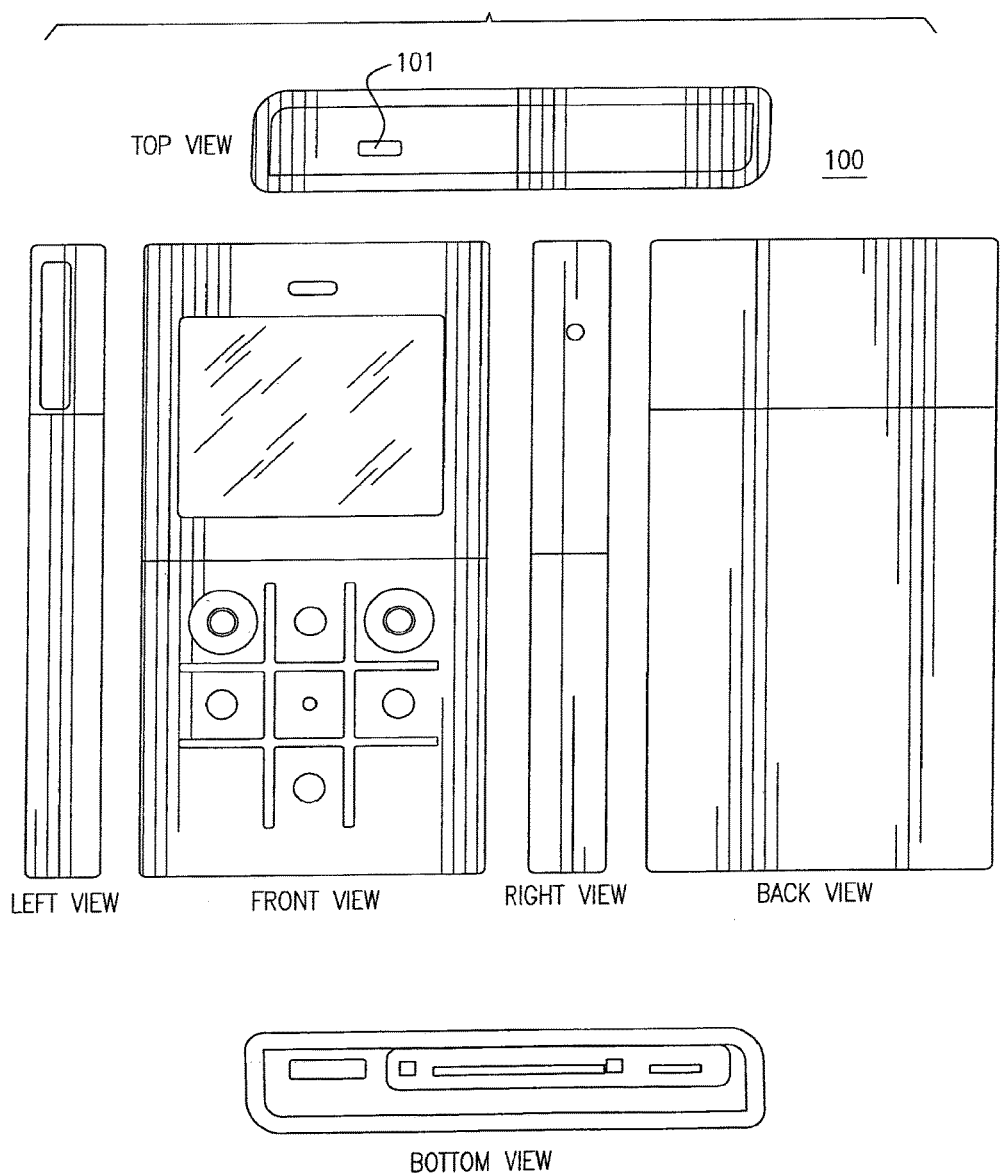

Reference is now made to FIGS. 3A and 3B, which are pictorial illustrations of an embodiment of wireless communicator 100 in accordance with an embodiment of the present invention. Wireless communicator 100 is small; in one embodiment, its dimensions are approximately 72.09 mm×37.59 mm×7.80 mm. Those skilled in the art will appreciate that the present invention is applicable when wireless communicator 100 is manufactured with other dimensions, as well. As shown in FIGS. 3A and 3B, the housing for wireless communicator 100 includes an at least partially transparent portion 101 for a light source to show through.

Figure 4A:
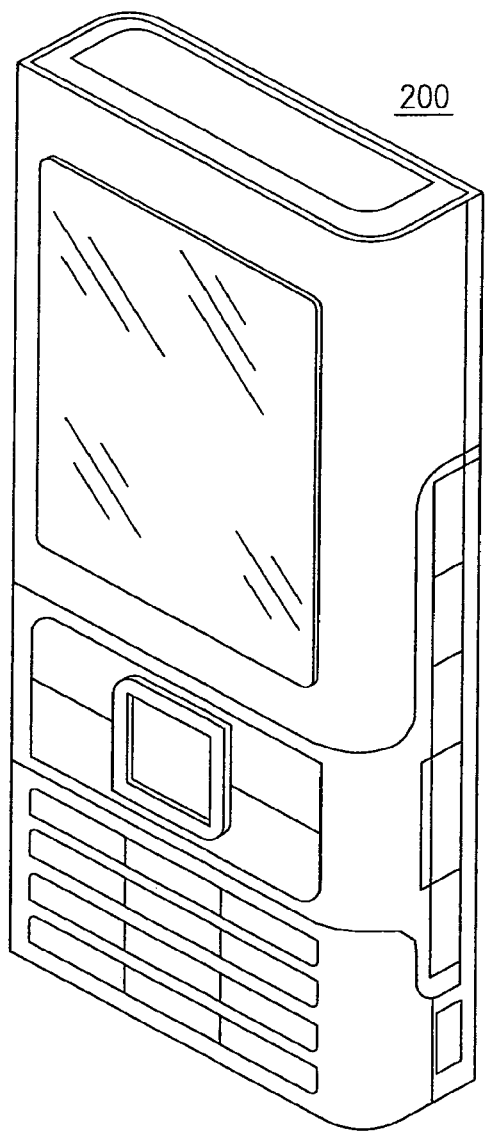

Reference is now made to FIGS. 4A and 4B, which are pictorial illustrations of an embodiment of enhanced function device 200 in accordance with an embodiment of the present invention.

Figure 5:
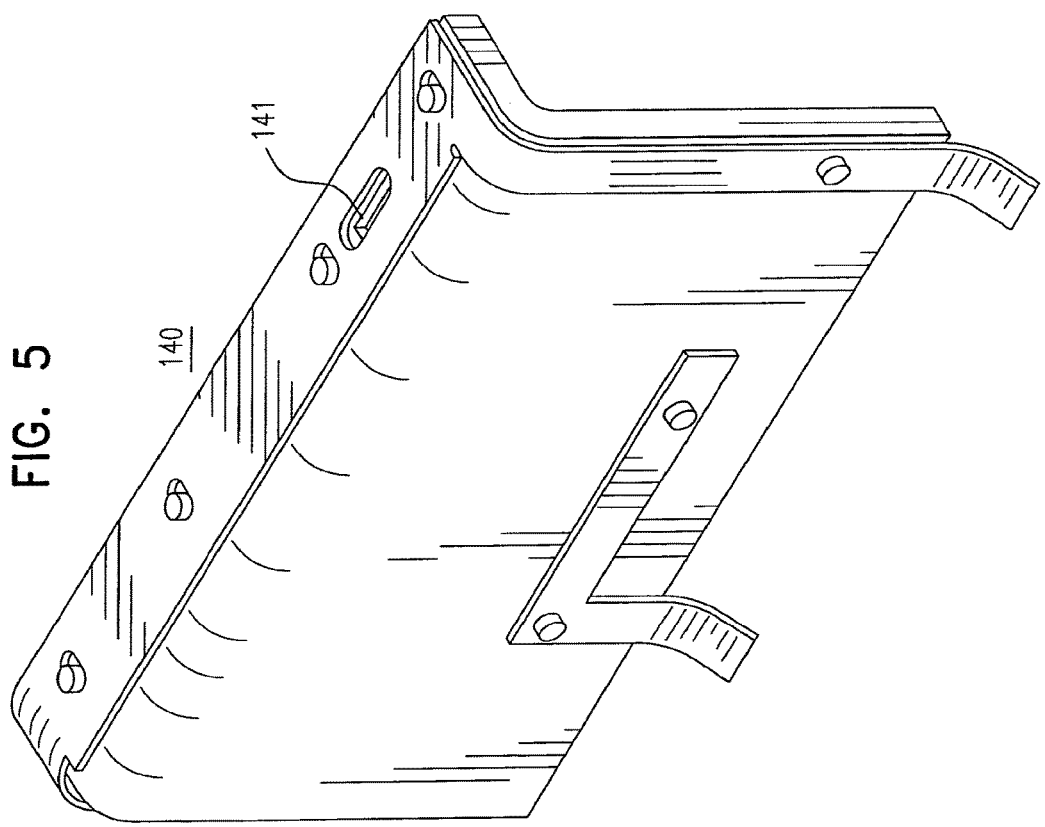
FIG. 5 is a pictorial illustration of an embodiment of an internal antenna of the wireless communicator in accordance with an embodiment of the present invention.

Reference is now made to FIG. 5, which is a pictorial illustration of an embodiment of an internal antenna 140 of wireless communicator 100 in accordance with an embodiment of the present invention. As shown in FIG. 5, antenna 140 includes an opening 141 for a light, such as an LED light, to show through. Antenna 140 is positioned so that opening 141 is aligned underneath at least partially transparent portion 101 of FIGS. 3A and 3B. The light for indicating a pouching connection between wireless communicator 100 and enhanced function device 200 thus shows through opening 141 and is visible through portion 101.

Figure 6:
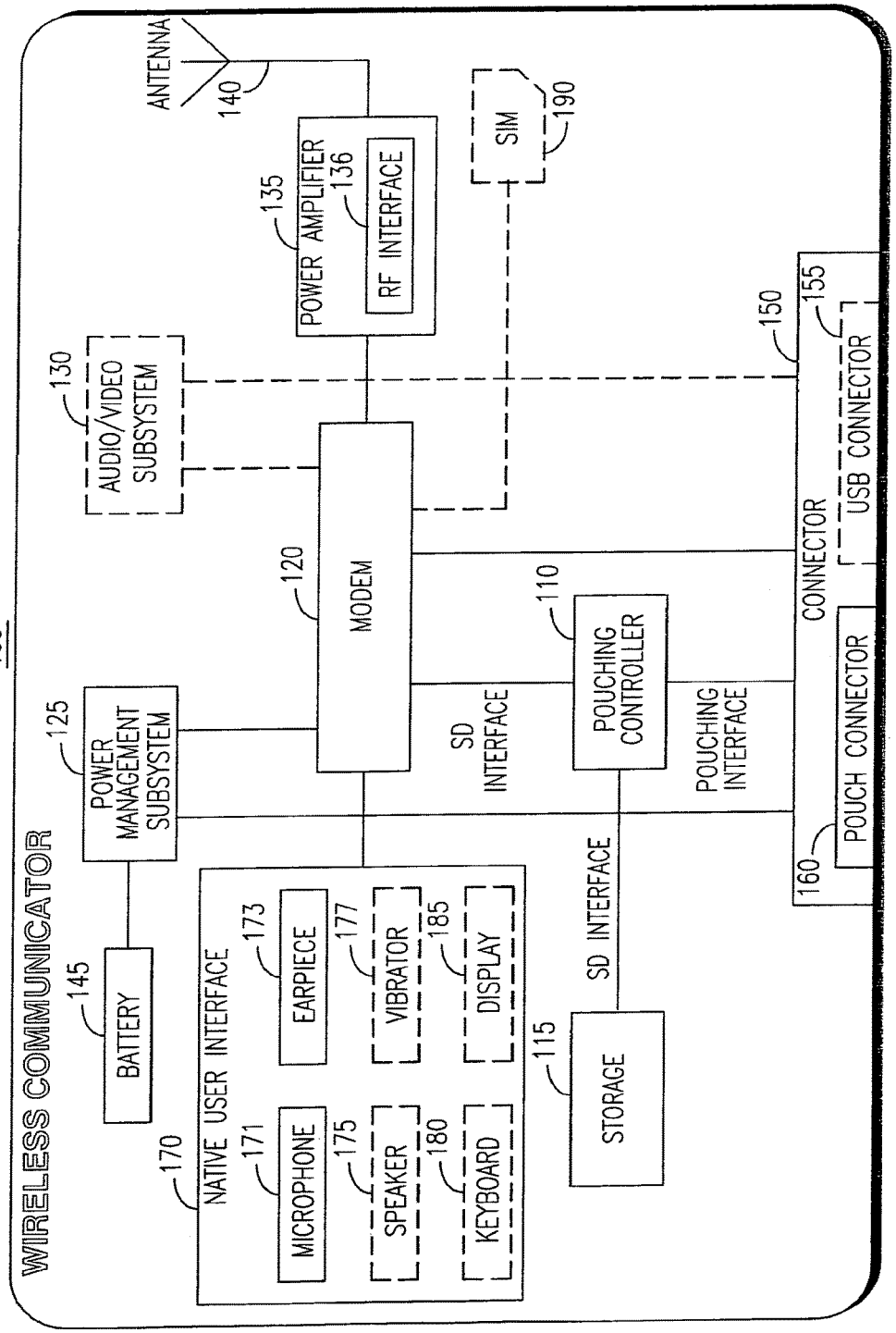
FIG. 6 is a simplified block diagram illustration of the wireless communicator in accordance with an embodiment of the present invention.

Reference is now made to FIG. 6, which is a simplified block diagram illustration of wireless communicator 100 in accordance with an embodiment of the present invention. Wireless communicator 100 includes six primary components, as follows: a pouching controller 110, a memory storage 115, a modem 120 for sending and receiving voice communications, a power management subsystem 125, a power amplifier 135 and a native user interface 170.

Pouching controller 110 executes programmed instructions that control the data flow between wireless communicator 100 and enhanced function device 200. Modem 120 controls the wireless communication functionality of wireless communicator 100. Power management subsystem 125 includes charging circuitry for charging a battery 145. Power amplifier 135 includes a radio frequency (RF) interface 136, and is connected to an antenna 140. Native user interface 170 includes a microphone 171 and an earpiece 173. Native user interface 170 also includes an optional speaker 175, vibrator 177, keyboard 180 and display 185. It will be appreciated by those skilled in the art that native user interface 170 may included additional components, such as a headset audio jack.

Wireless communicator includes an optional audio/video subsystem 130, which includes inter alia a voice, audio and video interface.

Wireless communicator 100 includes a connector 150, which includes a pouch connector 160 and an optional USB connector 155. Wireless communicator 100 optionally includes a SIM 190.

Generally, each subscriber of a wireless communication network is uniquely identified. Various methods are known in the art for identifying subscribers, including inter an IP address and a subscriber identification module (SIM). Although the description herein refers to SIM cards, those skilled in the art will appreciate that other forms of subscriber identification may be used instead.

Wireless communicator 100 operates in standalone mode or in conjunction with enhanced function devices, such as enhanced function device 200 shown in FIGS. 2A and 2B, when it is pouched therein via pouch connector 160.

In accordance with an embodiment of the present invention, the interface between pouching controller 110 and storage 115, and the interface between pouching controller 110 and modem 120 are SD interfaces. The interface between pouching controller 110 and pouch connector 160 is a customized pouching interface.

Figure 7A:
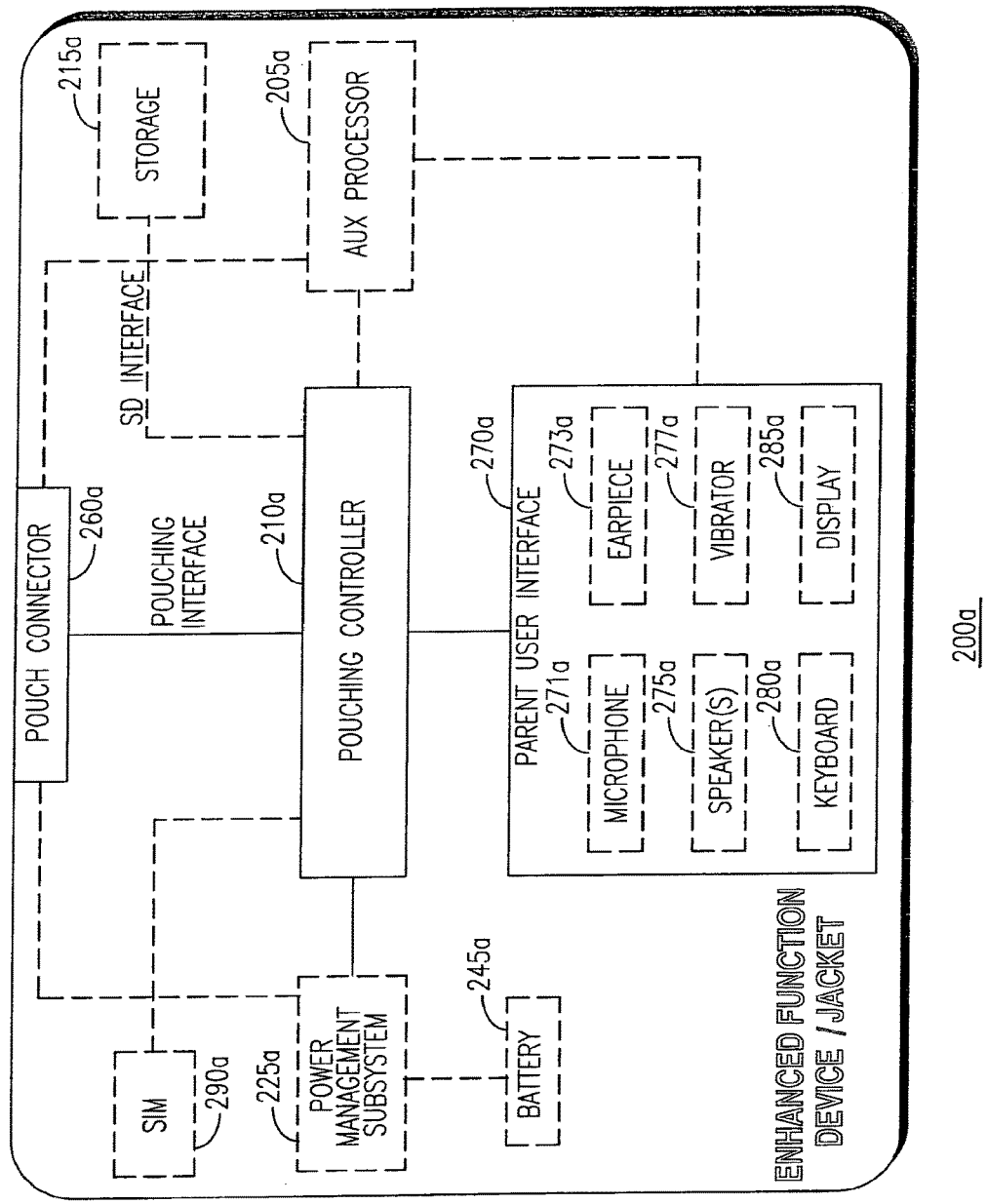
FIG. 7A is a simplified block diagram illustration of a first enhanced function device in accordance with an embodiment of the present invention.

Reference is now made to FIG. 7A, which is a simplified block diagram illustration of first enhanced function device 200a in accordance with an embodiment of the present invention. Enhanced function device 200a is a jacket for wireless communicator 100. Enhanced function device 200a includes a pouching controller 210a and a pouch connector 260a, for use when wireless communicator 100 is pouched with enhanced function device 200a via the wireless communicator's pouch connector 160. Enhanced function device 200a includes an optional auxiliary processor 205a, an optional storage 215a, an optional power management subsystem 225a, and an optional battery 245a, and an optional SIM 290a.

Enhanced function device 200a includes a parent user interface 270a including an optional microphone 271a, an optional earpiece 273a, an optional mono speaker or optional stereo speakers 275a, an optional vibrator 277a, an optional keyboard 280a and an optional display 285a. It will be appreciated by those skilled in the art that native user interface 270a may included additional components, such as a headset audio jack.

In accordance with an embodiment of the present invention, the interface between pouching controller 210a and storage 215a is an SD interface. The interface between pouching controller 210a and pouch connector 260a is a customized pouching interface.

Reference is now made to FIG. 7B, which is a simplified block diagram illustration of second enhanced function device 200b in accordance with an embodiment of the present invention. Enhanced function device 200b is a host for wireless communicator 100. Enhanced function device 200b includes a pouching controller 210b, a power management subsystem 225b and a pouch connector 260b. Enhanced function device 200b includes an optional host controller 205b, an optional battery 245b and an optional SIM 290b.

Enhanced function device 200b includes a parent user interface 270b including an optional microphone 271b, an optional earpiece 273b, an optional mono speaker or optional stereo speakers 275b, an optional keyboard 280b, and an optional display 285b. It will be appreciated by those skilled in the art that native user interface 270b may included additional components, such as a headset audio jack.

The interface between pouching controller 210b and pouch connector 260b is a customized pouching interface.

In accordance with an embodiment of the present invention, enhanced function device 200a/200b includes SIM 290a/290b, and when wireless communicator 100 is pouched with enhanced function device 200a/200b, wireless communicator 100 can access SIM 290a/290b via pouch connectors 160 and 260a/260b. As such, wireless communicator 100 is able to identify itself to a wireless network using either SIM 190 or SIM 290a/290b.

Having access to more than one SIM when pouched with enhanced function device 200a/200b, provides many diverse advantages to wireless communicator 100. Wireless communicator 100 is then able inter alia (i) to receive incoming communications for multiple subscribers, (ii) to select a desired subscriber identity for sending outgoing communications, and (iii) to change the identity of wireless communicator 100 in a wireless network from the identity corresponding to SIM 190 to an alternate identity corresponding to SIM 290a/290b.

In an embodiment of the present invention, SIM 290a/290b is a prepaid SIM, which allows a limited amount of communication.

In another embodiment of the present invention SIM 190 and SIM 290a/290b are associated with different billing programs of a wireless operator.

In another embodiment of the present invention, SIM 190 and SIM 290a/290b may have different access rights to resources in a wireless network.

In another embodiment of the present invention, wireless communicator 100 uses SIM 290a/290b in conjunction with SIM 190, when wireless communicator 100 is pouched with enhanced function device 200a/200b.

In another embodiment of the present invention, when wireless communicator 100 is pouched with enhanced function device 200a/200b, enhanced function device 200a/200b stores instructions for when to use SIM 290a/290b for subscriber identification. For example, enhanced function device 200a/200b may instruct wireless communicator 100 to use SIM 290a/290b for international calls, for SMS messaging and for data services. For other communications, wireless communicator uses SIM 190.

In another embodiment of the present invention, when wireless communicator 100 is pouched with enhanced function device 200a/200b, wireless communicator 100 prompts a user to selected between possible subscriber identifiers. Further, if wireless communicator 100 is connected to a network prior to being pouched with enhanced function device 200a/200b, and if the user selects to change subscriber identity when wireless communicator is subsequently pouched with enhanced function device, then wireless communicator 100 disconnects from the network and reconnects to the network using the changed subscribed identify.

It will be appreciated by those skilled in the art that use of more than one SIM may enables wireless communicator 100, when pouched with enhanced function device 200a/200b, to access wireless networks for which wireless communicator alone does not have access thereto.

It will further be appreciated by those skilled in the art that enhanced function device 200a/200b may include more than one SIM 290a/290b.

Reference is now made to FIG. 8A, which is a simplified flow chart illustration of operation of wireless communicator 100 when pouched within enhanced function device 200, in accordance with an embodiment of the present invention. At step 1005 wireless communicator 100 is pouched with enhanced function device 200. At step 1010 wireless communicator 100 and enhanced function device 200 authenticate each other.

Figure 8B:
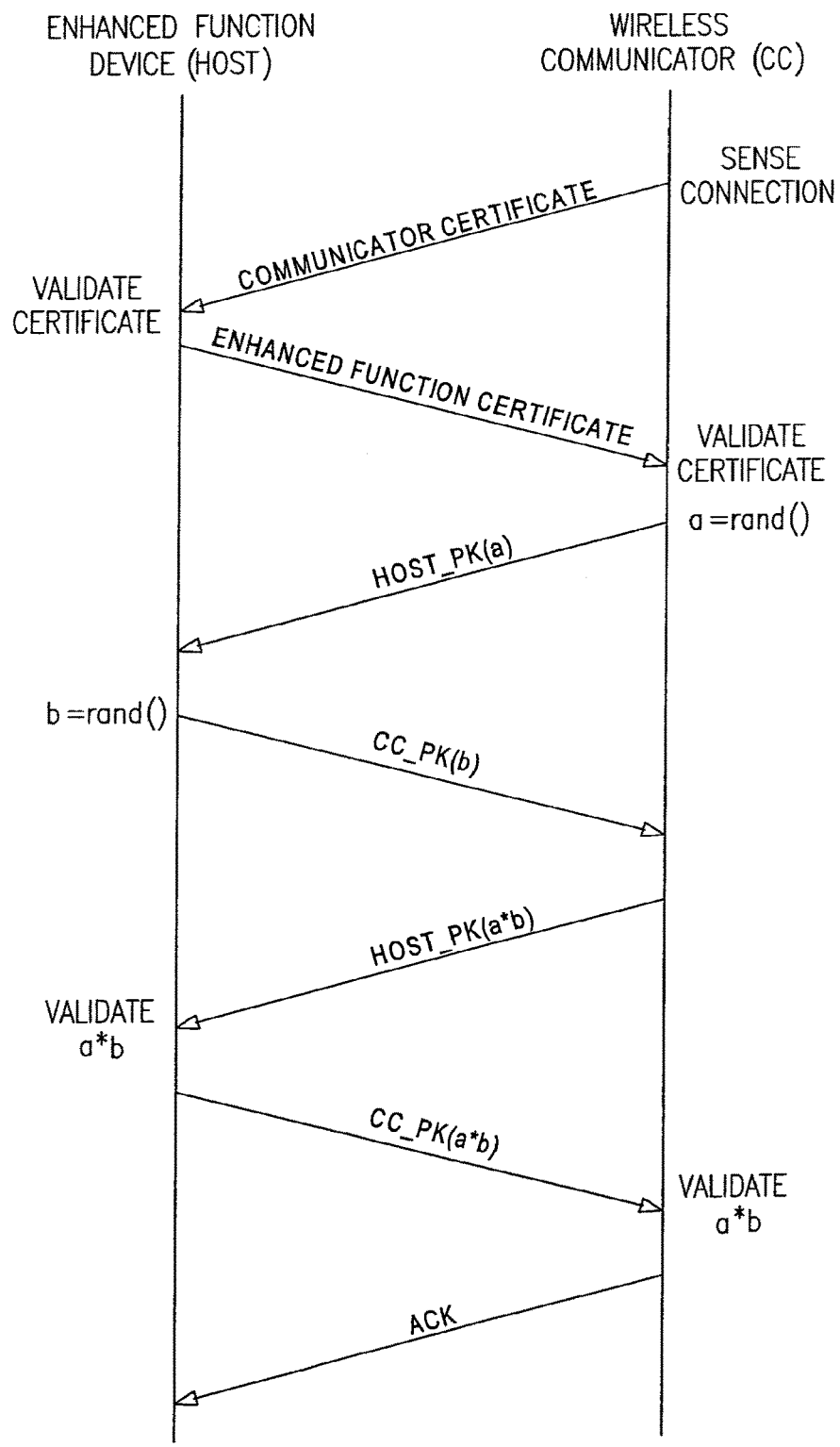
FIG. 8B is a simplified diagram of logic for alien rejection for a wireless communicator and an enhanced function device in accordance with an embodiment of the present invention.

In this regard, reference is now made to FIG. 8B which is a simplified diagram of logic for alien rejection for wireless communicator 100 and enhanced function device 200 in accordance with an embodiment of the present invention. Wireless communicator 100 and enhanced function device 200 each have a private key and a certificate signed by a trusted third party private key. As shown in FIG. 8B, the following sequence of events occurs at step 1010 of FIG. 8A.

Wireless communicator 100 sends its signed certificate to enhanced function device 200 for validation.

Enhanced function device 200 validates the certificate using the third party public key.

After validation, enhanced function device 200 sends its certificate to wireless communicator 100 for validation.

Wireless communicator 100 validates the certificate using the third party public key.

After validation, wireless communicator 100 generates a pseudo random number, a, encrypts it using the enhanced function device public key, and sends the encrypted value to enhanced function device 200.

Enhanced function device 200 generates a pseudo random number, b, encrypts it using the wireless communicator public key, and sends the encrypted value to wireless communicator 100.

Wireless communicator 100 decrypts b using its private key.

Wireless communicator encrypts a*b using the enhanced function device public key, and sends the encrypted value to enhanced function device 200.

Enhanced function device 200 decrypts a*b using its private key, and validates a*b.

Enhanced function device 200 decrypts a using its private key.

Enhanced function device 200 encrypts a*b using the wireless communicator public key, and sends the encrypted value to wireless communicator 100.

Wireless communicator 100 decrypts a*b using its private key and validates a*b.

The logic shown in FIG. 8B thus establishes a common key between wireless communicator 100 and enhanced function device 200, and enables validation of each certificate to facilitate alien rejection at step 1010.

Referring back to FIG. 8A, at step 1015 a determination is made whether or not wireless communicator 100 and enhanced function device 200 are mutually alien, based on the outcome of the logic shown in FIG. 8B. If so, then processing aborts at step 1020. Otherwise, at step 1025 wireless communicator 100 reads information about enhanced device, the information including inter alia subscriber network identification information.

At step 1030 wireless communicator 100 discovers the characteristics of the enhanced function device that it is pouched with. At step 1035 wireless communicator 100 auto-adapts itself to enhanced function device 200.

At step 1040 wireless communicator 100 determines whether or not enhanced function device 200 has a subscriber network identifier suitable for wireless communicator 100. If so, then at step 1045 pouching controller 110 determines the subscriber network identifier from enhanced function device 200. If not, then at step 1050 pouching controller 110 determines a subscriber network identifier from an embedded identifier. At step 1055 wireless communicator uses the determined identifier to connect to a wireless network.

In accordance with an embodiment of the present invention, enhanced function device 200 operates with a plurality of wireless communicators 100 simultaneously. Simultaneous pouching of the plurality of wireless communicators 100 with the same enhanced function device 200 has many advantages, including inter alia (i) battery charging, (ii) combining multiple wireless communication channels to expand bandwidth, (iii) enabling enhanced function device 200 to accept communication transmitted to any of the plurality of wireless communicators, (iv) usage of data storage in more than one wireless communicator, and (v) transfer of data from one wireless communicator to another wireless communicator.

According to an embodiment of the present invention, the pouching location of the plurality of wireless communicators within enhanced function device 200 dictates an order of priority for the plurality of wireless communicators.

According to an embodiment of the present invention, each of plurality of wireless communicators 100 has an identifier that is displayed by parenting user interface 270 of enhanced function device 200.

According to an embodiment of the present invention, parenting user interface 270 enables modification of the wireless communicator identifiers.

Figure 9:
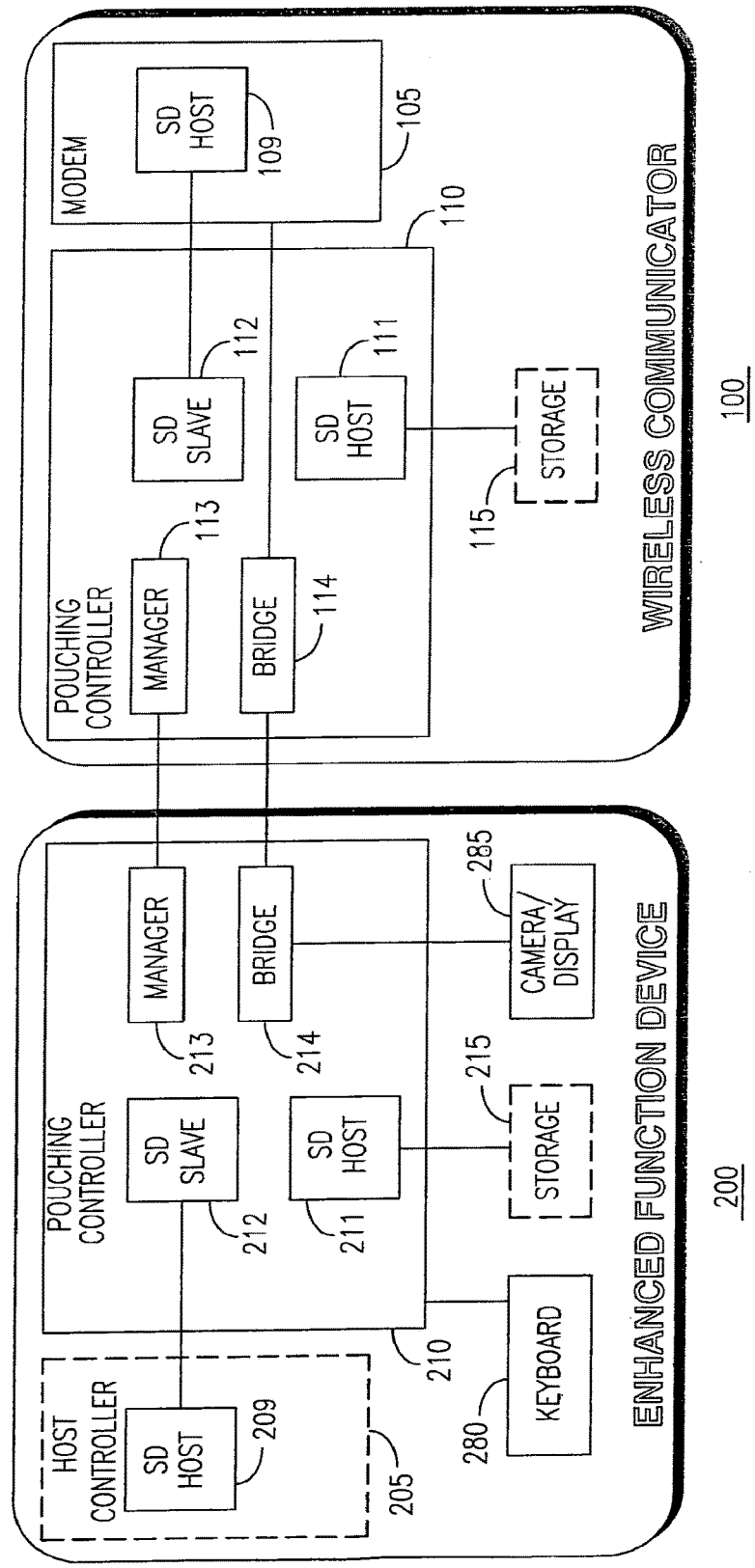
FIG. 9 is a simplified block diagram of a pouching interface between the wireless communicator and the enhanced function device in accordance with an embodiment of the present invention.

Reference is now made to FIG. 9, which is a simplified block diagram of a pouching interface between wireless communicator 100 and enhanced function device 200 in accordance with an embodiment of the present invention. As shown in FIG. 9, the pouching interface includes two data channels; namely, a first data channel for use by a wireless communicator manager 113 and an enhanced function device manager 213, and a second data channel for use by a wireless communicator bridge 114 and an enhanced function device bridge 214. Manager 113 and bridge 114 may be embodied within pouching controller 110, and manager 213 and bridge 214 may be combined within pouching controller 210.

The first data channel is used for exchanging mailbox messages between pouching controller 110 and pouching controller 210. The second data channel is used to place peripherals such as camera/display 285, in direct connection with modem 120.

In accordance with an embodiment of the present invention, the interface for the peripherals is translated into a proprietary protocol in wireless communicator 100, and is translated back to the original peripheral interface in enhanced function device 200.

The pouching interface may include third data channel, for use in transferring large amounts of data between pouching controller 110 and pouching controller 210.

The pouching interface includes inter alia audio channels and power supply lines.

In accordance with an embodiment of the present invention, pouching of wireless communicator 100 with enhanced function device 200 may reduce the functionality of wireless communicator 100. Specifically, functions accessible to wireless communicator 100 may be limited when wireless communicator is pouched with enhanced function device 200. For example, when pouched with enhanced function device 200, wireless communicator 100 may be limited to only dialing designated phone numbers, or to only connecting to designated web sites, or to only using a text editor to send SMS messages. Similarly, wireless communicator 100 may be limited to air-time, and restricted to accessing configuration settings for wireless communicator 100.

According to an embodiment of the present invention, the limiting of wireless communicator functionality is initiated automatically when wireless communicator 100 is pouched with enhanced function device 200. According to another embodiment of the present invention, the limiting of wireless communicator functionality is initiated manually; e.g., by entering a password. Further according to another embodiment of the present invention, the limiting of wireless communicator functionality may be manually stopped so that wireless communicator 100 is fully functional; e.g., by entering a password.

According to an embodiment of the present invention, the limiting of wireless communicator functionality is a parental control mechanism.

According to an embodiment of the present invention, jacket 200 is used to authenticate wireless communicator 100. E.g., a children's wireless communicator 100 is only configurable when pouched within a parental jacket 200; or vice versa a children's jacket 200 is only configurable when a parental wireless communicator 100 is pouched therewith. Moreover, according to an embodiment of the present invention when a parental wireless communicator 100 is pouched with a children's jacket 200, the parental wireless communicator 100 assigns a parent's phone number to a designated programmable key in children's jacket 200.

1. Three Operation States of Wireless Communicator

Embodiments of the present invention relate to the capability of wireless communicator 100 (i) to operate in a standalone mode, (ii) to be pouched with a jacket shell that is not an independent device and that cannot operate without the wireless communicator 100 being pouched thereto, and (iii) to be pouched with an enhanced function device that serves as the wireless communicator's host. In state (ii)

wireless communicator 100 functions as a master, and in state (iii) the wireless communicator 100 functions as a slave.

It will thus be appreciated by those skilled in the art that wireless communicator 100 is operable in three states; namely, (I) a standalone state, (II) a state connected to a simple host, and (III) a state connected to a complex host. In State II the simple host is a jacket shell. Wireless communicator 100 operates as a master and the jacket operates as a slave. Conversely, in State III the complex host is an enhanced function host device. Wireless communicator 100 operates as a slave and the enhanced function host device operates as a master.

In State I as a standalone, wireless communicator 100 has its own user interface and provides communication data and voice over radio technology, in addition to other services including inter alia MP3 playing.

In State II connected to a simple host, the jacket is not an independent device and cannot operate without wireless communicator 100 being pouched therewith. The jacket may include only a display, a keyboard and a simple non-volatile storage chip. Optionally, the jacket may further include speakers, a microphone and a secondary power source. Wireless communicator 100 supplies power to jacket's keyboard, display speakers and microphone, and to the wireless communicator's own internal circuitry. Wireless communicator 100 uses the jacket's secondary power source to charge the wireless communicator's internal power source.

During initialization, after wireless communicator 100 is pouched with the jacket, or at boot time, static configuration parameters are read from the storage of the jacket to wireless communicator 100. Thereafter, wireless communicator 100 provides the jacket with display information, in the form of screen shots such as bitmap images.

In State III connected to a complex host, the enhanced function host device is an independent device that operates independently of wireless communicator 100, such as an MP3/MPP player or a digital camera. Commands and information are shared, and sent over an SD control bus during operation. The enhanced function host device includes its own host controller, user interface and power source. The user interface for both the device functionality and the wireless communicator functionality operates through the enhanced function host device. The interface to the enhanced function host device is via pouch connector 160, where pins on the connector 160 have specifically assigned functionalities and use specific protocols.

It will thus be appreciated by those skilled in the art that the pouch connector to the jacket is via the same pouch connector as is the connector to the enhanced function host device, but the pins on pouch connector generally have different functionalities and use different protocols with the jacket than those used with the enhanced function host device.

The three operational states of wireless communicator 100 are summarized in TABLE I hereinbelow.

TABLE I

Three Operation States of Wireless Communicator 100

| | | |
|---|---|---|
| State I | Standalone | Wireless communicator uses its own interface |
| State II | Connected to a simple host | Wireless communicator is master; jacket is slave Jacket cannot operate without wireless communicator Wireless communicator provides jacket with screen shots, in the form of bitmap images, for display information Communication is through SD bus |

TABLE I-continued

Three Operation States of Wireless Communicator 100

| | | |
|---|---|---|
| State III | Connected to a complex host | Wireless communicator is slave; Enhanced function device is master Enhanced function device operates independently of wireless communicator Wireless communicator provides enhanced function device with screen shots, in the form of bitmap images, for display information Communication is through SD bus |

Figure 10:
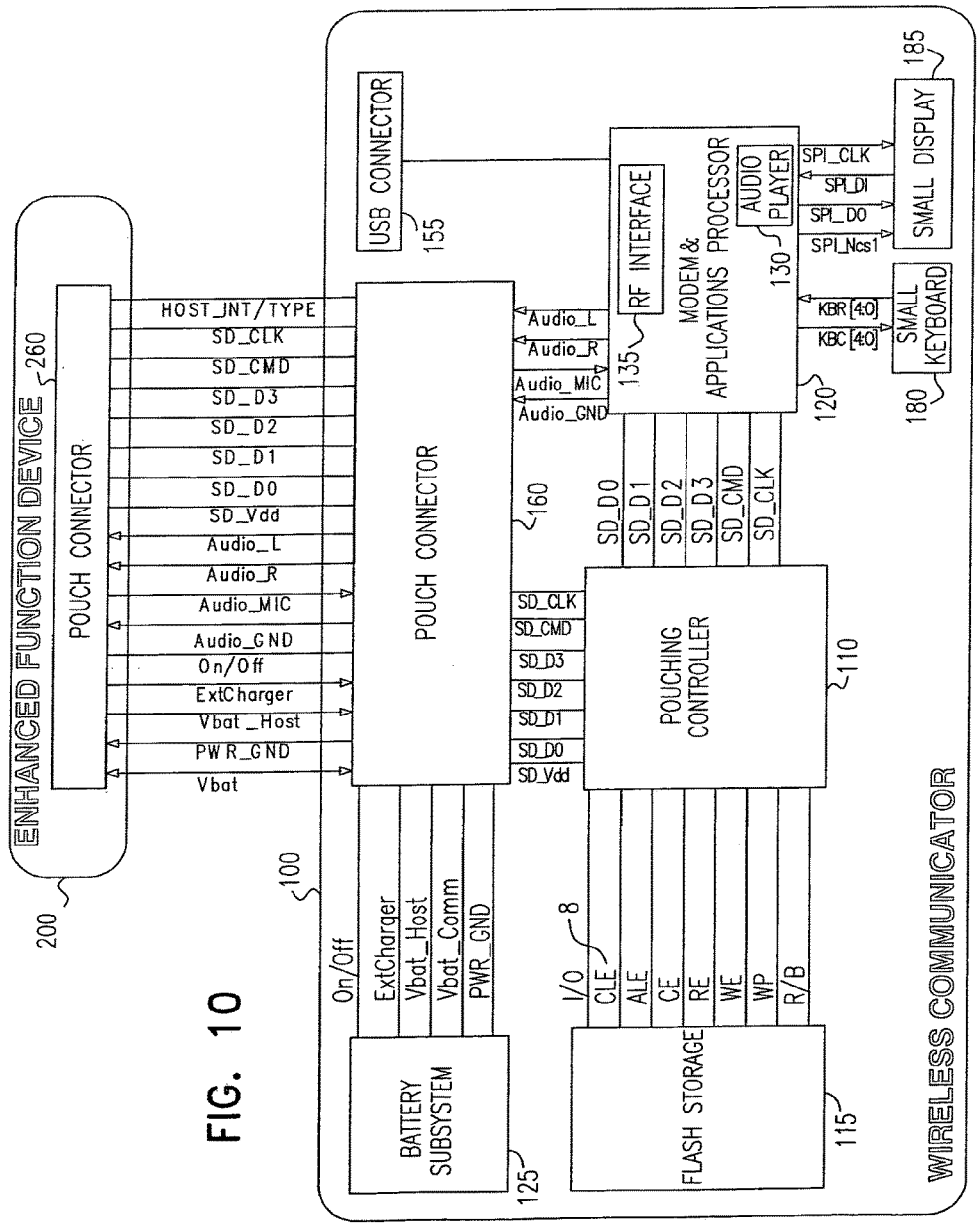
FIG. 10 is a simplified block diagram of the wireless communicator with three operational states in accordance with an embodiment of the present invention.

Reference is now made to FIG. 10, which is a simplified block diagram of wireless communicator 100 with three operational states in accordance with an embodiment of the present invention. Wireless communicator 100 as shown in FIG. 10 supports the three operational states in TABLE I. The components of wireless communicator 100 shown in FIG. 10 enable it to function as a standalone device. When enhanced function device 200 is connected to wireless communicator 100, wireless communicator 100 may operate as a master or as a slave, and the SD communication between pouch connectors 160 and 260 flows accordingly. Specifically, in State II wireless communicator 100 is the master and enhanced function device 200 is the slave, and in State III wireless communicator 100 is the slave and enhanced function device 200 is the master.

In accordance with an embodiment of the present invention wireless communicator 100 automatically detects its operational environment by monitoring the voltage on designated pins of pouch connector 160. I.e., communication card 100 distinguishes between States I-III based on voltage. Enhanced function host devices and jacket shells generally drive the voltage on these pins differently, which enables wireless communicator 100 to discriminate whether or not it is pouched with an enhanced function device, and to detect the type of enhanced function device it is connected to.

Figure 11:
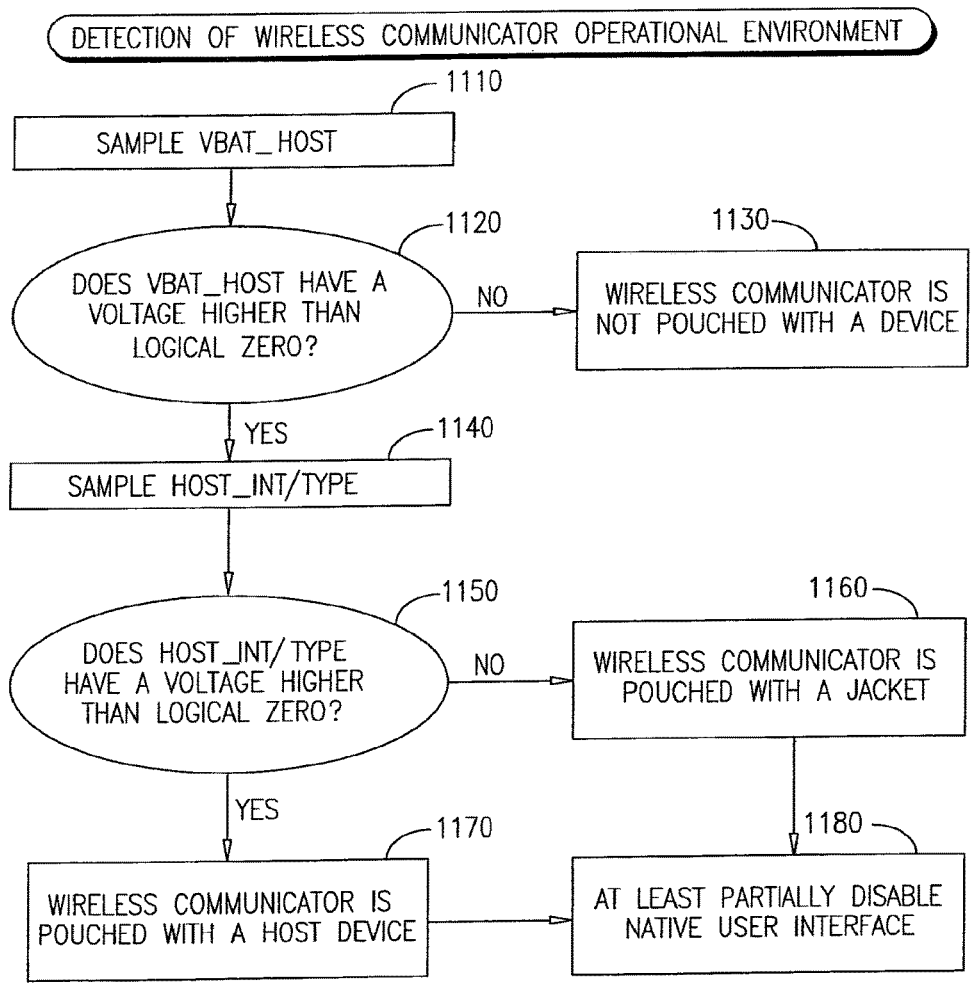
FIG. 11 is a simplified flowchart of a method for the wireless communicator to detect the type of enhanced function device it is pouched with in accordance with an embodiment of the present invention.

In this regard, reference is made to FIG. 11, which is a simplified flowchart of a method for wireless communicator 100 to detect the type of enhanced function device 200 it is pouched with in accordance with an embodiment of the present invention. At step 1110 power management subsystem 125, or alternatively pouching controller 110, monitors the connector signal VBat_host, shown in FIG. 10. If the VBat_host signal has a voltage level higher than logical zero (i.e., 0.5V or higher), as determined at step 1120, then pouching controller 110 concludes that wireless communicator 100 is pouched with an enhanced function device. Otherwise, if VBat_host is logical zero (i.e., below 0.5V), then at step 1130 pouching controller 110 concludes that wireless communicator 100 is not pouched with an enhanced function device.

In order to detect which type of enhanced function device wireless communicator 100 is pouched with, pouching controller 110 monitors the HOST_INT/TYPE signal, shown in FIG. 10. When pouching is detected, the HOST_INT/TYPE signal is sampled at step 1140. If HOST_INT/TYPE is a logical zero (i.e., below 0.5V), as determined at step 1150, then at step 1160 pouching controller 110 concludes that enhanced function device 200 is a jacket shell. Otherwise, if HOST_INT/TYPE is higher than logical zero (i.e., 0.5V or higher), then at step 1170 pouching controller 110 concludes that enhanced function device 200 is a host device.

The use of HOST_INT/TYPE for detecting the type of enhanced function device 200, is made at the time of pouching wireless communicator 100 with enhanced function device 200. Afterwards, the signal HOST_INT/TYPE is used as an interrupt signal.

In an alternative embodiment of the present invention, the SD_Vdd signal, shown in FIG. 10, may be monitored at step 1110 instead of or in addition to the VBat_host signal. Whereas the VBat_host signal generally indicates whether or not communication card 100 is pouched with an enhanced function device, the SD_Vdd signal generally indicates whether or not the enhanced function device is turned on.

It will be appreciated by those skilled in the art that the threshold of 0.5V used in the above discussion is merely indicative of a general pre-designated threshold that is used to detect attachment of the host to the communication card, and to detect the type of the host.

In an embodiment of the present invention, pouching controller 110 notifies modem 120 of the pouching of wireless communicator 100 with an enhanced function device, and the type of enhanced function device that wireless communicator 100 is pouched with.

When modem 120 detects that wireless communicator is pouched with an enhanced function device, native user interface 170 of wireless communicator 100 is at least partially disabled at step 1180. For enhanced function devices, modem 120 receives user interface inputs, and provides feedback as bitmap graphics BMP screen shots, or as single messages, via the pouching interface. The enhanced function device controls the device's display and keyboard. For enhanced function jackets, modem 120 receives direct keyboard strokes from the jacket keyboard, and provides the displayed image pixels/characters directly to the jacket display, using enhanced function device pouching controller 210a.

In an embodiment of the present invention, in order to be powered, jackets connect their internal circuitry to the Vbat_Comm signal that connects to connector 105. If a jacket 200 has a secondary battery, then the secondary battery is connected to Vbat_Host, which connects to the wireless communicator's 100 power management subsystem 125 and is used to charge the wireless communicator's internal battery 145.

Similarly, the internal circuitry of an enhanced function device 200 is powered by connecting its internal power source to Vbat_Host. Enhanced function device 200 does not use the Vbat_Comm signal as a power source, but may monitor it to detect when wireless communicator 100 is pouched therewith, or to monitor the wireless communicator's battery level.

2. Extending Functionality of Memory Cards

Embodiments of the present invention concern extending the functionality of SD cards, beyond the local storage functionality that is conventionally provided. Using the present invention, SD cards can provide wired or wireless communication channels to access remote content servers, and can stream content from, upload content to and download content from these servers.

Using the present invention, SD cards can also include applications that are controlled and displayed by enhanced function device 200, and implemented on wireless communicator 100.

Wireless communicator 100 is compatible with existing SD physical and logical interfaces, and operate transparently with enhanced function devices 200 that include SD slots.

Aspects of the present invention further provide an improved SD memory card that provides extended functionality, including (i) wired or wireless communication channels for accessing remote content servers, and (ii) applications that are controlled and displayed by an SD host device, but are implemented on the SD card. Using the improved SD memory card of the present invention, wireless communicator 100 can stream music or video from remote content servers, download files from these servers, and upload files to these servers.

Figure 12:
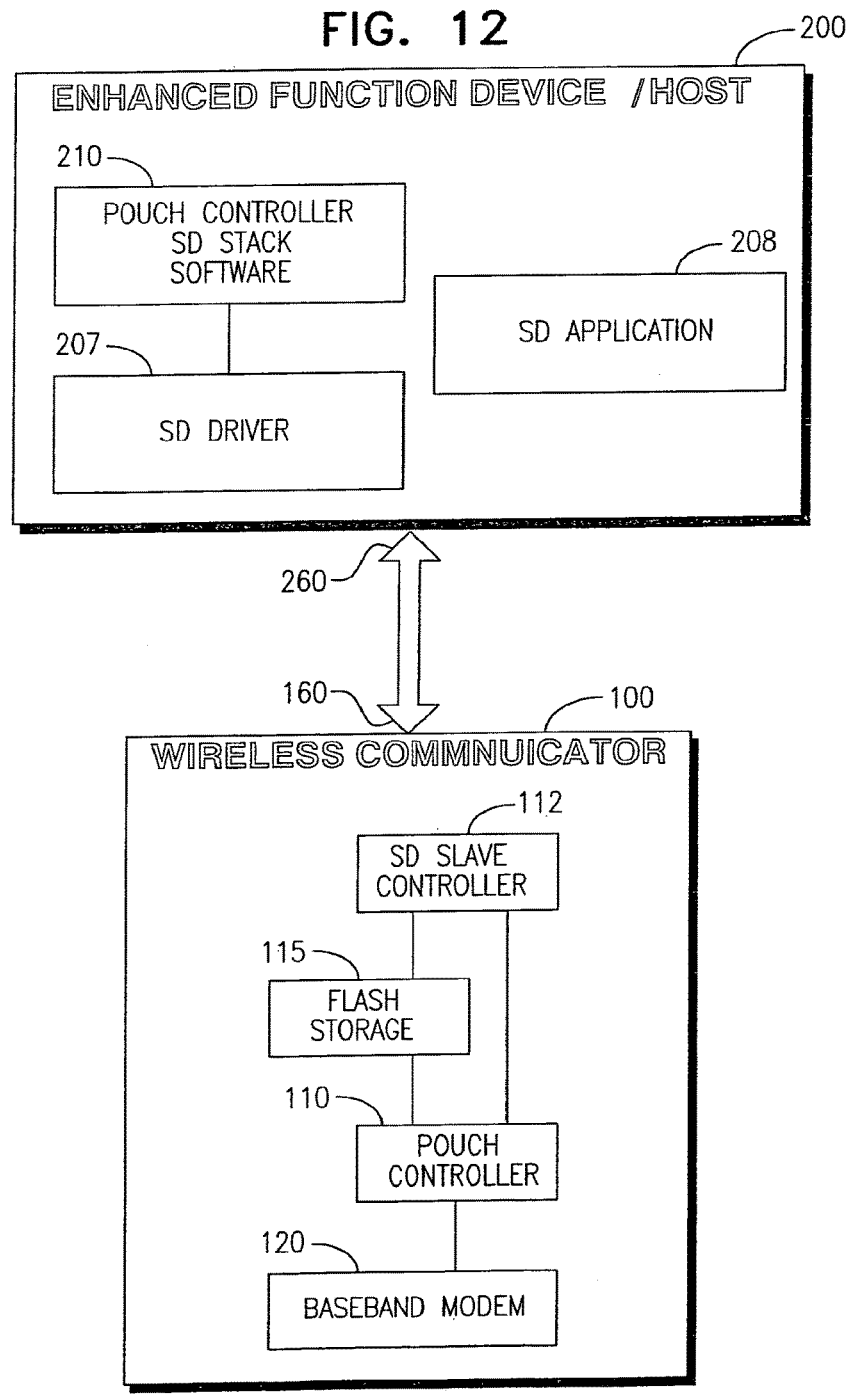
FIG. 12, which is a simplified diagram of an SD card interface that provides extended functionality in accordance with the present invention.

Reference is now made to FIG. 12, which is a simplified diagram of an SD card interface that provides extended functionality in accordance with an embodiment of the present invention. In accordance with the embodiment shown in FIG. 12, wireless communicator 100 uses the same interface as a standard SD card, and thus operates seamlessly with enhanced function device 200. Pouching controller 110 is controlled by embedded software. Wireless communicator storage 115 is embodied as flash memory storage. Wireless communicator 100 includes an SD slave controller 112, for accessing a file system that is stored on flash memory 115. Baseband modem 120 is embodied inter alia as a cellular modem, as a WLAN modem, as a WPAN modem, or as a wireless modem.

Further in accordance with the embodiment of the present invention shown in FIG. 12, enhanced function device 200 as embodied in FIG. 12 includes an SD slot. Pouching controller 210 is software controlled to process an SD instruction stack. Enhanced function device 200 also includes an SD driver 207. Enhanced function device 200 also includes an SD application 208 that performs extended functionality enabled by wireless communicator 100. Details of operation of SD application 208 are described hereinbelow with reference to FIG. 14.

Pouch connectors 160 and 260 enable data communication between enhanced function device 200 and wireless communicator 100. Pouch connectors 160 and 260 also enable wireless communicator 100 to receive electrical power from enhanced function device 200.

In accordance with an embodiment of the present invention, wireless communicator 100 interfaces with enhanced function device 200 as a standard SD card, and provides information for a virtual file system. The file and directory structure reported by slave controller 112 to enhanced function device 200 does not necessarily reflect files and directories that are stored on wireless communicator 100. Directory names may represent names of remote servers accessible via baseband modem 120, and they may represent names of services that wireless communicator 100 provides. The operation of opening a directory by the host, signals pouching controller 210 to access a specific server or activate a specific service.

In accordance with the present invention, file names may represent names of files or streams that are stored remotely on a selected server. Opening a specific files triggers wireless communicator 100 to access the remote file or stream and download it to the card. Immediate access to the file by the host is provided via a dummy copy of the file that may include a place holder message such as "file is currently being downloaded, download will be complete within xx seconds". The place holder message may be provided in the form of an audio file, such as an MP3 or WMA file, or an image file, such as a JPEG of GIF file, depending on the type of file that was requested.

Writing a file to a designated location on wireless communicator 100 operates to upload the file to the selected remote server.

In accordance with the present invention, file names may also be used to designate controls for applications that are executed on wireless communicator 100. Opening of a file designates activation of a corresponding control.

For one usage scenario, wireless communicator 100 may have a directory named "Radio". Selection of this directory activates a radio on the card. In turn, the Radio directory includes a list of files with names "Search Forward", "Search Backward", "Volume Up" and "Volume Down". Opening the "Search Forward" file, for example, activates an instruction to the radio to skip to the next channel.

For another usage scenario, enhanced function device 200 writes to a file in a directory named "ATComm". In response, an AT command, which includes content written to the file, is issued to baseband modem 120. Thus, if the host writes "ATZ" to the file, which is a reset command, the command is transmitted to baseband modem 120. The modem reply, which is typically "OK", is written to a second file in the ATComm directory, available for enhanced function device 200 to read.

For devices that support more advanced data formats such as HTML pages or Java applications, wireless communicator 100 provides a graphical user interface via an HTML file or Java application file that is stored on the card. The host device opens and executes such file, e.g., main.html, which in turn provides a graphical representation for accessing remote files or for controlling an application on wireless communicator 100. File content and HTML links are changed dynamically corresponding to changes in information or changes in status.

With the graphical user interface, control wireless communicator 100 is still performed by selecting, opening and writing to files, but the interface is graphical, as coded in the HTML file or Java application.

Figure 13:
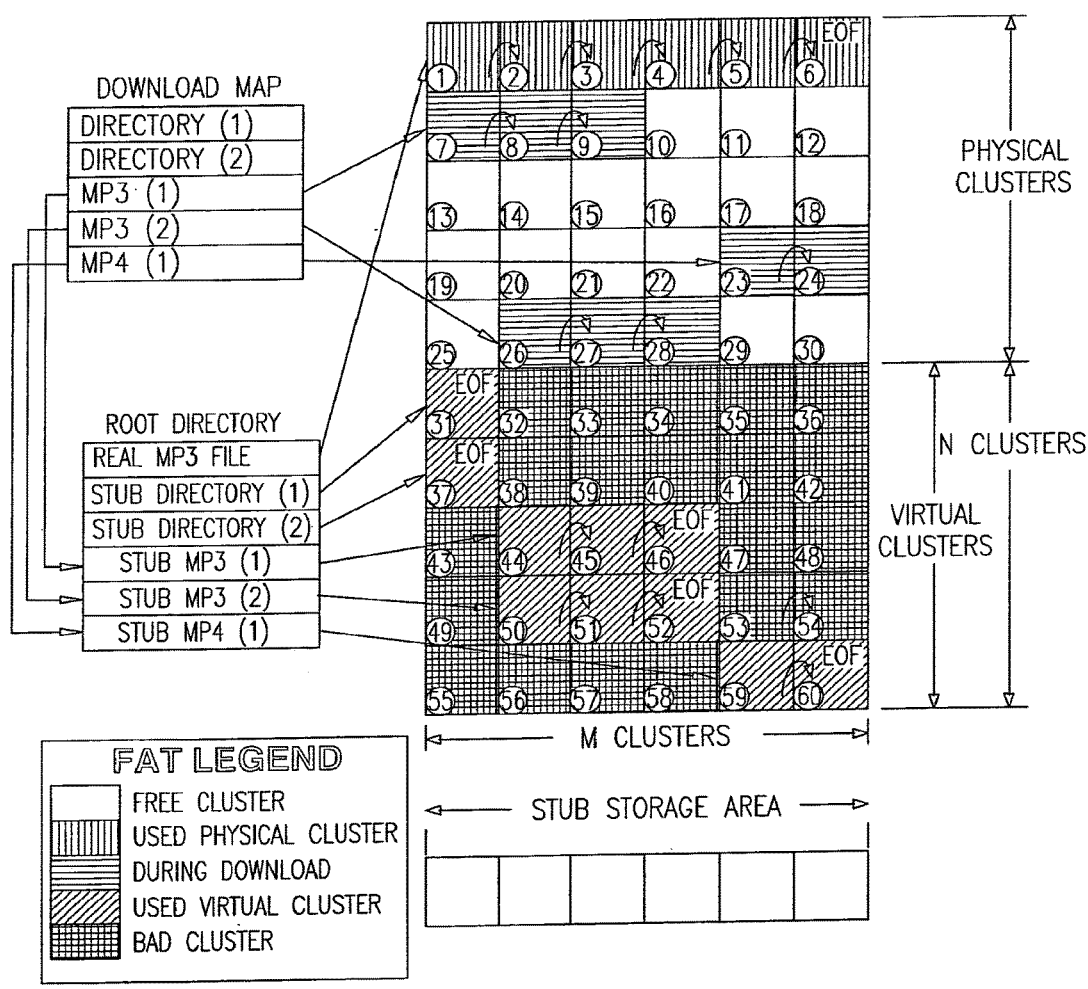
FIG. 13 is a simplified illustration of an arrangement of clusters in an SD card file system in accordance with an embodiment of the present invention.

As described hereinabove, directory names on wireless communicator 100 may represent names of remote servers, and file names on wireless communicator 100 may correspond to names of remote files and streams. Reference is now made to FIG. 13, which is a simplified illustration of an arrangement of clusters in an SD card file system in accordance with an embodiment of the present invention. Shown in FIG. 13 is a flash memory in SSD card is represented as including 60 clusters, numbered consecutively from 1 to 60, although clusters 31-60 are virtual, non-physical clusters, as described in detail in what follows.

The physical memory on wireless communicator 100 is generally partitioned into 512 byte sectors, and four sectors are combined to form a 2 KB cluster, although it will be appreciated by those skilled in the art that other partitions are within the scope of the present invention. In FIG. 11 the physical memory includes clusters 1-30. Information regarding available clusters on wireless communicator 100 is maintained in a file allocation table (FAT). For each cluster, two bytes are stored in the FAT, as follows.
0, if cluster is empty
Next cluster in file, if cluster is not the last cluster in a file
0xFFF8, if cluster is the last cluster in a file
0xFFF7, if cluster is a bad cluster Clusters 1-6 of FIG. 13 correspond to an MP3 file that is stored as a cluster chain. The first cluster in the chain is cluster 1, and the chain continues through clusters 2, 3, 4, 5 and 6, with cluster 6 being the last cluster in the file, designated as an EOF (end-of-file) cluster. The arrows drawn in these clusters represent pointers that advance through the chain of clusters. Clusters 7-9 of FIG. 13 correspond to an MP3 file that is currently being downloaded. As such, cluster 9 is not necessarily an EOF cluster since additional downloaded data may require additional clusters for storage. Similarly, clusters 26-28 correspond to a second MP3 file that is currently being downloaded. Clusters 23 and 24 correspond to an MP4 file that is currently being downloaded. Clusters 10-22 and 25, 29 and 30 are free clusters. The cross-hatching in the clusters of FIG. 13 corresponds to the type of cluster, as indicated in the FAT legend.

Information about files is stored in a directory, designated "ROOT DIRECTORY" in FIG. 13, having 32 byte directory entries generally including the following information.
File name with 8+3 characters
Type—regular file, directory
File size
Date & time
First cluster of file
File names longer than 8+3 characters are obtained by including additional entries for the same file with special attributes. The directory itself is stored in the file system as a regular file.

In the implementation of the present invention illustrated in FIG. 13, the SD file system is extended by declaring the volume to be of a size larger than the amount of available physical flash memory. Enhanced function device 300 is not aware of the discrepancy since it never needs to write to the excess volume.

The extended volume includes physical clusters, which are mapped to real flash memory locations, and virtual clusters, which have addresses beyond the available flash memory. Cluster 1-30 in FIG. 13 are physical clusters, and clusters 31-60 are virtual clusters. Upon initialization, the virtual clusters may be marked as bad clusters in the FAT, thereby ensuring that enhanced function device 100 does not try to write to these clusters. More generally, when host device is powered up, the flash memory is reset by erasing all file entries in the root directory and clearing the FAT. Physical clusters are marked as being free clusters, and virtual clusters may be marked as being bad clusters.

Virtual clusters are converted to stub locations when they are read. Stub locations include a directory list stub and a media stub, such as an MP3 stub. A directory list stub includes a file with a place holder message such as "file is currently being downloaded, download will be complete within xx seconds", as described hereinabove. A virtual cluster is mapped to an appropriate stub location in the flash memory in such a way that distinct virtual clusters correspond to distinct stub files.

Clusters 31 and 37 in FIG. 13 are directory list stubs. Clusters 44-46, clusters 50-52 and clusters 59-60 are media stubs. Media stubs are cluster chains that end at an EOF cluster. Clusters 44-46 and clusters 50-52 correspond to an MP3 stub, and cluster 59-60 corresponds to an MP4 stub. Clusters 32-36, 38-43, 47-49 and 53-58 are marked as bad clusters. It is noted that MP3 stubs are generally identical, since they generally contain the same place holder message. More generally, media stubs for a specific media type, such as MP3 stubs, JPG stubs or MP4 stubs, are identical.

The number of virtual clusters that are defined equals N*M, where N is the maximum number of concurrent stubs required, and M is the maximum number of clusters for stub data. Typically, one cluster is used for a directory list stub, and 50 clusters, corresponding to 100 KB, are used for a media stub. For simplicity, FIG. 13 is drawn with N=5 and M=6. In practice, reasonable values for N and M are 256 and 64, respectfully, and accordingly the number of virtual clusters is 2^14. As such, the virtual clusters require 32 KB for their FAT entries.

A portion of the flash memory, designated in FIG. 13 as "STUB STORAGE AREA", that contains M clusters is used to stub file data and is not mapped to the file system. Only SD controller 112 can access this storage area of the flash memory. The M clusters in the stub storage area are hidden clusters; specifically, they are physical clusters in the flash memory but they are not mapped directly on the FAT. When virtual clusters are read, the virtual cluster locations are converted to hidden cluster locations.

Stub files have valid directory entries, which point to virtual clusters as the first file cluster. All subsequent clusters in the stub files are also virtual clusters. Referring to FIG. 13, clusters 44-46, clusters 50-52 and clusters 59-60 are cluster chains for stub files. Each stub file points to a different virtual cluster, although they may contain the same stub data. Consequently, SD controller 112 knows which file to download based upon the virtual sector number requested by enhanced function device 300. Specifically, the hidden sector number to read from the stub storage area is V (mod 4M), where V is the virtual sector offset inside the virtual sector area. The term 4M arises from the 4 sectors per cluster. More generally, if there are K sectors per cluster, then the hidden sector number to read is V (mod K*M).

When a remote file or stream is downloaded, it is stored on wireless communicator 100 in a FAT cluster chain, just as a local file is stored. However, the directory entry for the file does not point to the first cluster in the chain. A download map from virtual cluster number to {file name, file type, pointer to file on remote server, first real cluster} is used to maintain a list of all current stub files, including files in stub mode and files in downloading mode. Links that can be clicked on by a user have entries in the download map, along with a stub file directory entry with a file type of the form DIRECTORY, MP3, MP3_STREAM, or such other media type. When a file is finished being downloaded, it is removed from the download map.

Shown in FIG. 13 is a download map with entries for two directories and two MP3 files, corresponding to the stubs in the root directory. The MP3 files being downloaded are currently stored in clusters 7-9 and clusters 23 and 24.

Figure 14:
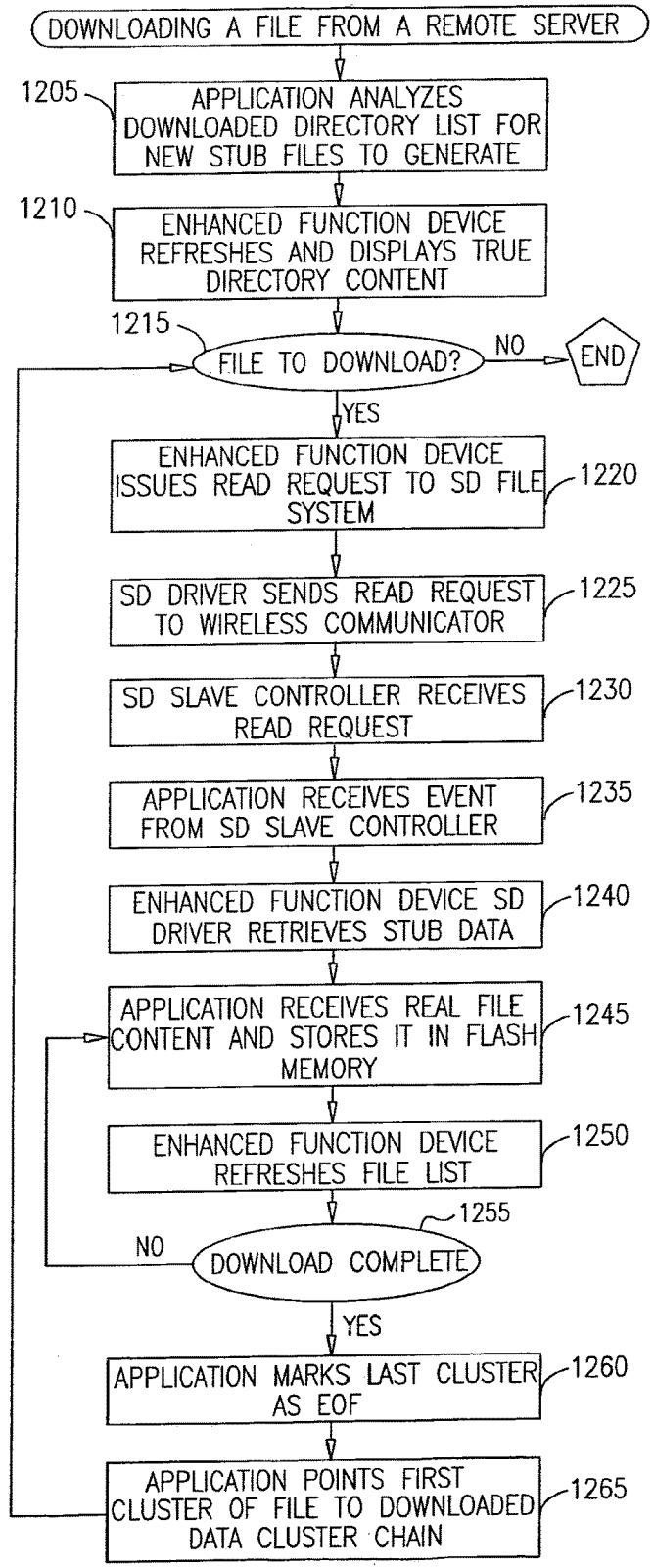
FIG. 14 is a simplified flowchart of a method for downloading a file from a remote server to the wireless communicator in accordance with an embodiment of the present invention.

Reference is now made to FIG. 14, which is a simplified flowchart of a method for downloading a file from a remote server to wireless communicator 100 in accordance with an embodiment of the present invention. To supplement FIG. 14, reference is also made to FIGS. 15A-15D, which are snapshots of a user interface and a file system for a simple example use case, during various stages of file download during operation of the method of FIG. 14 in accordance with an embodiment of the present invention. Each of FIGS. 15A-15D are divided into three portions. The leftmost portion illustrates a user interface, the middle portion illustrates directory entries and the download map, and the rightmost portion illustrates the FAT. Thus, whereas FIG. 14 describes the steps being performed, the accompanying FIGS. 15A-15D illustrate states of the user interface and the file system during various ones of the steps. The legends for the cross-hatching on the FATs in FIGS. 15A-15D are the same as the legend provided in FIG. 13. It will be appreciated by those skilled in the art that the file system illustrated in FIGS. 15A-15D is simplified, in order to emphasize the workings of an embodiment of the present invention.

Referring to FIG. 14, in general at step 1205, SD application 208 analyzes a downloaded directory file for new stub files to create. The directory content is recursively searched by SD application 208. For each file discovered a directory listing stub or media stub is created, corresponding to the file type.

Figure 15A:
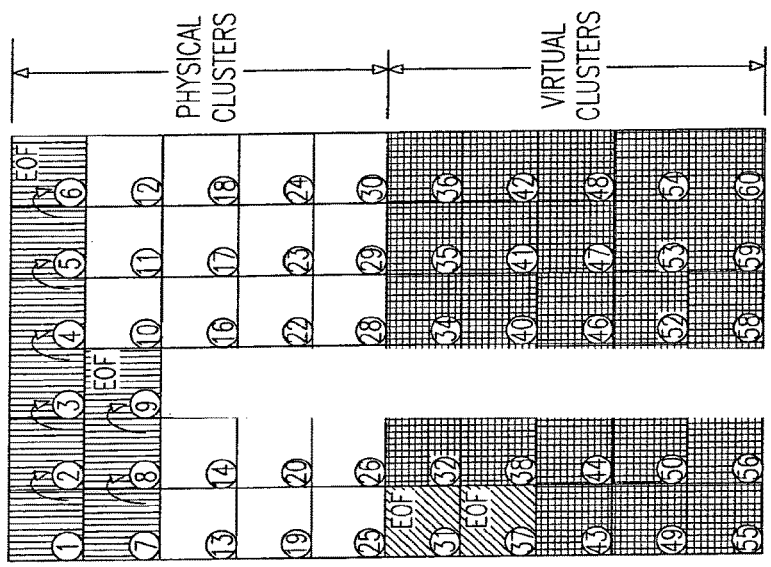
FIGS. 15A-15D are snapshots of a user interface and a file system for a simple example use case, during various stages of file download during operation of the method of FIG. 14 in accordance with an embodiment of the present invention.

FIG. 15A corresponds to an initial stage wherein a user is browsing a downloaded remote directory listing, as shown in the leftmost portion of FIG. 15A. At this stage, the root directory has entries for two stub directories; namely, a "jazz" stub directory at virtual cluster 31, and a "rock" stub directory at virtual cluster 37. The root directory also has entries for two local files; namely, a movie stored at clusters 1-6, and a pop song stored at clusters 7-9. The download map has URL entries for two remote directories; namely, a "jazz" directory at virtual cluster 31 has URL http://music.com/jazz, and a "rock" directory at virtual cluster 37 has URL http://music.com/rock.

Reference is now made to FIG. 16, which is a simplified flowchart of a method for generating a stub file in step 1205 of FIG. 14 in accordance with the present invention. At step 1310, SD application 208 searches the virtual clusters in the FAT, such as clusters 31-60 in FIG. 15A, for the first free row; namely, the first row with clusters marked as bad clusters. At step 1320 the first applicable cluster in the row found at step 1310 is set as the first cluster of the stub file, according to the type of stub file. Specifically, for the example FAT shown in FIG. 13, the applicable cluster for directory list stubs is the first cluster in the row, for MP3 stubs is the second cluster in the row, and for MP4 stubs is the fifth cluster in the row. Such an arrangement ensures that the different types of stubs correspond to different hidden cluster in the sub storage area.

At step 1330, SD application 208 allocates additional virtual clusters, as required for storing the stub file, and the additional virtual clusters are chained to the first virtual cluster. Such virtual cluster chains are shown in FIG. 13B as clusters 44-46 and clusters 50-52. Finally, at step 1340, SD application 208 modifies the directory entry for the stub file, so that the first cluster of the stub file points to the first cluster from step 1320, and so that the size of the stub file matches the actual length of the stub file.

At step 1210, enhanced function device 200 refreshes and identifies the newly-downloaded directory listing. At step 1215 a determination is made whether a file is to be downloaded. If so, processing advances to step 1225. Otherwise, processing ends.

As shown in FIG. 15A, the user clicks on the "jazz" directory. Momentarily, a place holder message "downloading file list please wait" appears on the user interface. The place holder message is stored in the stub storage area, as shown in FIG. 13, in the hidden cluster corresponding to cluster 31. In the meantime, enhanced function device 200 downloads the remote file list for the "jazz" directory, and displays the list shown at the top of the leftmost portion of FIG. 15B. The list contains two files; namely, a "benny goodman" MP3 file, and a "louis armstrong" MP3 file.

At this stage, the root directory includes a local directory for the "jazz" directory at data cluster 13. A "jazz" directory is generated, and includes entries for two stub MP3 files; namely, a stub MP3 file at virtual cluster 44, and a stub MP3 file at virtual cluster 50. The download map includes URLs for the remote "benny goodman" and "louis armstrong" files. The user clicks on "benny goodman" to initiate download of that file.

Referring back to FIG. 14, in general at step 1220 enhanced function device 200 issues a file read request to the SD file system. The request is transmitted to SD driver 207. SD driver 207 determines from the FAT, which appropriate cluster to read, and finds the cluster value, which corresponds to a virtual cluster. Enhanced function device 200 is unaware that the cluster value corresponds to a non-physical cluster, and interprets the value as a legitimate cluster value.

At step 1225, SD driver 207 transmits the read request to SD slave controller 112. SD driver 212 converts the virtual cluster value to a virtual sector value, using a conversion of the form K*V+constant, and issues a read request to the virtual sector. As above, the parameter K is the number of sectors per cluster.

At step 1230, SD slave controller 112 receives the read request. In response, SD slave controller 112 sends a command to SD application 208 including the virtual sector value, and returns the corresponding hidden sector value to enhanced function device 200, using the formula hidden_sector=virtual_sector (mod(K*M)).

At step 1235, SD application 208 receives the event from SD slave controller 112, and converts the sector value to a URL, or to another such pointer to a file on a remote server, using the download map. SD application 208 then issues an HTTP GET command, or such other download command, to retrieve the remote file. This operation is performed only once, when the first sector of the file is read.

At step 1240, SD driver 207 retrieves the stub data. Enhanced function device 200 is unaware that this data belongs to a stub file. The length matches the file length in the directory listing, to ensure consistency. The data is displayed to the user, and includes a message such as "file is currently being downloaded, download will be complete within xx seconds". Generally, the message is refreshed by enhanced function device 200. In circumstances where enhanced function device 200 does not refresh, the SD card forces a refresh every 2-3 seconds by a refresh operation, or by a disconnect/connect operation using the SD protocol.

Figure 15B:
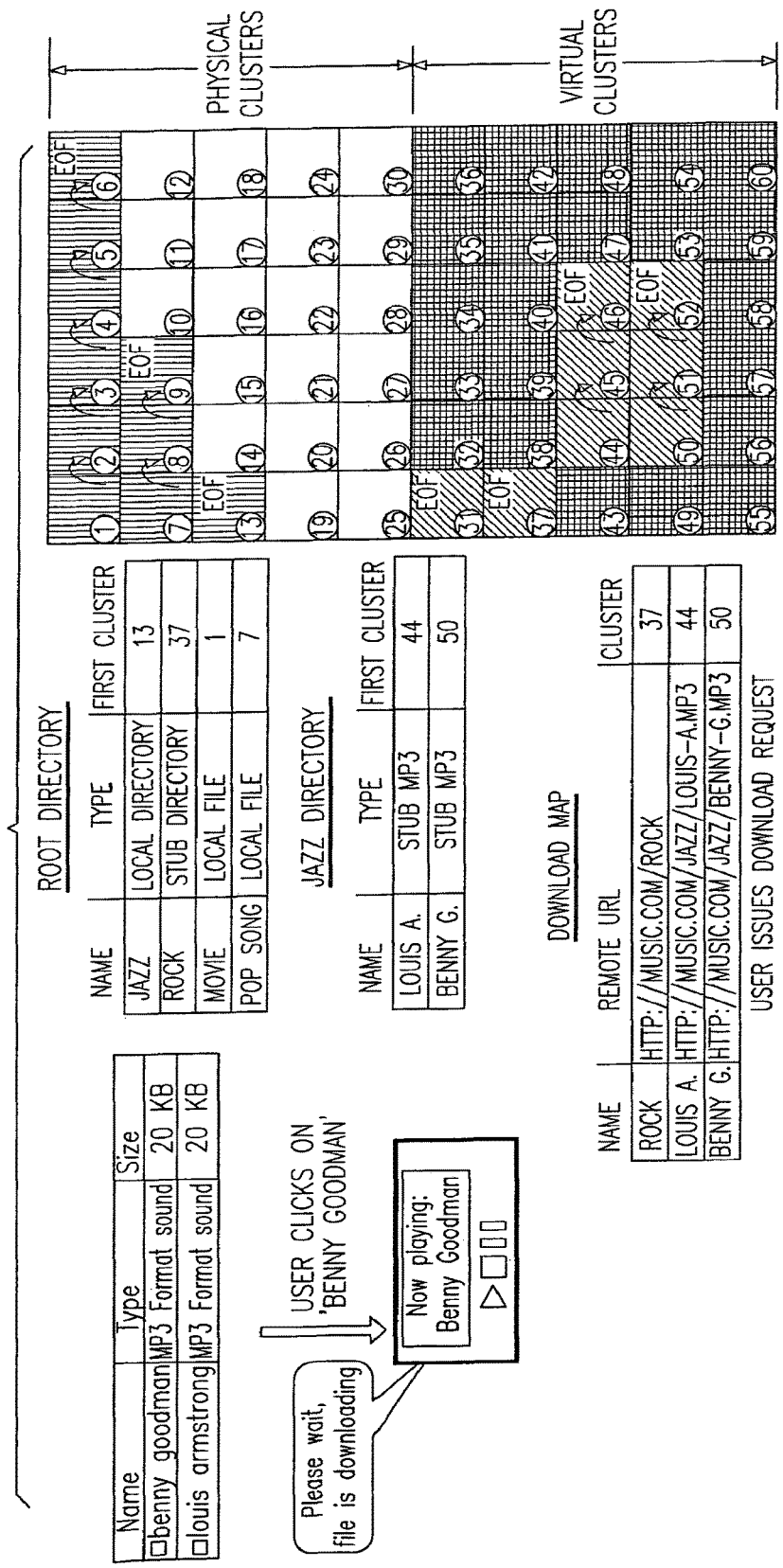

Referring to FIG. 15B, in this embodiment the place holder message "Please wait, file is downloading" from the stub file is played to the user. It will be appreciated by those skilled in the art the place holder messages may be displayed to a user as a still image or video clip, or played as an audio file, or both. In one embodiment, the place holder message is the same media type as the file that is corresponds to; i.e., audio messages are played when audio files are being downloaded, and video messages are played when video files are being downloaded.

Figure 15C:
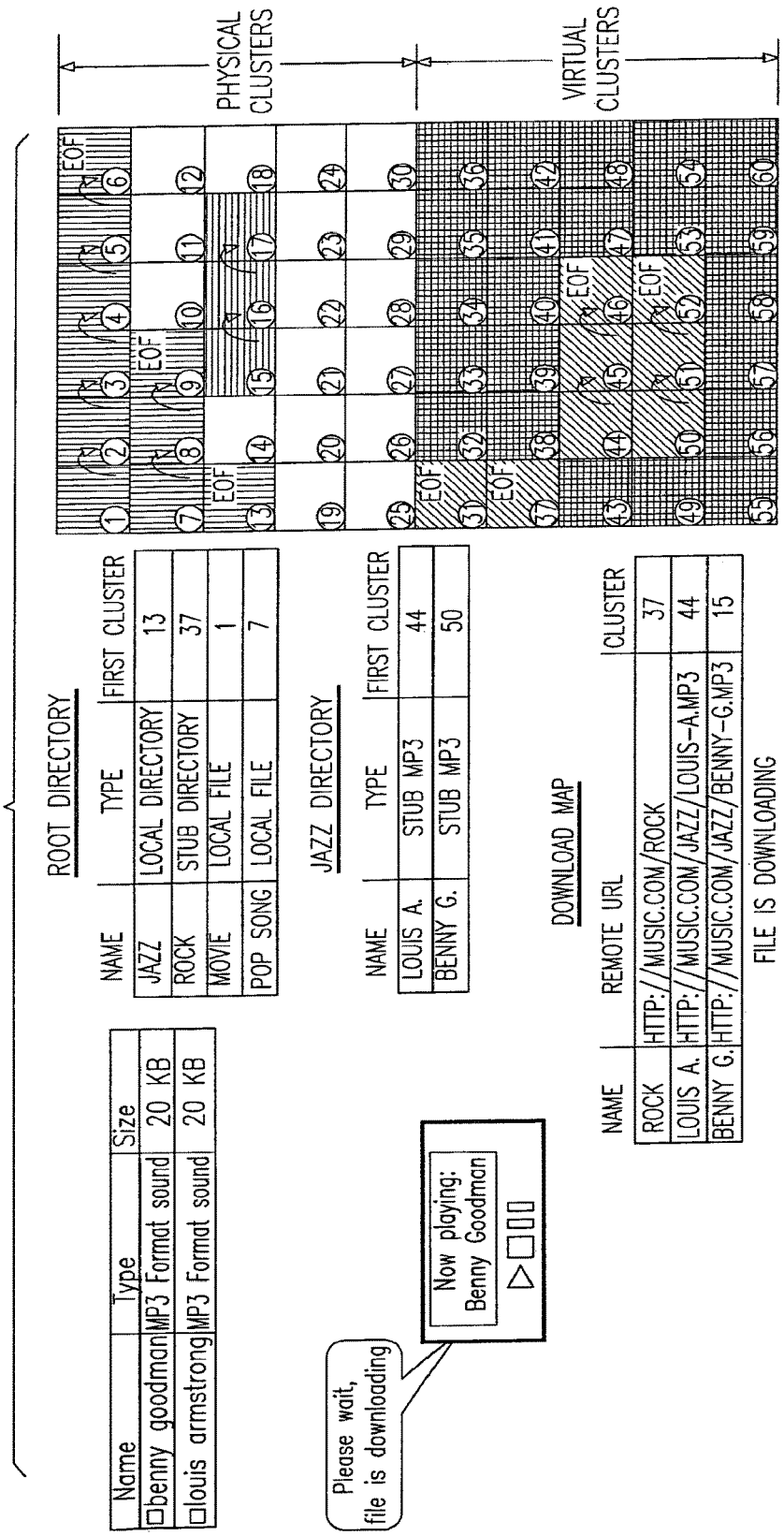

Referring to FIG. 15C, the file being downloaded is stored in physical clusters 15, 16, 17, etc. This is reflected in the entry for the "benny goodman" file in the download map, where cluster 15 is designated.

Referring back to FIG. 14, in general at step 1245 SD application 208 receives the real file content and stores it in the flash memory. The file is downloaded via baseband modem 120. As it arrives, SD application 208 updates the download map for the file with the amount of data received, and updates the first cluster in the cluster chain for the file in the flash memory. Each cluster of the downloaded file is stored in a free cluster in the flash memory, which is then marked as full. Thus it will be appreciated by those skilled in the art that as the file is downloaded a regular file is generated in the FAT, but without a directory item for the file. Instead, the first sector of the file is stored in the download map.

At step 1250 enhanced function device 300 refreshes the file list. At step 1255 a determination is made whether or not the download for the file is complete. If not, processing returns to step 1245 where SD application 208 continues to download the file. Otherwise, if the download is complete then, at step 1260, SD application 208 marks the last cluster of the downloaded file with an EOF.

At step 1265, SD application 208 points the first cluster of the file to the downloaded data cluster chain. SD application 208 replaces the directory entry for the file from the virtual cluster value to the physical first cluster of the newly downloaded file. As such, the file entry now points to a legitimate file. The file size is also changed, so as to correspond to the received file length. The file is then removed from the download map.

Figure 15D:
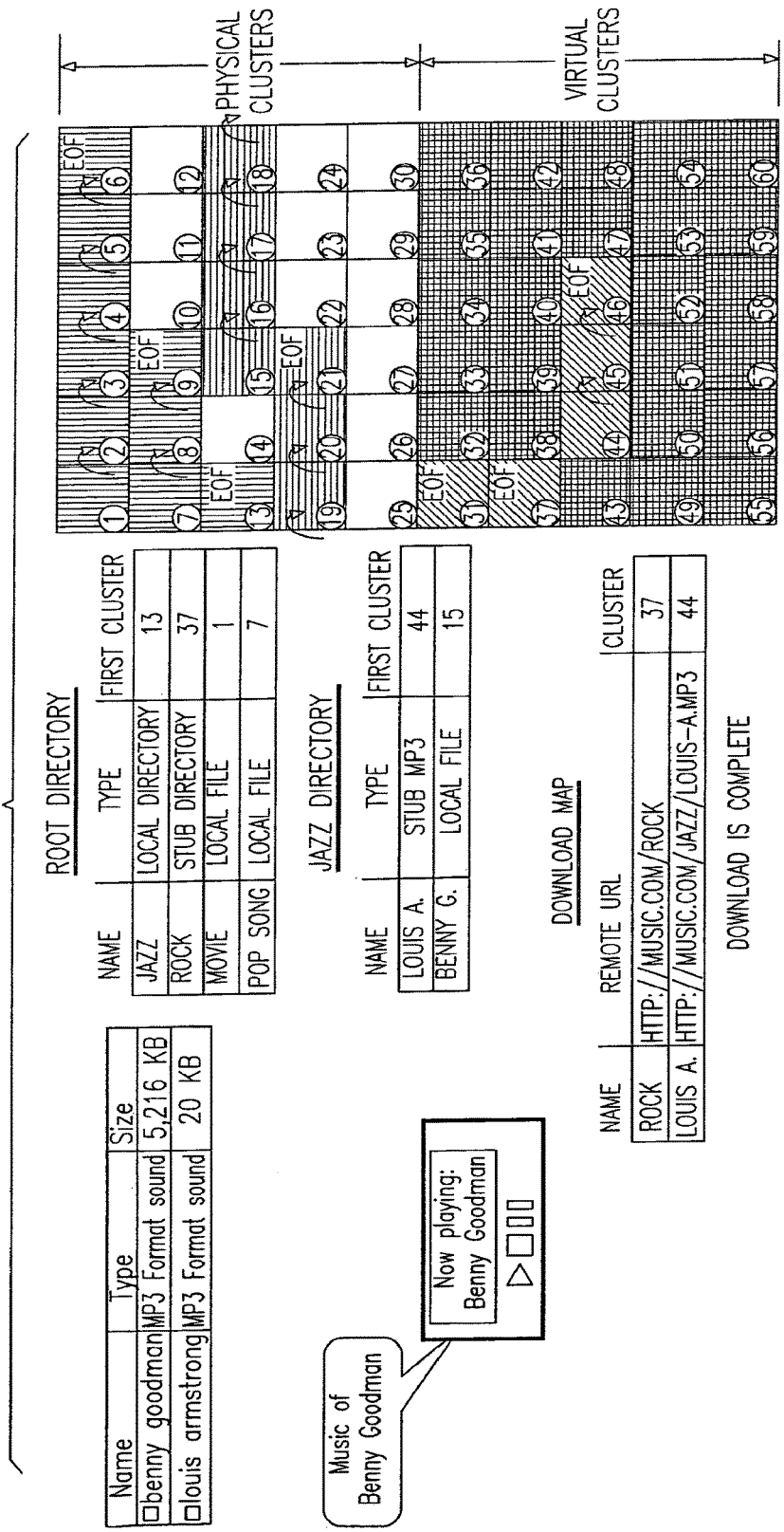

Referring to FIG. 15D, when enhanced function device 200 refreshes, the user interface displays the new file, and the user listens to the real Benny Goodman song. The downloaded file is now stored in clusters 15-21, and cluster 21 is marked with an EOF. The downloaded file now appears as a local file in the "jazz" directory, and its entry is removed from the download map.

Reference is now made to FIG. 17, which is a simplified flowchart of a method for playing a streamed file from wireless communicator 100 in accordance with an embodiment of the present invention. At step 1410, enhanced function device 200 accesses a media stub. At step 1410 the stream data associated with the media stub begins downloading, and is dynamically stored in physical file clusters as it arrives, such as file clusters 7-9 in FIG. 13. SD application 208 waits until sufficient data arrives to play a few seconds' worth of the media. Then, at step 1430, SD application 208 links the downloaded file to the FAT. The file size is reported as being extremely long. At step 1440, SD application 208 continues to write new clusters of data, as the stream if downloaded for several more seconds. At step 1450, the FAT cluster link becomes circular, and SD application 208 loops back to the first stored cluster for the file.

Figure 18:
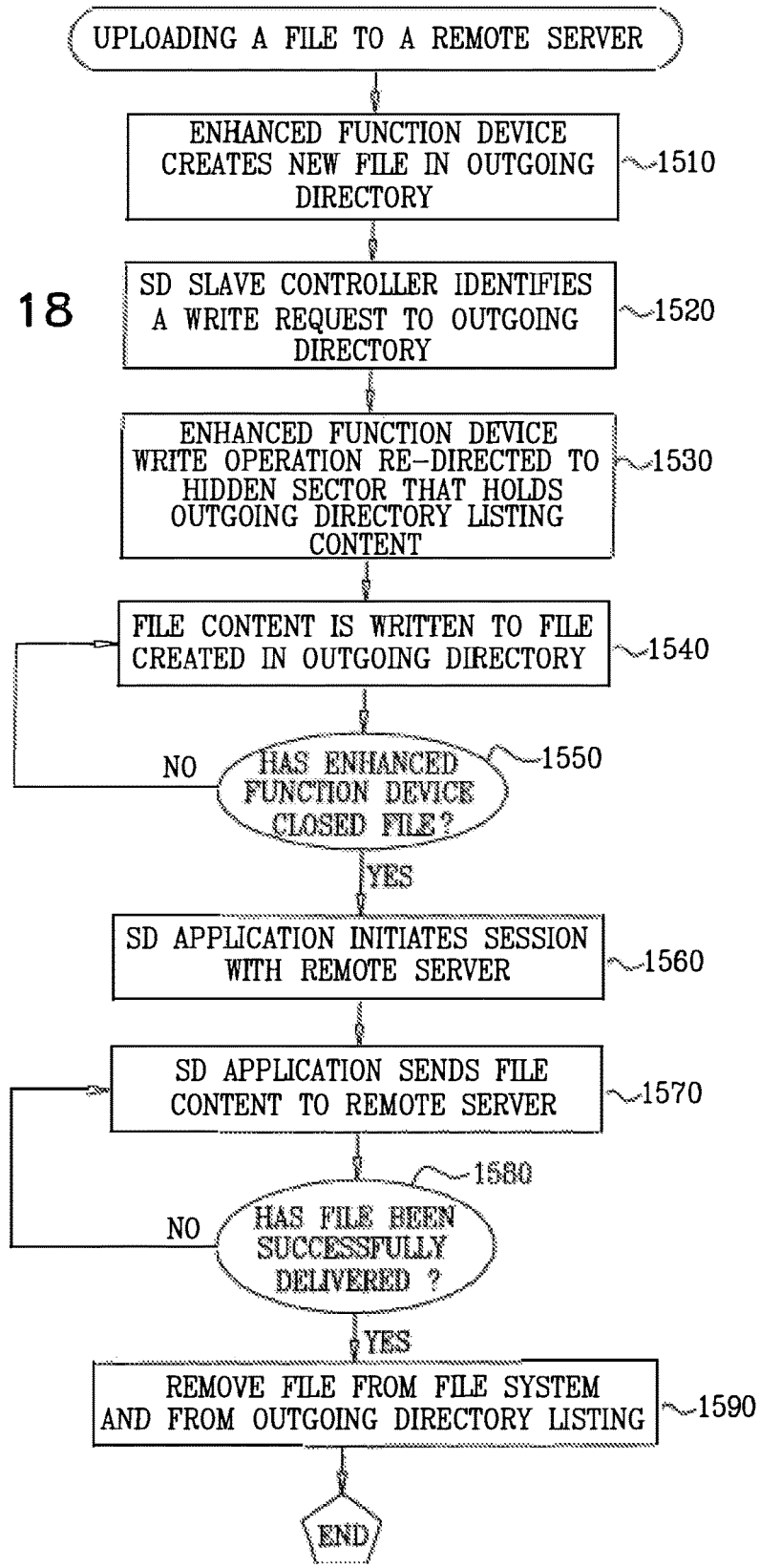
FIG. 18 is an illustration of file streaming using a circular cluster cycle in the FAT in accordance with an embodiment of the present invention.

In this regard, reference is now made to FIG. 18, which is an illustration of file streaming using a circular cluster cycle in the FAT in accordance with an embodiment of the present invention. The cross-hatched clusters in FIG. 18 correspond to the FAT legend provided in FIG. 10.

Referring back to FIG. 17, at step 1460 a determination is made whether or not the user has stopped listening to the stream. Such a determination may be made by SD application 208, by identifying a lack of access by enhanced function device 200 to the file clusters. If the user has not stopped listening to the stream, then processing returns to step 1440 as more data is streamed. Otherwise, if the user has stopped listening to the stream then, at step 1470, enhanced application 208 updates the FAT to point to a stub in the virtual memory, and frees up all clusters that have been designated for the streamed file.

In addition to downloading of remote files to wireless communicator 100, application 208 may also upload files from wireless communicator 100 to a remote server, and store them in a designated directory. SD application 208 may create a directory named "uploads" under the root directory, when the file system of wireless communicator 100 is initialized. The "uploads" directory is generated as a directory list stub in the virtual storage area, and includes a single data cluster. The "uploads" directory is initially set as an empty directory.

Figure 19:
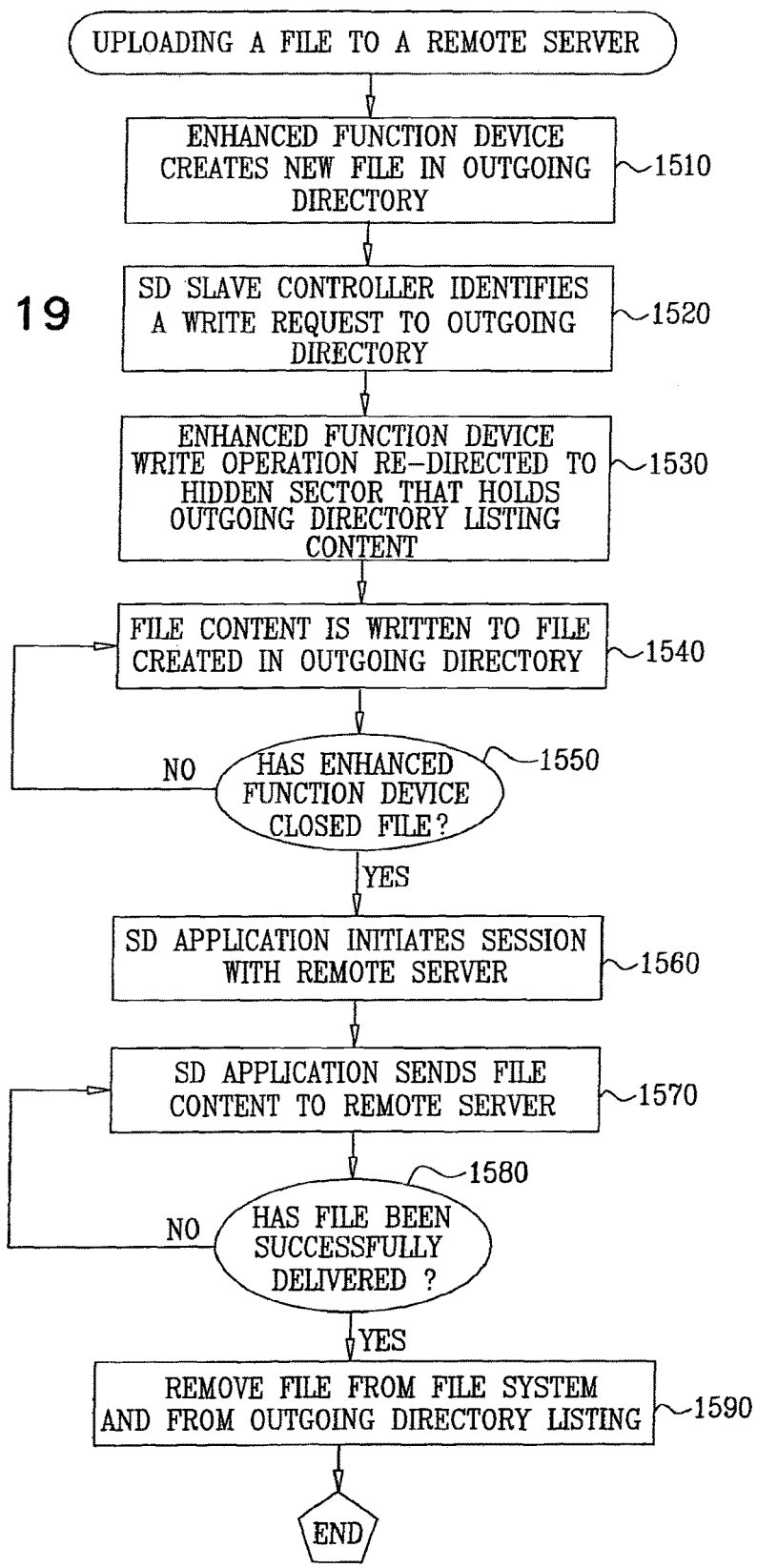
FIG. 19, which is a simplified flowchart of a method for uploading a file from the wireless communicator to a remote server in accordance with an embodiment of the present invention.
Figure 20B:
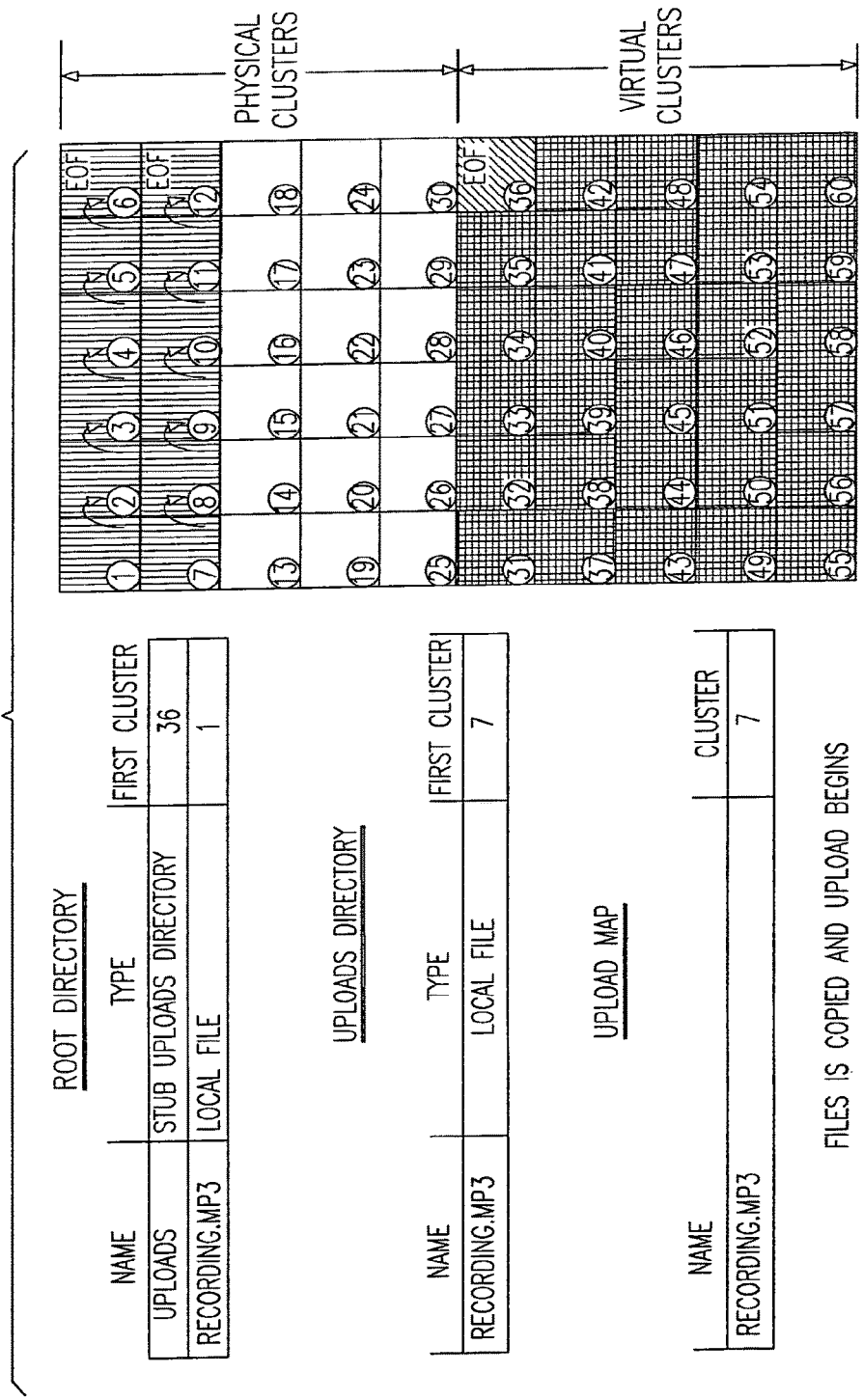

Reference is now made to FIG. 19, which is a simplified flowchart of a method for uploading a file from wireless communicator 100 to a remote server in accordance with an embodiment of the present invention. To supplement FIG. 19, reference is also made to FIGS. 20A and 20B, which are snapshots of a user interface and a file system for a simple example use case, during various stages of file upload during operation of the method of FIG. 19 in accordance with an embodiment of the present invention. FIG. 20A is divided into three portions. The leftmost portion illustrates a user interface, the middle portion illustrates directory entries and the upload map, and the rightmost portion illustrates the FAT. FIG. 20B is divided into two portions. The left portion illustrates directory entries and the upload map, and the right portion illustrates the FAT. Thus, whereas FIG. 19 describes the steps being performed, the accompanying FIGS. 20A and 20B illustrate states of the user interface and the file system during various ones of the steps. The legends for the cross-hatching on the FIGS. 20A and 20B are the same as the legend provided in FIG. 13. It will be appreciated by those skilled in the art that the file system illustrated in FIGS. 20A and 20B is simplified, in order to emphasize the workings of an embodiment of the present invention.

Referring to FIG. 19, in general at step 1510, when enhanced function device 200 is instructed to upload a file to a remote server, it creates a new file in a virtual directory named "uploads". At step 1520, SD slave controller 112 identifies a write request to the "uploads" directory. SD slave controller 112 may identify such request, since enhanced function device 200 issues the write request to a virtual cluster number. SD controller then sends an event to SD application 208.

At step 1530, the host's write request is re-directed to a hidden sector that holds the "uploads" directory listing content. SD application 208 recognizes that a new file is being created in the "uploads" directory, and it allows enhanced function device 200 to write the file content. At step 1540 the file content is written to the file created in the "uploads" directory. The file itself is treated as a regular file in the file system.

FIG. 20A corresponds to a stage where the upload directory listing is displayed in the user interface, and a user has selected a file name "recording.mp3" for upload. As shown in FIG. 20A, the root directory has an entry for a stub uploads directory located at virtual cluster 36. The root directory also has an entry for the music file "recording.mp3", which is stored at clusters 1-6.

FIG. 20B corresponds to a stage where the selected file is copied to the physical storage area, and the upload process begins. Referring to FIG. 20B, there is now an "uploads" directory with an entry for the file "recording.mp3" having first cluster 7.

At step 1550, SD application 208 determines whether or not enhanced function device 200 has finished writing the file and has closed the file. If not, processing returns to step 1540. If enhanced function device 200 has closed the file, then at step 1560 SD application 208 initiates a communication session with the remote server, and at step 1570 SD application 208 sends the file content to the remote server.

At step 1580, SD application 208 determines whether or not the file has been successfully delivered to the remote server. If not, processing returns to step 1570. If the file has been successfully delivered to the remote server, then at step 1590 the file is removed from the file system and from the outgoing directory listing.

3. Auto-Adaptation

Embodiments of the present invention provide methods and systems for maintaining a unified user interface look & feel when wireless communicator 100 is pouched with enhanced function device 200. Using the present invention, a user experiences the same-looking interface when he switches from the enhanced function device configuration screen to the wireless communicator configuration screen. Both screens have the same look & feel, and wireless communicator 100 appears transparent to the user and does not appear as a foreign device.

Using the present invention, wireless communicator 100 is aware of the specific enhanced function device 200 with which it is pouched, and adapts its screen graphics to parent user interface 270. As such, the same user interface displays both the enhanced function device and the wireless communicator configurations and a unified look & feel is maintained.

The present invention is of particular advantage with multi-source systems where many different types of wireless communicator 100 can be pouched with many different types of enhanced function devices 200. Methods of the present invention ensure that the user experiences a homogenous look & feel in each enhanced function device 200, when he navigates from the enhanced function device configuration screen to the wireless communicator configuration screen.

Embodiments of the present invention provide methods and systems for on-line configuration of controlled software, which flexibly support wireless communicator 100 pouched with one of multiple enhanced function devices 200 yet retain the same operational control over wireless communicator 100, and which adapt the look & feel so as to integrate the wireless communicator control software in the enhanced function device software environment in a homogeneous way. Enhanced function device 200 is used to configure the pouched system, and parent user interface 270 is maintained as a fixed point of reference for the user. Adaptation to the parent user interface 270 is carried out in wireless communicator 100.

The look & feel of a user interface relates to visual elements that a user experiences when he interacts with the interface. The look & feel includes inter alia:

screen size (pixel width and height);
font type, font size, font color and other visual font characteristics;
background color and background pattern (e.g., BMP or JPG image, or multiple images for animation);
menu type (e.g., scroll with items selected marked by highlight or zoom);
transitional entry effects (e.g., flip, zoom);
screen and button topology (e.g., location of specific buttons on the screen, such as the X button at the top-right corner of a window for closing the window);
menu topology (e.g., location of items in a specific menu); and
screen template (e.g., usage and position of general progress keys, such as Next, Back, Cancel and Enter).

In accordance with an embodiment of the present invention, look & feel parameters may be defined in an XML document. Such an XML document may, for example, take the form provided below.

| Sample XML document with look & feel parameters |
|---|
| <definitions> |
|   <screen> |
|     <size=800*600> |
|     <touch=yes> |
|     <layout=portrait> |
|     <color quality=32 bit> |
|     ... .. |
|   </screen> |
|   <background> |
|     <color = black> |
|     <pattern = none> |
|     ... .. |
|   </background> |
|   <fonts> |
|     <font1> |
|       <color=yellow> |
|       <size=16> |
|       <type=bold italic> |
|       ... ... |
|     </font1> |
|     <font2> |
|       <color=blue> |
|       <size=12> |

Sample XML document with look & feel parameters

```
        <type=regular>
        ... ...
        </font2>
        ...
    </fonts>
    ...
    <buttons>
        <button1>
            <location=bottom left>
            <icon="left_arrow.jpg">
        </button1>
        <button2>
            <location=bottom right>
            <icon="right_arrow.jpg">
        </button2>
    </buttons>
    ...
    </definitions>
```

Figure 21B:
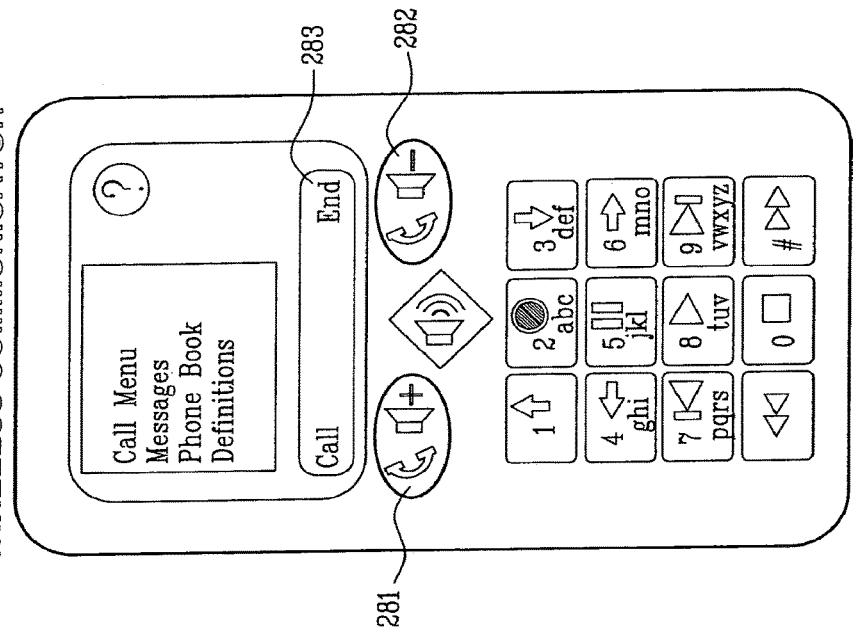
FIGS. 21A and 21B, are displays of configuration screens for the enhanced function device and the wireless communicator, pouched together, controlled so as to have the same look & feel, in accordance with an embodiment of the present invention.
Figure 21A:
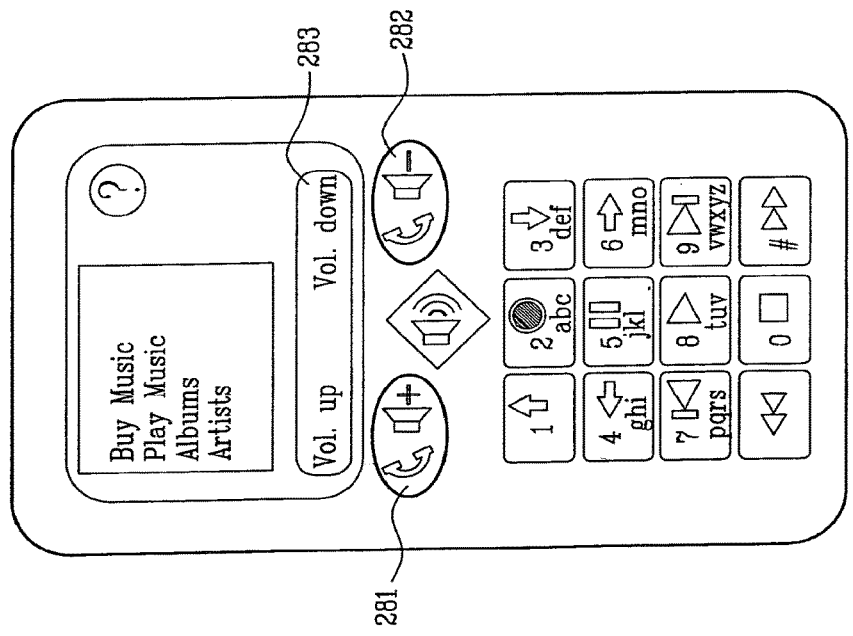

Reference is now made to FIGS. 21A and 21B, FIGS. 22A and 22B, and FIGS. 23A and 23B, which are displays of various configuration screens for enhanced function device 200 and wireless communicator 100, pouched together, wherein displays 185 and 285 are controlled so as to have the same look & feel, in accordance with an embodiment of the present invention. The enhanced function device shown in FIG. 21A is a media player, such as an MP3 player. Shown in FIG. 21A is a sample parent user interface 270. The screen shown in FIG. 21A corresponds to the enhanced function device configuration screen, before wireless communicator 100 is pouched to enhanced function device 200, and the screen shown in FIG. 21B corresponds to the enhanced function device configuration screen, after wireless communicator 100 is pouched to enhanced function device 200. It is noted that both configuration screens have the same look & feel. Specifically, when wireless communicator 100 is pouched to enhanced function device 200, the displayed font size, type and color remain the same, and the screen size and background color remain the same.

In addition, the screen template is preserved for two "soft-keys" 281 and 282 and a bar 283 above them that includes their corresponding function names. Soft keys are multi-function keys that use part of a display to identify their function at any moment. Soft-keys are generally located directly below the display. In FIG. 21A soft keys 281 and 282 correspond respectively to Vol. Up and Vol. Down functions, as indicated by bar 283; and in FIG. 20B soft keys 281 and 282 correspond respectively to Call and End functions, respectively, as indicated by bar 283.

The enhanced function device shown in FIG. 22A is a digital camera. Shown in FIG. 22A is a sample interface for enhanced function device 200. Again, in accordance with the present invention, the look & feel of FIG. 22B, namely, the wireless communicator configuration, is the same as that of FIG. 22A, namely, the enhanced function device configuration. As may be seen in FIGS. 22A and 22B, the look & feel of the configuration interface includes a left panel 286 and a right panel 287. The left panel 286 is created by enhanced function device 200. When wireless communicator 100 is pouched to enhanced function device 200, the left panel may be altered by enhanced function device 200. Thus in FIG. 22B the left panel includes a new control element 288 in the shape of a star, for toggling between parent functionality mode and native functionality mode.

Right panel 287 is controlled by enhanced function device 200 when the parent functionality mode is running, and controlled by wireless communicator 100 when the native functionality mode is running. In either case, the content displayed in the right panel conforms to the look & feel parameters for the host. The "look parameters" of right panel 287, including inter alia the dimensions of right panel 287, its background color, its font type, size and color, and its menu header and location, are the same in FIGS. 22A and 22B. Similarly, the "feel" parameters of right panel 287, including inter alia assignment of client options 1, 2 and 3 to corresponding host buttons and the jog dial options, are also the same in FIGS. 22A and 22B.

The enhanced function device shown in FIG. 23A is a GPS navigator. Shown in FIG. 23A is a sample interface for enhanced function device 200. Again, in accordance with the present invention, the look & feel of FIG. 23B, namely the native wireless communication configuration, is the same as that of FIG. 23A, namely the parent functionality configuration. It is noted, for example, that the "X" remains in the top right corner when wireless communicator 100 is pouched with enhanced function device 200.

Figure 24:
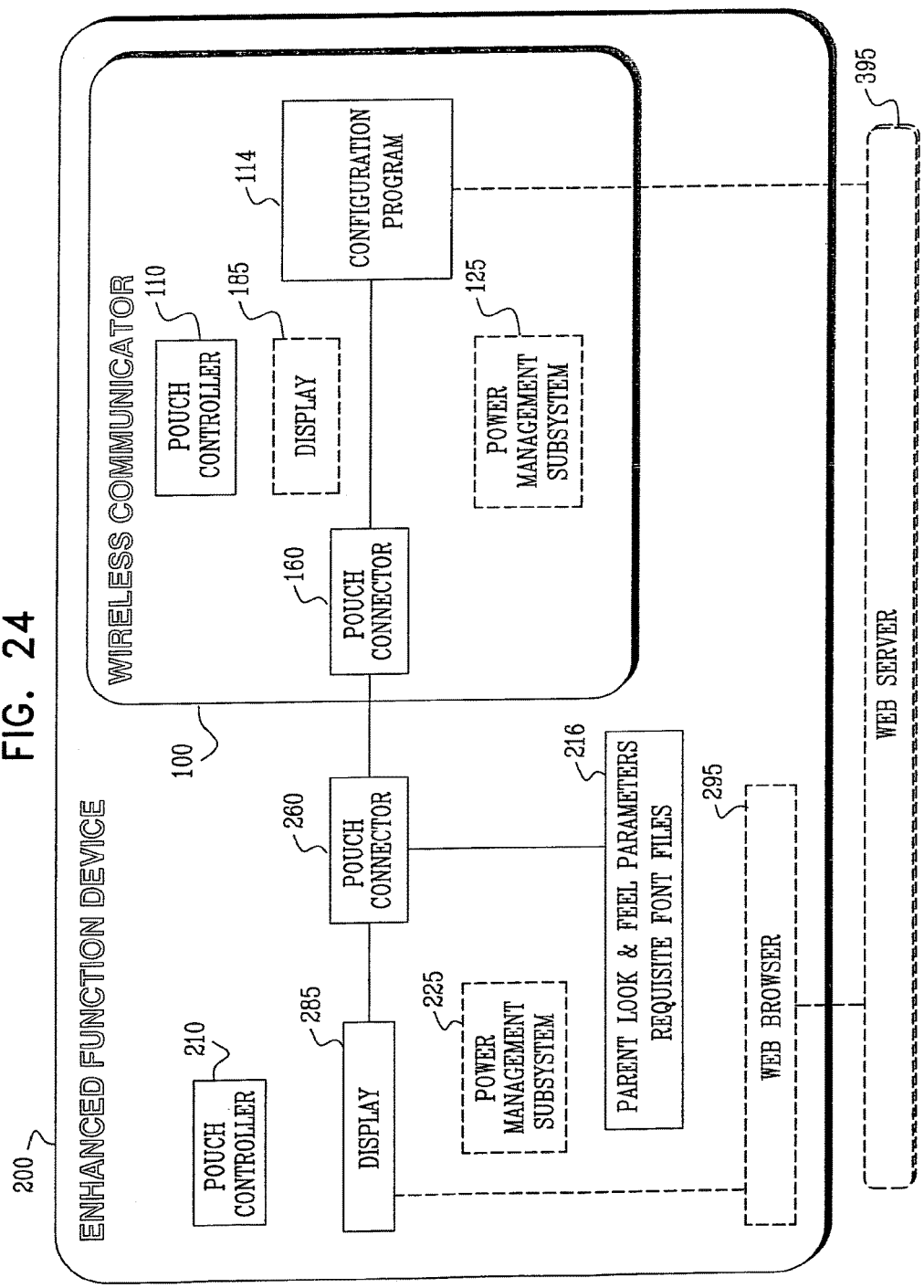
FIG. 24 is a simplified block diagram of a system with a uniform interface for configuring the wireless communicator and the enhanced function device in accordance with an embodiment of the present invention.

More generally, reference is now made to FIG. 24, which is a simplified block diagram of a system with a uniform interface for configuring wireless communicator 100 and enhanced function device 200 in accordance with an embodiment of the present invention. Shown in FIG. 24 is enhanced function device 200, with its pouching controller 210, its display 285 and its optional power management subsystem 225. Enhanced function device 200 has its own look & feel parameters 216 stored therein. In accordance with an embodiment of the present invention, requisite font files are also stored with look & feel parameters 216.

Also shown in FIG. 24 is wireless communicator 100, with its pouching controller 110, its optional display 185 and its power management subsystem 125. Wireless communicator 100 also includes a configuration program 114, which enables a user to select configuration settings for wireless communicator 100.

Enhanced function device 200 and wireless communicator 100 communicate via respective pouch connectors 260 and 160 over a communication channel. The communication channel may be a physical or a wireless channel. Parent look & feel parameters 216 are transmitted by pouch connector 260 over the communication channel, and received by pouch connector 160. In turn, the parent look & feel parameters are transmitted to configuration program 114, the transmission being controlled by corresponding pouching controllers 110 and 120.

Configuration program 114 has a native look & feel. In accordance with an embodiment of the present invention, configuration program 114 adapts its look & feel accordingly, so as to conform to parent look & feel parameters 216 of enhanced function device 200. Configuration program 114 generates a graphics screen image that conforms to parent look & feel parameters 216. The graphics screen image is transmitted to pouch connector 160, and is further transmitted to pouch connector 260 over the communication channel. The graphics image is then transmitted to display 285, for display to a user.

As the user interacts with the displayed graphics image and issues successive commands, the commands are transmitted via the communication channel back to configuration program 114, which generates successive graphics screen images in response to the user commands. The successive graphics screen images, based again on parent look & feel parameters 216, are transmitted to display 285 for further display to the user.

Pouching controllers 110 and 210 control transmission of the commands from enhanced function device 200 to wireless communicator 100, and transmission of the graphics screen images from wireless communicator 100 to enhanced function device 200.

Figure 25A:
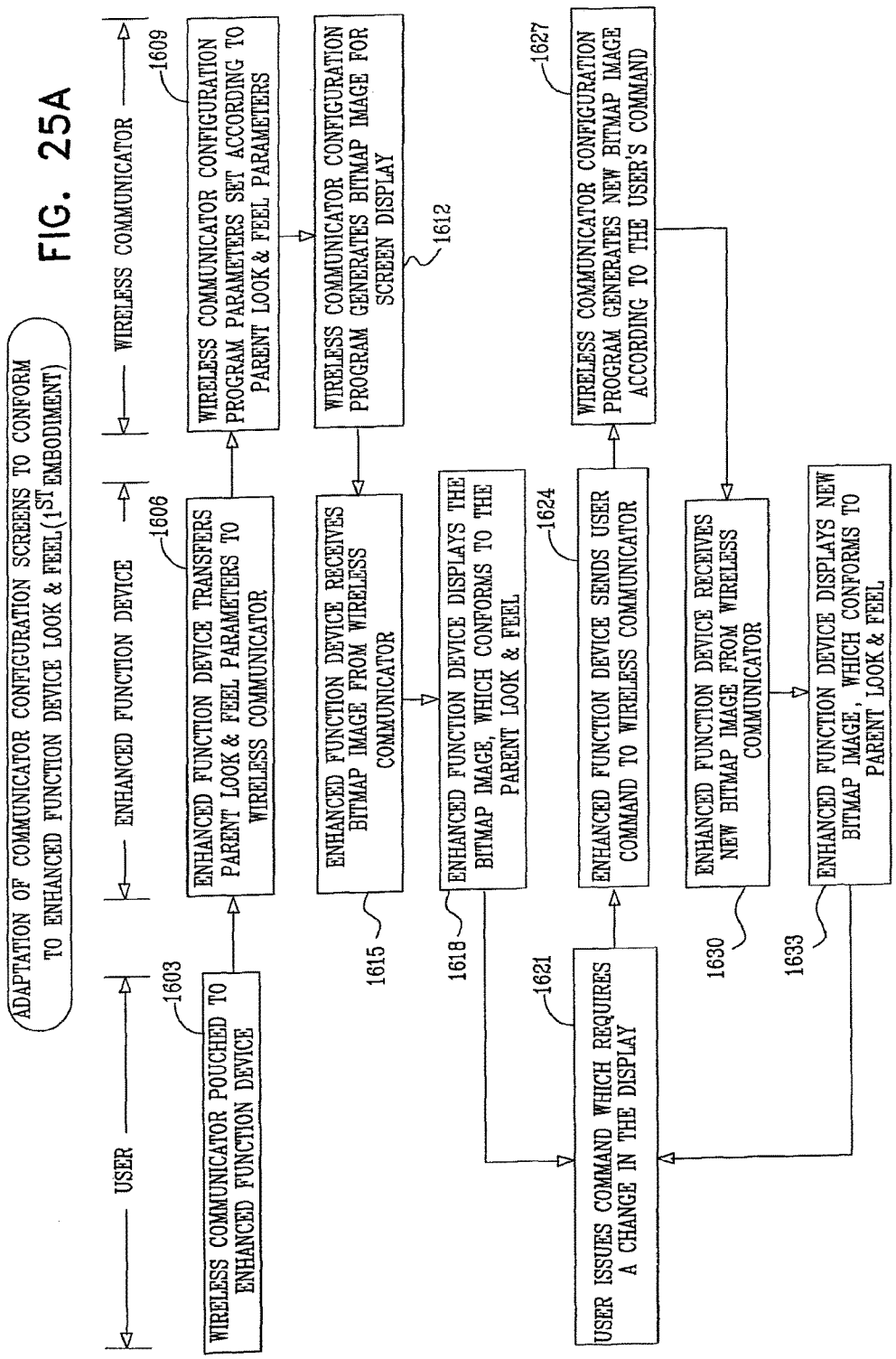
FIG. 25A is a simplified flowchart of a first embodiment of a method for controlling a configuration interface for the wireless communicator so as to conform to the look & feel of the parent user interface; in accordance with an embodiment of the present invention.

Reference is now made to FIG. 25A, which is a simplified flowchart of a first embodiment of a method for controlling a configuration interface for wireless communicator 100 so as to conform to the look & feel of parent user interface 270 in accordance with an embodiment of the present invention. The flowchart of FIG. 25A is divided into three columns. The leftmost column indicates steps performed by a user who is operating a multi-source system including enhanced function device 200 and wireless communicator 100. The middle column indicates steps performed by enhanced function device 200, and the rightmost column indicates steps performed by wireless communicator 100.

At step 1603 wireless communicator 100 is pouched to enhanced function device 200. At step 1606 enhanced function device 200 transfers the look & feel parameters for parent user interface 270, to the client. As described hereinabove, the parent look & feel parameters may be specified in an XML document. Enhanced function device 200 may also transfer requisite font files, for fonts specified in the look & feel parameters.

At step 1609 wireless communicator 100 adapts the look & feel of its configuration program according to the parent look & feel parameters. At step 1612 the wireless communicator configuration program generates a configuration screen, in the form of a bitmap image, which conforms to the look & feel of parent user interface 270.

At step 1615 enhanced function device 200 receives the bitmap image of the configuration screen from wireless communicator 100, and at step 1618 enhanced function device 200 displays the bitmap image, which conforms to the parent look & feel. As such, the user interface displayed by enhanced function device 200 preserves a unified look & feel, even when being used to configure wireless communicator 100.

It may thus be appreciated that enhanced function device 200 displays its own configuration options and wireless communicator 100 configuration options on the same screen, and with a common look & feel. Enhanced function device 200 may display both configurations at the same time, or may switch between the parent options and the native options, but in each case the same visual user interface is presented to the user.

At step 1621 the user interacts with the system and issues a command, the response to which may require a change in the display screen. At step 1624 enhanced function device 200 sends to wireless communicator 100 a notification of the user command. At step 1627 the wireless communicator configuration program generates a new bitmap image for a configuration screen, in response to the user command, as appropriate. At step 1630 enhanced function device 200 receives the new configuration screen, in the form of the new bitmap image, from wireless communicator 100. Finally, at step 1633 enhanced function device 200 displays the altered screen, which again conforms to the look & feel of the parent. The method then returns to step 1621, as the user continues to interact with the system.

Reference is now made to FIG. 25B, which is a simplified flowchart of a second embodiment of a method for controlling a configuration interface for wireless communicator 100 so as to conform to the look & feel of parent user interface 270, in accordance with an embodiment of the present invention. The flowchart of FIG. 25B is divided into three columns. The leftmost column indicates steps performed by a user who is operating a multi-source system including wireless communicator 100 and enhanced function device 200. The middle column indicates steps performed by enhanced function device 200, and the rightmost column indicates steps performed by wireless communicator 100. The method of FIG. 25B uses a web interface for a user to configure wireless communicator 100.

At step 1636 wireless communicator 100 is pouched to enhanced function device 200. At step 1639 enhanced function device 200 transfers the look & feel parameters for parent user interface 270 to wireless communicator 100. Enhanced function device 200 may also transfer requisite font files, for fonts specified in the parent look & feel parameters. At step 1642 the wireless communicator configuration program sets it parameters according to the parent look & feel parameters.

At step 1645 the wireless communicator configuration program generates a web page, which conforms to the parent look & feel parameters. At step 1648 wireless communicator 100 uploads the web page to a URL on a web server. At step 1651 enhanced function device 200, using a web browser installed therein, browses the URL and renders and displays the web page.

Referring back to FIG. 24, in this second embodiment enhanced function device 200 includes a web browser 295, which browses and renders web pages stored in a web server 395. The web pages are generated by configuration program 114 so as to comply with parent look & feel parameters 216, and are uploaded to web server 395.

Proceeding now with FIG. 25B, at step 1654 a user who is viewing the web page displayed at step 1651 issues a user command. At step 1657 enhanced function device 200 sends the user command to wireless communicator 100. At step 1660 the wireless communicator configuration program generates a new web page, in response to the user command, as appropriate. At step 1663 wireless communicator 100 uploads the web page to a URL on the web server. At step 1666 enhanced function device 200 browses the URL and renders and displays the new web page. The method then returns to step 1654, as the user continues to interact with the system.

Reference is now made to FIG. 25C, which is a simplified flowchart of a third embodiment of a method for controlling a configuration interface for wireless communicator 100 so as to conform to the look & feel of parent user interface 270, in accordance with an embodiment of the present invention. The flowchart of FIG. 25C is divided into three columns. The leftmost column indicates steps performed by a user who is operating a multi-source system including enhanced function device 200 and wireless communicator 100. The middle column indicates steps performed by enhanced function device 200, and the rightmost column indicates steps performed by wireless communicator 100.

At step 1669 wireless communicator 100 is pouched to enhanced function device 200. At step 1672 wireless communicator 100 transfers its configuration program to enhanced function device 200, thus enabling enhanced function device 200 to generate the appropriate user interfaces.

At step 1675 enhanced function device 200 sets parameters of the wireless communicator's configuration program corresponding to the look & feel parameters of parent user interface 270. At step 1678 enhanced function device 200 by itself generates a screen image for wireless communicator configuration, running the wireless communicator's configuration program. At step 1681 enhanced function device 200 displays the screen image.

At step 1684 a user who is viewing and interacting with the user interface issues a command. At step 1687 enhanced function device 200 generates a new screen image, in response to the user command, as appropriate, running the wireless communicator's configuration program. At step 1690 enhanced function device 200 displays the new screen image. The method then returns to step 1684, as the user continues to interact with the system.

It will thus be appreciated by those skilled in the art that the methods of FIGS. 25A, 25B and 25C enable wireless communicator 100 to display both parent configuration settings and native configuration settings on enhanced function device screen 285, simultaneously, with a uniform look & feel. As such, a user of the system experiences a homogeneous interface, and it is transparent to the user that two different standalone devices are operating.

Shown in TABLES IIA and IIB are example button key assignments for a host mode and a client mode, respectively, within a multi-source system. TABLES IIA and IIB correspond to FIGS. 21A and 21B, respectively, where the enhanced function device is an MP3 player running in media player mode. The buttons of the system are labeled B1-B15, together with a TOUCH button on the touch screen displayed with a question mark. The buttons have one assignment of functions in host mode and another assignment of functions in client mode. Button B8, for example, is assigned a play function in TABLE IA, and is assigned a function to enter the numeral "8" in TABLE IIB.

Figure 26:
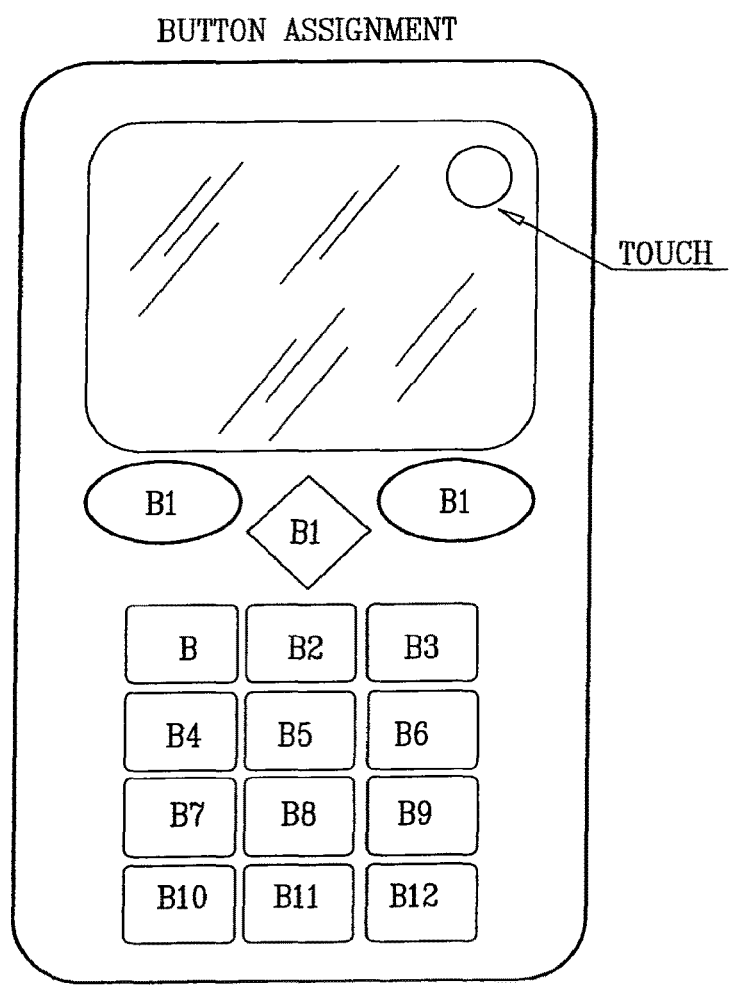
FIG. 26 is an illustration of button keys that have different key assignments for parent mode and native mode, but a common look & feel user interface for setting wireless communicator and enhanced function device configuration parameters in accordance with an embodiment of the present invention.

Reference is now made to FIG. 26, which is an illustration of button keys that have different key assignments for parent mode and native mode, but a common look & feel user interface for setting the wireless communicator and the enhanced function device configuration parameters in accordance with an embodiment of the present invention. As shown in FIG. 26, buttons B1-B12 correspond to the four rows of three buttons on the keypad, in the order from top left to bottom right. Buttons B13 and B14 correspond to the soft keys 281 and 282 in FIGS. 21A and 21B. Button B15 corresponds to a speaker button.

It is also noted that buttons B4, B6, B13 and B14 have dual functions, corresponding to a short duration press and a long duration press. Key-press and key-release events may be analyzed so as to distinguish between long duration and short duration presses.

When running in parent mode, the key assignments correspond to media player key assignments, as in TABLE IIA. However, when running in native mode, the key assignments correspond to conventional cell phone key assignments, as in TABLE IIB. It may be seen from TABLE IIA that in parent mode, buttons B5 and B15 are not used, and long button presses are not distinguished from short presses.

TABLE IIA

| Parent Key Assignments | | |
|---|---|---|
| Screen | Function | Assigned Key |
| Media Player Mode | Play | B8 |
| | Stop | B11 |
| | Next | B9 |
| | Prev | B7 |
| | FWD | B12 |
| | BKD | B10 |
| | Record | B2 |
| | Vol. Up | B13 |
| | Vol. Down | B14 |
| | Up | B1 |
| | Down | B3 |

TABLE IIA-continued

| Parent Key Assignments | | |
|---|---|---|
| Screen | Function | Assigned Key |
| | Right | B6 |
| | Left | B4 |
| | Help | TOUCH |

TABLE IIB

| Native Key Assignments | | |
|---|---|---|
| Screen | Function | Assigned Key |
| Dialer Mode | 0 | B11 |
| | 1 | B1 |
| | 2 | B2 |
| | 3 | B3 |
| | 4 | B4 |
| | 5 | B5 |
| | 6 | B6 |
| | 7 | B7 |
| | 8 | B8 |
| | 9 | B9 |
| | # | B12 |
| | * | B10 |
| | Left | LONG B4 |
| | Right | LONG B6 |
| | Call | B13 |
| | End | B14 |
| | Erase | LONG B14 |
| | Options | LONG B13 |
| | Speaker | B15 |
| | Help | TOUCH |

In accordance with the present invention, when wireless communicator 100 is not pouched to enhanced function device 200, or when wireless communicator 100 is pouched to enhanced function device 200 but the pouched system is running in parent mode, the parent key assignments, such as those indicated in TABLE IIA, are used. Switching between parent mode and native mode may be performed, for example, using a toggle switch such as control element 288 in FIG. 22B. When wireless communicator 100 is pouched to enhanced function device 200, wireless communicator 100 sends enhanced function device 200 a list of user functions it supports, such as the various functions indicated in TABLE IIB. Enhanced function device 200 then assigns the functions to buttons, and sends wireless communicator 100 the key assignments.

When wireless communicator 100 is pouched to enhanced function device 200 and the pouched system is running in native mode, the graphic image displayed on display 285, or a portion of the graphic image that is assigned to wireless communicator 100, is generated by wireless communicator 100 and transmitted to enhanced function device 200 for display. When the user presses a button, the button press event is sent to wireless communicator 100, and translated by wireless communicator 100 according to the key assignment for that button. If the user presses a touch screen, then the X-Y coordinates of the press location are sent to wireless communicator 100. In response, wireless communicator 100 generates a new graphic image, conforming to the parent look & feel parameters that wireless communicator 100 received from enhanced function device 200. The new graphic image is transmitted to enhanced function device 200 for display, thus completing a cycle of user input and screen display in response to the input. Generally, several such cycles are performed in an interactive session.

When the key assignments distinguish between short and long duration presses, as in TABLE IIB, enhanced function device 200 performs the analysis to make the distinction and passes the result (long press or short press) to wireless communicator 100. In an alternative embodiment, enhanced function device 200 may send the key-press and key-release events to wireless communicator 100, and wireless communicator 100 then determines the type of press (long or short) from these events.

4. Parent User Interface Package

Embodiments of the present invention concern a handset body that can be dressed with a variety of physical exteriors, visual presentation characteristics and audible presentation characteristics, according to a user's tastes. Each such dressing, referred to herein as a "parent user interface (UI) package", is a jacket housing to which wireless communicator 100 is pouched, and each such dressing provides a different all-around look & feel. The parent UI package may include inter alia the physical appearance of the handset, the visual presentation of the handset, and the audible presentation of the handset Generally, a parent UI package has a common theme. For example, a UI package may be themed to a celebrity, a TV show, or a soccer team. There may be a Barbie Doll UI package, a Harry Potter UI package, a Star Wars UI package, a Microsoft UI package, a Google UI package, etc. Thus a UI package for "The Simpson's" may include a yellow colored device with Simpson characters on the front and back, screen savers for Homer, Marge, Bart, Lisa and Maggie Simpson, and ring tones with the Simpson's theme song or other phrases or sounds related to the Simpson's.

The user interface package of the present invention uses storage 215, embodied as EEPROM, to store data describing the look & feel of a handset, and a mailbox for communicating with wireless communicator 100 when it is pouched with the parent UI package.

Figure 27A:
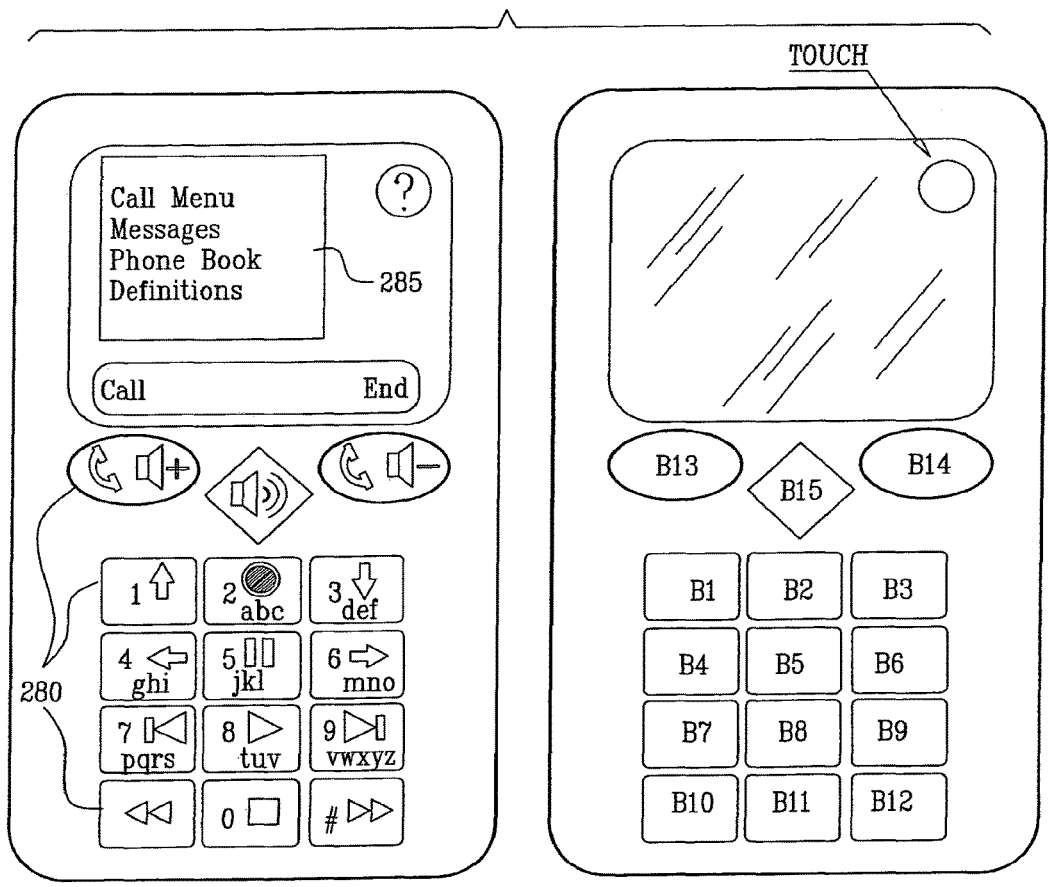
FIGS. 27A and 27B are illustrations of handset body dressed up in jackets with two different parent user interface packages in accordance with an embodiment of the present invention.
Figure 27B:
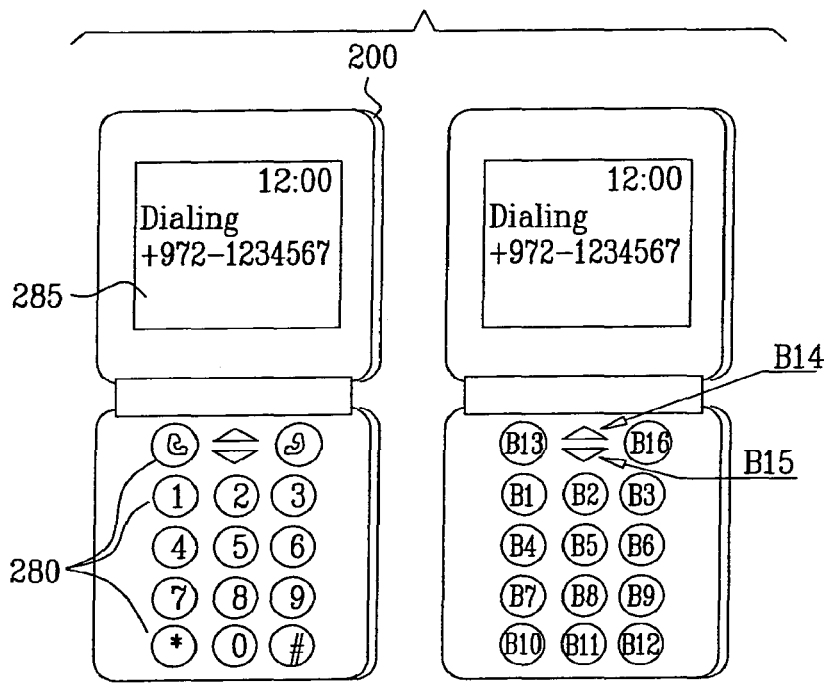

Reference is now made to FIGS. 27A and 27B, which are illustrations of handset body dressed up in jacket housings 200 with two different parent user interface packages in accordance with an embodiment of the present invention. Each housing 200 includes a decorative shell, a decorative display 285 and a decorative keypad 280. Each parent user interface package includes a keypad mapping with buttons assignments, as shown in FIGS. 27A and 27B.

As seen in FIGS. 27A and 27B, a parent UI package includes both physical and software-related look & feel characteristics. Physical look & feel characteristics relate to the exterior of a device, including inter alia its size, color, shape, weight, and interaction functionality such as keypad, touch screen, mouse and jog dial. Software-related look & feel characteristics include inter alia display properties such as screen resolution, background color or template, font properties, menu appearance and screen saver, and audible properties such as ring tones and dial tones.

In accordance with an embodiment of the present invention, pouching controller 210 is coupled to display 285 using a display interface having an 8-bit parallel bus, similar to an 8080 or a 6800 controller bus. Pouching controller 210 is coupled to input device 280 with a general purpose I/O interface that monitors state, or provides matrix scanning functionality, or both. Pouching controller 210 is connected to wireless communicator 100 via pouch connector 260.

EEPROM 215 stores information describing the parent UI package 200, including inter alia
- display resolution, bits per pixel, and word size;
- display specific initialization sequence and control;
- keypad matrix size;
- keypad mapping, such as the button assignments shown in FIGS. 27A and 27B that govern which key is mapped to which combination in the matrix;
- preferred screen saver image or images; and
- customization information for handset menu presentation.

In accordance with an embodiment of the present invention, pouching controller 210 implements a mailbox that is mapped to SD memory or SDIO memory, or to I/O space. Wireless communicator 100 and pouching controller 210 communicate via the mailbox. Pouching controller 210 notifies wireless communicator 100 that there are pending messages for wireless communicator 100 in the mailbox, by issuing an interrupt using either an SDIO defined in-band interrupt mechanism, or by using a dedicated line on the pouch connector, in addition to the SD bus signals. Examples of such messages are provided in TABLE III.

TABLE III

Messages between wireless communicator and parent UI package

| Message | Message Attributes |
|---|---|
| Write buffer to display | Command/Date - identifying if this the message is a command or data for display<br>Buffer length - size of buffer to write to display<br>Buffer content |
| Read key | Code of key pressed returned by controller |
| Read EEPROM request | Offset from start - offset in EEPROM memory space<br>Number of bytes to read |
| Read EEPROM response | Content of EEPROM request provided by controller |

It will be appreciated by those skilled in the art that the same wireless communicator 100 can be connected to various UI packages 200, as shown in FIGS. 27A and 27B, each of which presents a different look & feel experience for the user.

In reading the above description, persons skilled in the art will realize that the present invention applies to other consumer electronic devices, in addition to wireless communicator 100. Thus the present invention applies inter alia to producing theme-based packages, including decorative shells and user interfaces, for portable data assistants (FDA's), portable media players, digital cameras, camcorders and portable game stations. For each type of consumer electronic device, the parent UI package includes a decorative shell, a decorative display for output, a decorative keypad or other such device for input, EEPROM, a controller, and a connector for pouching a modular device. In addition, the controller includes a mailbox for communicating via messages between the controller and the modular device.

5. Bi-Directional Power Control

Embodiments of the present invention relate to power management and control between wireless communicator 100 and enhanced function device 200. Using special circuitry, each device 100 and 200 is able to turn the other device on and off, by generating wakeup events at one device to power the other device on or off, over a single connection line. A circuit with a single connection line between wireless communicator 100 and enhanced function device 200 enables wireless communicator 100 to turn enhanced function device 200 on and off, and enhanced function device 200 to turn wireless communicator 100 on and off. The circuit uses the single connection line for wireless communicator 100 to generate wakeup events to power enhanced function device 200 on or off, and for enhanced function device 200 to generate wakeup events to power wireless communicator 100 on or off. A wakeup event is either a button press and release, or a switch being closed and released thereby changing its logical level from 1 to 0 and back to 1.

Figure 28:
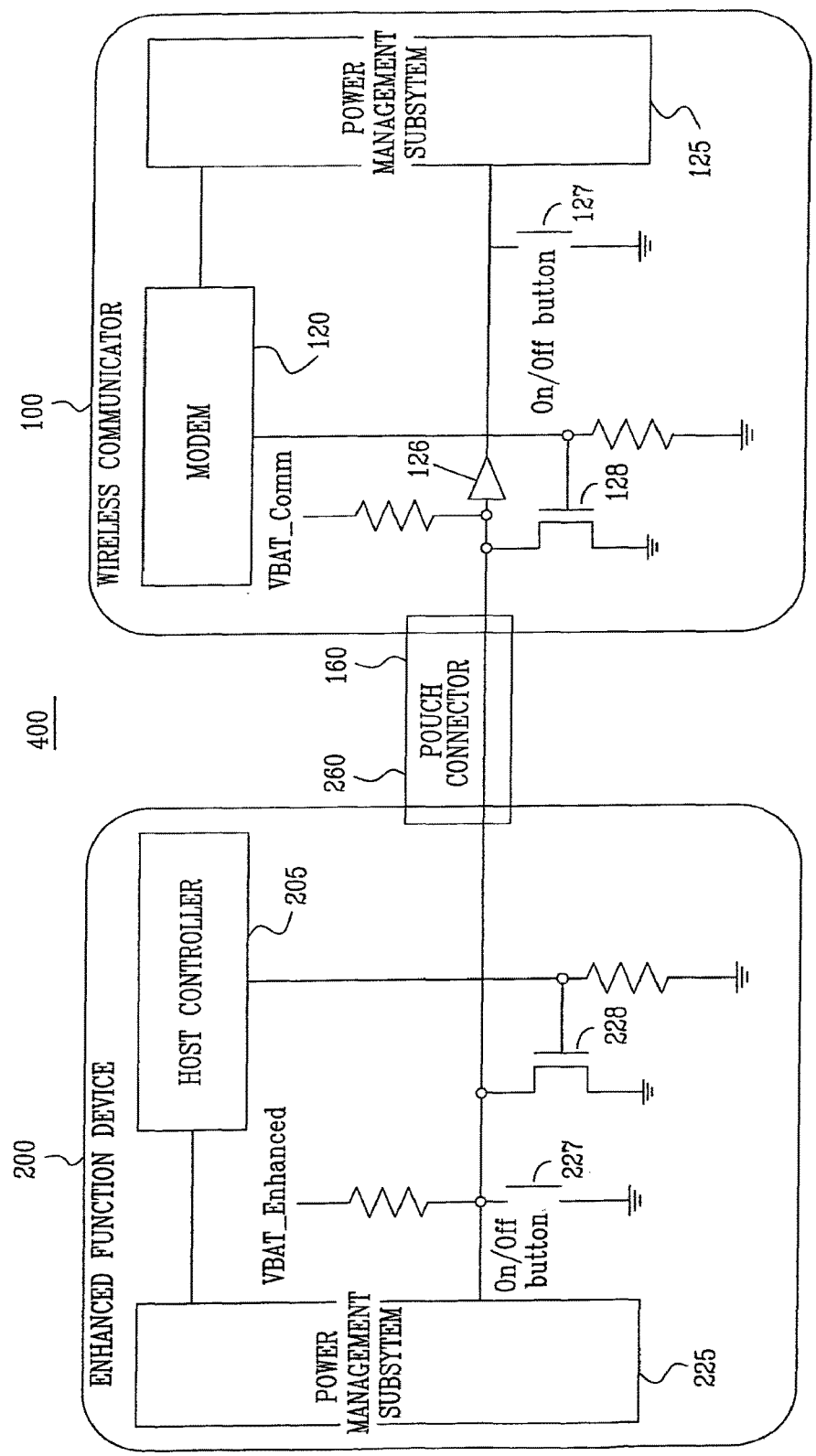
FIG. 28 is a simplified diagram of a circuit that provides bi-directional power control, in accordance with an embodiment of the present invention.

Reference is now made to FIG. 28, which is a simplified diagram of a circuit 400 that provides bi-directional power control in accordance with an embodiment of the present invention. Shown in FIG. 28 is wireless communicator 100 pouched to enhanced function device 200 via pouch connectors 160 and 260. Also shown in FIG. 28 is wireless communicator modem 120.

Wireless communicator 100 and enhanced function device 200 are battery-operated devices, and have their own batteries for power. Power sources for wireless communicator 100 and enhanced function device 200 are designated by VBAT_Comm and VBAT_Enhanced, respectively, in circuit 400. Typical voltage ranges for the batteries are 4.2V for a fully charged battery, to 3.2V for a low battery. Circuit 400 uses an optional voltage level shifter 126 to control the potential voltage gap between power sources VBAT_Comm and VBAT_Enhanced. One of the device batteries may be full charged at 4.2V, for example, and the other may be at the low range of 3.2V.

Voltage level shifter 126 is powered from VBAT_Comm, and its output level is based on VBAT_Comm. Specifically, logical bit 1 corresponds to an output of VBAT_Comm, and logical bit 0 corresponds to an output level of zero voltage. Voltage level shifter 126 also manages I/O levels of wireless communicator 100, which may differ from the level VBAT_Comm.

Circuit 400 includes grounds to protect the I/O units of the two devices from exposure to a high supply voltage, and to protect the devices' power sources from being shorted to one another.

Wireless communicator 100 and enhanced function device 200 are assumed to have respective power management ICs 160 and 170 that power them on and off when wakeup events occur. Additionally, wireless communicator 100 and enhanced function device 200 are physically connected by a single line that enables each device to generate wakeup events to power the other device on and off.

Wireless communicator 100 and enhanced function device 200 are powered on and off independently; i.e., wireless communicator 100 is able to be turned on when enhanced function device 200 is turned on or off, and enhanced function device 200 is able to be turned on when wireless communicator 100 is turned on or off. Moreover, circuit 400 of FIG. 28 enables wireless communicator 100, when it is turned on, to turn enhanced function device 200 on and off and enables enhanced function device 200, when it is turned on, to turn wireless communicator 100 on and off.

According to an embodiment of the present invention, enhanced function device 200 includes an internal watchdog timer, which is used to turn on wireless communicator 100 after a predetermined period of time.

Circuit 100 includes two on/off buttons, 127 and 227, and two on/off switches, 128 and 229, which cause each of wireless communicator 100 and enhanced function device 200 to power the other on or off. Buttons 127 and 227 are physical buttons that can be activated by a user. Switches 128 and 228 are electronic switches that are inaccessible to the user. Instead, switches 128 and 228 are controlled by respective controllers 120 and 205.

Circuit 400 provides simultaneous and non-simultaneous power on/off control. Use of switch 128 to turn enhanced function device 200 on or off, does not affect regular operation of wireless communicator 100 and, vice versa, use of switch 228 to turn wireless communicator 100 on or off, does not affect regular operation of enhanced function device 200.

Specifically, when operating alone, wireless communicator 100 is turned on and off by button 127. When button 127 is pressed to turn on wireless communicator 100, a wakeup event is detected in its power management system 125. When wireless communicator is pouched to enhanced function device 200, button 127 is generally physically inaccessible, and wireless communicator 100 can only be turned on simultaneously with enhanced function device 200, via switch 128, button 227 or switch 228.

Similarly, when operating alone, enhanced function device is turned on and off by button 227. When button 227 is pressed to turn on enhanced function device 200, a wakeup event is detected in its power management system 225. When wireless communicator 100 is pouched to enhanced function device 200, enhanced function device 200 can be turned on asynchronously by button 227, and can also be turned on synchronously with wireless communicator 100, via switch 228.

If enhanced function device 200 is a jacket device, instead of a host device, wireless communicator 100 is turned on and off via switch 228 on enhanced function device 200, which generates a wakeup event for power management system 125.

Power off events are generally reported to modem 120 and enhanced function device host controller 205 before each respective device is turned off. In an embodiment of the present invention, when button 227 is used to turn off one or both of wireless communicator 100 and enhanced function device 200, button 227 must be pressed for a long press. The time duration of a press of button 227 is calculated in software, by host controller 205, generally via telemetries that host controller 205 receives from enhanced function device power management subsystem 225.

Similarly, when wireless communicator 100 is not pouched to enhanced function device 200, button 127 is accessible, and may be used to turn wireless communicator 100 on and off. The time duration of a press of button 127 is calculated in software, by modem 120, generally via telemetries that modem 120 receives from host power management subsystem 125.

According to an embodiment of the present invention, pouching controllers 110 and 210 are responsible for performing on/off events, instead of modem 120, power management system 225 and host controller 205.

TABLE IV summarizes an embodiment of simultaneous and non-simultaneous power on/off control enabled by button 227, and switches 127 and 227, when wireless communicator 100 is pouched to enhanced function device 200.

TABLE IV

Power on/off control when wireless communicator
100 is pouched to enhanced function device 200

| Before wakeup event | | | After wakeup event | |
|---|---|---|---|---|
| Enhanced device (200) State | Communicator (100) state | Wakeup event | Enhanced device (200) State | Communicator (100) state |
| Off | Off | Button 227 pushed | On | On |
| On | Off | Switch 228 activated | On | On |
|  |  | Button 227 pushed | Off | Off |
| Off | On | Button 227 pushed | On | On |
| On | On | Switch 228 activated | On | Off |
|  |  | Button 227 pushed | Off | Off |

TABLE IV indicates that when switch 228 is activated to turn off wireless communicator 100, enhanced function device 200 remains on. In such case enhanced function device 200 turns itself off in a different manner, as appropriate, not using switch 228.

Circuit 400 is designed with grounds to protect the I/O units of the two devices from exposure to a high supply voltage, and to protect the devices' power sources from being shorted to one another. Circuit 400 uses voltage level shifter 126 to manage the potential voltage gap between power sources of the two devices. One of the device batteries may be full charged at 4.2V, for example, and the other may be at the low range of 3.2V. Voltage level-shifter 126 also manages I/O levels of the devices, which may differ from the level of VBAT_Comm.

An advantage of circuit 400 is that it uses a single connection line between wireless communicator 100 and enhanced function device 200, for carrying wakeup signals.

In reading the above description, persons skilled in the art will realize that some power management systems have two input signals for waking up a device. In such case, the on/off button of a device may be connected to one of its power management inputs, with the other power management input being used for a remote wakeup signal coming from another device.

6. Bi-Directional Battery Charging

Embodiments of the present invention relate to battery supply and battery charging of wireless communicator 100 and enhanced function device 200. Each device 100 and 200 has its own rechargeable battery and internal battery charger, and the coupling enables the battery of one device to supply power to the other device, and to charge the other device's battery. Using the present invention, optimized logic for controlling power supply and battery charging of the pouched devices, provides extended operational time.

The optimized logic decides when to supply battery power from one battery to the other device, and when to charge one battery from the other, based on the voltages of the two batteries, and based on the operational modes of the two devices 100 and 200.

The present invention applies generically to a wide variety of electronic devices that use single or dual input battery chargers, voltage boosts, and USB chargers to power manage their electrical components.

Referring back to FIG. 6, power management subsystem 125 of wireless communicator 100 includes circuitry for a battery charger, shown as element 124 in FIGS. 28 and 30. Battery charger 124 includes a power management integrated circuit. In accordance with an embodiment of the present invention, battery charger 124 supports fixed current and fixed voltage operational modes, and is capable of measuring voltage and current. Battery charger 124 is controlled by modem 120.

Referring back to FIGS. 7A and 7B, power management subsystem 225 of enhanced function device 200 includes circuitry for a battery charger, shown as element 224 in FIGS. 28 and 30. In accordance with an embodiment of the present invention, battery charger 224 supports both a fixed voltage mode and a fixed current mode. Battery charger 224 independently controls internal current and voltage of enhanced function device 200.

Figure 29:
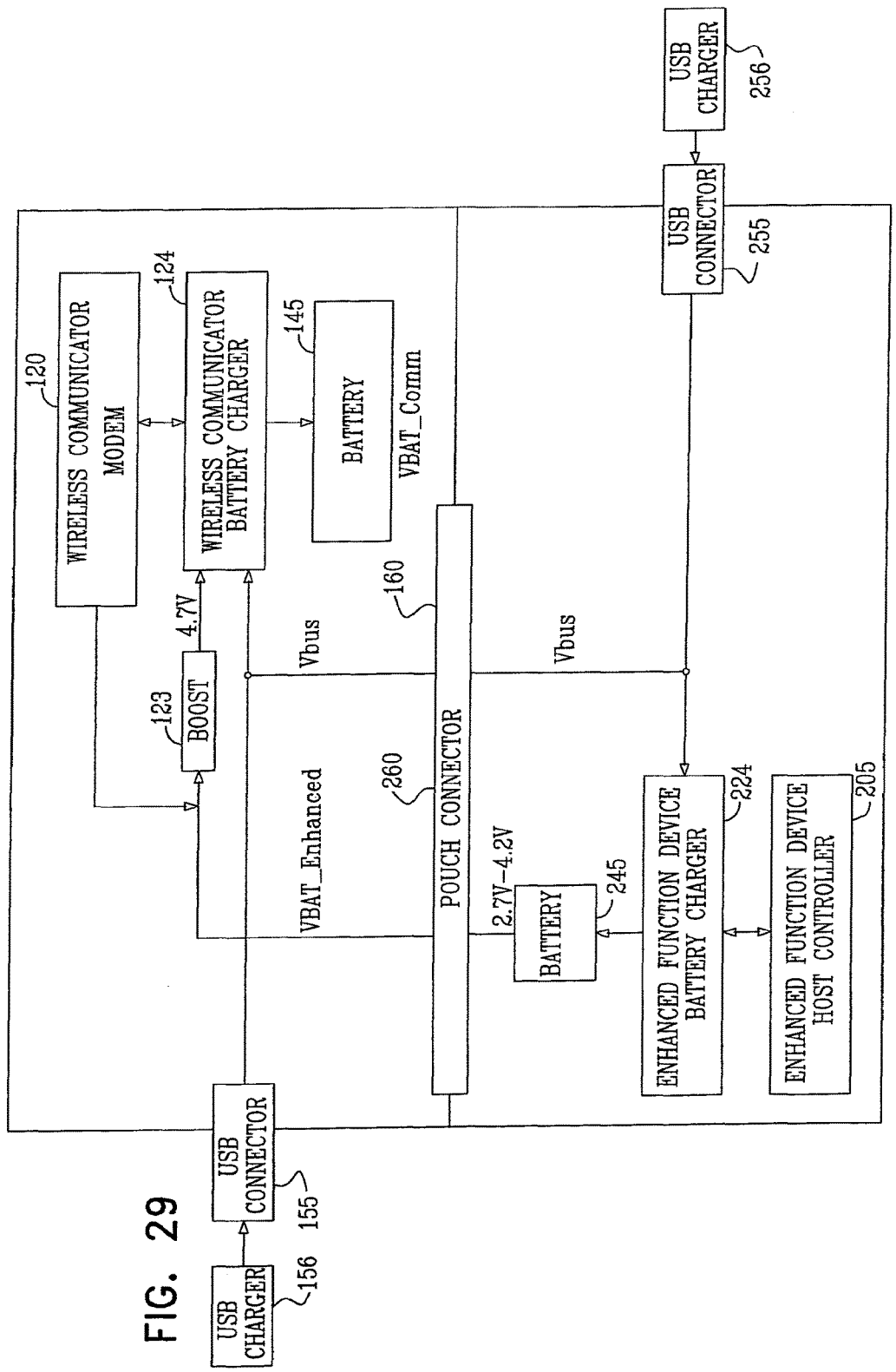
FIG. 29, which is a simplified block diagram of bi-directional battery charging for a simple enhanced function device in accordance with an embodiment of the present invention.

Reference is now made to FIG. 29, which is a simplified block diagram of bi-directional battery charging for a simple enhanced function device 200, in accordance with an embodiment of the present invention. Shown in FIG. 29 are modem 120, battery charger 124 and battery 145. Battery charger 124 is a dual input charger. A first input is connected to USB connector 155 for a USB charger 156, and a second input is connected to the output of a voltage boost 123.

Also shown in FIG. 29 are host controller 205, battery charger 224, and battery 245. Battery charger 224 is a single input charger, with its input connected to USB connector 255 for a USB charger 256.

Pouch connectors 160 and 260 provide signals paths between components of wireless communicator 100 and components of enhanced function device 200. Via pouch connectors 160 and 260, the input of USB charger 266, denoted by Vbus in FIG. 29, is routed to USB charger 166.

Modem 120 is able to track the voltage on battery 245, either by directly measuring a battery pin on pouch connector 160, or by receiving notifications from battery charger 224 via pouch connectors 160 and 260.

In an embodiment of the present invention modem 120 receives notifications from pouching controllers 110 and 210.

Voltage boost 123 receives a standard battery voltage as input and generates as output a minimal charging voltage of battery charger 124. Typical input to boost 123 is in the range 2.7V-4.2V, and typical output is 4.7V. When enabled, boost 123 up-converts its input voltage. When disabled, boost 123 simply passes its input voltage through to its output, minus any internal voltage drop. In an embodiment of the present invention, boost 123 is enabled by modem 120 via an enable signal. The input of boost 123 is connected to a pin of pouch connector 160, such that when wireless communicator 100 is pouched to enhanced function device 200, boost 123 has a direct connection to battery 245.

In an alternative embodiment of the present invention boost 123 is not used, and battery 245 is directly connected to battery charger 124 via pouch connector 160 while wireless communicator is pouched with enhanced function device 200.

The system of FIG. 29 applies advantageously to simple enhanced function devices 200, which have limited power consumption, lower than a threshold current, typically 500 mA. In such case, battery 145 supplies current to the electronic components of device 200 through pouch connector 160.

It will be appreciated by those skilled in the art that the bi-directional battery charging diagram in FIG. 29 applies to a general setting whereby a mobile device can be docked to an accessory device. The present invention may be used advantageously for bi-directional battery charging for general electronic devices that include controllers, rechargeable batteries, boosts and battery chargers as shown in FIG. 29.

Reference is now made to FIG. 30, which is a summary of bi-directional battery charging logic for the hardware of FIG. 29, in accordance with an embodiment of the present invention. In the notation of FIG. 30 wireless communicator 100 is referred to as a standalone (SA) device, and enhanced function device 200 is referred to as a jacket (JKT), into which wireless communicator 100 can be pouched.

FIG. 30 is divided into six columns. The first column refers to a state of the SA battery, and the second column refers to a state of the jacket battery. Referring to FIG. 30, the following notation is used in these two columns.

CC is the charging current for the SA battery. CC should conform to the maximal charging current authorization set by the JKT, and is typically between 200 mA-500 mA. For example, if the SA battery has a charge of 500 mAh, charging with a current greater than 500 mA may be harmful to the battery.

JKT is the voltage of the JKT battery.

SA is the voltage of the SA battery.

STBC is the average standby current of the SA device. STBC is typically between 5 mA-50 mA.

Vc is the voltage drop across the SA boost, the SA battery charger and the SA battery, when being charged with charge CC. Vc is typically approximately 0.3V and corresponds to 50%-100% of the SA battery capacity.

Vh is the maximal voltage to which the SA battery is charged when being charged from the JKT battery. Vh is typically between 3.7V-4V corresponding to approximately 50% capacity of the SA battery.

Vl is the minimal voltage for the SA battery, below which charging from the JKT is forced. Vl is typically between 3.4V-3.5V corresponding to approximately 10% capacity of the SA battery.

Vm is the minimal voltage for the JKT battery, below which charging from the SA device is forced. Vm is typically between 3.4V-3.5V corresponding to approximately 10% capacity of the JKT battery.

The third column in FIG. 30 refers to the mode in which the SA device is operating. There are three operational modes for the SA device, as follows:

I. High Current Consumption.

This mode occurs when the SA device is active and transmitting between the SA device and a base transceiver station (BTS). In this mode the SA has a typical current consumption greater than 100 mA, with peak currents possibly greater than 1A, depending on power requirement factors, such as the distance of the SA device from the BTS. Using the JKT battery to supply the SA device is undesirable in this mode, due to the high peak currents. Transfer of such high current over pouch connectors poses difficult requirements on the quality and current drive of the JKT battery, boost current and charger current, resulting in increased cost and size of the hardware. Charging in this mode is limited to fixed current, since fixed voltage charging draws peak currents from the JKT, which is undesirable.

II. Standby Current Consumption.

This mode occurs when the SA device is not communicating with the BTS. In this mode the SA device has a typical current consumption less than 100 mA, and no peak currents above 100 mA. Such current levels are suitable for supply from the JKT battery, and do not impose limitations on charging.

III. Shutdown.

In this mode the SA device is shutdown and has negligible current consumption.

The fourth column in FIG. 30 refers to the mode of charging the batteries. There are five charging modes, as follows:

I. No Charge.

The SA battery supplies all SA current. Efficiency is high, since no extra conversion is applied. The SA battery is being depleted during this mode.

II. Supply from JKT Battery.

In this mode, the JKT battery supplies current. Efficiency is lower than in the No Charge mode, due to voltage drop on the SA boost and SA charger, but in general this mode is efficient and preserves power of the SA battery for standalone operation of the SA device.

III. Supply from SA and JKT Battery.

In this mode, when there are peaks, the current is drawn from both the SA and the JKT battery. When there are not peaks, the current is drawn from the JKT battery alone. Current peaks are prevalent in many wireless communication systems, including inter alia Global System for Mobile Communication (GSM), General Packet Radio System (GPRS), Code Division Multiple-Access (CDMA), and Integrated Digital Enhanced Network (IDEN). For the GSM system, peaks occur due to time division multiplexing and are caused by time slots usage.

IV. Charge from JKT Battery.

In this mode the JKT battery charges the SA battery. This mode is inefficient, in some circumstances possibly less than 50% efficiency. If the SA boost is enabled, the efficiency is even lower, by approximately 10%. When the JKT battery is empty, charging from the JKT battery is disabled.

V. Charge from SA Battery.

In this mode the SA battery charges the JKT battery. This mode is inefficient, in some circumstances possibly less than 50% efficiency. If the JKT boost is enabled, the efficiency is even lower, by approximately 10%.

The fifth column in FIG. 30 refers to enablement of disablement of the SA boost. The sixth column in FIG. 0 refers to the SA charger.

The logic in FIG. 30 is implemented as programming logic for SA and JKT battery chargers and SA boost, to optimize their operation. The logic in FIG. 30 prescribes columns 4-6 (charging mode, SA boost enablement and SA charger) in terms of columns 1-3 (SA battery voltage, JKT battery voltage and SA operational mode). For example, referring to the first two rows in FIG. 30, if JKT>SA>Vh and if the SA device is in Standby Current Consumption mode, then the charging mode is set for the JKT battery to supply current to the SA device, the SA boost is disabled, and the SA charger is set to fixed voltage level. If instead the SA device is in High Current Consumption mode, then the charging mode is set for both the SA and JKT battery to supply current to the SA device, and the SA charger is set to fixed current level. The logic in FIG. 30 optimizes usage of the SA and JKT batteries, in order to provide extended operation time for SA device in combination with the JKT, and in standalone mode; and in order to facilitate charging the SA battery from JKT.

Figure 31:
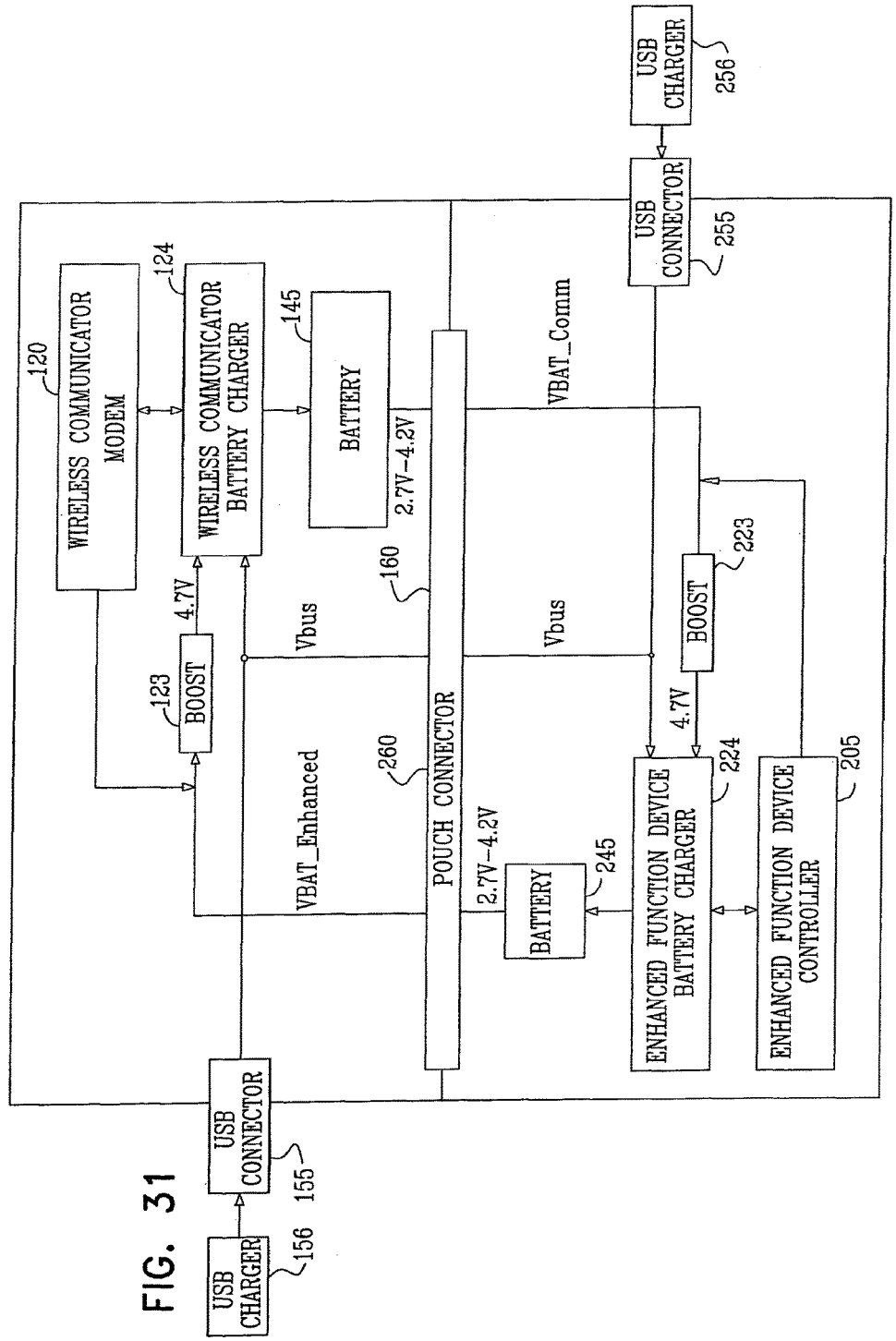
FIG. 31 is a simplified block diagram of bi-directional battery charging for a complex enhanced function device in accordance with an embodiment of the present invention.

Reference is now made to FIG. 31, which is a simplified block diagram of bi-directional battery charging for a complex enhanced function device 200, in accordance with an embodiment of the present invention. Shown in FIG. 30 are controller 105, battery charger 124 and battery 145. Battery charger 124 has a dual input. A first input is connected to USB connector 155 for a USB charger 156, and a second input is connected to the output of voltage boost 123.

Also shown in FIG. 31 are host controller 205, battery charger 224, and battery 245. Battery charger 224 has a dual input. A first input is connected to USB connector 255 for a USB charger 256, and a second input is connected to the output of a voltage boost 223. Battery charger 224 is a hardware-based charging controller that controls charging, including constant current charging and constant voltage charging, based on its input voltage levels and its output HST battery status.

Pouch connectors 160 and 260 provide signals paths between components of wireless communicator 100 and components of enhanced function device 200. Via pouch connectors 160 and 260, the input of USB charger 256, denoted by Vbus in FIG. 31, is routed to USB charger 156.

Modem 120 is able to track the voltage on battery 245, either by directly measuring a battery pin on pouch connector 160, or by receiving notifications from battery charger 224 via pouch connectors 160 and 260.

Voltage boosts 123 and 223 receive standard battery voltage as input and generate as output a minimal charging voltage of battery charger 124 and battery charger 224, respectively. Typical inputs to boosts 123 and 223 are in the range 2.7V-4.2V, and typical outputs are 4.7V.

When enabled, boosts 123 and 223 up-convert their input voltages. When disabled, boost 123 simply passes its input voltage through to its output, minus any internal voltage drops. When disabled, boost 223 blocks its input voltage from going out as output.

In an alternative embodiment of the present invention, controller 205 enables and disables battery charger 224, and boost 223 operates similarly to boost 123; namely, when disabled, boost 223 passes its input voltage through to its output, minus any internal voltage drops.

Boost 123 is enabled by modem 120 via an enable signal. The input of boost 123 is connected to a pin of pouch connecter 160, such that when wireless communicator 100 is pouched to enhanced function device 200, boost 123 has a direct connection to battery 245. Similarly, boost 223 is enabled by host controller 205 via an enable signal. The input of boost 223 is connected to a pin of pouch connector 260, such that when pouched to wireless communicator 100, boost 223 has a direct connection to battery 245.

In yet another alternate embodiment of the present invention, controller 205 enables and disables battery charger 224, and boost 223 is eliminated. Instead of enabling and disabling a voltage boost, controller 205 enables battery charger 224 when charging is desired, and disables battery charger 224 when charging is not desired.

The system of FIG. 31 applies advantageously to complex enhanced function devices 200, which have current consuming components above a threshold current, typically 500 mA. For such devices, it is impractical to supply their current from battery 145. Such current would require too much draw from battery 145, and would be too high for transfer over pouch connectors 160 and 260. Instead, battery 245 supplies current for the components of enhanced function device 200.

As mentioned above with reference to FIG. 29, it will be appreciated by those skilled in the art that the bi-directional battery charging diagram in FIG. 31 applies to a general setting whereby a mobile device can be docked to an accessory device. The present invention may be used advantageously for bi-directional battery charging for general electronic devices that include controllers, rechargeable batteries, boosts and battery chargers as shown in FIG. 31.

Reference is now made to FIG. 32, which is a summary of bi-directional battery charging logic for the hardware of FIG. 31, in accordance with an embodiment of the present invention. As with FIG. 30, in the notation of FIG. 32 wireless communicator 100 is referred to as a standalone (SA) device, and enhanced function device 200 is referred to as a host (HST) device, into which the SA device can be pouched. The notation indicated above for FIG. 30 applies to FIG. 32 as well, with HST being used for the docking device instead of JKT.

The logic in FIG. 32 is implemented as programming logic for SA and HST battery chargers to optimize their operation. FIG. 32 uses the same six columns as FIG. 30, with an additional column for indicating enablement/disablement of the HST charger and boost. The logic in FIG. 32 prescribes the settings in columns 4-7 (charging mode, SA boost enablement, SA charger, HST charger and boost) based on the states in columns 1-3 (SA battery voltage, HST battery voltage and SA operational mode). For example, referring to the first two rows in FIG. 32, if HST>SA>Vh and if the SA device is in Standby Current Consumption mode, then the charging mode is set for the HST battery to supply current to the SA device, the SA boost is disabled, the SA charger is set to fixed voltage level, and the HST charger and boost are disabled. If instead the SA device is in High Current Consumption mode, then the charging mode is set for both the SA and HST battery to supply current to the SA device, and the SA charger is set to fixed current level. The logic in FIG. 32 optimizes usage of the SA and HST batteries, in order to provide extended operation time for SA device in combination with the HST, and in standalone mode; and in order to facilitate charging the SA battery from the HST.

It will be appreciated by those skilled in the art that the distinction of JKT vs HST in the systems of FIGS. 29 and 31 and in the logic of FIGS. 30 and 32 is merely for the purpose of clarity of exposition. The system and logic of FIGS. 29 and 30 also apply to simple host devices 200, in addition to jackets 200; and the system and logic of FIGS. 31 and 32 also apply to complex jackets 200, in addition to host devices 200. In general, the system and logic of FIGS. 29 and 30 apply to devices (jackets or hosts) with limited power consumption; e.g., less than 500 mA; and the system and logic of FIGS. 31 and 32 apply to devices (jackets or hosts) with higher current consumption.

7. Audio and USB Multiplexing

Embodiments of the present invention relate to a switching device that routes analog audio signals and digital USB signals for wireless communicator 100 and enhanced function device 200. The switching device of the present invention includes circuitry that detects multiple audio/USB configurations. Regarding audio configurations, the switching device supports left and right audio signals for a headset, for stereo speakers and for an earpiece. Regarding USB, the switching device supports connection of a PC or a USB charger to wireless communicator 100 operating as a standalone device, and to wireless communicator 100 pouched with enhanced function device 200.

In accordance with an embodiment of the present invention, when wireless communicator 100 is pouched with enhanced function device 200, enhanced function device 200 provides data regarding its audio configuration to wireless communicator 100, the information including inter alia the presence of mono or stereo speakers, and their gains, and the presence of earpiece and microphone, and their gains. Wireless communicator 100 provides signals to enhanced function device 200 via pouch connector 160, the signals including inter alia headset L/R, D+/−, audio L/R and microphone (elements L, R, D+/L, D−/R and mic of FIG. 33A).

Considering wireless communicator 100 both as a standalone device, and as a device pouched to enhanced function device 200, twelve audio/USB configurations are identified, as summarized in TABLE V.

TABLE V

Audio/USB Configurations of Wireless Communicator and Enhanced Function Device

|  | State | Audio | USB |
| --- | --- | --- | --- |
| Standalone Wireless Communicator | S1 | no audio; | no USB connection |
| | S2 | audio via wireless communicator's speakers/earpiece | no USB connection |
| | S3 | audio via headset attached to wireless communicator | no USB connection |
| | S4 | no audio | charging via wireless communicator USB charger/PC |
| | S5 | audio via wireless communicator speaker | charging via wireless communicator USB charger/PC |
| Pouched Wireless Communicator | J1 | no audio | no USB connection |
| | J2 | audio via enhanced function device speaker | no USB connection |
| | J3 | audio via enhanced function device earpiece | no USB connection |
| | J4 | audio via headset attached to enhanced function device | no USB connection |
| | J5 | no audio | charging wireless communicator and enhanced function device via USB charger connected to e enhanced function device |
| | J6 | audio via jacket's speaker | charging wireless communicator and enhanced function device via USB charger connected to enhanced function device |

TABLE V-continued

Audio/USB Configurations of Wireless Communicator and Enhanced Function Device

| State | Audio | USB |
|---|---|---|
| J7 | audio via headset attached to jacket | charging wireless communicator and enhanced function device via USB charger connected to enhanced function device |

Figure 33A:
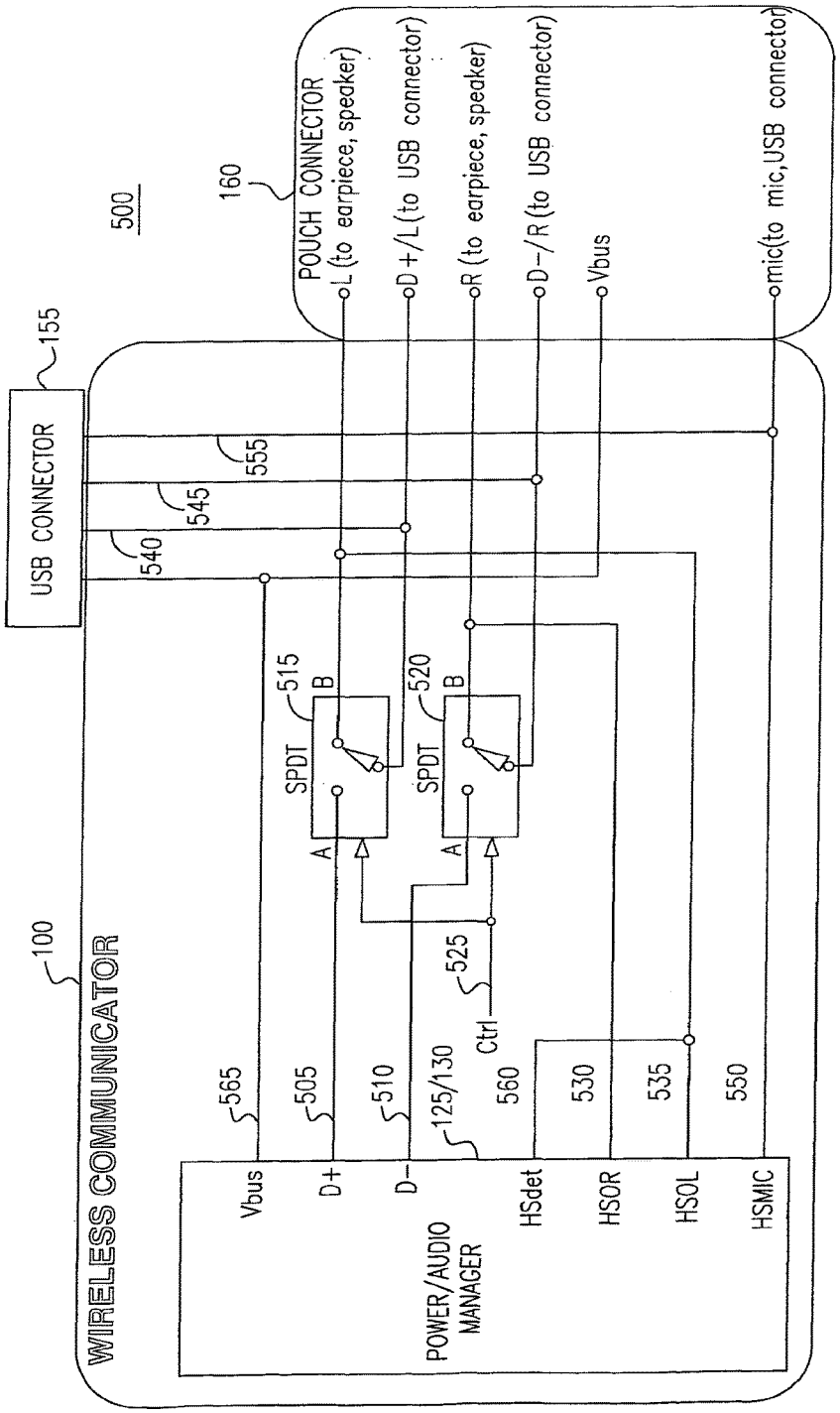

Reference is now made to FIGS. 33A and 33B, which are simplified diagrams of a switching circuit 500 that distinguishes between twelve audio/USB configurations of TABLE V, in accordance with an embodiment of the present invention. Specifically, the detection methods and control settings for supporting the twelve audio/USB configurations of TABLE V are summarized in TABLE VI.

TABLE VI

Control Settings and Detection Methods for Audio/USB Configurations

| Mode | Wireless Communicator Speaker/ Earpiece Amplifier | Wireless Communicator Headset Amplifier | USB/ Audio Switch | Enhanced Function Device Speaker Amplifier (SPK_EN) | Enhanced Function Device Earpiece Amplifier (EAR_EN) | Detection (Vbus/ Headset/ Enhanced Function Device) |
|---|---|---|---|---|---|---|
| S1 | Disabled | Disabled | Audio | NA | NA | No/No/No |
| S2 | Enabled | Disabled | Audio | NA | NA | No/No/No |
| S3 | Disabled | Enabled (G1) | Audio | NA | NA | No/Yes/No |
| S4 | Disabled | Disabled | USB | NA | NA | Yes/x/No |
| S5 | Enabled | Disabled | USB | NA | NA | Yes/x/No |
| J1 | Disabled | Disabled | Audio | Disabled | Disabled | No/No/Yes |
| J2 | Disabled | Enabled (G2) | Audio | Enabled | Disabled | No/No/Yes |
| J3 | Disabled | Enabled (G3) | Audio | Disabled | Enabled | No/No/Yes |
| J4 | Disabled | Enabled (G1) | Audio | Disabled | Disabled | No/Yes/Yes |
| J5 | Disabled | Disabled | USB | Disabled | Disabled | Yes/x/Yes |
| J6 | Disabled | Enabled (G2) | USB | Enabled | Disabled | Yes/x/Yes |
| J7 | Disabled | Enabled (G3) | USB | Disabled | Enabled | Yes/x/Yes |

The values G1, G2 and G3 in TABLE VI denote different gain levels. The headset amplifier is set to different gain levels, depending on the type of speakers it has to drive. Thus a different setting is generally required for headset connection, amplified jacket speakers and amplified jacket earpiece.

Circuit 500 includes the following elements shown in FIG. 33A:

respective D+ and D− signal lines 505 and 510 connecting to power/audio subsystems 125/130 of wireless communicator 100;

a first analog/digital switch 515 connected to D+ signal line 505, for multiplexing an input D+ signal to an output USB data signal or audio left signal, the multiplexed signal feeding into pouch connector 160;

a second analog/digital switch 520 connected to D− signal line 510, for multiplexing an input D− signal to an output USB data signal or audio right signal, the multiplexed signal also feeding into pouch connector 160;

a control signal line 525 for controlling the switching between audio and USB outputs at switches 515 and 520;

a headset left signal line 530 connected to power/audio subsystems 125/130 and to the output audio left signal of analog/digital switch 515;

a headset right signal line 535 connected to power/audio subsystems 125/130 and to the output audio right signal of second analog/digital switch 520;

a first USB signal line 540 connected to USB connector 155 and to the output USB data signal of analog/digital switch 515;

a second USB signal line 545 connected to USB connector 155 and to the output USB data signal of analog/digital switch 520;

a headset microphone signal line 550 connected to power/audio subsystems 125/130 and to pouch connector 160;

a third USB signal line 555 connected to USB connector 155 and to headset microphone signal line 550;

a headset detection line 560 for detecting connection of a headset to a headset port; and a USB detection line 565 connected to the power/audio subsystems 125/130 and to USB connector 155, for detecting a USB charger or a PC attached to USB connector 155.

Circuit 500 also includes an amplifier (not shown) for amplifying the output audio left signal and the output audio right signal at gain levels appropriate for (i) a headset jack 272 connected to enhanced function device 200, (ii) left and right speakers 275 and 276 connected to enhanced function device 200, and (iii) an earpiece 273 connected to enhanced function device 200.

Circuit 500 is designed so that the same detection mechanisms are used to detect direct connection of a charger to wireless communication device 100 or to enhanced function device 200, and to detect amplified enhanced function device speakers or amplified enhanced function device earpiece. Generally, when wireless communicator 100 is pouched with enhanced function device 200, access to the wireless communicator's charger and the wireless communicator's audio connector is physically blocked, being covered by enhanced function device 200.

According to an embodiment of the present invention, when wireless communicator 100 is engaged in a phone conversation, and wireless communicator 100 detects its being pouched with enhanced function device 200, wireless communicator 100 mutes its microphone 171 to avoid disturbing the other party in the phone conversation. Microphone 171 is muted until pouching of wireless communicator 100 with enhanced function device 200 is complete, and pouching connectors 160 and 260 are connected with one another, and wireless communicator is adapted to interoperate with enhanced function device 200.

8. SD Bridge Design

Embodiments of the present invention relate to a bi-directional data bus that connects a terminal A with a terminal B. The data bus may be an SD or MMC bridge, wherein terminal A is generally connected to enhanced function 200 device and terminal B is connected to wireless communicator 100. The bridge of the present invention is capable of determining signal direction without the need for external directional signals, and without the need for decoding exact content of messages being transmitted over the bridge.

In one embodiment, the present invention employs two data buffers, a first buffer that drives signals in a data bus in a direction from a terminal A to a terminal B, and a second buffer that drives signals in the opposite direction. The buffers may be in an enabled or disabled state. When a buffer is enabled, it drives the signal direction.

Special logic is introduced to determine when to enable and disable each of the buffers, based on logical processing of sampled bits at terminals A and B.

Figure 34:
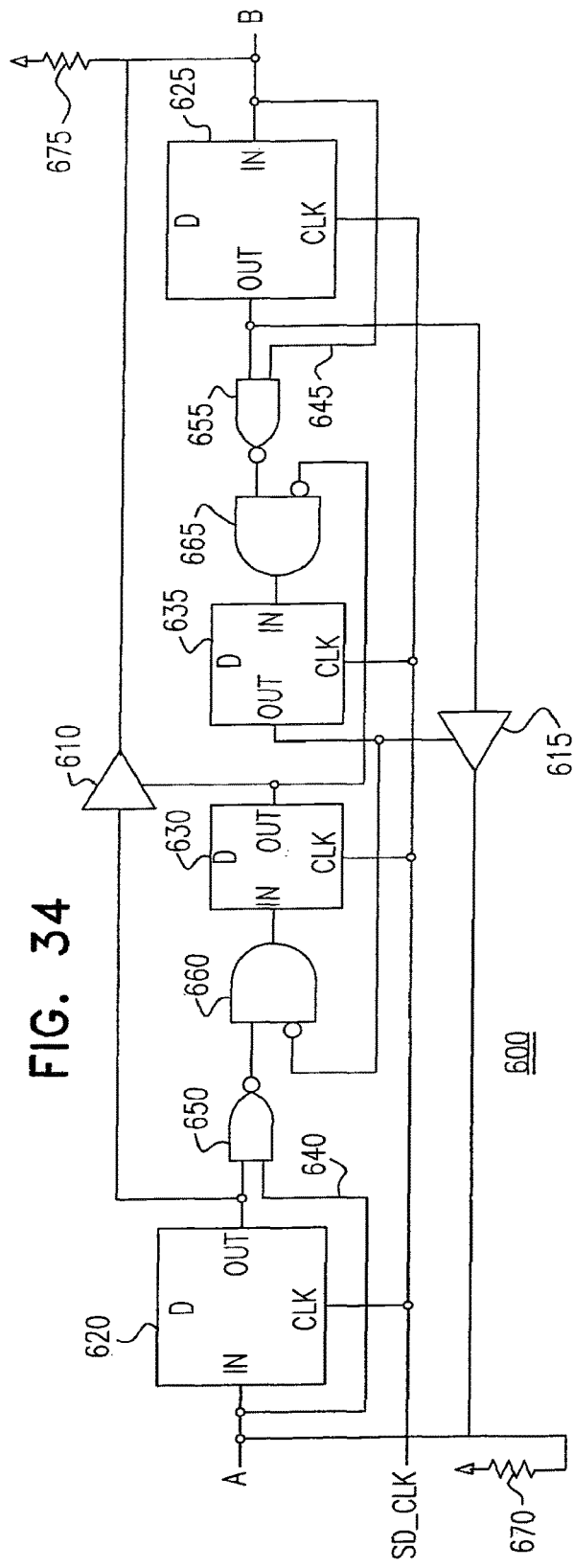
FIG. 34 is a simplified diagram of an electrical circuit that determines bus direction in bi-directional SD and MMC signal lines in accordance with an embodiment of the present invention.

Reference is now made to FIG. 34, which is a simplified diagram of an electrical circuit 600 that determines bus direction in bi-directional SD and MMC signal lines in accordance with an embodiment of the present invention. Circuit 600 connects two terminals, A and B, and carries signals in both directions; i.e., from A to B, and from B to A.

Generally, terminal A connects to enhanced function device 200, which is an SD host, and terminal B connects to wireless communicator 100, which is an SD slave. In such case, there are multiple bi-directional data lines D0-D3 and CMD. The data lines D0-D3 are synchronized so that they change their signal directions simultaneously.

The voltages at terminals A and B may be the same, or may be different. To accommodate different voltages at the terminals, circuit 600 includes two level-shifter buffers, 610 and 615, which drive signals from A to B and from B to A, respectively. Level shifting generates voltage drops across the buffers in order to drive the signal direction. Each buffer has two states; namely, enabled and disabled. When buffer 610 is enabled, signal data is transmitted from A to B, and when buffer 615 is enabled, signal data is transmitted from B to A.

Circuit 600 also includes four data flip flop (DFF) modules; namely, module 620 designated DFF_A, module 625 designated DFF_B, module 630 designated DFF_EnAB, and module 635 designated DFF_EnBA. Each DFF module has an input value, an output value and a clock value. The output of a DFF module delays the input by one clock count; i.e., a DFF module captures the input signal at the moment of a rising clock edge, when the clock goes high, and subsequent input changes to not influence the output until the next rising clock edge.

Modules 630 and 635 are used to enable buffers 610 and 615, respectively. Specifically, when DFF_EnAB.out=0, buffer 610 is enabled, and when DFF_EnAB.out=1, buffer 610 is disabled. Similarly, when DFF_EnBA.out=0, buffer 615 is enabled, and when DFF_EnBA.out=1, buffer 115 is disabled.

Circuit 600 also includes respective by-pass lines 640 and 645, so that previous signal values A and B, denoted A_Delayed and B_Delayed, respectively, are accessible, together with current signal values A and B.

Circuit 600 includes four logical processing units, 650, 655, 660 and 665. Processing unit 650 has inputs A and A_Delayed; processing unit 655 has inputs B and B_Delayed; processing unit 660 has input DFF_EnBA.out in addition to the data coming from processing unit 650 into processing unit 660; and processing unit 665 has input DFF_EnAB.out in addition to the data coming from processing unit 655 into processing unit 665. Operation of processing units 650, 655, 660 and 665 is described in the discussion of FIG. 35 hereinbelow.

Circuit 600 includes two pull-up resistors, 670 and 675, pull the circuit bus up to logical 1 when both sides of the SD or MMC link are not driving signals.

Figure 35:
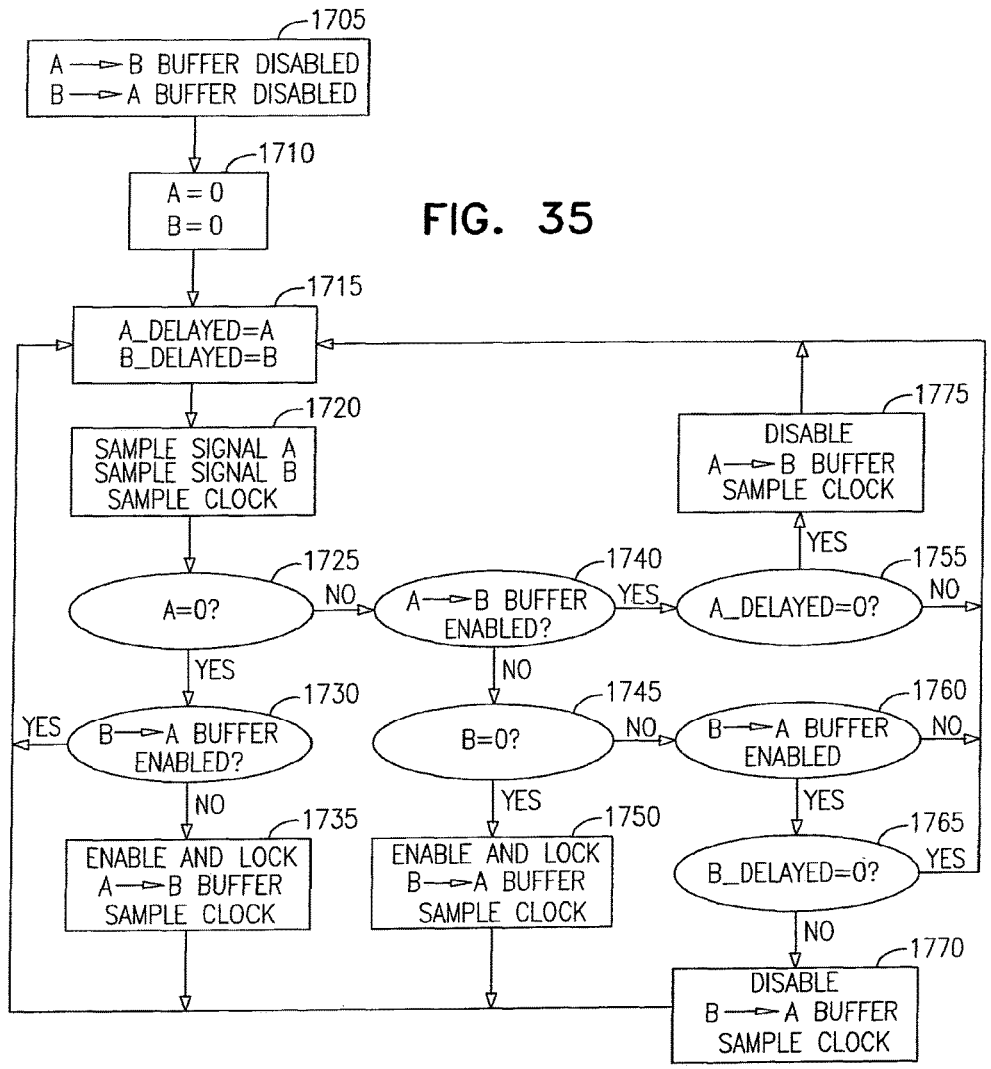
FIG. 35 is a simplified flowchart of a method for determining bus direction in bi-directional SD and MMC signal lines in accordance with an embodiment of the present invention.

Reference is now made to FIG. 35, which is a simplified flowchart of a method for determining bus direction in bi-directional SD and MMC signal lines in accordance with an embodiment of the present invention. Specifically, FIG. 35 summarizes a portion of the logic for enabling and disabling buffers 610 and 615 of FIG. 30.

The rationale for the logic illustrated in FIG. 35 is based on three characteristics of SD and MMC buses; namely:

1. The SD and MMC bus D0-D3 and CMD lines have pull-up resistors 670 and 675 connected thereto, which pull the bus up to logical 1 when both sides of the SD or MMC link are not driving signals.
2. Each SD and MMC transaction on the D0-D3 and CMD lines begins with a start bit of logical 0 and ends with a stop bit of logical 1.
3. Since the SD and MMC buses include direction transition, the side driving a signal stops driving a bus 2 clock cycles before the opposite side starts driving the bus.

The logic of FIG. 35 begins at step 1705 where both buffers are set to their disabled states. At step 1710 the A and B signal values are initialized to logical 0. Steps 1715 and 1720 are iterative steps that save previous A and B signal values and sample new values.

As seen at steps 1725-1750, when one side of circuit 600, A or B, is sampled to have a logical 0 input, circuit 600 enables the buffer in the direction from that side to the opposite side, and locks the buffer in the enabled state.

As seen at steps 1755-1775, circuit 600 disables the enabled buffer when two consecutive logical 1 bits are detected. The event of detecting two consecutive logical 1 bits may represent an end of transaction, or may be part of a transaction. In the former case, both buffers are disabled, and circuit 600 is ready to detect a next transaction, and switch direction as required. In the latter case, the SD or MMC bus remains in its correct logical level due to the pull-up resistors. Since the previous bit was a logical 1, no delay in bus signal stabilization is incurred, due to device and bus capacitance.

In order to avoid potential problems with transient conditions and synchronization to the SD_CLK signal, an embodiment of the present invention includes a sampling mechanism that delays transfer of bits from one direction to the other direction by a single clock, as indicated at steps 1720, 1735, 1750, 1770 and 1775 of FIG. 35. Such delays are implemented by DFF modules 620, 625, 630 and 635 of FIG. 34, and do not affect proper operation of the SD or MMC bus, since transaction starts are determined by start bits, and not based on exact timing. Internally in a transaction, the delay is fixed and thus no change to transaction content occurs.

Reference is now made to the Verilog pseudo-code presented herein, which summarizes one cycle of the logic for enabling and disabling buffers 610 and 615 of FIG. 34. Logical processing units 650 and 660 are used to evaluate the Boolean expression !(A & A_Delayed) &!DFF_En-BA.out, and logical processing units 655 and 665 are used to evaluate the Boolean expression !(B & B_Delayed) &!DFF_EnAB.out.

```
DFF_A.in = A
DFF_A.clk = SD_CLK
A_Delayed = DFF_A.out
DFF_B.in = B
DFF_B.clk = SD_CLK
B_Delayed = DFF_B.out
BufferAtoB.in = A_Delayed
B = BufferAtoB.out
BufferBtoA.in = B_Delayed
A = BufferBtoA.out
DFF_EnAB.in = !(A & A_Delayed) &!DFF_EnBA.out
DFF_EnAB.clk = SD_CLK
BufferAtoB.enable = DFF_EnAB.out
DFF_EnBA.in = !(B & B_Delayed) &!DFF_EnAB.out
DFF_EnBA.clk = SD_CLK
BufferBtoA.enable = DFF_EnBA.out
```

The logic of FIG. 35 applies to all bi-directional signals in an SD or MMC bus. However, since the D0-D3 data lines change direction simultaneously, it is only necessary to apply the logic of FIG. 35 to one of these data lines. The buffer enable/disable signals derived for the one data line suffices to control the buffers for the other three data lines.

Reference is now made to FIG. 36, which is a sample simulation of the Verilog code for A and B signals 110010101110111 and 0010111, respectively, in accordance with an embodiment of the present invention. Each column in FIG. 36 represents one clock cycle. As may be seen in FIG. 36, the signal direction goes from A to B, and Out A is a one clock delay of A, for bits 0010101 and for bits 01. During the time Out A is used, the buffer from A to B is locked (represented by logical 1), and the buffer from B to A is unlocked (represented by logical 0). Signal direction goes from B to A, and Out B is a one clock delay of B, for bits 00101. During the time Out B is used, the buffer from B to A is locked, and the buffer from A to B is unlocked.

It will be appreciated by those skilled in the art that although detection of two logical 1 bits triggers circuit 600 to disable the enabled buffer, as indicated in FIGS. 35 and 36, detection of three or more logical 1 bits may be used instead to trigger the disabling.

It will further be appreciated by those skilled in the art that circuit 600 may be used as a component of a more complex circuit that selectively connects terminal A with two terminals, B and C, or more than two terminals. To this end, reference is now made to FIG. 37, which is a simplified diagram of an electrical circuit 690 that determines bus direction in multiplexed directional SD and MMC signal lines in accordance with an embodiment of the present invention. Generally, terminal A is connected to a host device, and terminals B and C are connected to slave devices.

Figure 37:
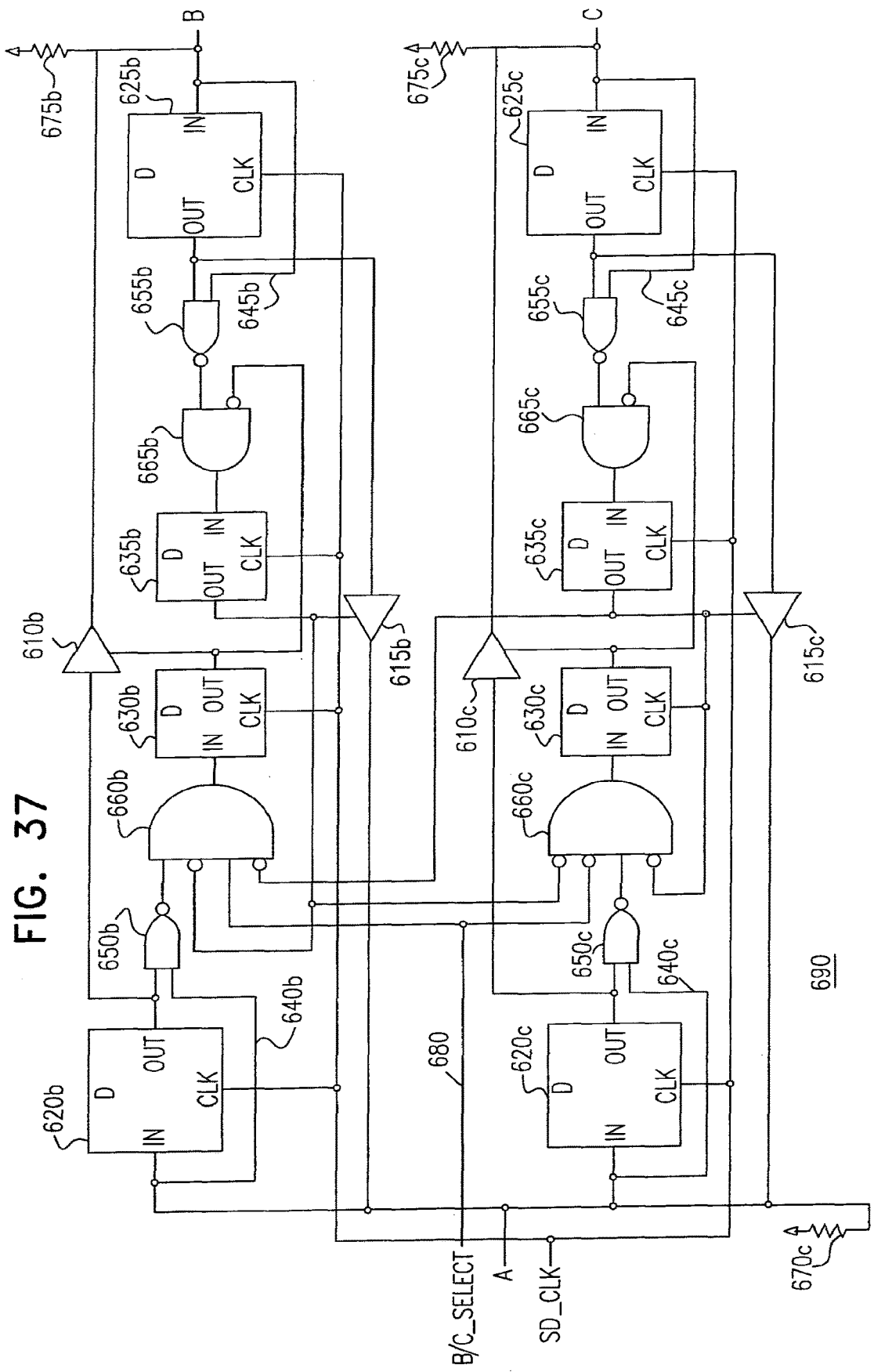
FIG. 37 is a simplified diagram of an electrical circuit that determines bus direction in multiplexed directional SD and MMC signal lines in accordance with an embodiment of the present invention.

As shown in FIG. 37, circuit 690 includes two sub-circuits, each similar in operation to circuit 600. The elements of one of the sub-circuits are labeled with numerals 610b-675b, and the corresponding elements of the other sub-circuit are labeled with numerals 610c-675c. Each of the sub-circuits is bi-directional, with one direction enabled and the other direction disabled, at any moment.

Circuit 690 includes a B/C_SELECT signal line 680, for selecting terminal B or terminal C. B/C_SELECT line 680 originates from a controller for the host device connected to terminal A.

In distinction from logical processing unit 660 of circuit 600, logical processing units 660b and 660c have four input lines. For each logical processing unit, two of its input lines carry signals from the sub-circuit in which the processing unit is located, one signal for examining two previous bits in the enabled direction and the other signal for examining a bit in the disabled direction. One of its input lines carries a signal from the other sub-circuit, for examining a bit in the disabled direction; and one of its input lines carries a signal from B/C_SELECT line 680. Terminals A, B and C may have the same voltage levels, or different voltage levels.

9. Automated Consumer Electronic Appliance Reporting

Embodiments of the present invention enable automated generation and submission of reports about consumer electronic appliances. The reports may include technical information about an appliance, personal information about the owner of the appliance, and information describing the owner's usage of the appliance. According to an embodiment of the present invention, generation and submission of reports is enabled by pouching wireless communicator 100 to consumer electronic appliances.

The consumer electronic appliances supported by the present invention are of many types, including inter alia cameras, media players, computers, home entertainment systems, home appliances, kitchen appliances, and electric tools.

The consumer electronic appliance generally includes storage that stores technical and usage information about the appliance, and wireless communicator 100 stores information about the owner of the appliance in its storage 115. When pouched with an appliance, wireless communicator 100 automatically generates and sends reports about the appliance and about the owner of the appliance and about the owner's usage behavior, to one or more appropriate recipients, including inter alia sellers and manufacturers of the appliance, and technical support centers.

Report generation and submission for an appliance may be automatically initiated when one or more pre-designated events involving the appliance occur, may be scheduled periodically, and may be manually initiated either by the owner of the appliance or by a remote recipient of the report.

Reports may be sent to recipients in the form of SMS messages, MMS messages, e-mail messages, voice messages, or other such GPRS or IP network messages. In addition, wireless communicator 100 may open voice channels, thereby enabling owners of appliances to speak directly with recipients.

The present invention applies to a wide variety of different types of reports, including inter alia registration of appliances, maintenance and diagnostic reports, and marketing-based consumer reports.

The present invention also applies to access control security, whereby an appliance only operates if an authorized wireless communicator 100 is pouched therewith. Moreover, if the appliance is reported as being missing or stolen, then it does not operate at all, even if an authorized wireless communicator 100 is pouched therewith.

Further aspects of the present invention apply to jacket covers for wireless communicator 100. Using the present invention, reports may be automatically generated and submitted about jackets and their usages.

Wireless communicator 100 operates within a variety of wireless communication networks, including inter alia GSM, CDMA and WiFi. These exemplary networks are respectively illustrated in FIGS. 38-40 hereinbelow.

Figure 38:
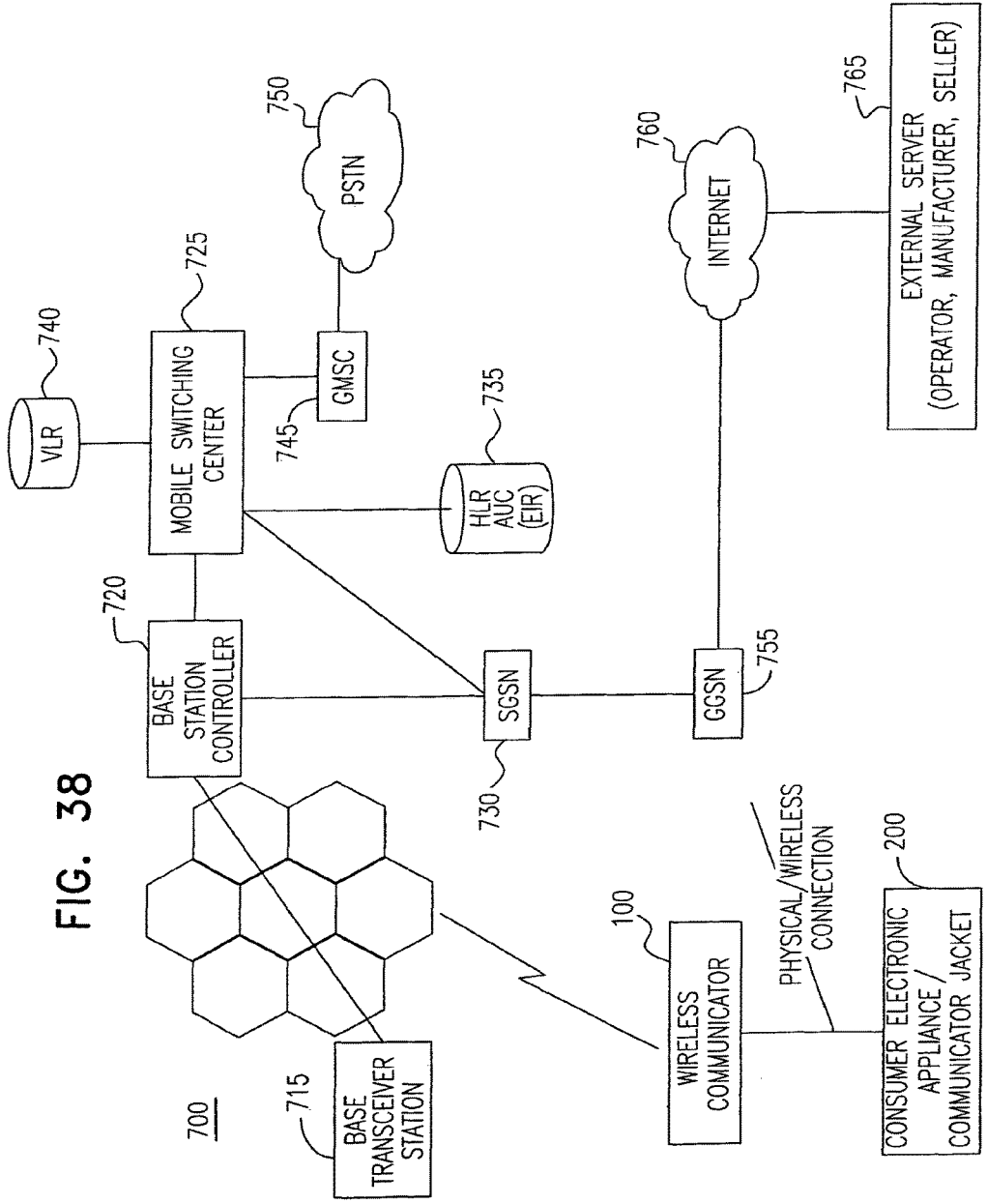
FIG. 38 is a simplified illustration of an exemplary GSM communication network, within which the wireless communicator transmits information about a consumer electronic (CE) device to remote sites in accordance with an embodiment of the present invention.

Reference is now made to FIG. 38, which is a simplified illustration of an exemplary GSM communication network 700, within which wireless communicator 100 transmits information about a consumer electronic appliance to remote sites, in accordance with an embodiment of the present invention. Being an embodiment of an enhanced function device, the appliance is denoted as enhanced function device 200 in FIGS. 38-40.

Communication network 700 is a General Packet Radio Service (GPRS) network. GPRS is a packet-switched service for the Global System for Mobile Communications (GSM), similar to the Internet. GPRS provides packet radio access for mobile GSM users. GPRS also supports Wireless Application Protocol (WAP) services.

Appliance 200 be any of a wide variety of devices. Appliance 200 may be an entertainment device, including inter alia a home entertainment center, a play station, a multimedia player, a television, an audio system and a DVD player. Appliance 200 may be a communication device, including inter alia a telephone, a fax machine and a cell phone. Appliance 200 may be a piece of office equipment including inter alia an office computer, and printer and a scanner. Appliance 200 may be a home appliance including inter alia a refrigerator, a microwave oven, a stove, a washing machine, a drying machine, an air conditioner. Appliance 200 may be a personal appliance including inter alia a personal computer, a personal data assistant (PDA), an automobile, a treadmill and a camera.

Wireless communicator 100 communicates with a base transceiver station (BTS) 715 via an over-the-air interface. Base transceiver stations are components of communication network 700 that terminate the over-the-air interface, over which subscriber traffic is communicated to and from wireless communicator 100. Communication network 700 also includes a base station controller (BSC) 720. Base station controllers are switching modules that provide handoff functions and power level control in base transceiver stations.

BSC 720 is controlled by a mobile switching center (MSC) 725. MSC 725 performs functions of a landline network switching node, including search, signal path switching, and processing of supplementary services. When a request is made for connecting to a subscriber in a landline network, the request is forwarded by MSC 725 to the landline network over a switching path.

BSC 720 controls the interface between MSC 725 and BTS 715, and, as such, controls BTS 715 in call set-up, signaling, and use of radio channels. BSC 720 also controls the interface between a serving GPRS support node (SGSN) 730 and BTS 715.

SGSN 730 services wireless communicator 100 by sending or receiving packets via a base station subsystem (BSS), and more specifically via BSC 720, in the context of GSM systems. SGSN 730 is responsible for delivery of data packets to and from wireless communicator 100, within a service area. SGSN 730 also performs packet routing and transfer, mobility management, local link management, authentication and charging functions.

In order to accommodate a multitude of services, a provider of communication network 700 stores various types of data. The provider must know which subscribers are using communication network 700, and which services the subscribers use. Subscriber profiles, such as the International Mobile Subscriber Identify Number (IMSI), of GPRS subscribers registered with SGSN 730, are stored in a home location registry (HLR) 735. The owner of wireless communicator 100 is such a GPRS subscriber.

To determine whether a subscriber is entitled to use communication network 700, the network provider maintains an authentication center (AUC) 735. Generally, AUC 735 includes algorithms and subscriber-related encryption keys, which are used for authentication. AUC 735 determines, inter alia, whether a subscriber has a valid service contract.

The provider of communication network 700 may optionally maintain an equipment identity registry (EIR) 735, which includes details of mobile transceivers permitted on the network. Generally, EIR 735 stores a "white list", a "grey list" and a "black list". The white list includes mobile phones that function reliably, the grey list includes mobile phones that may be defective, and the black list includes mobile phones which are either faulty or have been reported missing or stolen.

In order to establish a connection to a subscriber's mobile phone, the network provider must determine where the subscriber is located and whether his mobile phone is turned on. Such information is stored in a visitor location registry (VLR) 740.

While GSM forms the underlying technology, SGSN 730 is a network element introduced through GPRS technology. HLR/AUC/EIR 735 is also in communication with a gateway MSC 745, which acts as a gateway to a public-switched telephone network (PSTN) 750.

Another network element introduced in the GPRS context is the gateway GPRS support node (GGSN) 755, which acts as a gateway to Internet 760 and to an external server 765, respectively. External server 765 may be used by a manufacturer of appliance 200, a seller of appliance 200, a service provider for appliance 200, or a combination of the above.

Figure 39:
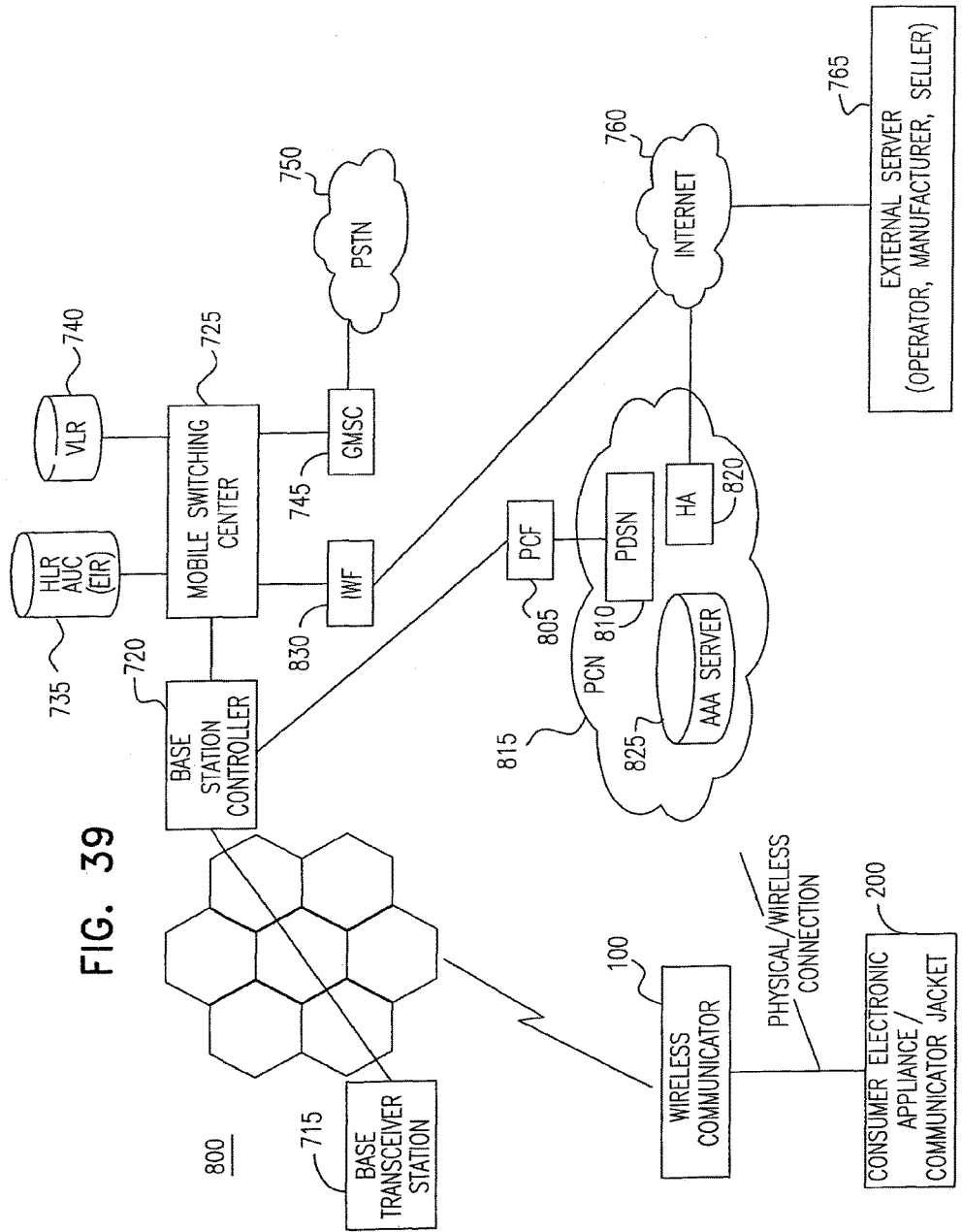
FIG. 39 is a simplified illustration of an exemplary Code Division Multiple Access (CDMA) communication network, within which the wireless communicator transmits information about a consumer electronic (CE) device to remote sites in accordance with an embodiment of the present invention.

Reference is now made to FIG. 39, which is a simplified illustration of an exemplary Code Division Multiple Access (CDMA) communication network 800, within which wireless communicator 100 transmits information about appliance 200 to remote sites, in accordance with an embodiment of the present invention. The specific communication network shown in FIG. 39 conforms to the CDMA2000 1× standard. Communication network 800 includes several components of FIG. 38; namely, wireless communicator 100, appliance 200, base station transceiver 715, base station controller 720, mobile switching center 1125, HLR/AUC/EIR 735, VLR 740, gateway MSC 745, PSTN 750, Internet 760 and external server 765.

In communication network 800, BSC 720 is in communication with a packet control function (PCF) 805. In turn, PCF 805 is in communication with a packet data serving node (PDSN) 810, which is part of a packet core network (PCN) 815. A packet core network generally includes a succession of interconnected routers, or such other communication nodes, that carry Internet protocol (IP) data traffic.

PDSN 810 provides both mobility management functions, similar to SGSN 730, and packet routing functions, similar to GGSN 755. PDSN 810 serves as a connection point between a radio access network and an IP network, and manages point-to-point sessions between a mobile phone and an IP address.

PCF 805 provides a relay from PDSN 810 to a mobile phone. PCF 805 tracks registration expiration, and ensure that sessions are renewed as necessary. PCF 805 also controls available radio resources, and buffers data received from PDSN 810 when radio resources are not available. PCF 805 also controls dormancy.

PCN 815 also includes a home agent (HA) 820. Generally, HA 820 manages roaming and handoff of mobile data. HA 820 is used for registration of a mobile IP (MIP), and transfer of mobile packet data in PDSN 810. Through tunneling, HA 820 transfers MIP data from a home network to PDSN 810, and from PDSN 810 to the home network through a reverse tunnel.

PCN 815 also includes an authentication, authorization and accounting (AAA) server 825. Generally, AAA server 825 is responsible for access control. AAA server 825 processes user requests for access to computer resources and, for enterprises, provides authentication, authorization and accounting services. Authentication is used to identify subscribers. Authorization is used to manage policies and service profiles that govern which resources and services a subscriber may access, and to manage and distribute security keys. Accounting services track usage of time and data resources, and manage billing. AAA server 825 interacts with network access and gateway servers, and with databases and directories containing user information.

In communication network 800, MSC 725 is in communication with an interworking function (IWF) 830. An interworking function provides an interface between wireless data networks and data packet networks such as Internet 760 or corporate intranets, and also between wireless data networks and wireline networks such as PSTN 750. The interworking function converts and sends data to a data packet network or a wireline network, based on the data type. Generally, IWF 830 includes modems or data terminal adapters, or both, to convert data transmitted over a wireless network to a format suitable for recognition and carrying by a public telecommunications network.

Figure 40:
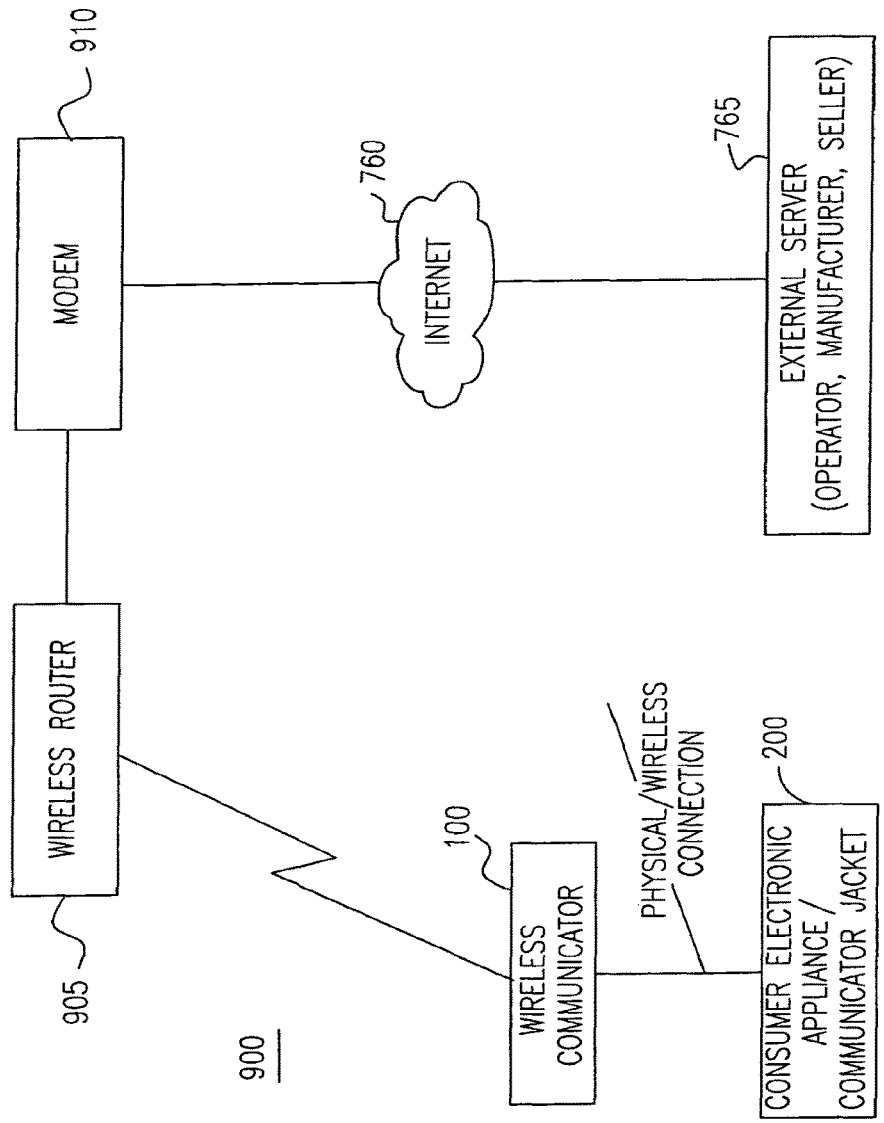
FIG. 40 is a simplified illustration of an exemplary IEEE 802.11b WiFi communication network, within which the wireless communicator transmits information about a consumer electronic (CE) device to remote sites in accordance with an embodiment of the present invention.

Reference is now made to FIG. 40, which is a simplified illustration of an exemplary IEEE 802.11b WiFi communication network 900, within which wireless communicator 100 transmits information about appliance 200 to remote sites, in accordance with an embodiment of the present invention. Communication network 900 includes several components of FIGS. 38 and 39; namely, wireless communicator 100, appliance 200, Internet 760 and external server 765.

A wireless router 905 communicates with a modem 910, and modem 910 sends and receives data to and from Internet 760.

It will be appreciated by those skilled in the art that although FIGS. 38-40 illustrate operation of wireless communicator 100 in GSM network 700, CDMA network 800 and WiFi network 900, the present invention applies to other current and future technologies, including inter alia packet-switched and circuit-switched technologies, and 3G technologies.

Referring back to FIG. 6, storage 115 includes information about the owner of appliance 200, such as information INF-3 listed below in TABLE V. Information INF-3 may include inter alia subscriber identification module (SIM) information for wireless communicator 100.

Similarly, referring back to FIGS. 7A and 7B, storage 215 includes technical and usage information about appliance 200, such as information INF-1 listed below in TABLE VII.

In accordance with an embodiment of the present invention, wireless communicator 100 and appliance 200 communicate with one another via a pair of mailboxes within wireless communicator 100. Specifically, pouching controller 110 includes two mailboxes, an outgoing mailbox that is written to by base band modem 120 and read from by appliance 200, and an incoming mailbox that is written to by appliance 200 and read from by base band modem 120. Pouching controller 110 initiates an interrupt to pouching controller 210 when base band modem 120 completes a write operation to the wireless communicator's outgoing mailbox. Such interrupt may be implemented as an SDIO interrupt on an SD bus, or as a dedicated signal. Similarly, pouching controller 210 initiates an interrupt to base band modem 120 when appliance 200 completes a write operation to the wireless communicator's incoming mailbox.

It will thus be appreciated by those skilled in the art that wireless communicator's incoming and outpoint mailboxes may be used for direct transfer of data between wireless communicator 100 and appliance 200. In one embodiment of the present invention, each mailbox includes 512 bytes, of which the first two bytes are header bytes that store a message type, and the remaining bytes store the message itself.

Wireless communicator's incoming and outgoing mailboxes may be mapped to an SDIO register map on the modem side and on the appliance side, respectively. Alternatively, wireless communicator's incoming and outgoing mailboxes may be mapped to SD memory space. In such case an arbitration algorithm is used to resolve conflicts when both appliance 200 and wireless communicator 100 try to access SD storage at the same time.

Figure 41:
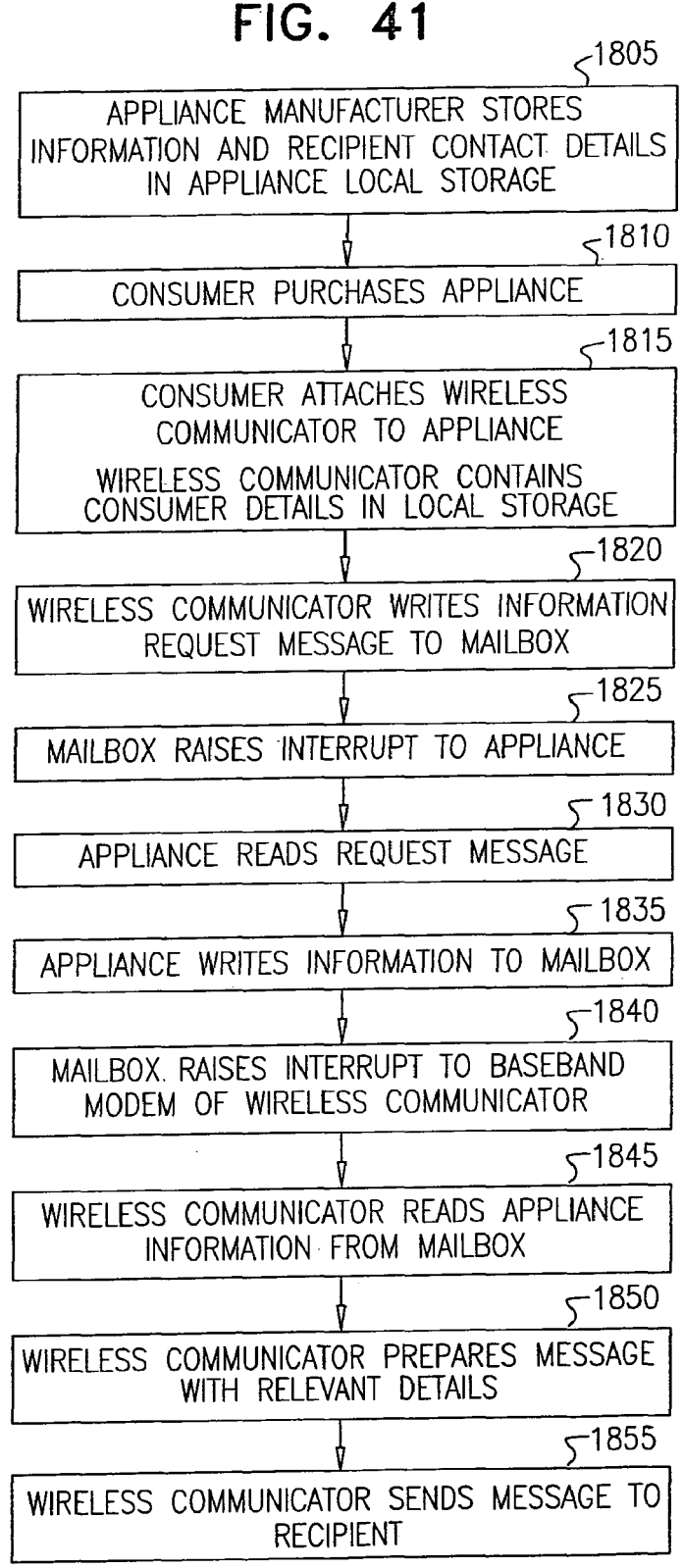
FIG. 41 is a simplified flowchart of a method for automated consumer electronic device reporting, using the wireless communicator in accordance with an embodiment of the present invention.

Reference is now made to FIG. 41, which is a simplified flowchart of a method for automated reporting for appliance 200, using wireless communicator 100, in accordance with an embodiment of the present invention. At step 3705, a manufacturer of appliance 200 stores information about the appliance, designated by INF-1, and contact information for a recipient, designated by INF-2, in appliance 200 storage 215.

At step 1810, a consumer purchases appliance 200. At step 1815, the consumer attaches wireless communicator 100 to appliance 200. When wireless communicator 100 is attached to appliance 200, wireless communicator 100 collects and monitors real-time information related to operation and usage of appliance 200. In an embodiment of the present invention, wireless communicator 100 stores details about the user, designated by INF-3, in its local storage 115. In an alternate embodiment of the present invention, INF-3 is stored in SIM 190.

At step 1820, wireless communicator 100, wishing to receive appliance information INF-1 and recipient contact information INF-2 from appliance 200, writes an information request to the wireless communicator's outgoing mailbox. At step 1825 pouching controller 110 raises an interrupt to appliance 200. At step 1830 host appliance 200 reads the request message, and at step 1835 host appliance 200 writes the requested information INF-1 and INF-2 to the wireless communicator's incoming mailbox.

At step 1840 pouching controller 210, in turn, raises an interrupt to baseband modem 120, and at step 1845 wireless communicator 100 reads the requested information INF-1 and INF-2.

At step 1850 wireless communicator 100 prepares an appropriate report for recipient 765, based on INF-1 and INF-3. At step 1855 wireless communicator 100 sends the report to recipient 765 at the recipient's address as specified in INF-2.

The report may be sent to recipient 765 in the form of an SMS message, an MMS message, a voice message, a GPRS message, or such other message transmitted by wireless communicator 100. Alternatively or in addition, the report may be transmitted as an e-mail message over an IP or alternate network. The report may be transmitted over a GDSM network, as in FIG. 38, over a CDMA network as in FIG. 39, over a WiFi network as in FIG. 40, or via WIMAX communication.

Steps 1815-1855 of FIG. 41 are summarized in the following simplified pseudo-code.

```
//declarations for variables
OWNER_DETAILS = {NAME, CONTACT_INFO};
HOST_DETAILS  = {HOST_TYPE,  MODEL_NUM,
SERIAL NUMBER, MANUFACTURER, RECIPIENT_NUMBER};
IF (IS_CC_INSERTED) {                       // step 1815
    CC_MAILBOX_WRITE("INFO REQUEST"};       // step 1820
    INTERRUPT_HOST( );                      // step 1825
    HOST_MAILBOX_READ_MAILBOX( );           // step 1830
    HOST_MAILBOX_WRITE(HOST_DETAILS);       // step 1835
    INTERRUPT_CC( );                        // step 1840
    CC_MAILBOX_READ(HOST_DETAILS);          // step 1845
    MESSAGE = PREPARE_MESSAGE(OWNER_DETAILS,
    HOST_DETAILS);
    // step 1850
    SEND_TO_RECIPIENT(RECIPIENT_NUMBER,     // step 1855
    MESSAGE);
}
```

TABLE VII summarizes exemplary information data that is accessed by wireless communicator 100 in performing the method of FIG. 41.

TABLE VII

Exemplary information accessed by wireless communicator 100 for automated reporting of appliance 200 or of the communicator's jacket 200

| INF-1: Appliance information/ INF-1: Communicator jacket information | INF-2: Recipient contact information | INF-3: Owner information |
|---|---|---|
| Manufacturer | Phone number | ID |
| Type of appliance | E-mail | Membership number |
| Model Number | IP address | Full name |
| Serial Number | | Address |
| SKU | | Phone number |
| Date of purchase | | Cell phone number |
| Point of purchase | | E-mail |
| Capabilities - screen type | | Web site |
| Capabilities - screen size | | SIM subscriber information |
| Capabilities - user interface | | |
| Usage-related information | | |

Generally, appliance information, INF-1, is controlled by the manufacturer or seller of the appliance, and is stored in the appliance itself. Appliance information, INF-1, may be updated by the manufacturer or seller up to the time when the appliance is sold. In another embodiment of the present invention, some or all of appliance information, INF-1, may be manually entered. Such information may be attached to or printed on the appliance, for reference.

Generally, owner information, INF-3, is controlled by the owner of appliance 200, and is stored in wireless communicator 100. Alternatively, some or all of owner information, INF-3, may be accessible on a network such as the Internet. In such case, wireless communicator 100 accesses the owner information from the network, prior to sending the report to recipient 765 at step 1850. In another embodiment of the present invention, some or all of owner information, INF-3, may be manually entered.

The usage-related information listed in TABLE VII may include a variety of present and past usage information. Such usage-related information includes inter alia,
   wireless communicator insertion time;
   wireless communicator extraction time;
   battery status of the appliance;
   battery status of the wireless communicator;
   memory status of the appliance;
   memory status of the wireless communicator;
   geographical movement of the appliance;
   mode of the appliance (e.g., silent, flight mode, meeting mode)
   accessories connected to the appliance (e.g., earphones, speaker, charger);
   accessories connected to the wireless communicator (e.g., PC);
   software installed on the appliance (e.g., drivers, operation system, applications, codecs);
   software and firmware versions on the appliance;
   file types in memory of the appliance (e.g., audio, video, documents); and
   file types in memory of the wireless communicator.

For purposes of illustration, the following is an exemplary simplified report that is submitted by wireless communicator 100 to recipient 765 at step 1855.

| Device Details |
|---|
| Type: Digital Camera |
| Manufacturer: Olympus |
| Model: C-765 |
| SKU: 12345-ABCDE |
| Additional Information (report specific) |
| Owner Details |
| Name: Jack Times |
| Phone: 123-456-7890 |
| Cell Phone: 987-654-3210 |
| E-mail: Jack.Times@mailserver.com |

Reporting step 1855 may be performed either while wireless communicator 100 is pouched with appliance 200, or while wireless communicator 100 is not pouched with appliance 200, or both. When wireless communicator 100 is pouched with appliance 200, automated reporting may be event driven. Events that may initiative the reporting include inter alia
   Attachment of the wireless communicator to the appliance
   Detachment of the wireless communicator from the appliance
   Performing a device-specific function, e.g., begin listening to a song on an audio player
   Appliance is turned on
   Appliance is turned off
   Wireless Communicator is pouched with the appliance for the first time Wireless communicator 100 may generate and save a usage history log in the wireless communicator storage 115 or in the appliance storage 215. Wireless communicator 100 may generate and save a history log for a plurality of appliances. Information from the history log can be sent periodically to the recipient, such as daily or weekly.

Reporting step 1855 may be performed in real-time, or at a later time via a PC or via GPRS.

Reporting step 1855 may be initiated by the owner of appliance 200. For example, the owner may initiate generating a report and submitting the report to a service provider, if appliance 200 is malfunctioning.

Reporting step 1855 may be initiated by software or firmware running on appliance 200 or on wireless communicator 100. Such software or firmware initiated reporting may occur as a one-time event, or as a recurring event.

Reporting step 1855 may be initiated remotely over a network. For example, recipient 765 may initiate generating a report and submitting it to the recipient.

Alternatively or in addition to step 1855, wireless communicator 100 may open a voice channel for the user of appliance 200 and the recipient to speak with one another, or to leave voice messages for one another. Thus, when wireless communicator 100 is pouched with appliance 200 for the first time, the owner of appliance 200 and the recipient may be connected via a voice channel. The recipient may thereby introduce the owner to operation of appliance 200, assist the owner in configuring appliance 200, and offer the owner of CE appliance 200 a tutorial. In addition, incoming voice messages may be saved in a voice mailbox within wireless communicator 100.

As described hereinabove, wireless communicator 100 may have one or more jackets 200. In an embodiment of the present invention, distinct jackets 200 of wireless communicator 100 have distinct identification codes. The identification code of a jacket 200 may include some or all of information, INF-1. In this embodiment, the jacket identification code may be reported to the recipient at step 1855.

In accordance with an embodiment of the present invention, reporting step 1855 may advantageously use a user-agent header, which prefaces transmissions from wireless communicator 100. User-agent headers are text strings that are transmitted by a device, such as wireless communicator 100, via an HTTP header, to identify the device that is sending data. User-agent headers generally include a wireless device model and manufacturer. User-agent headers may also include additional information such as the device's operation system version, browser version and Java capabilities. Examples of user-agent headers are:
Nokia 6230
User-Agent: Nokia6230/2.0 (03.14) Profile/MIDP-2.0 Configuration/CLDC-1.1
Sony Ericsson Z1010
User-Agent: SonyEricssonZ1010/R1A SEMC-Browser/4.0
Modu
User-Agent: Modu-A1.0/SKY Browser 1.1/Music In accordance with an embodiment of the present invention, user-agent headers are modified according to capabilities of appliance 200, so that recipient 765 may identify content and services that appliance 200 supports. User-agent headers are also modified according to properties of the wireless communicator's jacket, so that recipient 765 may identify the jacket. The user-agent headers are modified in the HTTP header upon pouching of wireless communicator 100 with appliance 200, or upon pouching of wireless communicator 100 with its jacket.

Wireless communicator 100 also uses a user-agent profile (UAProf). Specifically, wireless communicator 100 sends a universal resource identifier (URI) with a link to its UAProf, within an HTTP header or a Web Service Provider (WSP) header. The UAProf resides on the manufacturer's web site—either the manufacturer of wireless communicator 100 or the manufacturer of appliance 200 or the manufacturer of jacket 200. The UAProf is maintained by the manufacturer, and is unique per communicator/appliance combination and per communicator/jacket combination and per software version. The URI is updated when a UAProf parameter value is changed.

The system and method of the present invention illustrated in FIGS. 38-41 may be used advantageously in many application areas where automated reporting is useful, including inter alia:
  medical reports;
  police reports;
  insurance reports;
  driver and automobile safety reports;
  taxi cab reports;
  credit card reports;
  ATM card reports;
  registration of CE devices;
  diagnostics and maintenance;
  software/firmware updates;
  warranties and guarantees;
  access control security;
  offer of services;
  time-stamping;
  advertising;
  market segmentation;
  understanding user behavior; and
  networking.

The present invention is advantageous for automated registration, diagnostic testing and malfunction reporting for electrical appliances. In an embodiment of the present invention, when wireless communicator 100 is pouched with a new appliance, wireless communicator 100 automatically collects information about the appliance and its owner, and transmits the collected information to a remote manufacturer or seller for registering the appliance.

Wireless communicator 100 also includes program code for diagnostic testing of the appliance. When wireless communicator 100 is pouched with the appliance, the program code runs diagnostic maintenance tests on the appliance. Wireless communicator 100 automatically collects information about the appliance and its owner, and transmits the collected information along with a diagnostic report, to the seller or service provider for the appliance. In turn, if a malfunction is reported, the seller or service provider contacts the owner about repairing the appliance. In this way, the seller or service provider is able to maintain the appliance, and proactively repair appliance malfunctions before they become severe.

Figure 42:
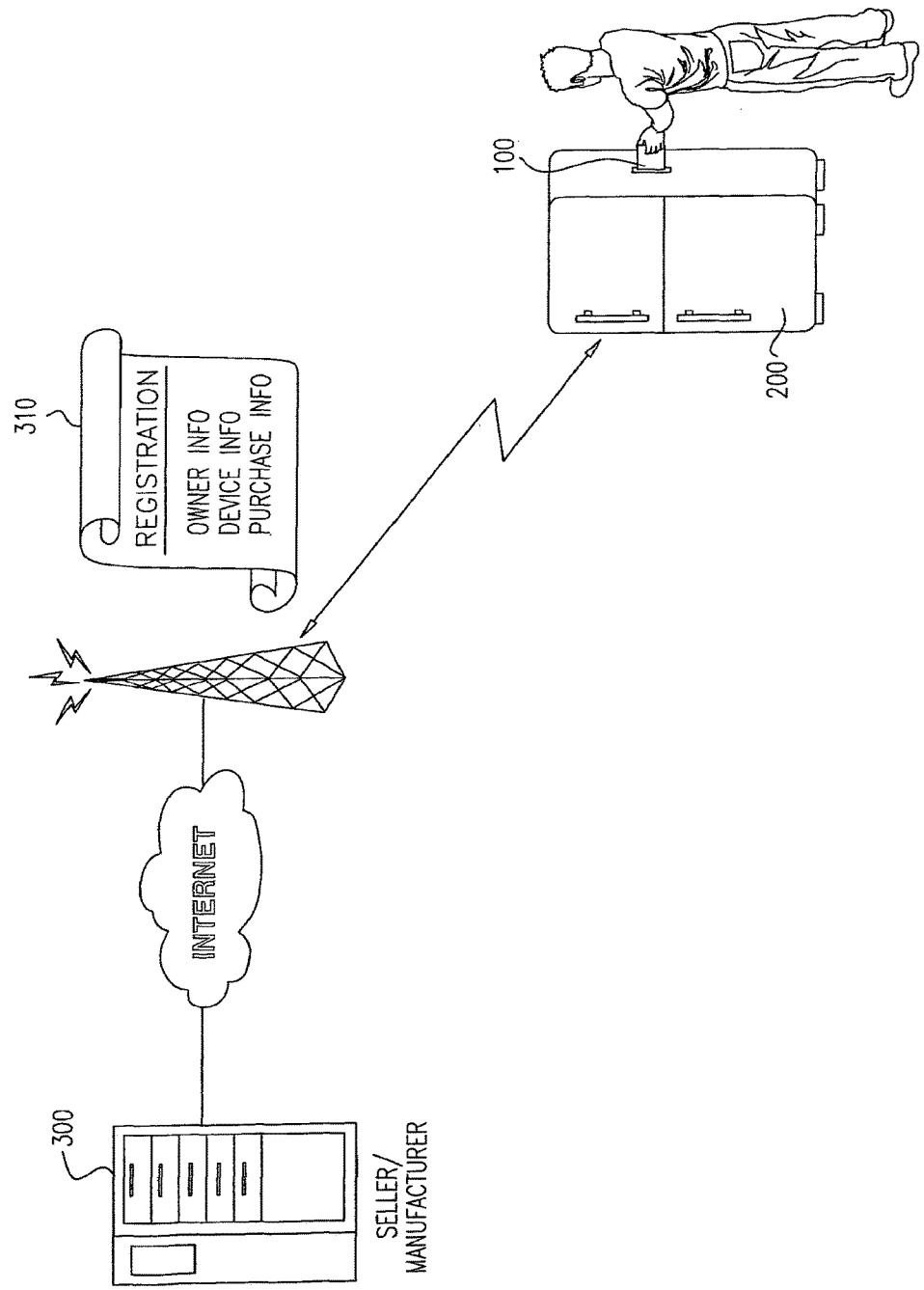
FIG. 42 is a simplified illustration of a communications network with the wireless communicator that wirelessly transmits registration information about an appliance to one or both of a remote manufacturer and a remote seller in accordance with an embodiment of the present invention.

Reference is now made to FIG. 42, which is a simplified illustration of a communications network with wireless communicator 100 that wirelessly transmits registration information about appliance 200 to one or both of a remote manufacturer and a remote seller 300 in accordance with an embodiment of the present invention. When wireless communicator 100 is pouched with appliance 200, wireless communicator 100 automatically registers appliance 200 by transmitting appropriate information 310 about the appliance, its purchase, and its owner to remote manufacturer or a seller 300.

Referring back to FIG. 6, in accordance with an embodiment of the present invention, storage 115 stores information about the owner of appliance 200, and appliance registration program code for registering appliance 200. Similarly, referring back to FIGS. 7A and 7B, storage 215 stores information about appliance 200 and its purchase. Such details may include inter alia a serial number for appliance 200, a model number, a date of purchase and an identifier for the store where appliance 200 was purchased.

Wireless communicator 100 is used to send registration information about appliance 200 and its owner to one or more of manufacturer and seller 300.

When wireless communicator 100 is pouched with appliance 200, appliance 200 serves as an enhanced function host device. To register appliance 200, the appliance registration program code programs wireless communicator 100 (i) to collect requisite appliance and purchase information from the appliance storage 215, and owner information from the wireless communicator storage 115 or SIM 190; and (ii) to forward the collected information to the seller or to the manufacturer 300, as appropriate, using modem 120. Contact information for seller or manufacturer 300 may be available in the appliance storage 215. Alternatively, contact information for seller or manufacturer 300 may be entered manually to wireless communicator 100. Yet alternatively, contact information for seller or manufacturer 300 contact information may be available in wireless communicator storage 115. Specifically, wireless communicator 100 may store a list of manufacturers and their appliances, and looks up the appropriate contact information based on appliance 200.

In an alternative embodiment of the present invention, owner information does not reside in wireless communicator storage 115 or SIM 190. Instead, wireless communicator 100 obtains the owner information from an external server.

In accordance with one embodiment of the present invention, connection to the seller or manufacturer 300 is initiated by wireless communicator 100, and transmitted over GPRS (GSM mobile data service). Wireless communicator 100 creates a file or text message that includes the relevant registration data, shown as message 310 in FIG. 42. An example of such file or text message is as follows.

---
Device details

Type: Audio Receiver
Brand: Yamaha
Model: RX-V2700
S/N: 12345-ABCDE
Purchase Details Date of Purchase: Jan. 1, 2007
Store: 1280 Lexington Ave., New York, NY 10028
Owner Details Name: John Smith
Phone: 123-456-7890
Cell: 098-765-4321
Email: John.Smith@anonymous.com

---

In another embodiment of the present invention, wireless communicator 100 transmits the registration information via an SMS or MMS message. In yet another embodiment of the present invention, wireless communicator 100 places a voice call to the seller or manufacturer 300 with the information indicated in the text above, using text-to-speech conversion.

An alternate embodiment of the present invention, owner information is not stored in wireless communicator 100. Instead, owner information is retrieved by the seller and manufacturer 300 after receipt of registration data sent from wireless communicator 100. Alternatively or additionally, owner information, together with an optional owner log history, is stored within appliance 200 itself.

After wireless communicator 100 has registered appliance 200, a corresponding flag is set in wireless communicator storage 115 or appliance memory 215. Thereafter, when wireless communicator 100 is pouched with appliance 200 it knows not to register appliance 200 a second time.

Figure 43:
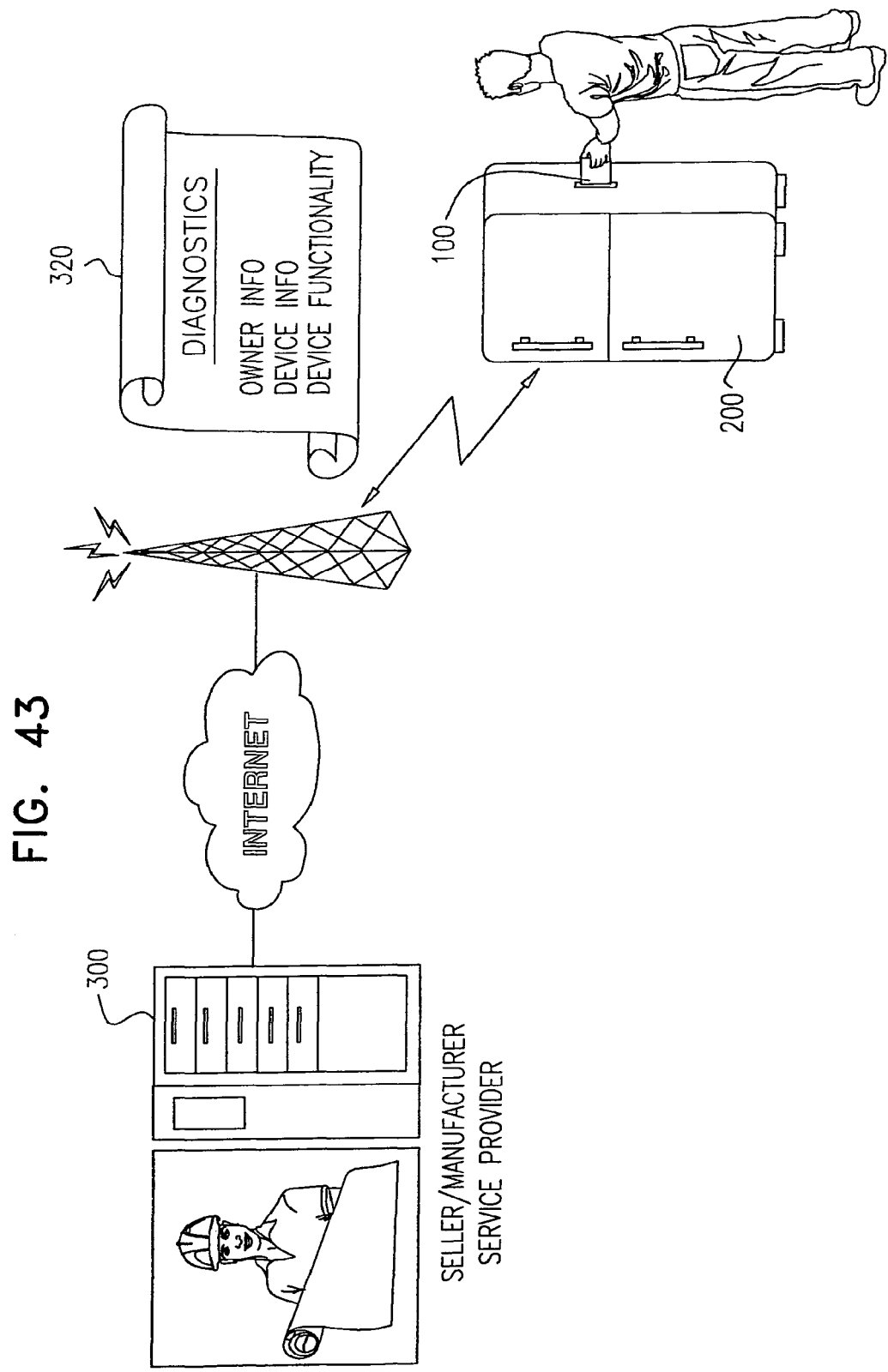
FIG. 43 is a simplified illustration of a communications network with the wireless communicator that wirelessly transmits diagnostic information about an appliance to one or more of a remote seller, a remote manufacturer and a remote service provider in accordance with an embodiment of the present invention.

Reference is now made to FIG. 43, which is a simplified illustration of a communications network with wireless communicator 100 that wirelessly transmits diagnostic information about appliance 200 to one or more of a remote seller, a remote manufacturer and a remote service provider 300 in accordance with an embodiment of the present invention. When wireless communicator 100 is pouched with appliance 200, wireless communicator 100 (i) automatically runs diagnostic tests on appliance 200, and (ii) automatically prepares diagnostic summary reports 320 for appliance 200 and transmits them to remote seller, manufacturer or service provider 300 for the appliance.

Referring back to FIG. 6, in an embodiment of the present invention the wireless communicator storage 115 stores information about the owner of wireless communicator 100, and also store application diagnostic program code for reporting diagnostics of appliance 200, as described hereinbelow. Similarly, referring back to FIGS. 7A and 7B, the appliance storage 215 stores information about appliance 200 and its purchase. Such details may include inter alia a serial number for appliance 200, a model number, a software/firmware version, a date of purchase and an identifier for the store where appliance 200 was purchased.

Further in accordance with an embodiment of the present invention, electrical appliance 200 includes sensors for use in diagnostics. A sensor is a type of transducer which converts a signal into a reading for the purpose of information transfer. There are direct-indicating sensors which are human-readable, e.g., a mercury thermometer. Other sensors that may be embedded in an electrical appliance are sensors that produce an output voltage or such other electrical output which is interpreted by another device. Most sensors are electrical or electronic, although other types exist. Sensors used in diagnostics of appliance 200 in accordance with the present invention include inter alia thermal sensors, electromagnetic sensors, mechanical sensors, chemical sensors, optical radiation sensors, ionizing radiation sensors and acoustic sensors.

Wireless communicator 100 is used to send information about electrical appliance 200 and its owner to one or more of seller, manufacturer and service provider 300. The information sent by wireless communicator 100 includes diagnostic reports for appliance 200.

When wireless communicator 100 is pouched with appliance 200, appliance 200 serves as an enhanced function host device. For maintenance and repair of appliance 200, the appliance diagnostic program code programs wireless communicator 100 (i) to run diagnostic tests on appliance 200; and (ii) to forward the test results to seller, to manufacturer or service provider 300 for appliance 200, as appropriate, using modem 120. As above, wireless communicator 100 creates a file or text message that includes the relevant diagnostic monitoring data, shown as service report 320 in FIG. 43. An example of such file or text message is as follows.

---
Device details

Type: Audio Receiver
Brand: Yamaha
Model: RX-V2700
S/N: 12345-ABCDE
Problem Diagnosed Description: Over-heating
Owner Details Name: John Smith
Phone: 123-456-7890
Cell: 098-765-4321
Email: John.Smith@anonymous.com

---

In another embodiment of the present invention, wireless communicator 100 transmits the service report using an SMS or MMS message. In yet another embodiment of the present invention, wireless communicator 100 places a voice call to seller, manufacturer or service provider 300 with the information indicated in the text above, using text-to-speech conversion.

In accordance with an embodiment of the present invention, diagnostic tests may be scheduled periodically, or initiated manually by the owner, or initiated remotely via wireless communicator 100.

Figure 44:
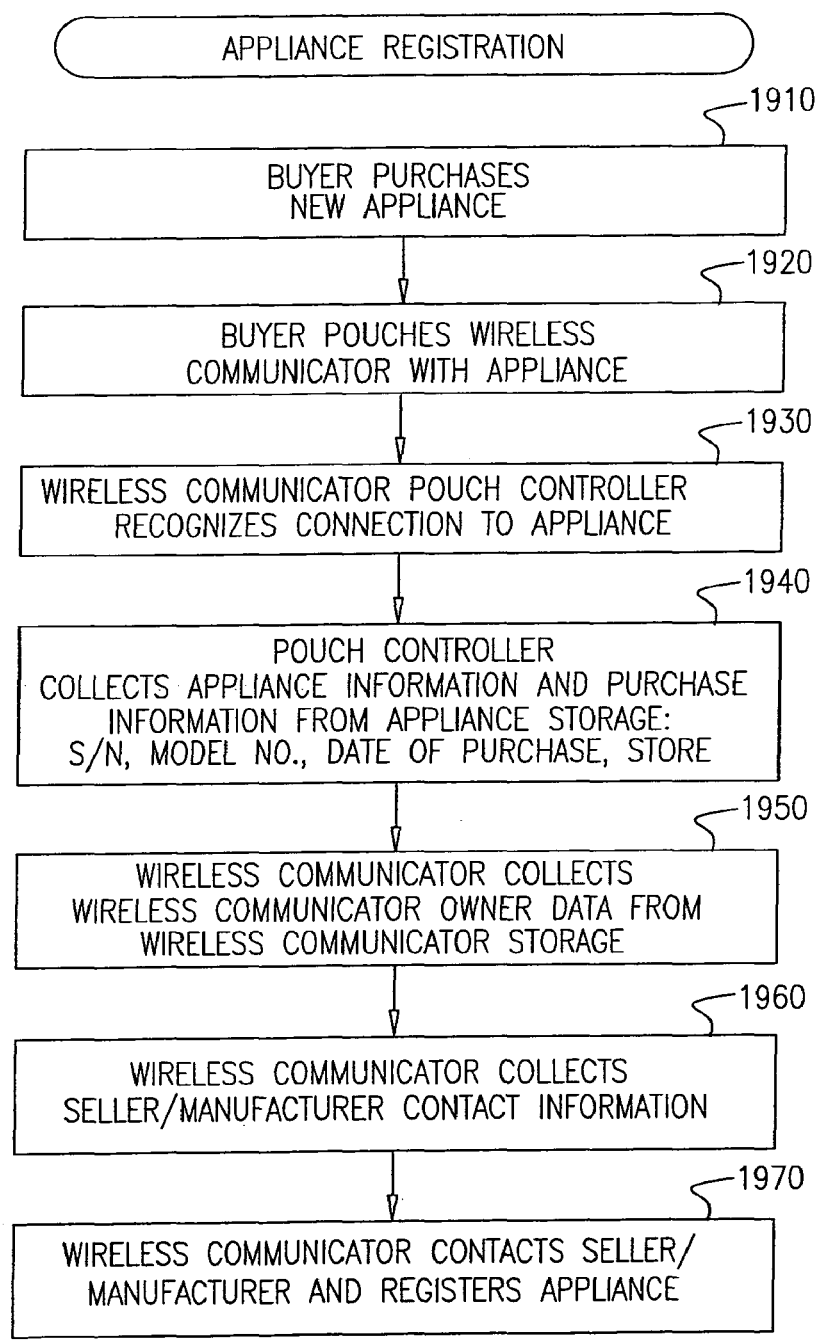
FIG. 44 is a simplified flowchart of a method for registering electrical appliances using the wireless communicator in accordance with an embodiment of the present invention.

Reference is now made to FIG. 44, which is a simplified flowchart of a method for registering electrical appliances using wireless communicator 100 in accordance with an embodiment of the present invention. At step 1910 a buyer purchases an electronic appliance, which serves as a host device, such as appliance 200 of FIG. 42. At step 1920 the buyer pouches wireless communicator 100 with the appliance 200. At step 1930 the wireless communicator pouching controller 110 recognizes its being pouched to appliance 200.

At step 1940 pouching controller 110, under program instruction from code stored on wireless communicator 100, such as the appliance registration program code, collects appliance information and purchase information from the appliance storage 215. Such appliance and purchase information includes inter alia a serial number, a model number, a date of purchase, and an identifier of a store where the appliance was purchased. At step 1950 pouching controller 110 collects information about the owner from wireless communicator storage 115 or SIM 190. At step 1960 pouching controller 110 collects contact information for the seller or manufacturer of appliance 200, with whom the appliance is to be registered. Such contact information may be stored in appliance 200, or may be manually entered. Finally, at step 1970 wireless communicator 100 opens a connection to the seller or manufacturer, and transmits the registration information. Wireless communicator 100 may transmit the registration information as data transmitted over GPRS. Alternatively, wireless communicator 100 may transmit the information as a voice transmission by making a phone call to the seller or manufacturer.

Figure 45:
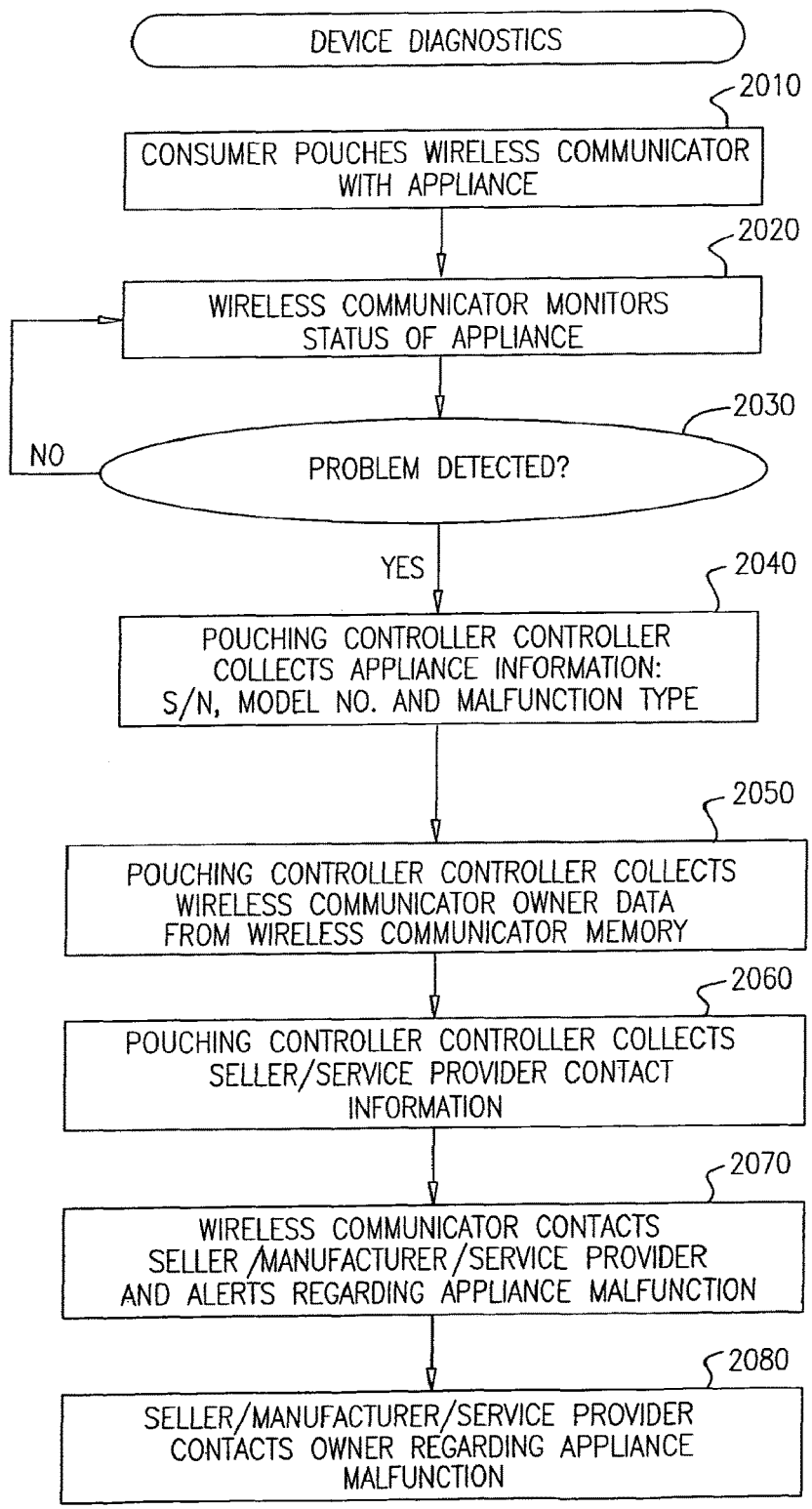
FIG. 45 is a simplified flowchart of a method for reporting diagnostics for electrical appliances using the wireless communicator in accordance with an embodiment of the present invention.

Reference is now made to FIG. 45, which is a simplified flowchart of a method for reporting diagnostics for electrical appliances using wireless communicator 100 in accordance with an embodiment of the present invention. At step 2010 a consumer inserts wireless communicator 100 into appliance 200, which serves as an enhanced function host device for wireless communicator 100. At step 2020 wireless communicator 100 monitors appliance 200 by running diagnostic testing program code that is stored in the wireless communicator storage. At step 2030 a determination is made whether a problem has been detected. If not, the method returns to step 2020 to continue monitoring appliance 200 while wireless communicator 100 is pouched therewith. Such monitoring may be continuous monitoring or scheduled periodic monitoring.

Referring back to step 2030, if a problem is detected, then at step 2040 the wireless communicator pouching controller 110 collects appliance information that is stored in appliance storage 215. Such information includes inter alia an appliance serial number and a model number. Pouching controller 110 also identifies a malfunction type corresponding to the detected problem. At step 2050 pouching controller 110 collects owner data that is stored in wireless communicator storage 115. At step 2060 pouching controller 110 collects contact information for the seller, manufacturer or service provider of appliance 200. At step 2070 wireless communicator 100 contacts the seller, manufacturer or service provider and transmits an alert notification regarding the malfunction. Finally, at step 2080 the seller, manufacturer or service provider contacts the owner of appliance 200 regarding the malfunction.

The present invention is advantageous for updating software and firmware. The generated report may include identifiers of versions of software and firmware for an enhanced function device, in response to which appropriate updated versions are remotely accessed.

In accordance with an embodiment of the present invention, wireless communicator 100 maintains a history log of the various enhanced function devices it was pouched with. The history log includes the enhanced function devices' current installed software and firmware versions. According to an embodiment of the present invention, settings that were last defined or modified for the enhanced function devices are also stored in the history log. When wireless communicator 100 reports its history log, appropriate software/firmware updates are made accessible for wireless communicator 100 to download. After downloading the updates, when wireless communicator 100 is subsequently pouched with one of the enhanced function devices in its history log, the software/firmware in these enhanced function devices is updated as appropriate. The updated software/firmware may be installed automatically when wireless communicator 100 is pouched with an enhanced function device, or may be prompted manually by a user.

According to an embodiment of the present invention, the settings for the enhanced function devices are restored on the enhanced function devices from the history log on wireless communicator 100, when wireless communicator 100 is subsequently pouched with any of the enhanced function devices.

Figure 46:
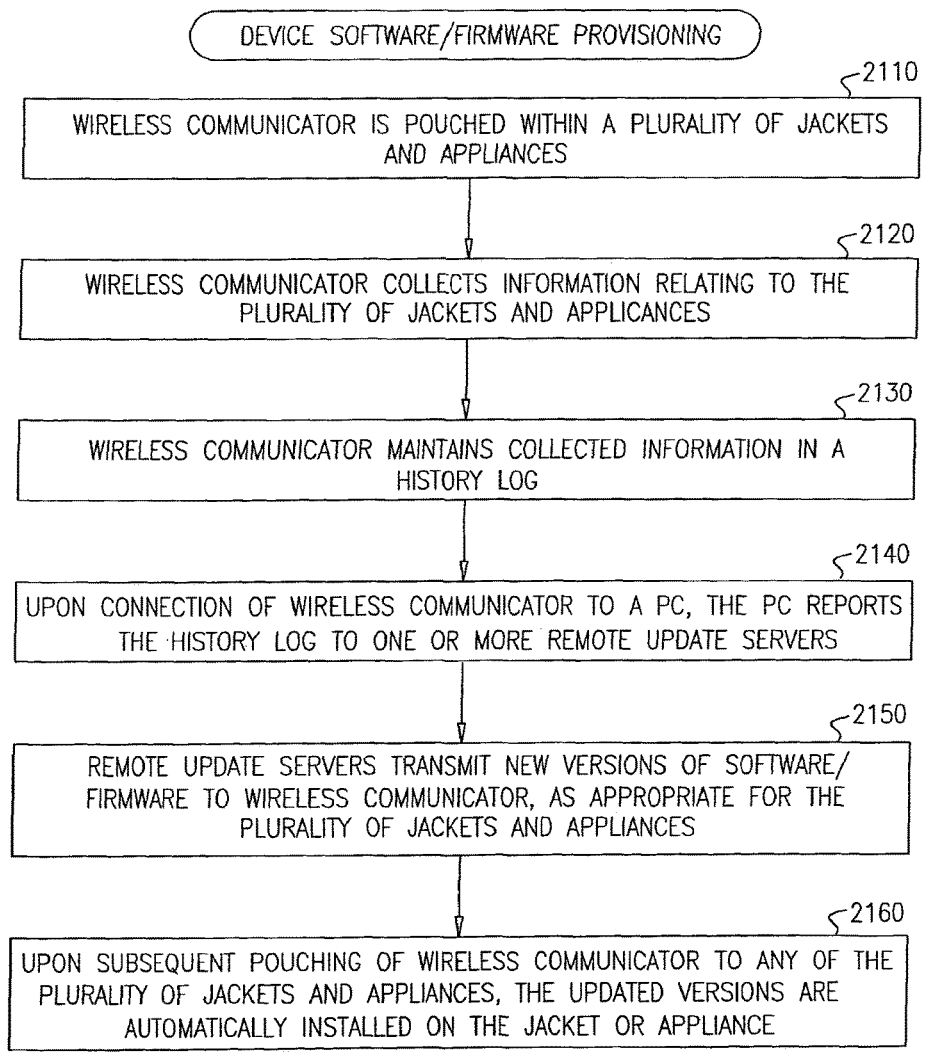
FIG. 46 is a simplified flow chart of a method for provisioning software and firmware updates to a plurality of jackets and appliances using the wireless communicator in accordance with an embodiment of the present invention.

Reference is now made to FIG. 46, which is a simplified flow chart of a method for provisioning software and firmware updates to a plurality of jackets and appliances using the wireless communicator in accordance with an embodiment of the present invention. At step 2110 wireless communicator 100 is pouched in a plurality of jackets and appliances over time. At step 2120 wireless communicator collects information relating to the plurality of jackets and appliances over time, the collected information including versions of installed software/firmware and last defined or modified settings for the jackets and appliances.

At step 2130 wireless communicator 100 maintains a history log of the collected information. At step 2140, wireless communicator 100 is connected to a PC, and the PC reports the history log to one or more remote update servers. At step 2150 the remote update servers transmit new versions of software/firmware to wireless communicator, as appropriate for the plurality of jackets and appliances. At step 2160, upon subsequent pouching of wireless communicator 100 to any of the plurality of jackets and appliances, the updated versions of software/firmware are installed on the jacket or appliance.

10. SD Switch Box in the Wireless Communicator

Embodiments of the present invention enable the wireless communicator baseband modem 120 to bypass NOR flash memory when booting up, enable communication between baseband modem 120 and an enhanced function host device 200, and enable baseband modem 120 to switch in and out of sleep mode without loss of state parameters and code image.

In accordance with an embodiment of the present invention, pouching controller 110 is used to couple enhanced function host device 200 with the wireless communicator's baseband modem 120 and with the wireless communicator's storage 115 embodied as NAND flash memory. Pouching controller 110 serves as an SD switch box, which connects two SD devices, namely, the baseband modem 120 and enhanced function host device 200, and enables switching access to SD storage between the two SD devices.

In an embodiment of the present invention, while pouching controller 110 operates as an SD switch, it is used for allowing two SD hosts embedded within the same housing to access the SD storage. Pouching controller 110 thus enables use of a single storage area accessible by multiple controllers in the same housing, such as modem 120 and an optional application processor. Similarly, pouching controller 110 enables use of a single storage area accessible by modem 120 and external controller 205.

Pouching controller 110 includes a communication mechanism through which baseband modem 120 and enhanced function host device 200 communicate with one another. Such communication mechanism includes an outgoing communicator mailbox via which baseband modem 120 sends a message to enhanced function host device 200, and an incoming communicator mailbox via which enhanced function host device 200 sends a message to baseband modem 120.

The two mailboxes are used to resolve conflicts when both enhanced function host device 200 and the baseband modem 120 want to access SD memory at the same time. Baseband modem 120 sends an access request message to enhanced function host device 200 via the outgoing mailbox, and enhanced function host device 200 responds by sending an access granted message to baseband modem 120 via the incoming mailbox.

Pouching controller 110 is used to couple enhanced function host device 200 with baseband modem 120. When enhanced function host device 200 and baseband modem 120 are coupled, they share use of the wireless communicator's NAND flash memory 115. Pouching controller 110 serves as an SD switch box, which connects two SD devices, namely, baseband modem 120 and enhanced function host device 200, and enables switching access to SD storage between the two SD devices.

Figure 47:
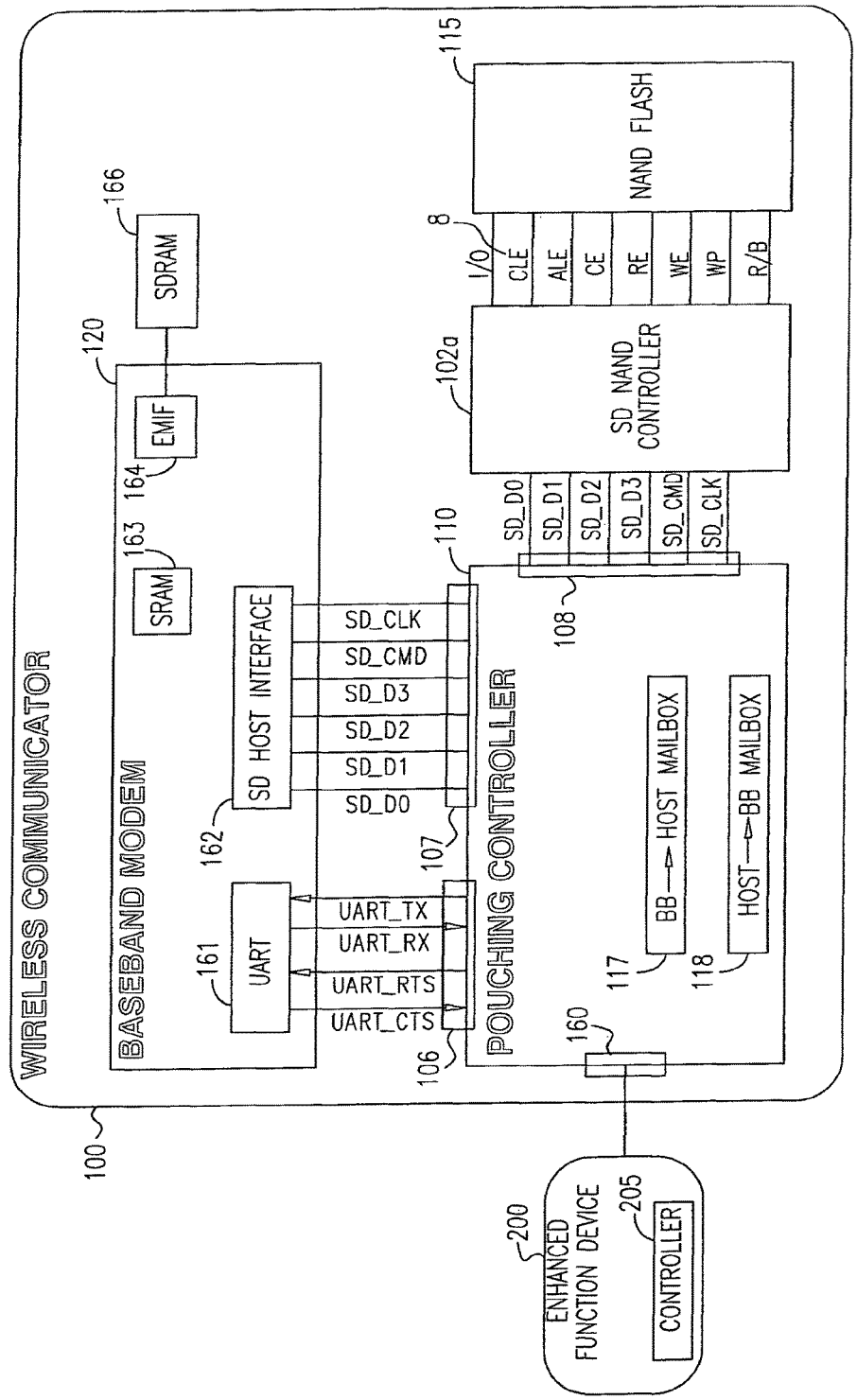
FIG. 47 is a simplified block diagram of the wireless communicator with a pouching controller in accordance with a first embodiment of the present invention.

Reference is now made to FIG. 47, which is a simplified block diagram of wireless communicator 100 with pouching controller 110 in accordance with a first embodiment of the present invention. Wireless communicator 100 includes baseband modem 120, pouching controller 110, a NAND controller 102*a*, and NAND flash memory 115.

Pouching controller 110 is connected to baseband modem 120 via both a UART port 106 and a baseband SD host port 107. Correspondingly, modem 120 includes a UART interface 161 and an SD interface 162, respectively.

Pouching controller 110 is connected to SD NAND controller 102*a* via an SD port 108. During normal operation, baseband modem 120 accesses flash memory 115 via SD port 108.

Pouching controller 110 also includes pouched connector 160 for pouching wireless communicator 100 to enhanced function host device 200, which supports SD connections. When wireless communicator 100 is pouched with enhanced function host device 200, enhanced function host device 200 accesses NAND flash memory 115 via pouching controller 110. It is noted that access to NAND flash memory 115 is not required to pass through base band modem 120. As such, baseband modem 120 may be in sleep mode or shutdown mode during operations between enhanced function host device 200 and NAND flash memory 115.

For memory storage, wireless communicator 100 also includes an internal SRAM memory 163, and an external memory interface (EMIF) 164 connected to an SDRAM memory 166.

Figure 48:
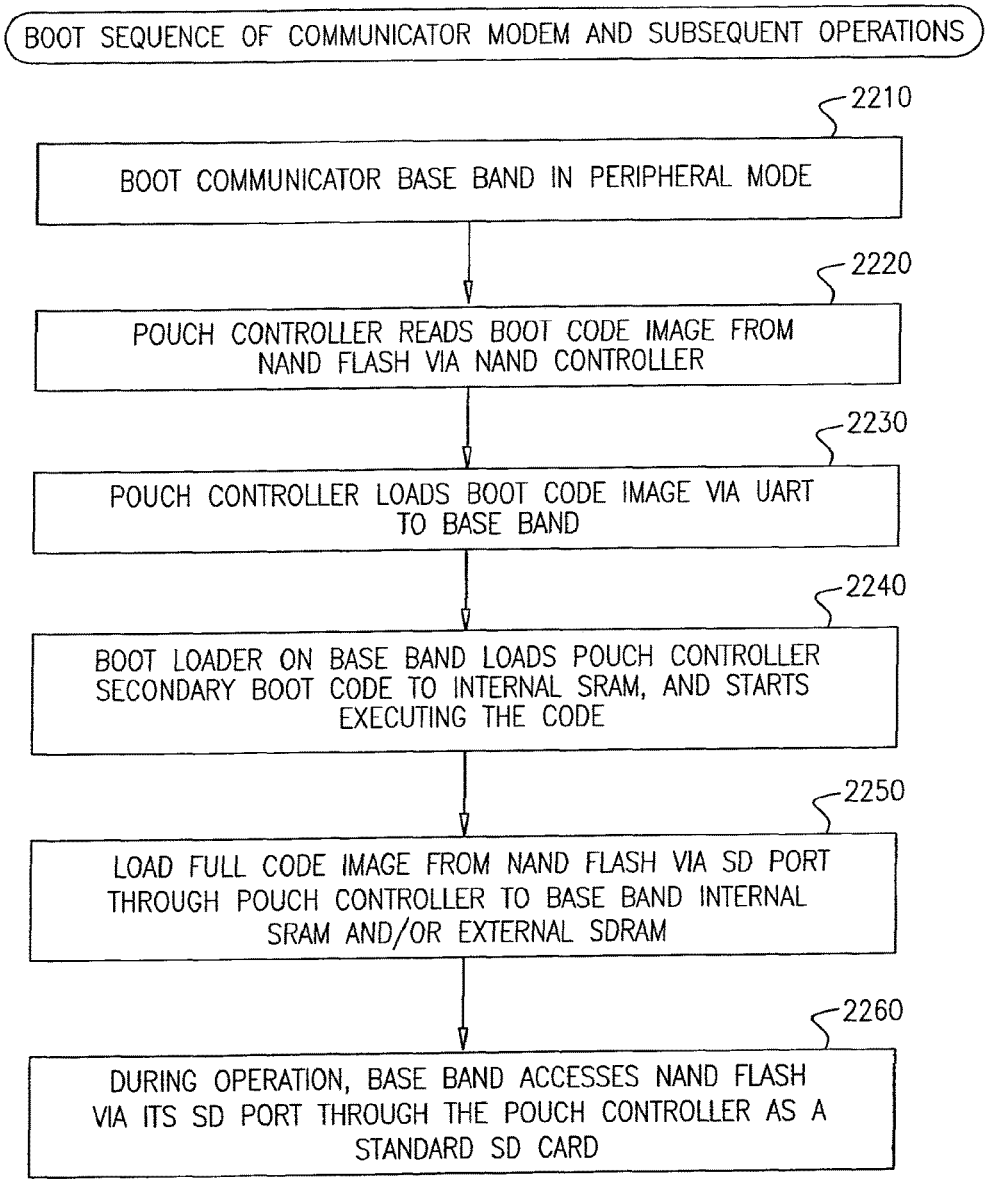
FIG. 48 is a simplified flowchart of a method for booting the wireless communicator's baseband modem, and for performing subsequent operations in accordance with an embodiment of the present invention.

Reference is now made to FIG. 48, which is a simplified flowchart of a method for booting the wireless communicator's baseband modem 120, and for performing subsequent operations in accordance with an embodiment of the present invention. At step 2210 the baseband modem is booted in peripheral mode. In general, when a baseband modem is booted in peripheral mode, the internal ROM code in the modem looks for code that is input via a peripheral interface, including inter alia a UART or a USB interface. The base band modem retrieves such code and transfers it to internal SRAM 163, and then transfers control to SRAM 163.

At step 2220 pouching controller 110 reads a secondary boot code image from NAND flash 115, via NAND controller 102*a*. At step 2230 pouching controller 110 loads the secondary boot code image via its UART port 106 to baseband modem 120.

At step 2240 a boot loader of baseband modem 120 loads the secondary boot code to internal SRAM 163, and begins executing the secondary boot code. At step 2250 the executing code loads the full code image from NAND flash 115 via the pouching controller's SD port 108, to internal SRAM 123 or to external SDRAM 166, or to both. At step 2260, during operation, baseband modem 120 accesses NAND flash 115 via the pouching controller's SD port 108, as a standard SD memory card.

In accordance with an embodiment of the present invention, baseband modem 120 communicates with enhanced function host device 200 via its controller 260, using mailboxes implemented in pouching controller 110. Specifically, pouching controller 110 includes two mailboxes, an outgoing communicator mailbox 117 that is written to by baseband modem 120 and read from by enhanced function host device 200, and an incoming communicator mailbox 118 that is written to by enhanced function host device 200 and read from by baseband modem 120. Pouching controller 110 initiates an interrupt to enhanced function device pouching controller 210 when modem 120 completes a write operation to mailbox 117. Such interrupt may be implemented as an SDIO interrupt on an SD bus, or as a dedicated signal. Similarly, enhanced function device pouching controller 210 initiates an interrupt to baseband modem 120 when enhanced function host device 200 completes a write operation to mailbox 118.

It will thus be appreciated by those skilled in the art that mailboxes 117 and 118 may be used for direct transfer of data between baseband modem 120 and enhanced function host device 200. In one embodiment of the present invention, each mailbox 117 and 118 includes 512 bytes, of which the first two bytes are header bytes that store a message type, and the remaining bytes store the message itself.

Mailboxes 117 and 118 may be mapped to an SDIO register map on the base band modem side and on the enhanced function host device side. Alternatively, mailboxes 117 and 118 may be mapped to SD memory space. In such case an arbitration algorithm is used to resolve conflicts when both enhanced function host device 200 and baseband modem 120 try to access SD storage at the same time.

Figure 49:
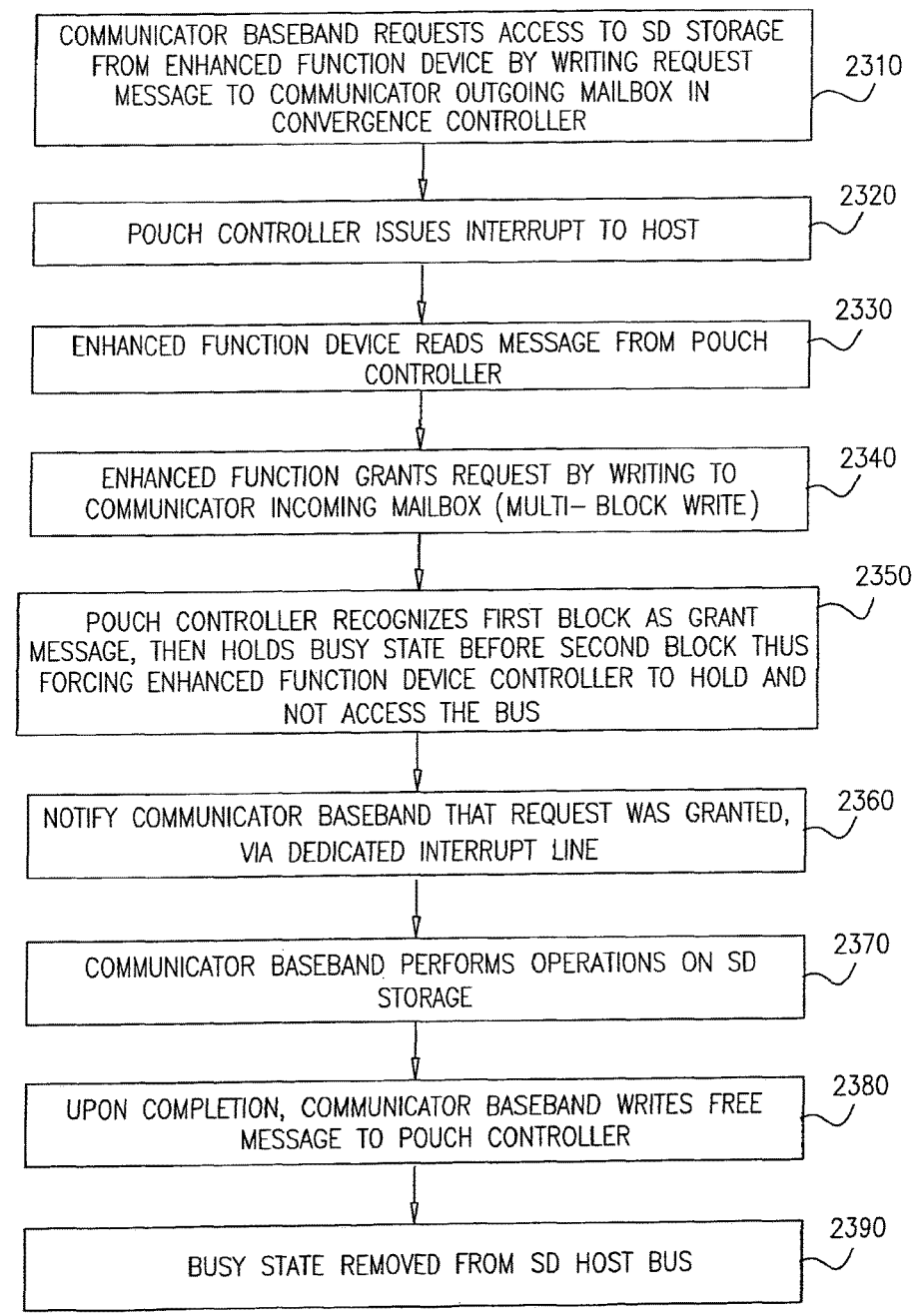
FIG. 49 is a simplified flowchart of a method for communicating between the enhanced function host device and the wireless communicator's baseband modem, and accessing the SD storage, in accordance with an embodiment of the present invention.

Reference is now made to FIG. 49, which is a simplified flowchart of a method for communicating between enhanced function host device 200 and the wireless communicator's baseband modem 120, and accessing SD storage 115 in accordance with an embodiment of the present invention. At step 2310, base band modem 120 requests access to SD storage 115 from enhanced function host device 200, by writing an access request message to mailbox 117. At step 2320 pouching controller 110 issues an interrupt to enhanced function host device 200, to notify enhanced function host device 200 of the message that was written. At step 2330 enhanced function host device 200 reads the message from mailbox 117.

At step 2340 enhanced function host device 200 grants the storage access request by writing an access granted message to mailbox 118. The write operation at step 2340 is performed as a multiple block write operation. Multi-block writes are described in the SD specification, Part I: Physical Layer, Simplified Specification Version 2.00, Sep. 25, 2006.

At step 2340, the first block of the multi-block write includes the grant of access message, and the rest of the blocks are dummy blocks that are filled with zeros. At step 2350 pouching controller 110 recognizes the first block of the message as a grant of access, and holds a busy state on the SD host bus before reading the second block, thereby forcing the enhanced function device pouching controller 210 to hold and not access the SD bus.

At step 2360 baseband modem 120 is notified that its access request was granted, via a dedicated interrupt line, by reading mailbox 118. Baseband modem 120 can then proceed to access SD storage 115. At step 2370 base band modem 120 performs its operations on SD storage 115. At step 2380, upon completion of using SD storage 115, baseband modem 120 writes a free message to pouching controller 110. Finally, at step 2390 pouching controller 110 removes the busy state from the SD host bus.

Generally there is a timeout of 250 msec for a busy period. As such, pouching controller 110 ensures that access to SD storage 115 is shorter than this time.

Figure 50A:
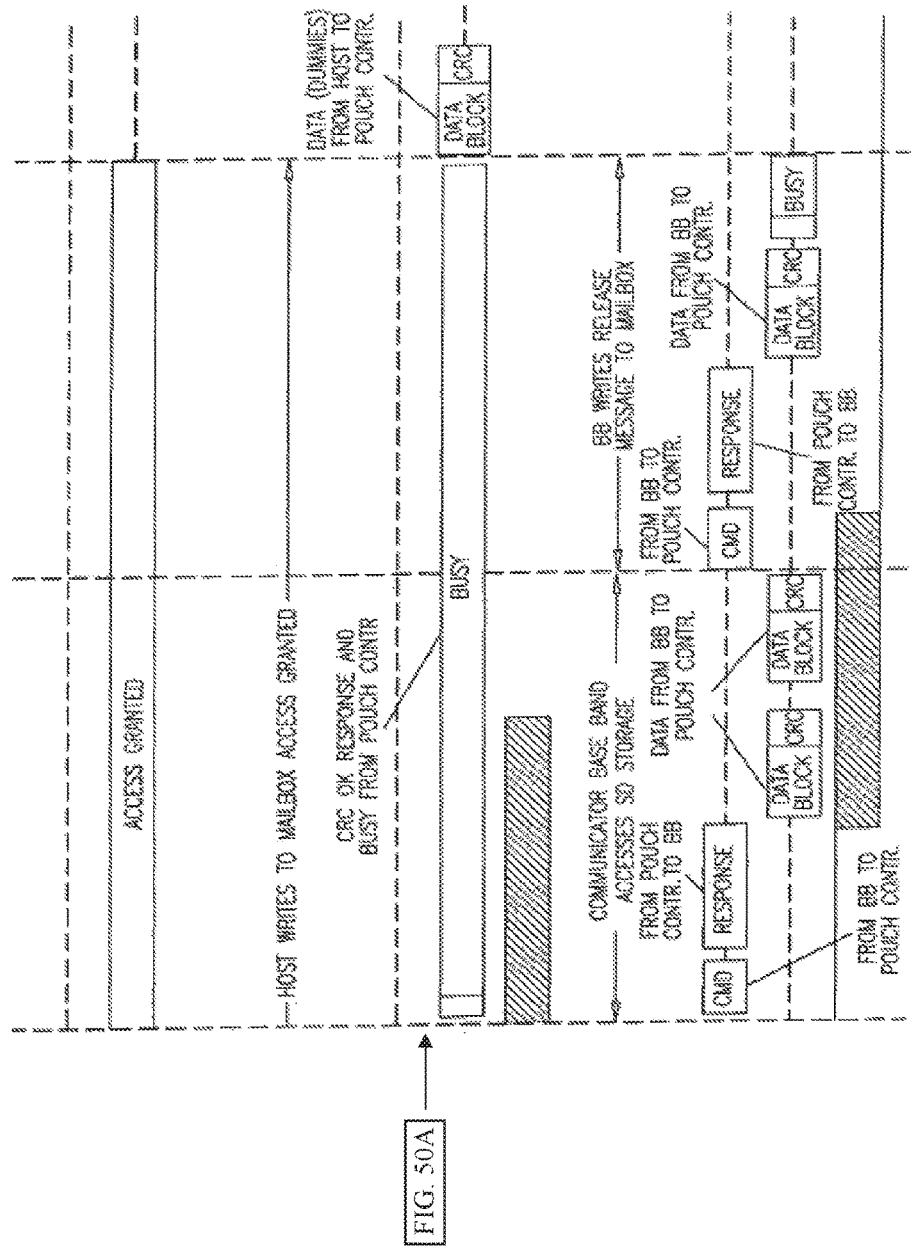
FIG. 50A is a simplified diagram illustrating a process of enabling a baseband modem to access SD storage, where a pouching controller coordinates between the baseband modem and enhanced function host device in accordance with a first embodiment of the present invention.

Reference is now made to FIG. 50A, which is a simplified diagram illustrating a process of enabling a baseband modem to access SD storage, where pouching controller 110 coordinates between the baseband modem and enhanced function host device in accordance with a first embodiment of the present invention. FIG. 50A is arranged as a time line advancing from left to right. Three types of data flow are illustrated along the time line; namely, a logical arbitration state, communication between enhanced function host device 200 and pouching controller 110, and communication between the wireless communicator's base band modem 120 and pouching controller 110.

Logical arbitration involves a protocol for switching access to SD storage 115 between baseband modem 120 and enhanced function host device 200, which share SD storage 115. As described hereinabove with respect to FIG. 49, arbitration operates by means of access requests and access grants written to mailboxes 117 and 118.

Communication between enhanced function host device 200 and pouching controller 110, and between the wireless communicator's baseband modem 120 and pouching controller 110, occurs via command signals, data signals and interrupt signals. Data blocks are followed by CRC error checking codes.

As shown in FIG. 50A, when the wireless communicator's baseband modem 120 wants to access SD storage 115, it writes an access request message to the wireless communicator's outgoing mailbox 117. Thereafter, pouching controller 110 issues an interrupt to enhanced function host device 200, informing it that there is a message waiting in mailbox 117. Enhanced function host device 200 then reads the access request message in mailbox 117, and writes a multi-block access grant message to the wireless communicator's incoming mailbox 118. Pouching controller 110 recognizes the first block of the multi-block as an access grant message, and holds a busy state. Pouching controller 110 issues an interrupt to baseband modem 120, indicating that access to SD storage 115 is granted. Baseband modem 120 then accesses SD storage 115 and performs its requisite operations. Upon completion, baseband modem 120 writes a release message to pouching controller 110, which then releases the busy state. In turn, enhanced function host device 200 is then able to write the second block (dummies) to the wireless communicator's incoming mailbox 118.

Figure 50B:
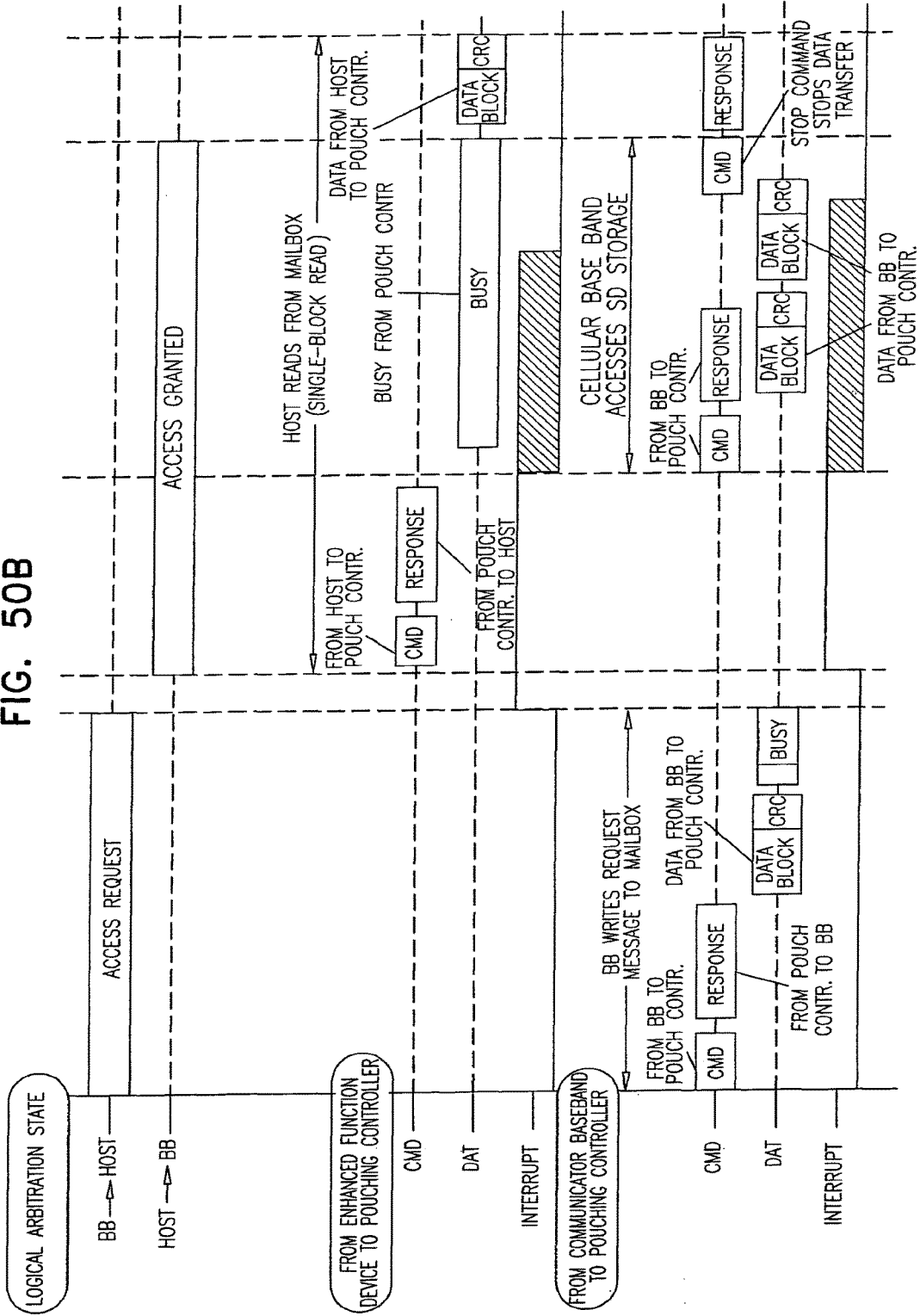
FIG. 50B is a simplified diagram illustrating a process of enabling a baseband modem to access SD storage, where a pouching controller coordinates between the baseband modem and enhanced function host device in accordance with a second embodiment of the present invention.

Reference is now made to FIG. 50B, which is a simplified diagram illustrating a process of enabling a baseband modem to access SD storage, where pouching controller 110 coordinates between the baseband modem and enhanced function host device in accordance with a second embodiment of the present invention. As shown in FIG. 50B, an access grant write command is not needed, and the reading of the baseband modem access request suffices to trigger the busy state for enhanced function host device 200. Whereas in the embodiment of FIG. 50A a multi-block write by enhanced function host device 200 is used to generate the busy state, in the embodiment of FIG. 50B a single-block read suffices to initiate the busy state.

Baseband modem 120 may be idle for a long period of time if no call or data exchange is underway and there is time to wait until a next signaling session with a cellular network. In such case, base modem 120 may drop to a sleep mode. Moreover, in order to conserve power consumption in sleep mode, baseband modem 120 may shut off SDRAM power, which results in losing the code image on SDRAM 166. In order to enable proper operation, baseband modem 120 maintains state parameters in internal SRAM 163. Alternatively, or in addition, base band modem 120 backs up state parameters in internal SRAM 163 prior to going to sleep.

Figure 51:
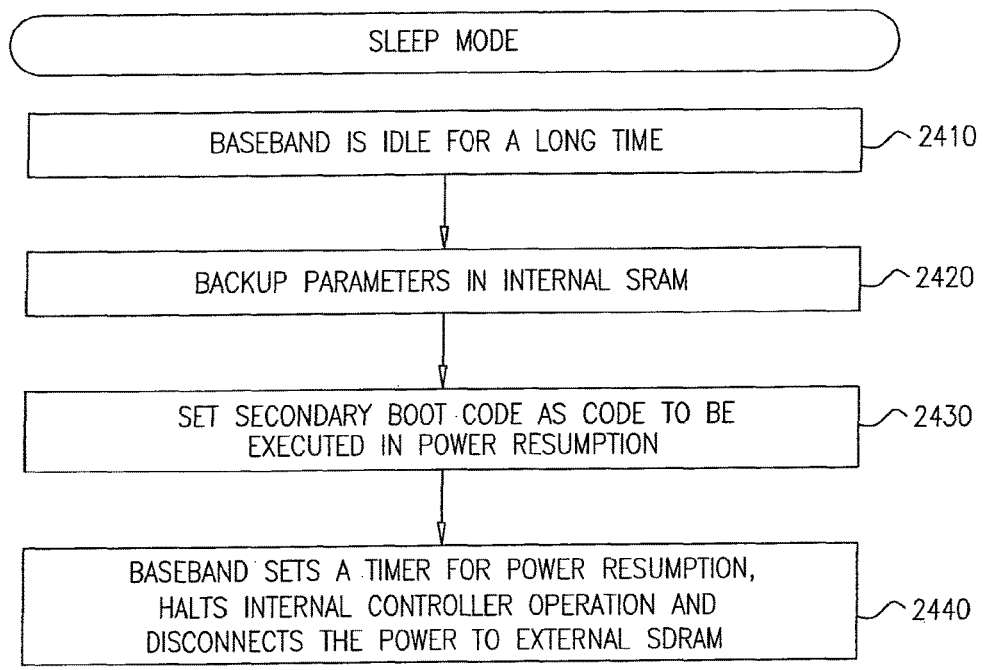
FIG. 51 is a simplified flowchart of a method for a sleep mode in accordance with an embodiment of the present invention.

In this regard, reference is now made to FIG. 51, which is a simplified flowchart of a method for a sleep mode in accordance with an embodiment of the present invention. At step 2410 baseband modem 120 is idle for a long period of time. At step 2420 base band modem 120 backs up state parameters in internal SRAM 163. At step 2430 baseband modem 120 sets the secondary boot code that was loaded to SRAM 163 at step 2240 as the code to be executed upon resumption of power. At step 2440 baseband modem 120 sets a timer for resumption of power, halts internal controller operation, and then disconnects power to external SDRAM 166.

Figure 52:
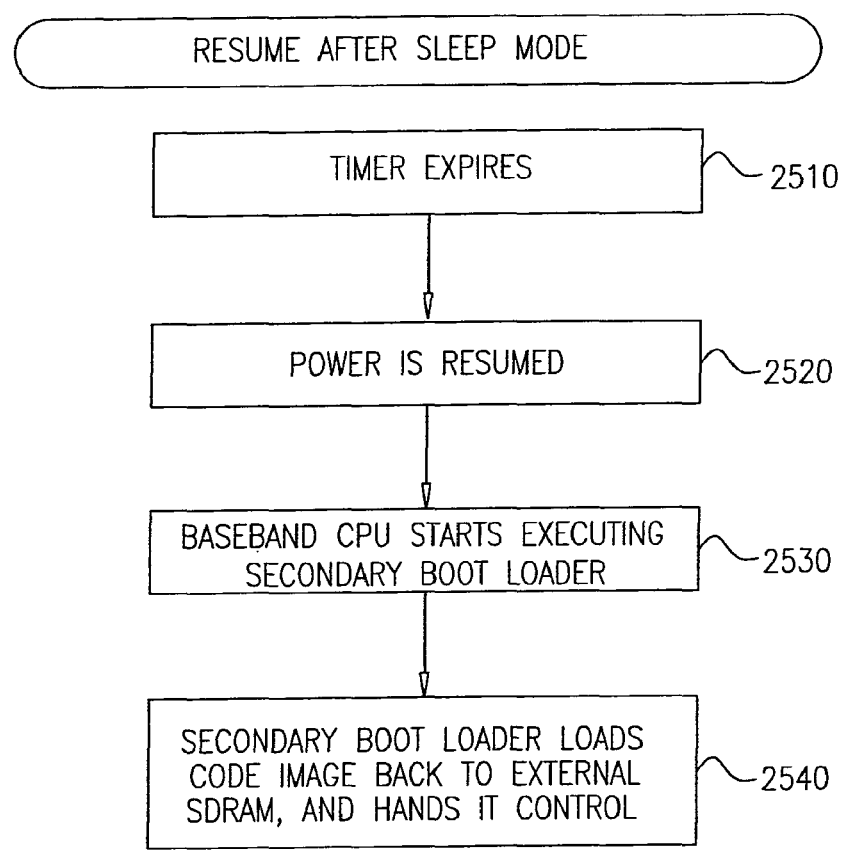
FIG. 52 is a simplified flowchart of a method for resuming operation after a sleep mode, in accordance with an embodiment of the present invention.

Reference is now made to FIG. 52, which is a simplified flowchart of a method for resuming operation after a sleep mode in accordance with an embodiment of the present invention. At step 2510 the timer that was set at step 2440 expires. At step 2520 power is resumed. At step 2530 baseband modem 120 begins executing the secondary boot code, based on the setup defined at step 2430. Finally, at step 2540 the secondary boot code loads the code image into external SDRAM 166, and transfers control thereto.

Figure 53:
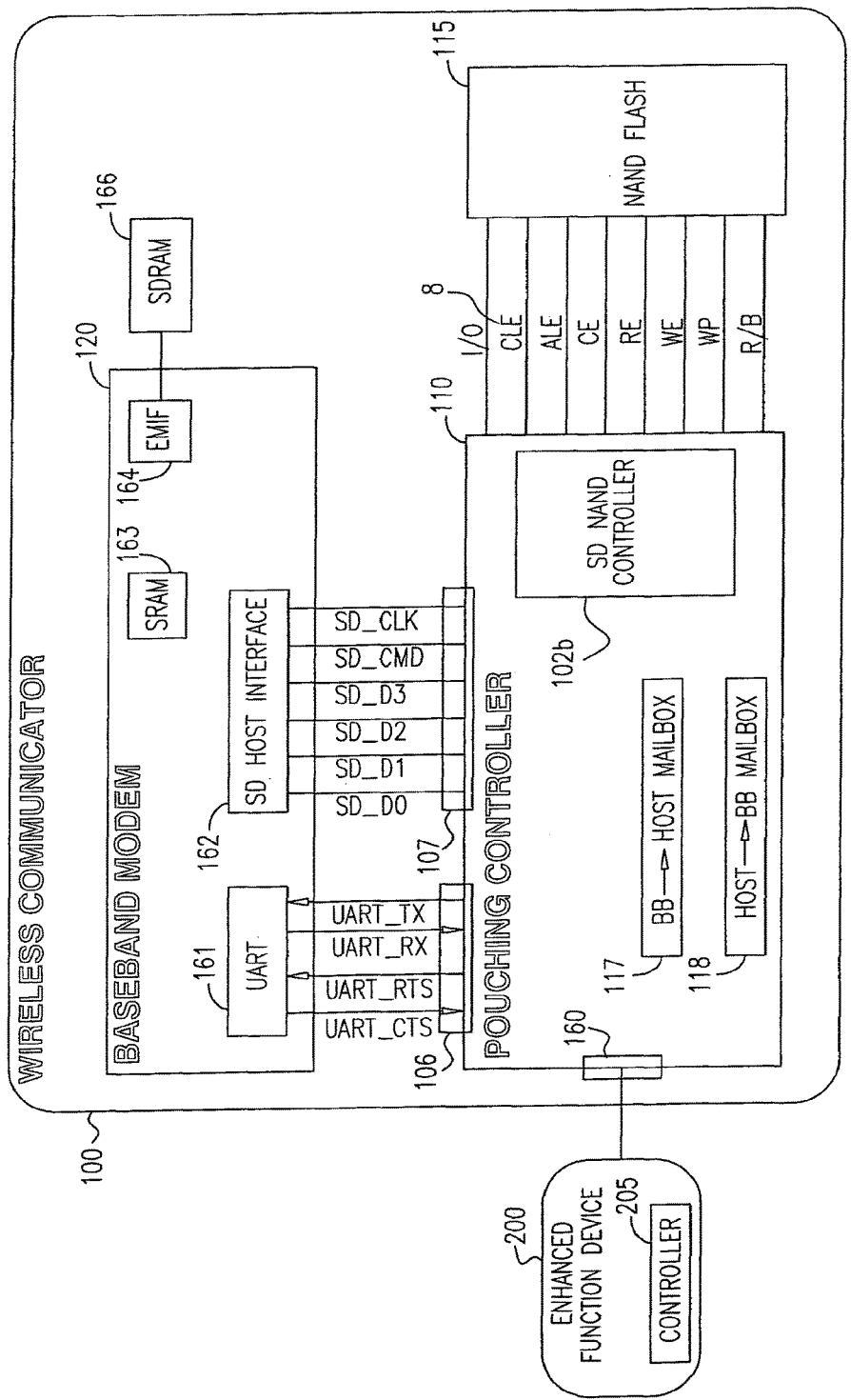
FIG. 53 is a simplified block diagram of a cellular handset, in accordance with a second embodiment of the present invention.

In reading the above description, persons skilled in the art will realize that there are many apparent variations that can be applied to the methods and systems described. In particular, components of FIG. 47 that are shown integrated may be separated, and components that are shown as separated may be integrated. In this regard, reference is now made to FIG. 53, which is a simplified block diagram of a cellular handset in accordance with a second embodiment of the present invention. In the embodiment illustrated in FIG. 53, an SD NAND controller 102*b* is integrated within pouching controller 110. In distinction, SD NAND controller 102*a* is external to pouching controller 110 in FIG. 47.

When SD NAND controller 102*b* is integrated within pouching controller 110, pouching controller 110 can directly access NAND flash 115. As such, at step 2120 of FIG. 48, pouching controller 110 reads the boot code image directly from NAND flash 115, without using an external NAND controller.

11. Power Management of the Wireless Communicator when its Battery Lapses

Embodiments of the present invention concern power management of wireless communicator 100, so as to mitigate the problem of inability to turn on and use wireless communicator 100 even when wireless communicator 100 is connected to an external power source, by graduating power modes via an intermediate limited use mode prior to shut down mode.

More generally, aspects of the present invention concern power management for a mobile electronic device in order to preserve life of a battery, or a battery pack, within the device. The mobile device can run in standalone mode, or in an external power mode. When running in standalone mode the battery loses charge, and when running in external power mode the battery is re-charged by the external power source.

In order to prevent a shutdown of the device, without being able to turn the device back on, when the charge of the battery drops below a power-on reset (POR) threshold, a lockout power mode is enabled prior to the POR threshold being reached. The lockout power mode, referred to as a "provisional mode" and also as an "emergency mode", enables the mobile device to be used only for limited actions and only for a pre-specified period of time. Thus a cellular telephone, for example, in provisional mode, may be turned on and used only for making emergency calls. This enables the user of the telephone to turn on the phone and call for help for a limited time period after his cell phone has shut down. In another scenario, the cellular telephone in provisional mode may be enabled for speed dial calls, thus enabling a child to turn on his phone and call his parents for a limited time period after the child's cell phone has shut down.

The present invention monitors the mobile device's battery voltage and places the mobile device in one of several power mode states, depending on the battery voltage and depending on whether the mobile device is running on its internal battery or connected to an external power source. The transitions between power mode states are controlled so that a user of the mobile device is able to make limited emergency-type actions for a limited time period after the mobile device has been shut down.

Multiple power modes for the mobile device are managed, including a fully operation power mode, a non-operational (shut-down) power mode, and a provisional power mode. The provisional power mode enables the device to be turned on for limited emergency-type use, for a short period of time. Transitions between power modes are governed by increases and decreases in battery voltage, and by the mobile device being connected to or disconnected from an external power source.

Figure 54:
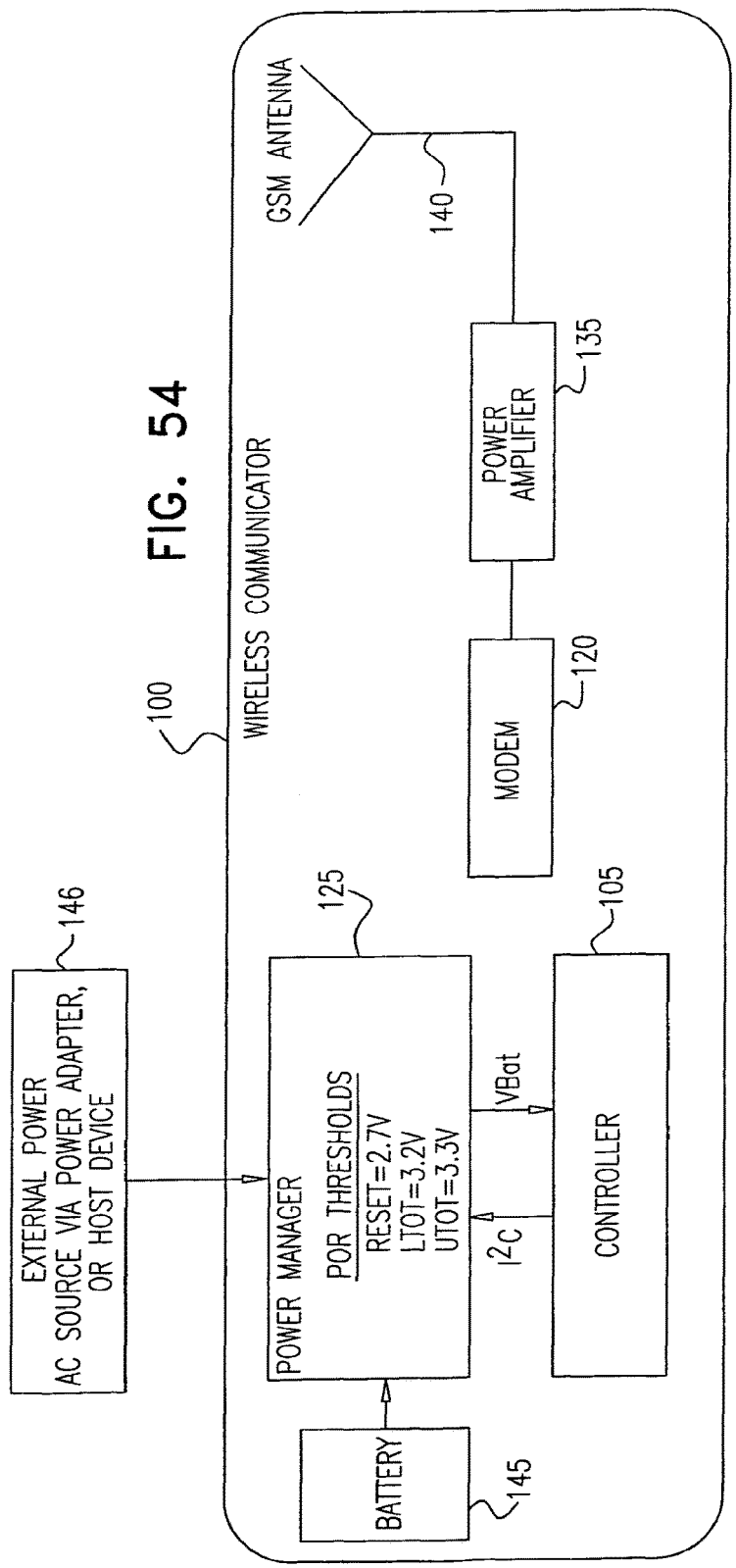
FIG. 54 is a simplified block diagram of a power management system, for preserving life of the battery in the wireless communicator in accordance with an embodiment of the present invention.

Reference is now made to FIG. 54, which is a simplified block diagram of a power management system, for preserving life of battery 145 in wireless communicator 100 in accordance with an embodiment of the present invention. Shown in FIG. 54 is wireless communicator 100 and its baseband modem 120 for transmitting and receiving digital audio signals via its GSM antenna 140. Power amplifier 135 is used to amplify signals transmitted by antenna 140. Wireless communicator 100 operates under control of its dedicated pouching controller 110.

Wireless communicator 100 uses its internal battery 145 for supplying power. In addition, wireless communicator 100 uses an external power adapter 146, for connecting wireless communicator 100 to an external source such as an AC electrical socket, or to an external device, such as a computer, which is able to supply some of its own power to wireless communicator 100.

Wireless communicator 100 may operate in a standalone mode, powered by battery 145. Alternatively, wireless communicator 100 may operate in an external power mode, powered by an external source. In accordance with an embodiment of the present invention, battery 145 is a re-chargeable lithium ion battery, and generally when wireless communicator 100 operates in external power mode, some of the external power is used to charge battery 145.

The voltage on battery 145, denoted by VBat, changes continuously with time. Without being re-charged, VBat for a lithium ion battery typically decays according to a known discharge curve. Wireless communicator's power manager 125 ensures that wireless communicator 100 is shut down when VBat falls below a reset threshold, in order to avoid damage to battery 145 and to wireless communicator 100.

In accordance with an embodiment of the present invention, power manager 125 includes logic for a lockout mechanism that is functional when LTOT<VBat<UTOT, for pre-defined lower and upper turn-on thresholds LTOT and UTOT, respectively, and when wireless communicator 100 is not connected to an external power source. The lockout mechanism serves to put wireless communicator 100 into a provisional mode, also referred to as an emergency mode, in which operation of wireless communicator 100 is limited to one or more emergency functions. Emergency functions may include inter alia making an emergency phone call, and making a speed dial phone call.

In an embodiment of the present invention, LTOT is a threshold below which wireless communicator 100 cannot be turned on, and UTOT is slightly higher than LTOT. Sample settings are LTOT=3.2V and UTOT=3.3V. The provisional mode of the present invention enables wireless communicator 100 to shut down methodically and in a controlled manner, so that it can be turned on for emergency calls after being shut down.

Power manager 125 controls wireless communicator 100 in accordance with TABLE VIII. As indicated in TABLE VIII, when VBat drops below 2.7V, referred to as a "power-on reset" (POR) threshold, then power manager 125 shuts down wireless communicator 100 and prevents it from being turned on. This protects battery 145 from suffering permanent damage. Generally, when VBat drops below 2.7V, power manager 125 asserts a reset signal. The reset remains asserted until a safety period after VBat rises above 2.7V.

When VBat is between 2.7V and 3.2V, then power manager 125 enables wireless communicator 100 to operate in external power mode, but not in standalone mode. The threshold of 3.2V is referred to as a "turn-on" threshold, and also referred to herein as the lower turn-on threshold (LTOT). When wireless communicator 100 is operating in standalone mode and VBat falls below 3.2V, then power manager 125 turns wireless communicator 100 off, and prevents it from being turned back on until VBat rises above 3.2V.

When VBat is above 3.2V then power manager 125 enables wireless communicator 100 to operate in external power mode, and when VBat is above 3.3V then power manager 125 enables wireless communicator 100 to also operate in standalone mode. The threshold of 3.3V is referred to herein as the upper turn-on threshold (UTOT).

However, when VBat is between 3.2V and 3.3V, then power manager 125 limits wireless communicator 100 to operate in provisional mode. In provisional mode wireless communicator 100 can be turned on for a pre-defined time period, such as 30 seconds, and can only be used for one or more emergency functions, such as making an emergency call.

It will be appreciated by those skilled in the art, from the nature of the steep decline at the end of battery discharge curves, that raising the turn-on threshold for cellular telephone 200 from 2.7V to 3.3V has negligible impact on usage time. The drop from 3.3V to 2.7V occurs in a few minutes.

TABLE VIII

Power Management Logic for Wireless Communicator

| Battery Voltage (VBat) | External Power Mode | Standalone Mode |
|---|---|---|
| VBat ≤ 2.7 V | Communicator cannot be turned on. During operation, if the voltage drops below this threshold, then the communicator is automatically turned off. | |
| 2.7 V < VBat ≤ 3.2 V | Communicator cannot be turned on. During operation, communicator operates normally unless the voltage drops below POR threshold (2.7 V) | |
| 3.2 V < VBat ≤ 3.3 V | Communicator can be turned on. Communicator operates normally. | Communicator can be turned on in provisional mode. After a pre-defined time period, the communicator is automatically turned off. |
| VBat > 3.3 V | | Communicator operates normally. During operation, if the voltage drops below the upper threshold (3.3 V), then the communicator is automatically turned off. |

It will further be appreciated by those skilled in the art that the parameter values POR=2.7V, LTOT=3.2V and UTOT=3.3V are example values, and that other values for these parameters are within the scope of the present invention.

Figure 55:
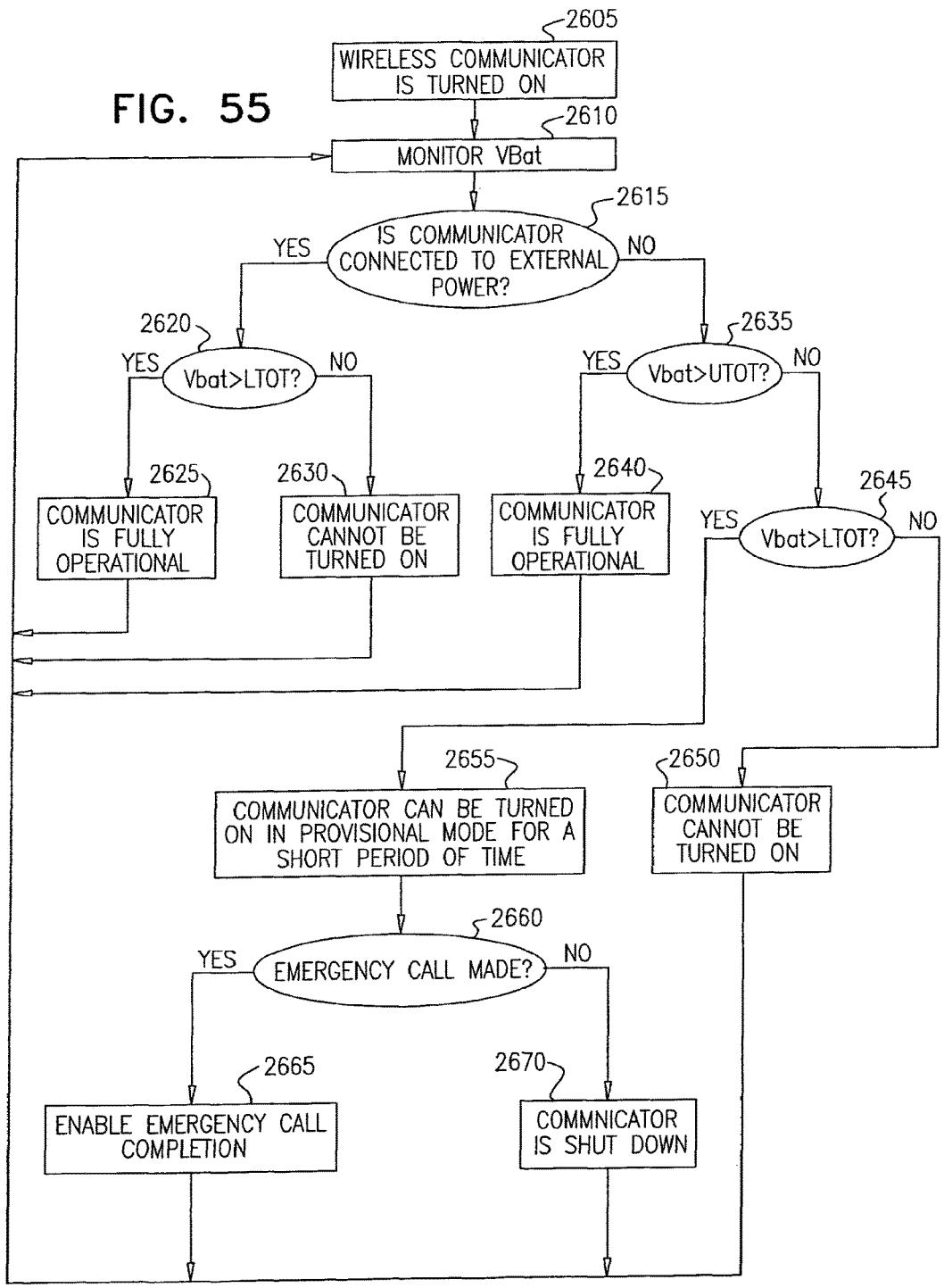
FIG. 55 is a simplified flowchart of a method for preserving life of a battery in the wireless communicator in accordance with an embodiment of the present invention.

Reference is now made to FIG. 55, which is a simplified flowchart of a method for preserving life of a battery in wireless communicator 100 in accordance with an embodiment of the present invention. At step 2605 wireless communicator 100 is turned on. At step 2610 the voltage of wireless communicator's battery 145 is continually monitored. At step 2615 a determination is made whether wireless communicator 100 is connected to an external power source.

If wireless communicator 100 is connected to an external power source, then its internal battery 145 is being charged. At step 2620 a further determination is made whether the battery voltage is higher than a lower turn-on threshold, denoted LTOT. If so, then at step 2625 wireless communicator 100 is power controlled so as to be fully operational. If not, then at step 2630 wireless communicator 100 is power controlled so as to be able to operate, but cannot be turned on after it has been turned off.

Referring back to step 2615, if wireless communicator 100 is not connected to an external power source, then it is running in standalone mode and being powered by its internal battery. The charge on its internal battery is being drained. At step 2635 a determination is made whether the battery voltage is higher than an upper turn-on threshold, denoted UTOT. It so, then at step 2640 wireless communicator 100 is power controlled so as to be fully operational. If not, then at step 2645 a further determination is made whether the battery voltage is higher than the lower turn-on threshold, LTOT. If not, then at step 2650 wireless communicator 100 is power controlled so that it cannot be turned on.

Referring back to step 2645, if the battery voltage is higher than LTOT, then at step 2655 wireless communicator 100 is power controlled so as to turn on to operate only in a limited provisional mode, and only for a pre-specified short period of time. When operating in provisional mode, only limited use of wireless communicator 100 is enabled. Generally, use of wireless communicator 100 is limited to one or more emergency actions. An emergency action may be making an emergency phone call. An emergency action may also be making a speed dial call. This would enable a child to call his parents, for example, if his cell phone battery runs low.

When wireless communicator 100 is operating in provisional mode, and a person uses wireless communicator 100 to make a phone call, a determination is made at step 2660 whether or not the call is an emergency call. If so, then the call is enabled at step 2665. If not, wireless communicator 100 is shut down at step 2670.

The voltage on wireless communicator's battery 145 continually changes. The battery's charge decreases when wireless communicator 100 is operating in standalone mode, and the charge increases when wireless communicator 100 is connected to an external power source. The flowchart of FIG. 55 continually returns to step 2610 to monitor the voltage and power manage the telephone accordingly.

Figure 56:
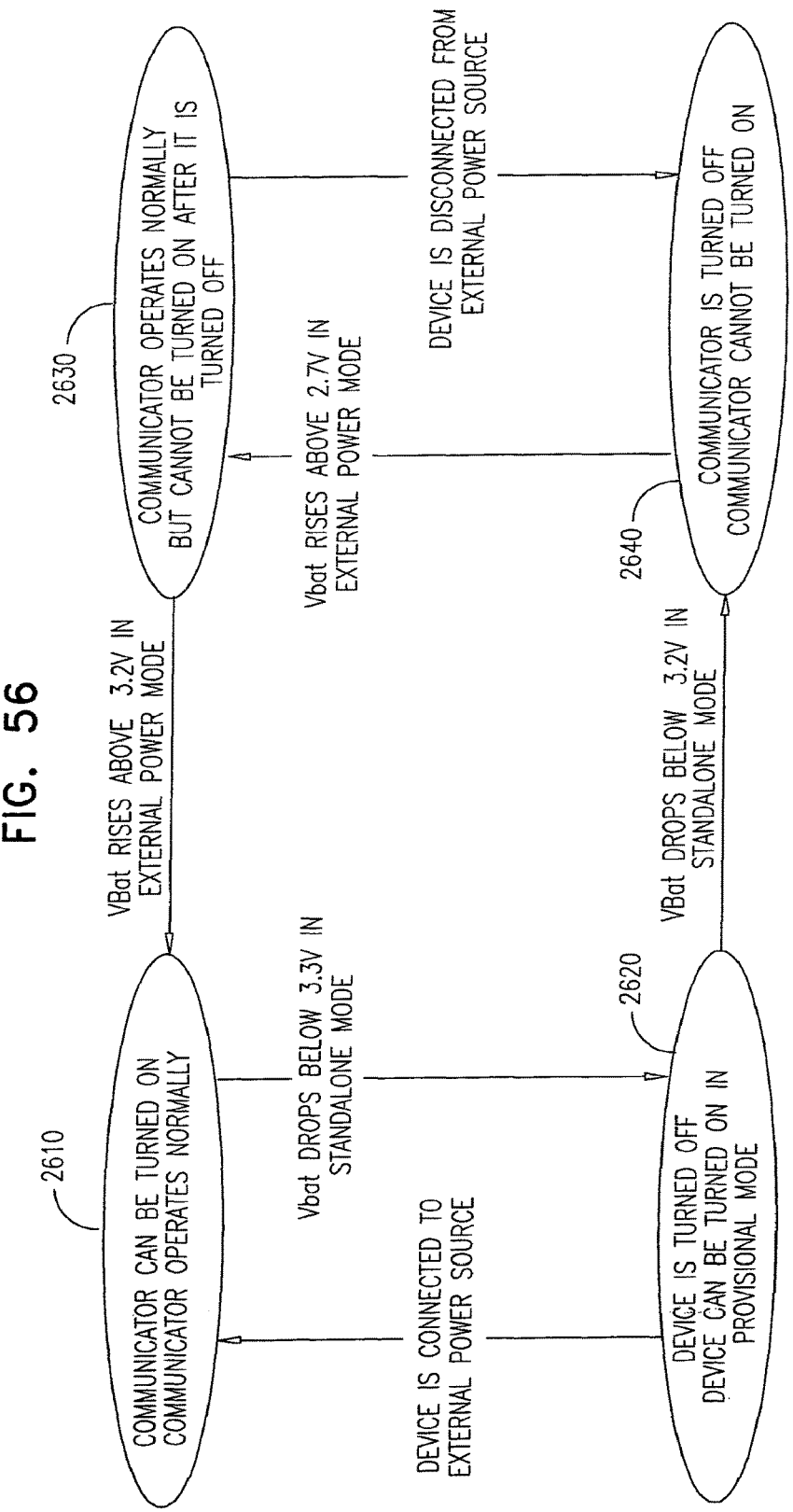
FIG. 56 is a simplified state transition diagram for power modes of the wireless communicator in accordance with an embodiment of the present invention.

Reference is now made to FIG. 56, which is a simplified state transition diagram for power modes of wireless communicator 100 in accordance with an embodiment of the present invention. As shown in FIG. 56, wireless communicator 100 can be in one of four power modes; namely, a fully operational power mode 2610, wherein wireless communicator 100 can be turned on and operates normally;

a provisionally operational mode 2620, wherein wireless communicator 100 can be turned on for a pre-specified amount of time, such as 30 sec., and used for one or more emergency actions;

a critical mode 2630, wherein wireless communicator 100 is operational, but cannot be turned on once it is turned off; and a non-operational mode 2640, wherein wireless communicator 100 is shut down and cannot be turned on.

State transitions from one power mode to another in FIG. 56 occur when the battery voltage, VBat, drops below or rises above one of the thresholds POR, LTOT and UTOT. Voltage drops occur when wireless communicator 100 is operating in standalone mode, and the charge on battery 145 is being drained. Voltage rises occur when wireless communicator 100 is operating in external power mode, and battery 145 is being charged by an external power source.

State transitions in FIG. 56 also occur when wireless communicator 100 is connected to or disconnected from an external power source. The state transitions summarized in FIG. 56 are controlled by power manager 125 and correspond logically to the flowchart of FIG. 55.

In reading the above description, persons skilled in the art will realize that there are many apparent variations that can be applied to the methods and systems described. In particular, the power management system described hereinabove with reference to FIG. 54, and the power management method described hereinabove with reference to FIG. 55 apply to a wide variety of other mobile electronic devices, in addition to wireless communicator 100. Among the actions supported by such devices, certain actions among them are designated as being emergency actions. When the devices are placed into provisional power mode (step 2555 of FIG. 55), only the emergency actions are enabled, and only for a pre-specified period of time.

12. Wireless Communicator Memory Expansion with Direct USB Connection

Embodiments of the present invention relate to wireless communicator 100 and a USB disk drive. The USB disk drive is situated within an enhanced function jacket, referred to herein as USB jacket 200. USB jacket 200 includes a keypad, and attaches to wireless communicator 100.

When wireless communicator 100 is pouched with USB jacket 200, each device enhances the other. Wireless communicator 100 is enhanced by having additional storage and USB connectivity, and USB jacket 200 is enhanced by have wireless communication capability. Wireless communicator 100 may further enhance USB jacket 200 with additional capabilities including a music player and GPS location based services.

When wireless communicator 100 is pouched with USB jacket 200, the jacket's keypad 280 is used to input commands for wireless communicator 100. Such commands for wireless communicator 100 include inter alia dialing a phone call, playing music, and commands for location based applications.

When wireless communicator 100 is not pouched with USB jacket 200, the jacket's keypad 280 may be used to input commands for the USB disk drive. Such commands for the USB disk drive include inter alia locking and unlocking the USB disk drive using a password.

Figure 57A:
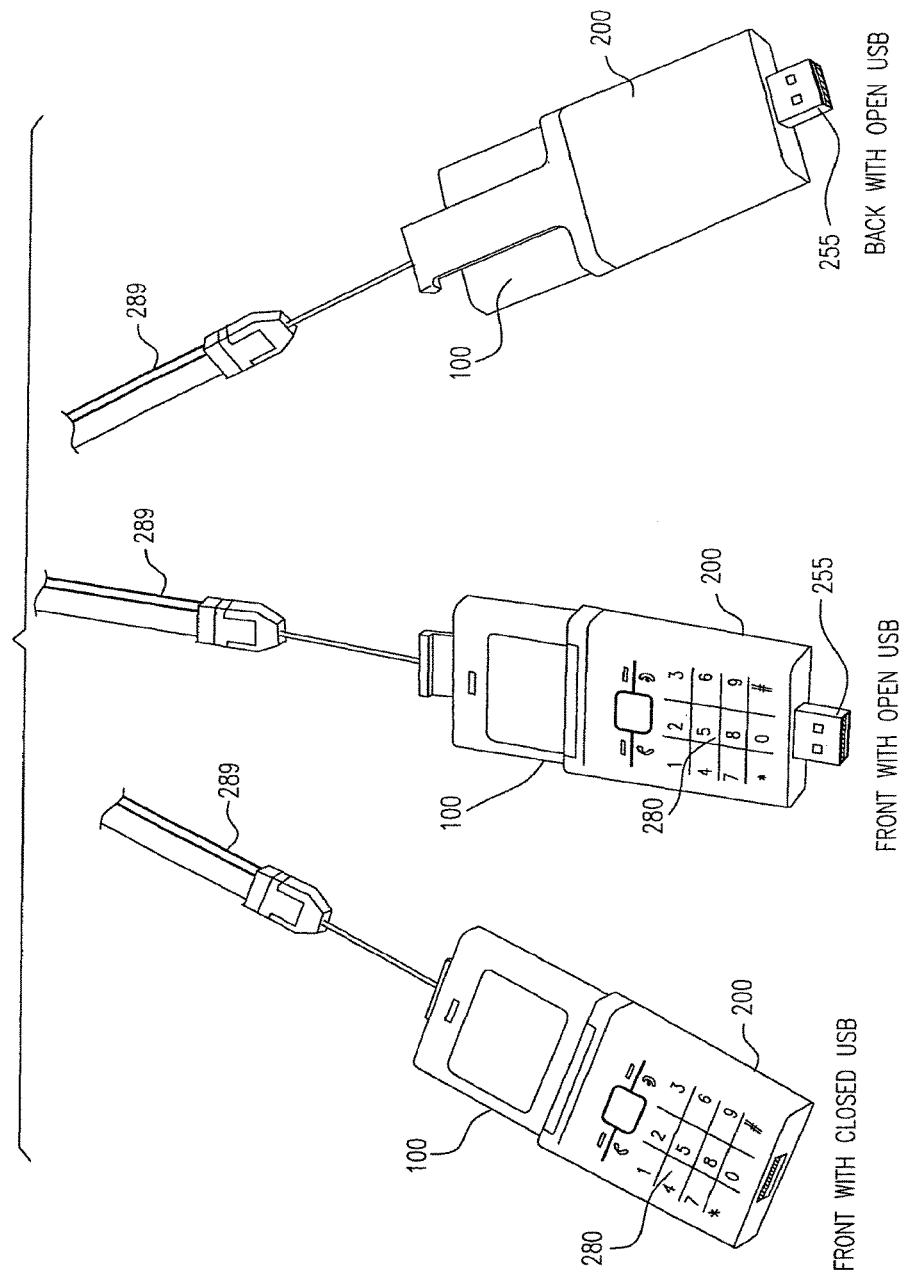
FIGS. 57A and 57B are illustrations of the wireless communicator pouched with a USB jacket in accordance with an embodiment of the present invention.
Figure 57B:
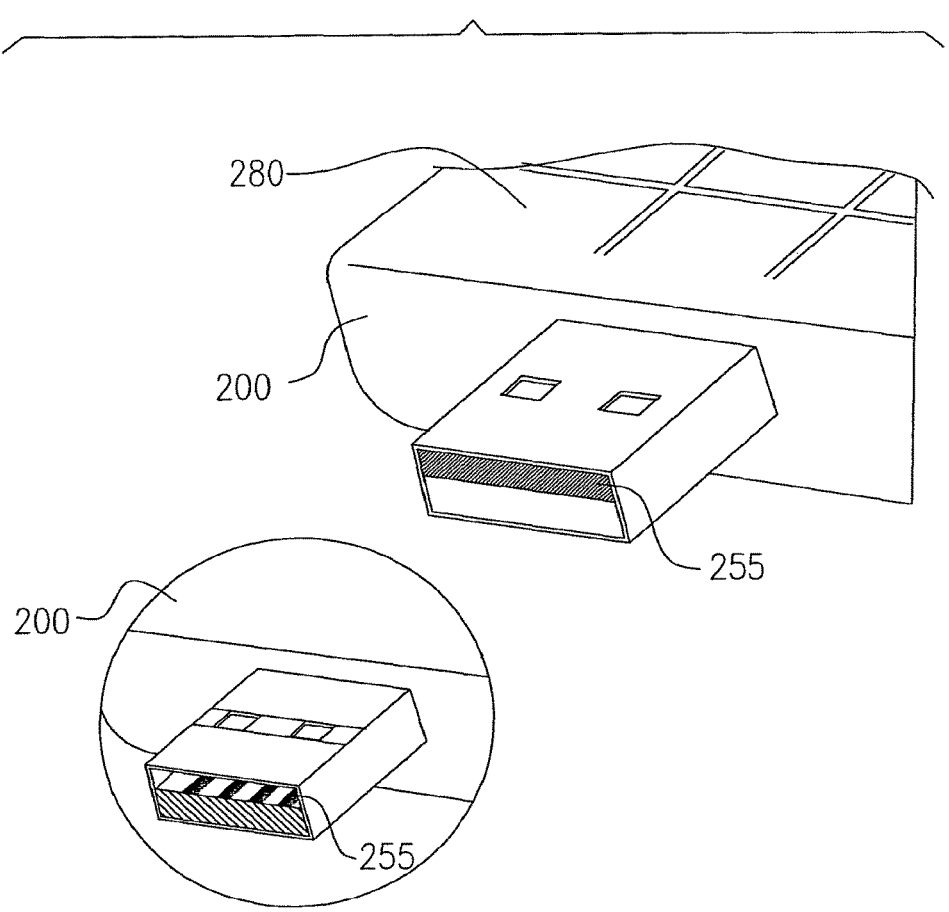

Reference is now made to FIGS. 57A and 57B, which are illustrations of wireless communicator 100 pouched with USB jacket 200 in accordance with an embodiment of the present invention. USB jacket 200 has a storage and functions as a USB disk drive. USB jacket 200 has a USB connector 255 and, as such, USB jacket 200 is readily plugged into a personal computer, or such other device having a USB receptacle.

USB connector 255 is mechanically fastened so that it slides into USB jacket 200. USB jacket 200 includes a strap 289 which, when pulled, causes USB connector 255 to slide back out.

In accordance with an embodiment of the present invention, when wireless communicator 100 is pouched with USB jacket 200, USB jacket 200 enhances the capabilities of wireless communicator 100 by providing inter alia additional storage and USB connectivity. Similarly, wireless communicator 100 enhances USB jacket 200 with wireless communication, and may further enhance USB jacket 200 with GPS location based services, speaker capability, and headset support.

The USB jacket's keyboard 280 has dual functionality. When wireless communicator 100 is not pouched with USB jacket 200, keyboard 280 is used to operate USB jacket 200. For example, keyboard 280 may be used to lock the storage of USB jacket 200 using a password; i.e., the disk drive of USB jacket 200 may be locked and unlocked by entering a password using keyboard 280. When wireless communicator 100 is pouched with USB jacket 200, then keyboard 280 is used to operate wireless communicator 100.

Figure 58:
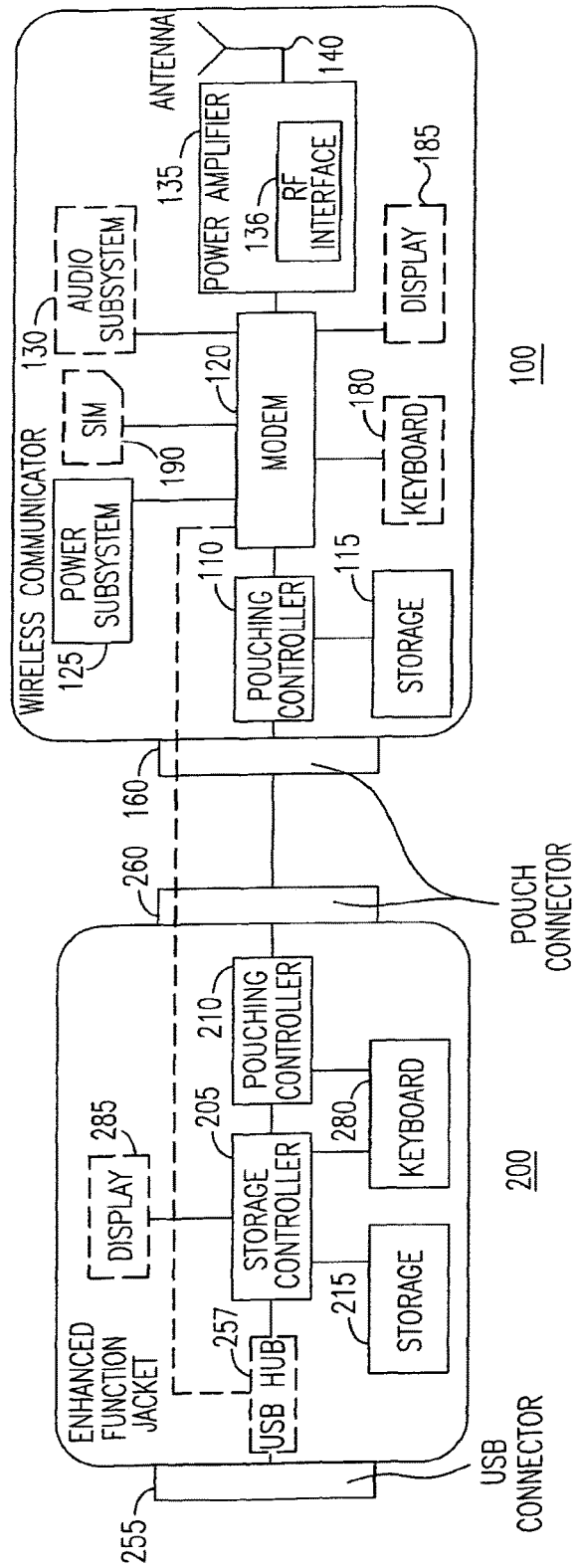
FIG. 58 is a simplified block diagram of the wireless communicator and a USB jacket in accordance with an embodiment of the present invention.

Reference is now made to FIG. 58, which is a simplified block diagram of wireless communicator 100 and USB jacket 200 in accordance with an embodiment of the present invention. Wireless communicator 100 is shown in FIG. 58 with six primary components; namely, pouching controller 110, storage 115, modem 120, power management subsystem 125, power amplifier 135 and pouch connector 160. Wireless communicator 100 is shown with four optional components; namely, audio subsystem 130, keyboard 180, display 185 and SIM 190.

USB jacket 200 is shown in FIG. 58 with six primary components; namely, storage controller 205, pouching controller 210, storage 215, USB connector 255, pouch connector 260 and keyboard 280. USB jacket 200 is shown with an optional USB hub 257 and optional display 285.

In the embodiment shown in FIG. 58, keyboard 280 is connected to storage controller 205, which interprets the keyboard scan codes. Storage controller 205 mediates between keyboard 280 and a USB connected device, such as a personal computer, connected to USB connector 255.

In general, a USB hub allows many USB devices to be connected to a single USB port. USB hub 257 is connected via a USB line to modem 120 or to pouching controller 110 of wireless communicator 100, or to both of them. USB hub 257 enables a device connected to USB connector 255 to access both storage 215 and storage 115.

In the embodiment shown in FIG. 58, access to storage 115 is made via USB hub 257, without passing through pouching controller 210.

In the embodiment shown in FIG. 58, keyboard 280 is connected to storage controller 205 and pouching controller 210. When wireless communicator 100 is pouched with USB jacket 200, pouching controller 210 scans the matrix keyboard for keyboard 280, and passes the scan-code to wireless communicator 100. To avoid ambiguity, only pouching controller 210 initiates the matrix keyboard scanning.

Figure 59:
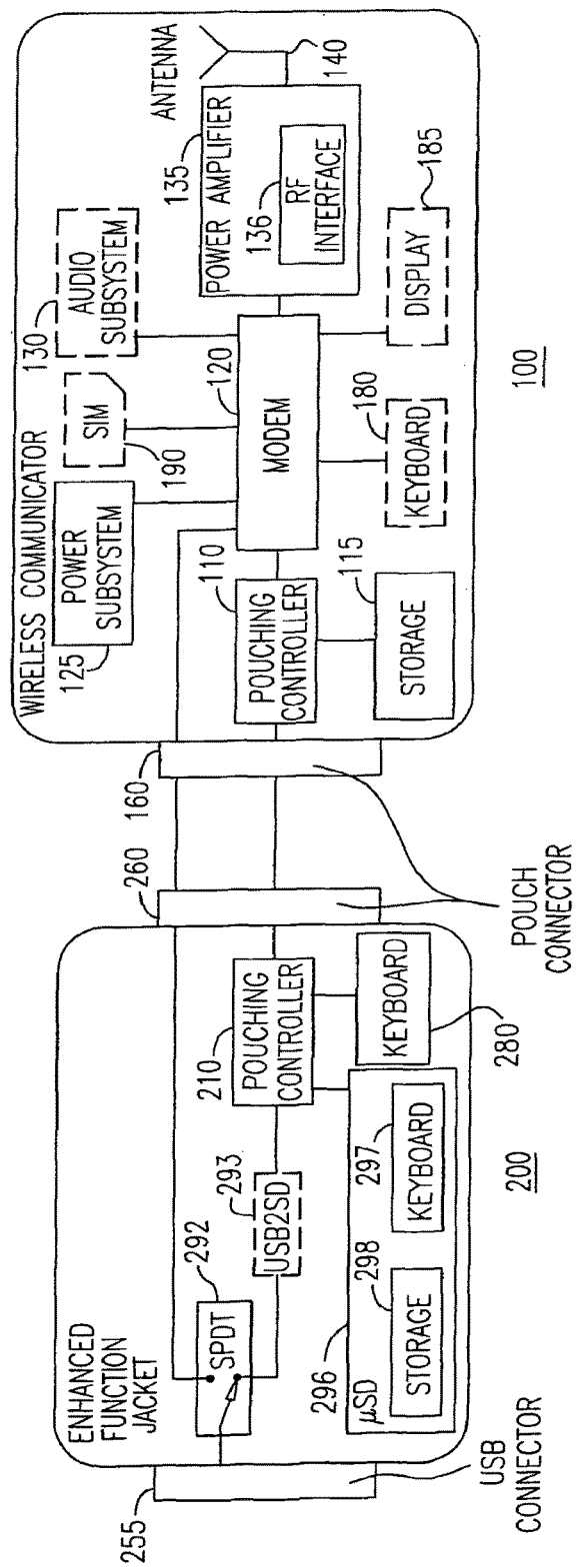
FIG. 59 is a simplified block diagram of the wireless communicator and a USB jacket, in accordance with a second embodiment of the present invention.

Reference is now made to FIG. 59, which is a simplified block diagram of wireless communicator 100 and USB jacket 200, in accordance with a second embodiment of the present invention. The USB jacket shown in FIG. 57 includes pouching controller 210, USB connector 255, pouch connector 260 and keyboard 280.

In addition, the USB jacket in FIG. 59 includes a micro-SD card 296, a single-pole double-throw (SPDT) switch 292, and a USB2SD bridge 293 between USB to SD. The AU6336 SD/MMC card reader controller manufactured by Alcor Micro, Corp. of Taiwan, may be used for USB2SD bridge 293. Micro-SD card 296 includes a controller 297 and a storage 298. It is noted that in distinction, the jacket controller and storage are separate components in the embodiment shown in FIG. 58. SPDT switch 292 is controlled by pouching controller 210, and enables connection of USB jacket 200 with wireless communicator 100 directly via modem 120 or via pouching controller 110. A proprietary command over the USB channel, such as an SCSI transparent method, instructs pouching controller 210 to changes the state of SPDT 292.

It will be appreciated by those skilled in the art that the system of FIG. 59 enables a USB host device that is connected to USB jacket 200 via USB interface 255 to directly access storage 298, by translating the USB protocol into the SD protocol, and routing through pouching controller 210, or to indirectly access storage 115. Pouching controller 210 dynamically routes access to appropriate storage 115 or 298 to the USB host device. Pouching controller 210 introduces the USB device to both storage 115 and 298, as a combined storage area or as two separate storage areas.

13. Modular Audio Player that Pouches with a Host Media Player

Embodiments of the present invention relate to a modular audio player, referred to herein as the "modular player", that may be pouched with a digital media player, referred to herein as the "host" or the "host player", such as an MP3 player that may be pouched with an MP3/MP4 player. Both players have memories for storing digital files, and the host's controller or the modular audio player's controller, or both controllers, are able to automatically or manually synchronize files stored in the two memories.

The host player has its own battery, its own non-volatile memory for storing media files, and its own controller. The host player generally includes a display, and includes user interface controls to organize, select, play and view metadata for songs or video files.

The modular player may be hosted by the host player when pouched therewith. The modular player is also a standalone audio player, but with limited features in comparison to the host player. The modular player includes its own battery sub-system, its own removable non-volatile memory for storing digital audio files, and its own controller. The modular player also includes a wireless modem, including inter alia a cellular modem, a WLAN modem or a WiMax modem, which enables download of digital media files from remote sources. The modular player generally does not have its own display, and generally has a limited user interface to play a song, to advance to a next song, and to return to the beginning of a song.

The modular player is used in circumstances where it is convenient for a user to handle a small player. When a user is jogging, for example, it is easier for him to carry a small player.

The media files played by either player may be obtained via the host's connection to remote media sources, via physical USB or SD connection, or via wireless connection. The media files may also be obtained via the modular player's wireless modem connection. Media files obtained via the modular player's wireless modem may be transferred to the host player. As such, the modular player may be used to download files intended for the host player, such as video files, which generally cannot be played on the modular player.

In one embodiment of the present invention the host controller synchronizes the media files stored on the host player and the modular player. In another embodiment of the present invention, the modular player's controller synchronizes the media files stored on the host player and the modular player. Synchronization of media files is based primarily on the media formats that each player supports. Generally, the modular player supports only audio formats, such as MP3 formats, where the host player supports also video formats, such as MP4 formats. As such, when the two players interact to synchronize their respective memories, only files supported by each player are stored in the player.

Additionally, synchronization is governed by user preferences. For example, a user may specify that those songs which are most often played or most recently played, or which have high rankings, are to be shared on both players.

Figure 60A:
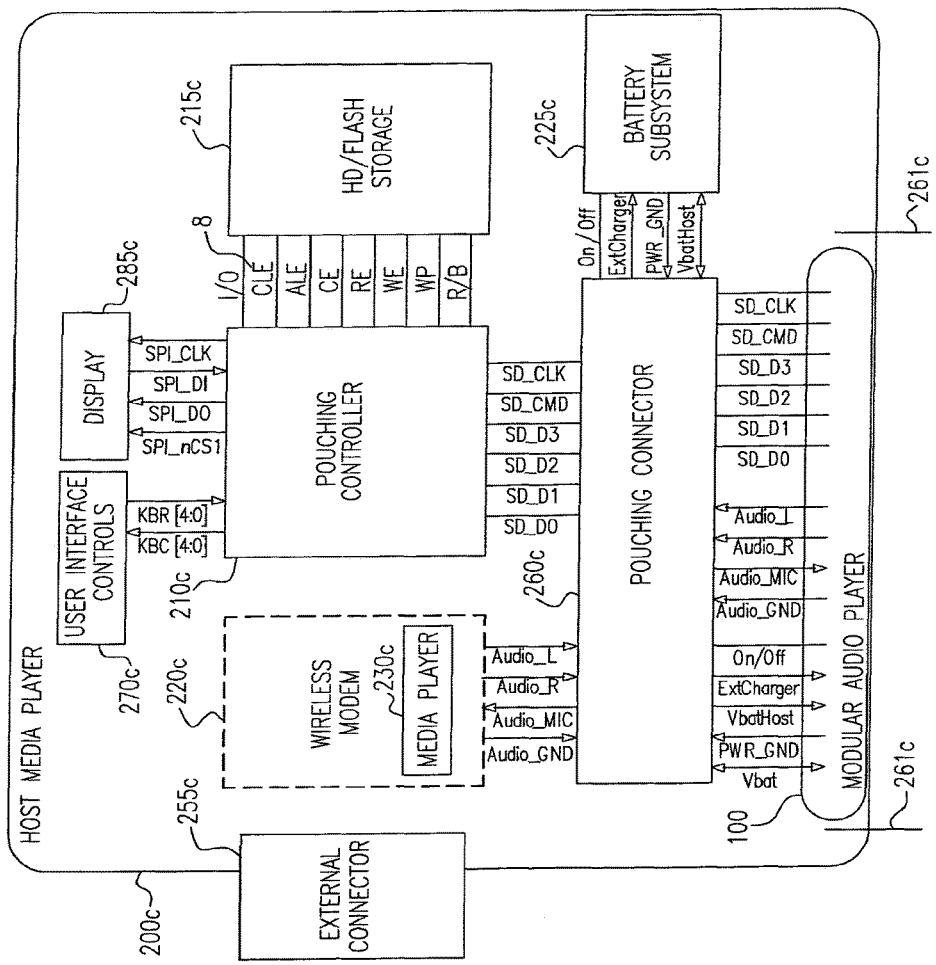
FIGS. 60A and 60B are simplified block diagrams of a modular audio player pouched with a digital media player in accordance with an embodiment of the present invention.
Figure 60B:
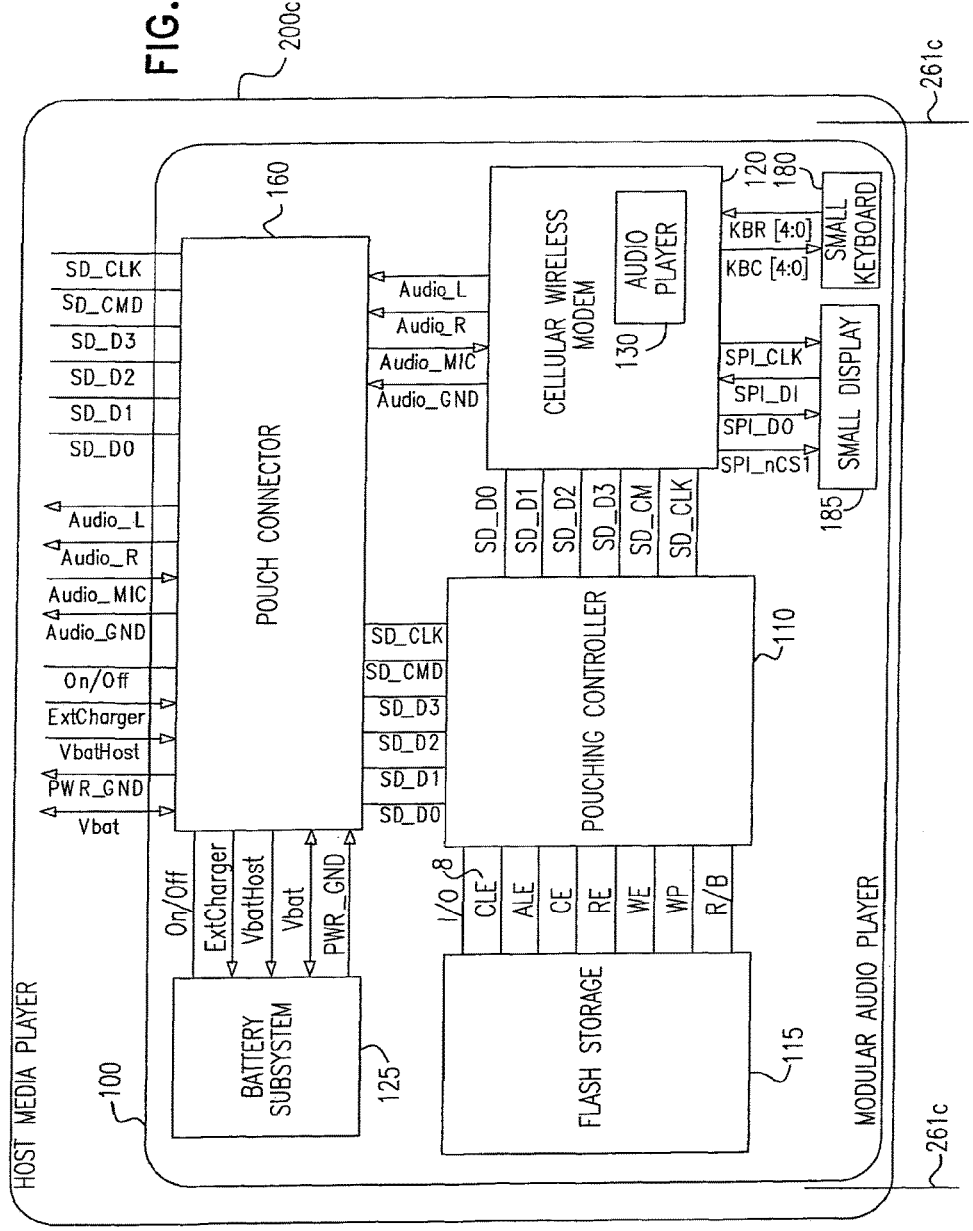

Reference is now made to FIGS. 60A and 60B, which are simplified block diagrams of a modular audio player pouched with a digital media player in accordance with an embodiment of the present invention. Shown in FIGS. 60A and 60B are a host media player 200c and a modular audio player 100. Modular audio player 100 can be pouched with host media player 200c. Modular audio player 100 slides in and out of host media player 200c along tracks 261c. Host media player 200c and modular audio player 100 are operative to play songs stored in digital audio files. Host player 200c is also operative to play video files.

Host media player 200c includes a player module 230c. Host player 200c also includes a storage unit 215c, which is generally HD or flash memory, for storing digital media files. Host media player 200c also includes a battery subsystem 225c for powering player module 230c.

Modular audio player 100 includes a player module 130. Modular audio player 130 also includes a storage unit 115, which is generally a built-in flash memory such as NAND flash or a detachable memory card such as an SD card, or both, for storing digital audio files.

Modular audio player 100 is powered by a battery subsystem 125 that includes a small removable battery. Battery subsystem 125 is charged by battery subsystem 225c, when modular audio player 100 is pouched with host player 200c. When modular audio player 100 is not pouched with host player 200c, it is powered by battery subsystem 125, until the stored charge in battery subsystem 125 is exhausted. Battery subsystem 125 may also be charged from an external power source, via a charger, or via a USB connection.

Pouch connectors 160 and 260c are used to transfer data and power between host media player 200c and modular audio player 110.

Incoming data may be transferred to host media player 200c via an external connector 255c, such as a USB port or an SD connector, or both. Host media player 200c may optionally include a wireless modem 220c, through which data is received from remote sources.

Modular audio player 100 includes a wireless modem 120c, which is generally a cellular modem.

Host player 200c includes pouch controller 210c, and removable audio player 100 includes pouch controller 110. Controllers 110 and 210 are operative to store incoming digital files on either or both of host memory 215c and removable player memory 115, automatically or manually as instructed by a user. Synchronization of files between the host media player 200c and modular audio player 100 is described hereinbelow with respect to FIGS. 61 and 62.

Host media player 200c is large enough to include a display 285c, for displaying command menus and song metadata to a user, and for displaying videos. Host media player 200c also includes user interface controls 270c, for organizing, playing and selecting media files. User interface controls 270c also enable a user to manage files stored in host memory 215c and removable player memory 115. User interface controls 270c enable a user to select to which or both of memories 115 and 215c incoming files are to be saved. User interface controls 270c also enable a user to add and delete files from memories 115 and 215c, and to copy media files from one memory to another.

As distinct from host media player 200c, modular audio player 100 may not have a display at all, or may have a simple LCD display 185. Modular audio player 100 includes limited user interface controls 170 including a small keyboard 180. Keyboard 180 enables a user to perform basic functions, including inter alia playing a song, advancing to a next song, and returning to the beginning of a song.

Host media player 200c may or may not be operative to play media when modular player 100 is not pouched therewith.

It will be appreciated by those skilled in the art that the configuration illustrated in FIGS. 60A and 60B is but one of many possible implementations of the present invention, and that the various components in FIGS. 60A and 60B may be positioned and inter-connected differently than the specific configuration illustrated in FIGS. 60A and 60B, within the scope of the present invention.

Figure 61:
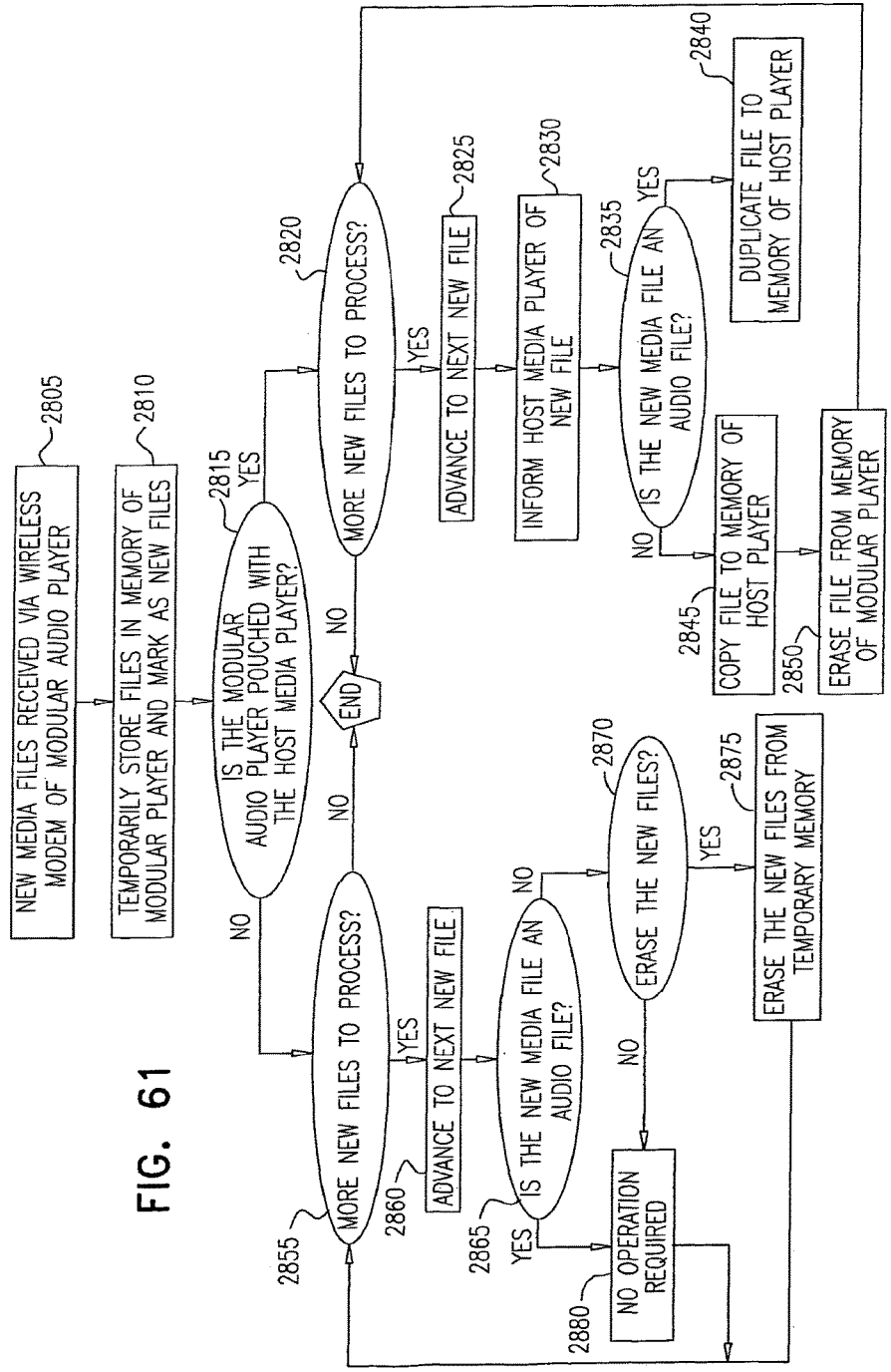
FIG. 61 is a simplified flowchart of a method for synchronizing media files between the host media player and the modular audio player, when the media files are received by the modular player in accordance with an embodiment of the present invention.

Reference is now made to FIG. 61, which is a simplified flowchart of a method for synchronizing media files between host media player 200c and modular audio player 100, when the media files are received by modular audio player 100 in accordance with an embodiment of the present invention. At step 2805 new media files are downloaded via cellular wireless modem 120 of modular audio player 100. At step 2810 the files are stored in a temporary allocated memory of storage 115, and marked as new files. The new files are classified as being audio files or other files.

At step 2815 a determination is made whether or not modular audio player 100 is currently pouched with host media player 200c. If so, then at step 2820 a determination is made whether there are more new files to process. If so, then at step 2825 processing advances to the next new file. At step 2830 a message is sent to host media player 200c, indicating that there is a media update. At step 2835 a determination is made whether the new file currently being processed is an audio file. If so, then at step 2840 a duplicate copy of the file is written to storage 215c of host media player 200c. Processing then advances to step 2820, to process the next file. If all of the new files have already been processed, then the synchronization ends. If the new file currently being processed is not an audio file, as determined at step 2835, then at step 2845 the file is copied to storage 215c of host media player 200c, and at step 2850 the new files is erased from storage 115. Processing then advances to step 2820.

If modular audio player 100 is not currently pouched with host media player 200c, as determined at step 2715, then at step 2855 a determination is made whether there are more new files to process. If so, then at step 2860 processing advances to the next new file. At step 2865 a determination is made whether the new file currently being processed is an audio file. If not, then at step 2870 a determination is made, generally based on user preferences, whether or not to erase the new file from storage 115 or else to keep the new file in storage 115 until modular player 100 is subsequently attached to host player 200c. If so, then at step 2875 the new file is erased. Otherwise, at step 2880 no operation is required. Processing then advances to step 2855, to process the next file. If the new file currently being processed is an audio file, as determined at step 2865, then at step 2880 no operation is required. When modular audio player 100 is subsequently attached to host media player 200c, the new audio files in storage 115 may be transferred to host storage 215c. Processing then advances to step 2855.

Figure 62:
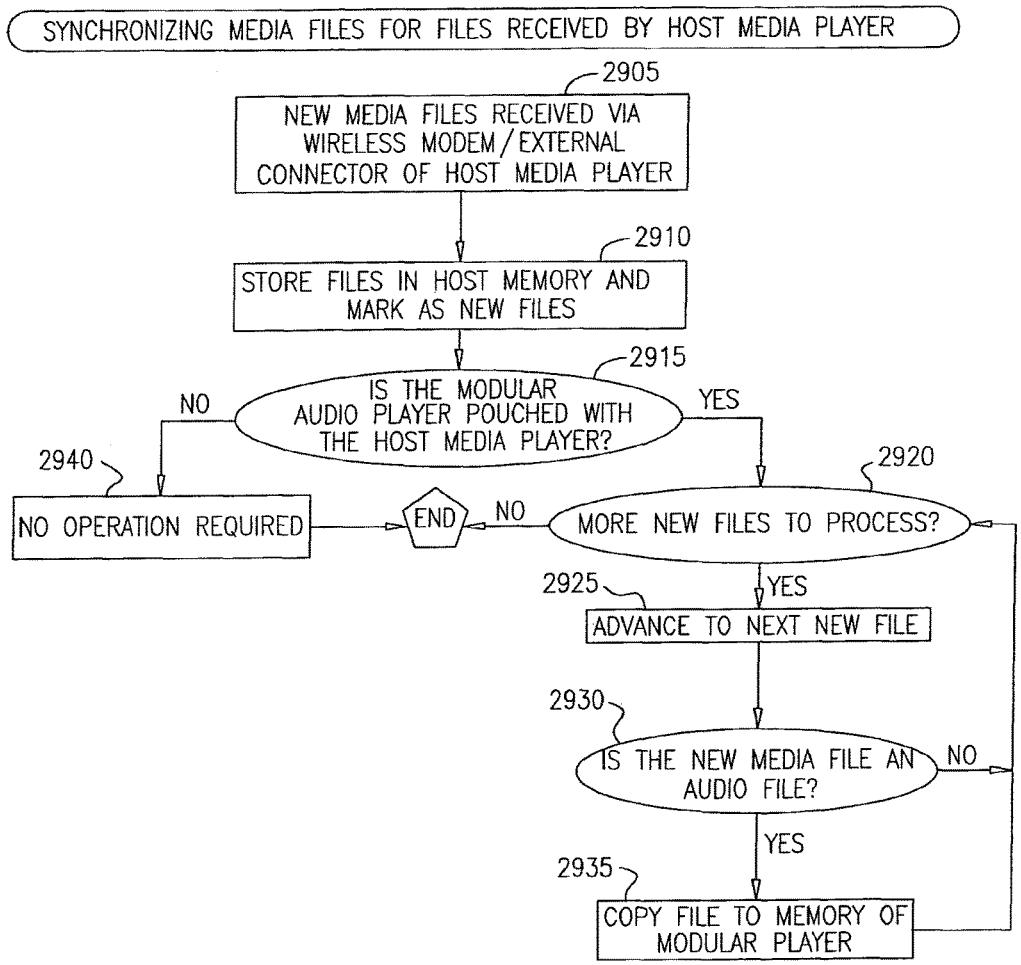
FIG. 62 is a simplified flowchart of a method for synchronizing media files between the host media player and the modular audio player, when the media files are received by the host player in accordance with an embodiment of the present invention.

Reference is now made to FIG. 62, which is a simplified flowchart of a method for synchronizing media files between host media player 200c and modular audio player 100, when the media files are received by host player 200c in accordance with an embodiment of the present invention. At step 2905 new media files are received by host media player 200c, via wireless modem 220c or external connector 255c. At step 2910 the files are stored in host memory 215c and marked as new files. The new files are classified as being audio files or other files.

At step 2915 a determination is made whether modular audio player 100 is currently pouched with host media player 200c. If so, then at step 2920 a determination is made whether there are more new media files to process. If so, processing advances to the next new media file at step 2925. At step 2930 a determination is made whether the new media file currently being processed is an audio file. If so, then at step 2935 the new file is copied to storage 115. Processing then advances to step 2920, to process the next new file. If all of the new files have been processed, then the synchronization ends. If the new file currently being processed is not an audio file, as determined at step 2930, then processing advances directly to step 2920.

If modular audio player 100 is not currently pouched with host media player 200c, as determined at step 2915, then at step 2940 no operation is required, and the new files may be transferred to modular audio player 100 when it is subsequently pouched with host media player 200c. The synchronization then ends.

Reference is now made to FIG. 63, which is a simplified flowchart of operations carried out when modular audio player 100 is pouched with host media player 200c in accordance with an embodiment of the present invention. At step 3005 modular audio player 100 is pouched with host media player 200c. When the two players are pouched, host player 200c receives a corresponding interrupt, and is thus informed of the pouching at step 3010. Such interrupt may be implemented as an SDIO interrupt on the SD bus, or via a dedicated signal.

At step 3020, memories 115 and 215c are searched and a determination is made whether there are new media files in one or both of the memories. If so, then the host player and modular player are synchronized in accordance with FIGS. 61 and 62. Specifically, steps 2820-2850 are performed to copy new files from memory 115 to memory 215c, and steps 2920-2935 are performed to copy new files from memory 215c to memory 115.

Processing then proceeds to step 3025, whereat the players are synchronized according to predefined user preferences. User preferences may indicate, for example, that all audio files are synchronized, subject to memory availability; or that audio files most often or more frequently listened to are synchronized, subject to memory availability; or that audio files with high user ratings are synchronized, subject to memory availability.

If there are no new media files in memories 115 and 215c, as determined at step 3020, the processing proceeds directly to step 3025. After step 3025, the synchronization ends.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for wireless communication comprising:
   in response to orientation of a wireless communicator to a connector of an enhanced function device, the wireless communicator associated with a first identifier and having a first wireless communication functionality and a native user interface, the enhanced function device associated with a second identifier and having a second wireless communication functionality and a parent user interface:
   adapting the wireless communicator to conform with the parent user interface at least partially instead of with the native user interface by at least adapting screen graphics of the wireless communicator to conform with parent look-and-feel parameters of the parent user interface at least partially instead of with native look-and-feel parameters of the native user interface; and changing an identity of the wireless communicator in a wireless network from the first identifier to the second identifier by switching from the first wireless communication functionality to the second wireless communication functionality to access the wireless network using the second identifier.

2. The method for wireless communication of claim 1, wherein the switching switches in response to the wireless communicator making an international call.

3. The method for wireless communication of claim 1, wherein the switching switches in response to sending or receiving an SMS message.

4. The method for wireless communication of claim 1, wherein the switching switches in response to use of data services.

5. The method for wireless communication of claim 1, wherein the first and second identifiers are each associated with an IP address or a subscriber identifier module, and further comprising prompting a user to select between the first and second identifiers, and wherein the switching switches in response to selection of the second identifier.

6. The method for wireless communication of claim 1, wherein the switching comprises disconnecting the wireless communicator from the wireless network and reconnecting the wireless communicator to the wireless network using the second identifier.

7. The method for wireless communication of claim 1, wherein the first wireless communication functionality and the second wireless communication functionality comprise a first subscriber identifier module and a second wireless secure digital (SD) card, respectively.

8. The method for wireless communication of claim 1, wherein the connector is a pouch of the enhanced function device.

9. The method for wireless communication of claim 1, wherein the first wireless communication functionality comprises a SIM card.

10. A method for communication comprising:
in response to orientation of a wireless communicator to a connector of an enhanced function device, the wireless communicator associated with a first identifier and having a first wireless communication functionality and a native user interface, the enhanced function device associated with a second identifier and having a second wired communication functionality and a parent user interface:
adapting screen graphics of the wireless communicator to conform with parent look-and-feel parameters of the parent user interface at least partially instead of with native look-and-feel parameters of the native user interface;
switching from the first wireless communication functionality to the second wired communication functionality and from the first identifier to the second identifier to access a communication network using the second identifier for the wireless communicator; and
accessing the communication network using the second identifier for the wireless communicator in place of the first identifier.

11. The method for communication of claim 10, wherein the switching switches in response to the wireless communicator making an international call.

12. The method for communication of claim 10, wherein the switching switches in response to sending or receiving an SMS message.

13. The method for communication of claim 10, wherein the switching switches in response to use of data services.

14. The method for communication of claim 10, wherein the connector is a pouch of the enhanced function device.

15. The method for communication of claim 10, wherein the first wireless communication functionality comprises a SIM card.

16. The method for communication of claim 10, wherein:
the first identifier is associated with a first internet protocol (IP) address; and
the second identifier is associated with a second IP address that is different than the first IP address.

17. An enhanced function device comprising:
a connector configured to receive a wireless communicator having native user interface functionality and a first wireless communication functionality with a first subscriber identifier module for accessing a communication network;
wired or wireless communication functionality including a second subscriber identifier module for accessing the communication network;
parenting user interface functionality configured to provide interface functionality instead of, or in conjunction with, the native user interface functionality, the interface functionality provided responsive to the wireless communicator being oriented to the connector, the parenting user interface functionality enabling selection to switch from the first wireless communication functionality to the wired or wireless communication functionality and from the first subscriber identifier module to the second subscriber identifier module to enable the wireless communicator to access the communication network using the second subscriber identifier module to identify the wireless communicator; and
a controller configured to control display of graphics screen images generated and adapted by the wireless communicator to conform with parent look-and-feel parameters of the parenting user interface functionality at least partially instead of with native look-and-feel parameters of the native user interface functionality.

18. The enhanced function device of claim 17, wherein the wired or wireless communication functionality is operable to switch from the first subscriber identifier module to the second subscriber identifier module to maintain access to the communication network.

19. The enhanced function device of claim 17, wherein the first subscriber identifier module and the second subscriber identifier module are associated with different access rights to resources of the communication network.

20. The enhanced function device of claim 17, wherein the connector is configured to mechanically support the wireless communicator.

* * * * *